US012686604B2

(12) United States Patent
Hayakawa et al.

(10) Patent No.: US 12,686,604 B2
(45) Date of Patent: Jul. 21, 2026

(54) CONTENT-FILLING SYSTEM AND STERILIZING METHOD

(71) Applicant: DAI NIPPON PRINTING CO., LTD., Tokyo (JP)

(72) Inventors: Atsushi Hayakawa, Tokyo (JP); Yukinori Yamamoto, Tokyo (JP); Yuiko Wada, Tokyo (JP); Junichi Murakami, Tokyo (JP); Takahiro Fujino, Tokyo (JP); Yoshitaka Inoue, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 18/455,710

(22) Filed: Aug. 25, 2023

(65) Prior Publication Data

US 2024/0059541 A1 Feb. 22, 2024

Related U.S. Application Data

(63) Continuation of application No. PCT/JP2022/038385, filed on Oct. 14, 2022.

(30) Foreign Application Priority Data

Oct. 14, 2021 (JP) ................................. 2021-169183
Oct. 14, 2021 (JP) ................................. 2021-169185
(Continued)

(51) Int. Cl.
*B67C 3/26* (2006.01)
*B67C 3/02* (2006.01)
(Continued)

(52) U.S. Cl.
CPC ............ *B67C 3/2642* (2013.01); *B67C 3/026* (2013.01); *B67C 3/225* (2013.01); *B67C 3/24* (2013.01);
(Continued)

(58) Field of Classification Search
None
See application file for complete search history.

(56) References Cited

U.S. PATENT DOCUMENTS 5,376,281 A 12/1994 Safta
5,512,178 A 4/1996 Dempo
(Continued)

FOREIGN PATENT DOCUMENTS

CN 107792974 A 3/2018
DE 20 2013 100 826 U1 8/2013
(Continued)

OTHER PUBLICATIONS

Japanese Office Action (with English translation) dated Jan. 30, 2024 (Application No. 2022-190672).
(Continued)

*Primary Examiner* — Tanzim Imam
(74) *Attorney, Agent, or Firm* — BURR PATENT LAW, PLLC

(57) ABSTRACT

A content-filling system (10) includes a water sterilization line (50) that sterilizes water without heating, an undiluted-solution sterilization line (70) that heats and sterilizes a product undiluted solution, and a filling device (20) that is connected to the water sterilization line (50) and the undiluted-solution sterilization line (70) and that fills the water and the product undiluted solution in bottles (100).

31 Claims, 54 Drawing Sheets

(30) Foreign Application Priority Data

| Oct. 14, 2021 | (JP) | 2021-169186 |
|---|---|---|
| Oct. 14, 2021 | (JP) | 2021-169187 |
| Apr. 11, 2022 | (JP) | 2022-065360 |
| Jul. 29, 2022 | (JP) | 2022-122232 |

(51) Int. Cl.

| B67C 3/22 | (2006.01) |
|---|---|
| B67C 3/24 | (2006.01) |
| B67C 7/00 | (2006.01) |
| C02F 1/00 | (2023.01) |
| C02F 1/32 | (2023.01) |

(52) U.S. Cl.

CPC ............. *B67C 7/004* (2013.01); *C02F 1/001* (2013.01); *C02F 1/325* (2013.01); *B67C 2003/227* (2013.01); *B67C 2003/228* (2013.01); *B67C 2007/006* (2013.01); *C02F 2201/326* (2013.01); *C02F 2209/03* (2013.01); *C02F 2303/04* (2013.01)

(56) References Cited

U.S. PATENT DOCUMENTS

| 7,683,354 B2 | 3/2010 | Girodet et al. |
|---|---|---|
| 2003/0094406 A1 | 5/2003 | Smith |
| 2004/0208781 A1 | 10/2004 | Hayashi et al. |
| 2010/0170867 A1 | 7/2010 | Hayakawa |
| 2011/0094616 A1 | 4/2011 | Hayakawa et al. |
| 2016/0185584 A1 | 6/2016 | Hayakawa et al. |
| 2017/0225971 A1 | 8/2017 | Henderson et al. |
| 2017/0341791 A1 | 11/2017 | Weiler et al. |
| 2018/0257039 A1 | 9/2018 | Giglia et al. |
| 2018/0334372 A1 | 11/2018 | Hayakawa et al. |
| 2019/0002136 A1 | 1/2019 | Bomgaars et al. |
| 2019/0276166 A1 | 9/2019 | Nishino et al. |
| 2019/0375622 A1 | 12/2019 | Hayakawa |
| 2020/0268917 A1 | 8/2020 | Hayakawa |
| 2020/0277178 A1 | 9/2020 | Hayakawa et al. |
| 2020/0297000 A1 | 9/2020 | Wang et al. |
| 2021/0032127 A1 | 2/2021 | Wu et al. |
| 2021/0206662 A1* | 7/2021 | Wei ........................ C02F 1/325 |
| 2021/0261397 A1 | 8/2021 | Hayakawa |
| 2021/0269298 A1 | 9/2021 | Hayakawa et al. |
| 2022/0127125 A1 | 4/2022 | Hayakawa et al. |
| 2024/0059541 A1 | 2/2024 | Hayakawa et al. |

FOREIGN PATENT DOCUMENTS

| EP | 0 558 790 A1 | 9/1993 |
|---|---|---|
| JP | S62-287888 A | 12/1987 |
| JP | H02-095491 A | 4/1990 |
| JP | H05-229595 A | 9/1993 |
| JP | H05-293469 A | 11/1993 |
| JP | H05-305298 A | 11/1993 |
| JP | H07-285505 A | 10/1995 |
| JP | H09-066905 A | 3/1997 |
| JP | H09-301326 A | 11/1997 |
| JP | H11-277061 A | 10/1999 |
| JP | 2001-204439 A | 7/2001 |
| JP | 2001-259394 A | 9/2001 |
| JP | 2004-018496 A | 1/2004 |
| JP | 2005-131559 A | 5/2005 |
| JP | 2006-062660 A | 3/2006 |
| JP | 2006-116536 A | 5/2006 |
| JP | 4526820 B2 | 8/2010 |
| JP | 2012-187037 A | 10/2012 |
| JP | 2013-095504 A | 5/2013 |
| JP | 2014-103893 A | 6/2014 |
| JP | 2015-034013 A | 2/2015 |
| JP | 2015-202897 A | 11/2015 |
| JP | 2017-070255 A | 4/2017 |
| JP | 2018-012102 A | 1/2018 |
| JP | 2018-500246 A | 1/2018 |
| JP | 2018-122044 A | 8/2018 |
| JP | 2018-203340 A | 12/2018 |
| JP | 2019-501375 A | 1/2019 |
| JP | 2019-505168 A | 2/2019 |
| JP | 2019-508325 A | 3/2019 |
| JP | 2019-172377 A | 10/2019 |
| JP | 2019-206366 A | 12/2019 |
| JP | 2020-111369 A | 7/2020 |
| JP | 2020-116294 A | 8/2020 |
| JP | 2020-138802 A | 9/2020 |
| JP | 6757129 B2 * | 9/2020 |
| JP | 2020-183233 A | 11/2020 |
| JP | 2021-013769 A | 2/2021 |
| JP | 2021-031066 A | 3/2021 |
| JP | 2021-080028 A | 5/2021 |
| JP | 7022247 B1 | 2/2022 |
| JP | 2023-129481 A | 9/2023 |
| JP | 2023-175962 A | 12/2023 |
| KR | 20210102081 A * | 8/2021 | ............. C02F 1/325 |
| WO | 2013/094587 A1 | 6/2013 |
| WO | 2014/098058 A1 | 6/2014 |
| WO | 2018/052048 A1 | 3/2018 |
| WO | 2019/069967 A1 | 4/2019 |
| WO | 2019/111994 A1 | 6/2019 |

OTHER PUBLICATIONS

Japanese Office Action (Application No. 2023-174502) dated Jan. 19, 2024 (with English translation) (9 pages).

Japanese Office Action (Application No. 2024-072908) dated Jun. 7, 2024 (with English translation) (7 pages).

International Search Report and Written Opinion (Application No. PCT/JP2022/038385) dated Dec. 13, 2022 (11 pages).

Japanese Office Action (Application No. 2022-109308) dated Sep. 30, 2022 (with English translation) (7 pages).

Japanese Office Action (Application No. 2022-110782) dated Oct. 11, 2022 (with English translation) (5 pages).

Japanese Office Action (Application No. 2022-122232) dated Dec. 2, 2022 (with English translation) (6 pages).

Japanese Office Action (Application No. 2022-109308) dated Feb. 3, 2023 (with English translation) (4 pages).

Japanese Office Action (Application No. 2022-110782) dated Feb. 14, 2023 (with English translation) (6 pages).

Japanese Office Action (Application No. 2023-013595) dated Feb. 17, 2023 (with English translation) (5 pages).

Japanese Office Action (Application No. 2023-013608) dated Feb. 17, 2023 (with English translation) (5 pages).

Japanese Office Action (Application No. 2023-013558) dated Feb. 24, 2023 (with English translation) (6 pages).

Japanese Office Action (Application No. 2023-013558) dated Apr. 7, 2023 (with English translation) (6 pages).

Japanese Office Action (Application No. 2023-013558) dated May 19, 2023 (with English translation) (5 pages).

Japanese Office Action (Application No. 2023-115396) dated Aug. 1, 2023 (with English translation) (5 pages).

Japanese Office Action (Application No. 2023-115416) dated Aug. 1, 2023 (with English translation) (5 pages).

Japanese Decision of Dismissal of Amendment (with English translation) dated Sep. 3, 2024 (Application No. 2024-072803).

Japanese Decision of Refusal (with English translation) dated Sep. 3, 2024 (Application No. 2024-072803).

Japanese Decision of Dismissal of Amendment (with English translation) dated Sep. 3, 2024 (Application No. 2024-072889).

Japanese Decision of Refusal (with English translation) dated Sep. 3, 2024 (Application No. 2024-072889).

Extended European Search Report dated Dec. 6, 2023 (Application No. 22881115.4).

U.S. Appl. No. 18/455,736, filed Aug. 25, 2023, Hayawaka, Atsushi.
U.S. Appl. No. 18/627,650, filed Apr. 5, 2024, Hayawaka, Atsushi.
U.S. Appl. No. 18/629,066, filed Apr. 8, 2024, Hayawaka, Atsushi.

English translation of the International Preliminary Report on Patentability (Chapter I) dated Apr. 25, 2024 (Application No. PCT/JP2022/038385).

(56) References Cited

OTHER PUBLICATIONS

English translation of the International Preliminary Report on Patentability (Chapter I) dated Apr. 25, 2024 (Application No. PCT/JP2022/038386).

English translation of the International Preliminary Report on Patentability (Chapter I) dated Apr. 25, 2024 (Application No. PCT/JP2022/038387).

English translation of the International Preliminary Report on Patentability (Chapter I) dated Apr. 25, 2024 (Application No. PCT/JP2022/038388).

Japanese Office Action (Application No. 2024-072803) dated May 31, 2024 (with English translation) (7 pages).

Japanese Office Action (Application No. 2024-072832) dated May 31, 2024 (with English translation) (6 pages).

Japanese Office Action (Application No. 2024-072889) dated May 31, 2024 (with English translation) (7 pages).

Anonymous: "*UV Medium-Pressure Lamps*," Jun. 22, 2021 (Jun. 22, 2021), XP093185634, Online, Retrieved from the Internet: Jul. 15, 2024 URL:https://www.heraeus.com/en/hng/products_and_ solutions/uv_lamps_and_systems/uv_lamps/uv_medium_pressure_ lamps/ uv_medium_pressure_lamps.html#tabs-43875-4.

European Office Action dated Jul. 18, 2024 (Application No. 22881115.4).

Extended European Search Report dated Sep. 25, 2025 (Application No. 22881117.0).

Japanese Office Action (with English translation) dated Aug. 29, 2025 (Application No. 2025-136587).

Japanese Office Action (Application No. 2024-209775) dated Aug. 26, 2025 (with English translation) (9 pages).

Extended European Search Report dated Sep. 25, 2025 (Application No. 22881116.2).

U.S. Office Action dated Jan. 8, 2026 (U.S. Appl. No. 18/445,736).

Japanese Office Action (Application No. 2024-209775) dated Dec. 19, 2025 (with English translation) (13 pages).

Notice of Termination Reconsideration by Examiner before Appeal Proceedings for Japanese Application No. 2025-136587 dated Apr. 17, 2026.

Reconsideration Report by Examiner before Appeal Proceedings for Japanese Application No. 2025-136587 dated Apr. 17, 2026.

* cited by examiner

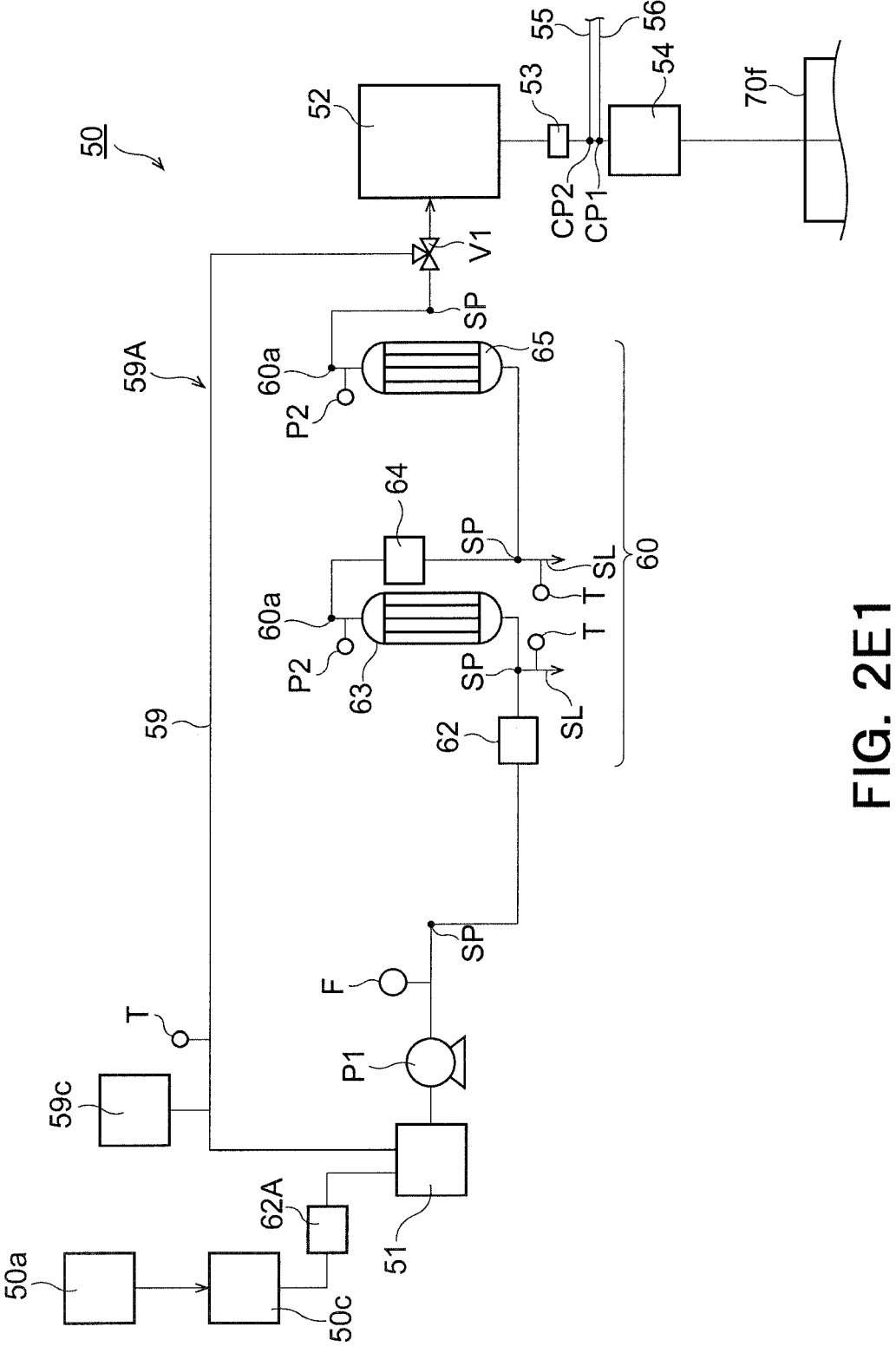
FIG. 2E1

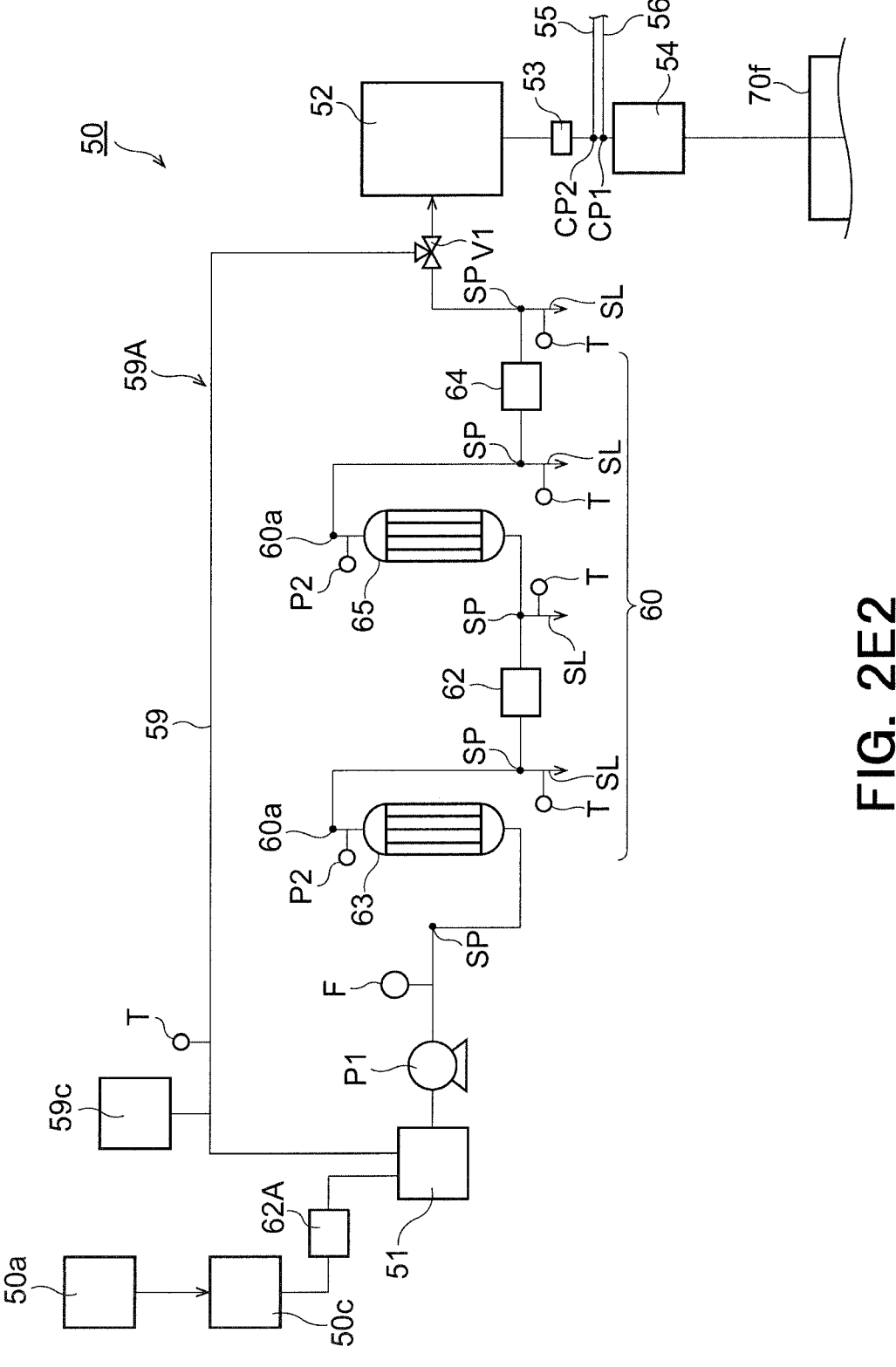
FIG. 2E2

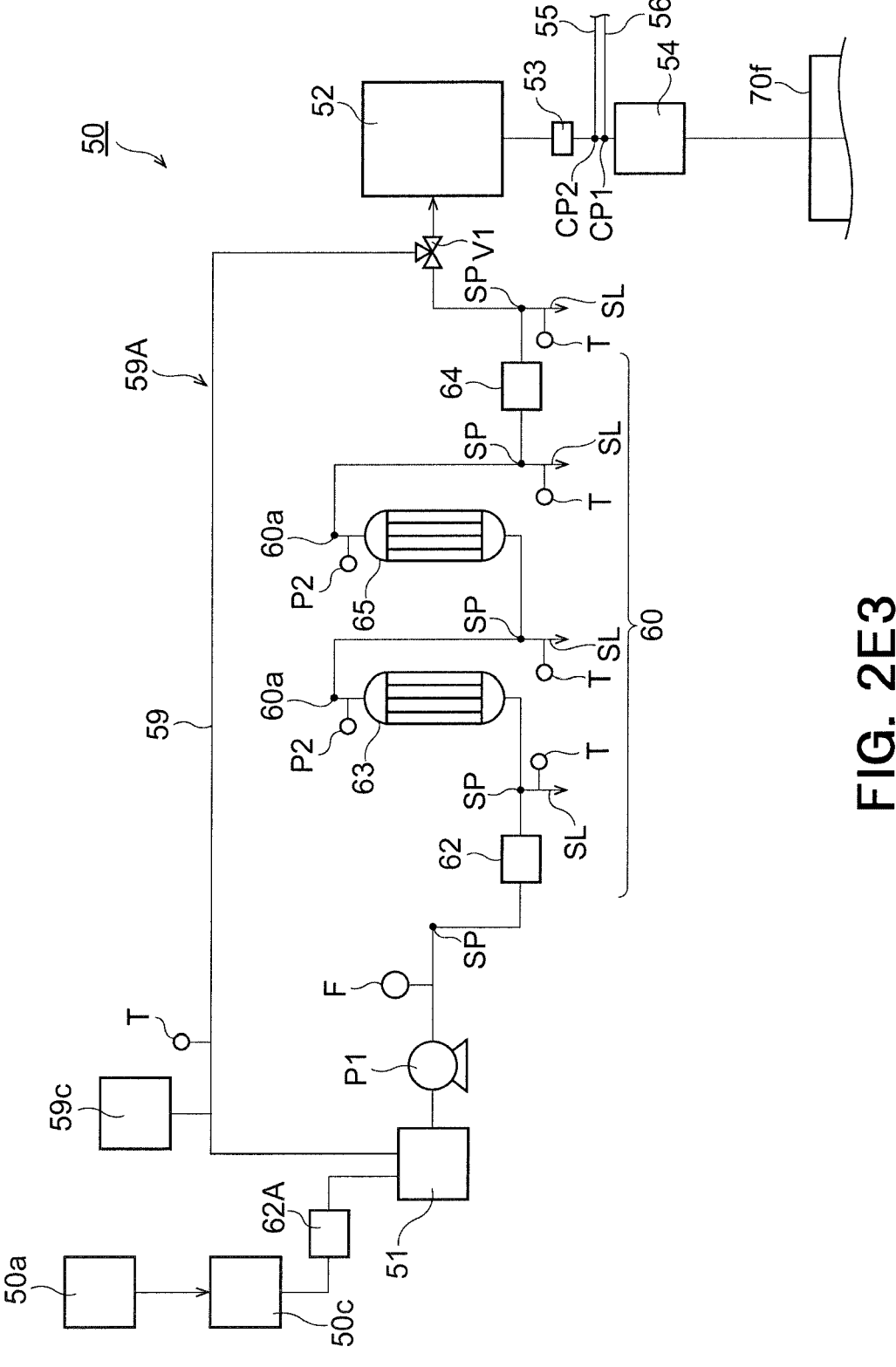
FIG. 2E3

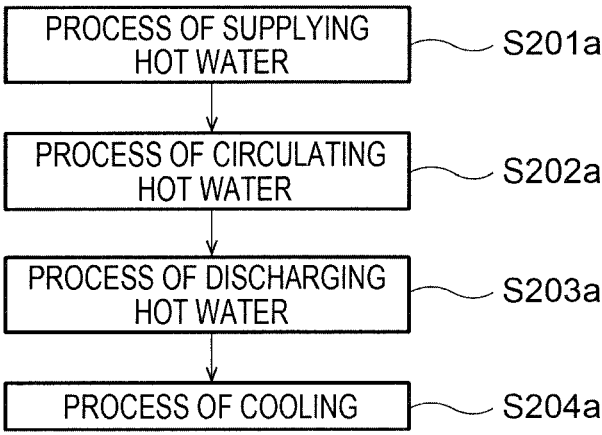
FIG. 10B1
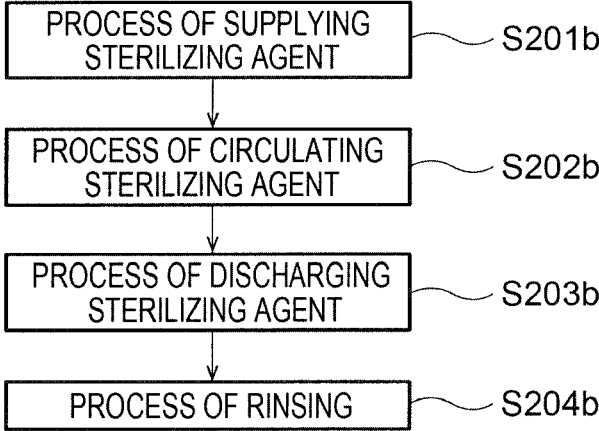
FIG. 10B2

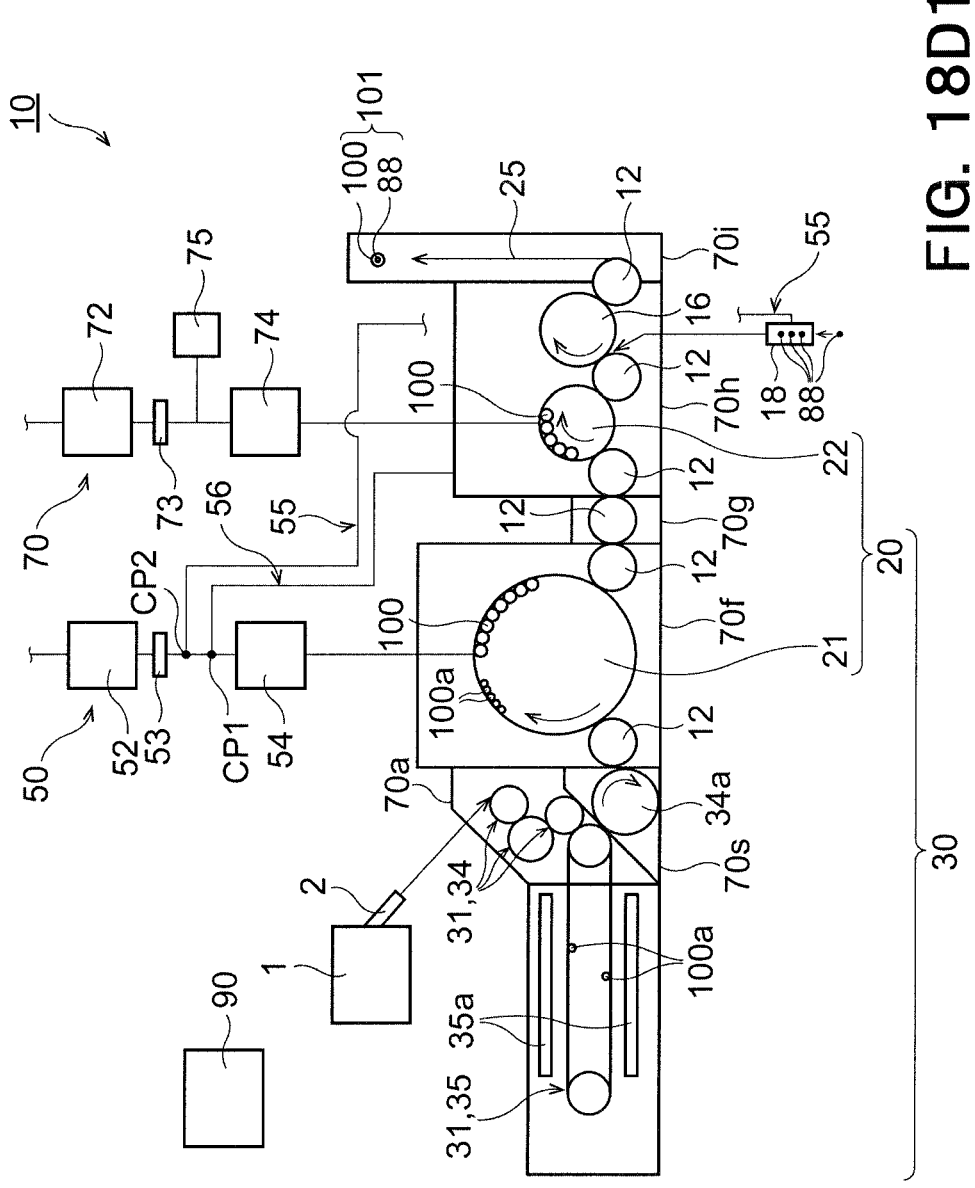
FIG. 18D1

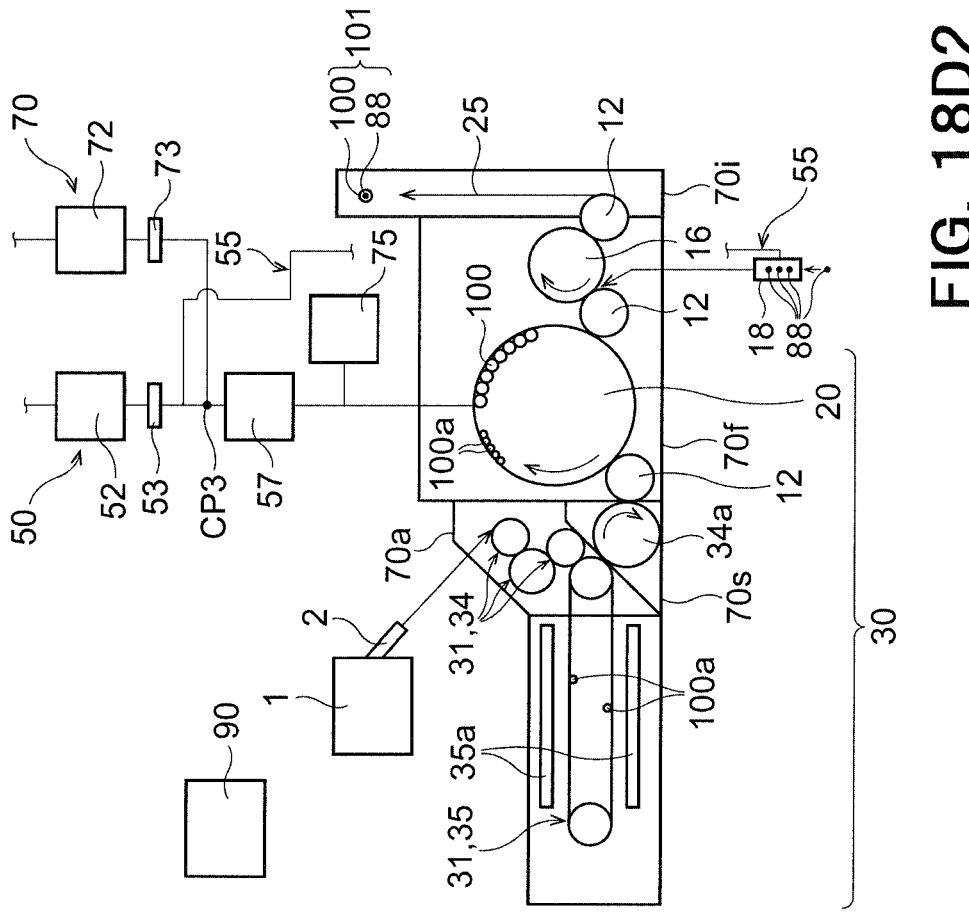
FIG. 18D2

CONTENT-FILLING SYSTEM AND STERILIZING METHOD

TECHNICAL FIELD

The present disclosure relates to a content-filling system and a sterilizing method.

BACKGROUND ART

A known sterile filling system (an Aseptic filling system) fills a sterilized content in a sterilized container (a PET bottle) in a sterile environment and subsequently caps the container by using a cap (see, for example, Patent Document 1).

Specifically, as for the sterile filling system, a molded container is supplied to the sterile filling system, a hydrogen peroxide solution that serves as a sterilizing agent is sprayed to the container in the sterile filling system. Subsequently, the hydrogen peroxide solution is dried, and the container is consequently sterilized. Subsequently, the content is sterilely filled in the container.

In recent years, there has been a need to decrease the amount of discharged carbon dioxide in order to decrease an environmental load.

CITATION LIST

Patent Literature

PATENT DOCUMENT 1: Japanese Patent No. 4526820

The present disclosure has been accomplished in view of these matters, and it is an object of the present disclosure to provide a content-filling system and a sterilizing method that enable the amount of discharged carbon dioxide to be decreased.

SUMMARY OF INVENTION

According to a first aspect of the present disclosure, a content-filling system includes a water sterilization line that sterilizes water without heating, an undiluted-solution sterilization line that heats and sterilizes a product undiluted solution, and a filling device that is connected to the water sterilization line and the undiluted-solution sterilization line and that fills the water and the product undiluted solution in a container.

According to a second aspect of the present disclosure, as for the content-filling system according to the first aspect described above, the water sterilization line may sterilize the water by using an ultraviolet ray.

According to a third aspect of the present disclosure, as for the content-filling system according to the first aspect described above or the second aspect described above, at the water sterilization line, the water may be sterilized by using the ultraviolet ray at least from a low-pressure mercury lamp or an intermediate-pressure mercury lamp.

According to a fourth aspect of the present disclosure, as for the content-filling system according to the second aspect described above or the third aspect described above, the content-filling system may further include a control unit that controls the water sterilization line, and the control unit may cause the water to be discharged to a location outside the water sterilization line in a case where an irradiation amount or irradiance of the ultraviolet ray is equal to or less than a predetermined value.

According to a fifth aspect of the present disclosure, a content-filling system includes a water sterilization line that sterilizes water, an undiluted-solution sterilization line that heats and sterilizes a product undiluted solution, and a filling device that is connected to the water sterilization line and the undiluted-solution sterilization line and that fills the water and the product undiluted solution in a container, the water sterilization line sterilizes the water such that an $F_0$ value is 0.00029 or more and less than 3.1 in a case where a content that is manufactured by diluting the product undiluted solution with the water has a pH of less than 4.5, the water sterilization line sterilizes the water such that the $F_0$ value is 3.1 or more and 100 or less in a case where the content has a pH of 4.5 or more, and the $F_0$ value is an F value that is calculated as an expression:

$$F = \int_{t_0}^{t_1} 10^{(T-T_r)/Z} dt \qquad \text{[Math. 1]}$$

(where T is a freely determined sterilization temperature (° C.), $10^{\{(T-Tr)/Z\}}$ is a lethality ratio at the freely determined sterilization temperature T, Tr is a reference temperature (° C.), and Z is a Z value (10° C.)).

According to a sixth aspect of the present disclosure, a content-filling system includes a water sterilization line that sterilizes water, an undiluted-solution sterilization line that heats and sterilizes a product undiluted solution, and a filling device that is connected to the water sterilization line and the undiluted-solution sterilization line and that fills the water and the product undiluted solution in a container, the water sterilization line sterilizes the water such that an $F_0$ value is 3.1 or more and 100 or less, and the $F_0$ value is an F value that is calculated as an expression:

$$F = \int_{t_0}^{t_1} 10^{(T-T_r)/Z} dt \qquad \text{[Math. 2]}$$

(where T is a freely determined sterilization temperature (° C.), $10^{\{(T-Tr)/Z\}}$ is a lethality ratio at the freely determined sterilization temperature T, Tr is a reference temperature (° C.), and Z is a Z value (10° C.)).

According to a seventh aspect of the present disclosure, as for the content-filling system according to any one of the first aspect described above to the sixth aspect described above, the water sterilization line may sterilize the water by filtering the water by using a sterile filter.

According to an eighth aspect of the present disclosure, as for the content-filling system according to any one of the first aspect described above to the seventh aspect described above, the content-filling system may further include a control unit that controls the water sterilization line, the water sterilization line may include at least a water sterilizer that sterilizes the water, the water sterilizer may include at least a sterile filter, and the control unit may cause the water to be discharged to a location outside the water sterilization line in a case where a difference between pressure at a position upstream of the sterile filter and pressure at a position downstream of the sterile filter is a predetermined value or more.

According to a ninth aspect of the present disclosure, as for the content-filling system according to any one of the first aspect described above to the eighth aspect described above, the content-filling system may further include a control unit that controls the water sterilization line, the control unit may cause the water to be discharged to a location outside the water sterilization line in a case where at least a number of a microbe or a number of a fine particle in the water that is sampled from the water sterilization line is a predetermined value or more.

According to a tenth aspect of the present disclosure, as for the content-filling system according to any one of the first aspect described above to the ninth aspect described above, the product undiluted solution may be diluted with the water by a factor of 1.1 or more and 100 or less.

According to an eleventh aspect of the present disclosure, as for the content-filling system according to any one of the first aspect described above to the tenth aspect described above, the filling device may include a water-filling device that is connected to the water sterilization line and an undiluted-solution-filling device that is connected to the undiluted-solution sterilization line, the water-filling device may fill the water that is sterilized in the container, and the undiluted-solution-filling device may fill the product undiluted solution that is sterilized in the container.

According to a twelfth aspect of the present disclosure, as for the content-filling system according to the eleventh aspect described above, the water-filling device may fill the water in the container that is empty, and a filling rate at which the water-filling device fills the water in the container may be higher than a filling rate at which the undiluted-solution-filling device fills the product undiluted solution in the container.

According to a thirteenth aspect of the present disclosure, as for the content-filling system according to any one of the first aspect described above to the ninth aspect described above, the filling device may include a water-filling device that is connected to the water sterilization line and an undiluted-solution-filling device that is connected to the undiluted-solution sterilization line, and the water or the product undiluted solution may be filled in the container by using only the water-filling device or the undiluted-solution-filling device.

According to a fourteenth aspect of the present disclosure, as for the content-filling system according to any one of the eleventh aspect described above to the thirteenth aspect described above, the water-filling device may include a plurality of water-filling nozzles that fills the water, a snifting line for discharging gas in the container may be connected to a corresponding one of the plurality of water-filling nozzles, and the water-filling device may compress and fill the water with the gas in the container being to be discharged via the snifting line.

According to a fifteenth aspect of the present disclosure, as for the content-filling system according to the fourteenth aspect described above, a seal member that inhibits the gas in the container from leaking by coming into close contact with the container may be disposed at an end of the plurality of water-filling nozzles, and the water-filling device may compress and fill the water with the seal member being in close contact with the container.

According to a sixteenth aspect of the present disclosure, as for the content-filling system according to the fourteenth aspect described above or the fifteenth aspect described above, the undiluted-solution-filling device may include a plurality of undiluted-solution-filling nozzles that fills the product undiluted solution, and a diameter of the plurality of water-filling nozzles may be larger than a diameter of the plurality of undiluted-solution-filling nozzles.

According to a seventeenth aspect of the present disclosure, as for the content-filling system according to the sixteenth aspect described above, the diameter of the plurality of water-filling nozzles may be 1.2 times the diameter of the plurality of undiluted-solution-filling nozzles or more and 1.5 times the diameter of the plurality of undiluted-solution-filling nozzles or less.

According to an eighteenth aspect of the present disclosure, as for the content-filling system according to any one of the eleventh aspect described above to the seventeenth aspect described above, the filling device may include a plurality of the undiluted-solution-filling devices.

According to a nineteenth aspect of the present disclosure, as for the content-filling system according to the eighteenth aspect described above, the content-filling system may further include a plurality of the undiluted-solution sterilization lines, and each of the plurality of the undiluted-solution-filling devices may be connected to a corresponding one of the plurality of the undiluted-solution sterilization lines.

According to a twentieth aspect of the present disclosure, as for the content-filling system according to the nineteenth aspect described above, the filling device may include a first undiluted-solution-filling device that fills the product undiluted solution that has no flavor, and a second undiluted-solution-filling device that fills the product undiluted solution that has flavor.

According to a twenty-first aspect of the present disclosure, as for the content-filling system according to the twentieth aspect described above, the first undiluted-solution-filling device may be contained in a space that is divided by a chamber wall, the chamber wall may have a gap through which the container passes, a first wheel that includes a first gripper that conveys the container may be disposed outside the space so as to be capable of opening and closing, a second wheel that includes a second gripper that conveys the container may be disposed in the space so as to be capable of opening and closing, the second gripper may receive the container from the first gripper in a case where the first undiluted-solution-filling device fills the product undiluted solution in the container, and the second gripper may move to an open position so as not to interfere with the first gripper in a case where the first undiluted-solution-filling device does not fill the product undiluted solution in the container.

According to a twenty-second aspect of the present disclosure, as for the content-filling system according to the twenty-first aspect described above, the chamber wall may include a shutter that covers and uncovers the gap, the shutter may cover the gap in a case where the first undiluted-solution-filling device does not fill the product undiluted solution in the container, and the second gripper may move to the open position so as not to interfere with the shutter that covers the gap.

According to a twenty-third aspect of the present disclosure, as for the content-filling system according to any one the first aspect described above to the tenth aspect described above, a mixing tank that mixes the water and the product undiluted solution may be interposed between the water sterilization line and the filling device and between the undiluted-solution sterilization line and the filling device.

According to a twenty-fourth aspect of the present disclosure, as for the content-filling system according to any one of the first aspect described above to the tenth aspect described above, the filling device may include a plurality of filling nozzles that fills the water and the product undiluted solution, and the water sterilization line and the undiluted-solution sterilization line may be connected to a corresponding one of the plurality of filling nozzles.

According to a twenty-fifth aspect of the present disclosure, as for the content-filling system according to any one of the first aspect described above to the twenty-fourth aspect described above, the water sterilization line may include a first water tank that stores the water, a water sterilizer that sterilizes the water that is stored in the first water tank, and a second water tank that stores the water that is sterilized by the water sterilizer, and the undiluted-solution sterilization line may include a first undiluted-solution tank that stores the product undiluted solution, a product-undiluted-solution sterilizer that heats and sterilizes the product undiluted solution that is stored in the first undiluted-solution tank, and a second undiluted-solution tank that stores the product undiluted solution that is sterilized by the product-undiluted-solution sterilizer.

According to a twenty-sixth aspect of the present disclosure, as for the content-filling system according to the twenty-fifth aspect described above, the water sterilization line may include a plurality of the water sterilizers.

According to a twenty-seventh aspect of the present disclosure, as for the content-filling system according to the twenty-fifth aspect described above or the twenty-sixth aspect described above, the content-filling system may further include a cap-sterilizing device that sterilizes a cap to be mounted on the container in which the water and the product undiluted solution are filled, and a bypass line that connects the water sterilization line and the cap-sterilizing device to each other may be disposed downstream of the second water tank.

According to a twenty-eighth aspect of the present disclosure, as for the content-filling system according to any one of the twenty-fifth aspect described above to the twenty-seventh aspect described above, an addition unit that adds a solid into the product undiluted solution may be coupled downstream of the second undiluted-solution tank.

According to a twenty-ninth aspect of the present disclosure, the content-filling system according to any one of the first aspect described above to the twenty-eighth aspect described above may further include a preform-sterilizing device that sterilizes a preform, a container-molding device that molds the container by using the preform, and a container-sterilizing device that sterilizes the container, and the container-molding device may mold the container without adjusting temperature of the container by using warm water.

According to a thirtieth aspect of the present disclosure, as for the content-filling system according to any one of the first aspect described above to the twenty-ninth aspect described above, the water sterilization line may be divided into a non-sterile zone in a non-sterile atmosphere, a first gray zone and a second gray zone that isolate the non-sterile atmosphere and a sterile atmosphere from each other, and a sterile zone in the sterile atmosphere, the non-sterile zone, the first gray zone, the second gray zone, and the sterile zone may be arranged in this order from an upstream position to a downstream position in a direction in which the water is conveyed, a microbe in the water may be killed in the first gray zone, and a state in which no microbe is present in the water may be maintained in the second gray zone.

According to a thirty-first aspect of the present disclosure, as for a sterilizing method of sterilizing the content-filling system according to any one of the first aspect described above to the thirtieth aspect described above, the water sterilization line includes at least a water sterilizer, the water sterilizer includes at least one sterile filter and at least one sterilizer, and the sterilizing method includes a step of conducting a first integrity test for the at least one sterile filter, a step of sterilizing the at least one sterile filter, and a step of conducting a second integrity test for the at least one sterile filter.

According to a thirty-second aspect of the present disclosure, as for the sterilizing method according to the thirty-first aspect described above, the sterilizing method may further include a step of sterilizing the at least one sterilizer.

According to a thirty-third aspect of the present disclosure, as for the sterilizing method according to the thirty-first aspect described above or the thirty-second aspect described above, the step of sterilizing the at least one sterilizer may include a step of supplying hot water to the water sterilizer, a step of circulating the hot water in a circulation system that includes the at least one sterilizer, and a step of cooling the circulation system.

According to a thirty-fourth aspect of the present disclosure, as for the sterilizing method according to any one of the thirty-first aspect described above to the thirty-third aspect described above, the step of sterilizing the at least one sterilizer may include a step of supplying a chemical to the water sterilizer, a step of circulating the chemical in a circulation system that includes the at least one sterilizer, and a step of rinsing the circulation system.

According to a thirty-fifth aspect of the present disclosure, as for the sterilizing method according to any one of the thirty-first aspect described above to the thirty-fourth aspect described above, the step of sterilizing the at least one sterile filter may be performed while the step of sterilizing the at least one sterilizer is performed.

According to the present disclosure, the amount of carbon dioxide that is discharged by a content-filling system can be decreased.

BRIEF DESCRIPTION OF DRAWINGS

FIG. 2E1 schematically illustrates another example of the water sterilization line according to an embodiment.

FIG. 2E2 schematically illustrates another example of the water sterilization line according to an embodiment.

FIG. 2E3 schematically illustrates another example of the water sterilization line according to an embodiment.

FIG. 2I schematically illustrates another example of the water sterilization line according to an embodiment.

FIG. 3 illustrates a plan view of a first sterilizer of a water sterilizer according to an embodiment.

FIG. 10B1 is a flowchart illustrating the method of sterilizing the water sterilizer corresponding to the method of sterilizing the content-filling system according to an embodiment.

FIG. 10B2 is a flowchart illustrating another example of the method of sterilizing the water sterilizer corresponding to the method of sterilizing the content-filling system according to an embodiment.

FIG. 18D1 schematically illustrates a plan view of a sixteenth modification to the content-filling system according to an embodiment.

FIG. 18D2 schematically illustrates a plan view of another example of the sixteenth modification to the content-filling system according to an embodiment.

DESCRIPTION OF EMBODIMENTS

Embodiments of the present disclosure will hereinafter be described with reference to the drawings. FIG. 1 to FIG. 10E illustrate an embodiment.
(Content-Filling System)

A content-filling system (a sterile filling system) according to the embodiment will now be described with reference to FIG. 1.

Figure 1:
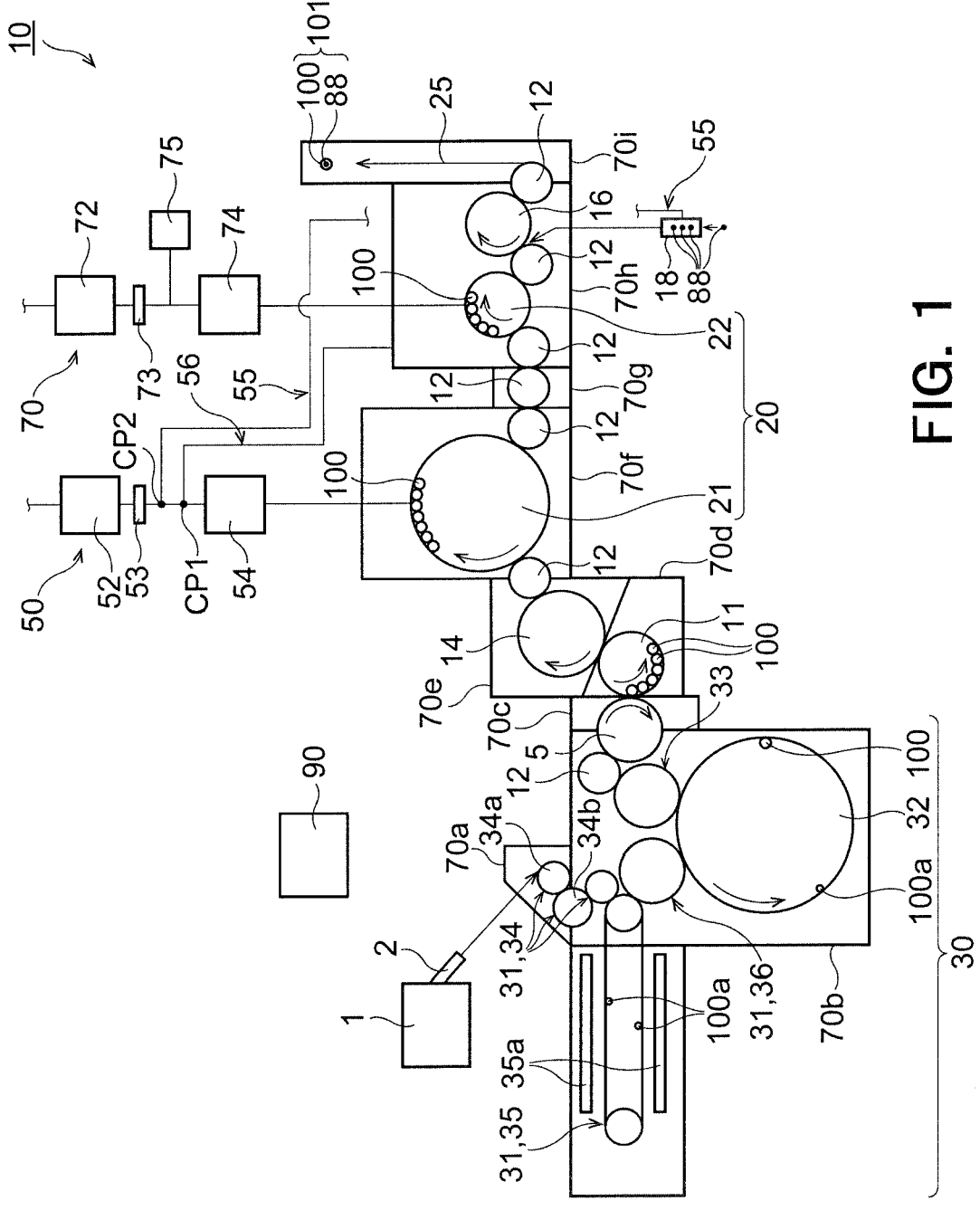
FIG. 1 schematically illustrates a plan view of a content-filling system according to an embodiment.

A content-filling system 10 illustrated in FIG. 1 fills a content such as a beverage in bottles (containers) 100. The content can be manufactured by diluting a product undiluted solution with water. In this case, the product undiluted solution may be diluted with the water by a factor of 1.1 or more and 100 or less and is preferably diluted by a factor of 2 or more and 10 or less. The product undiluted solution may be diluted with the water by a factor of 10 or more and 80 or less, diluted by a factor of 20 or more and 70 or less, or diluted by a factor of 30 or more and 50 or less. The bottles 100 can be manufactured in a manner in which preforms 100a that are manufactured by injection-molding a synthetic resin material are molded by biaxial stretching blow molding. The bottles 100 may be manufactured by direct blow molding. A thermoplastic resin, particularly, PE (polyethylene), PP (polypropylene), PET (polyethylene terephthalate), or PEN (polyethylene naphthalate) is preferably used as the materials of the bottles 100. Other than these, the containers may be glass, can, paper, pouch, or cup containers, or composite containers thereof. In an example described according to the present embodiment, the containers are synthetic resin bottles.

As illustrated in FIG. 1, the content-filling system 10 includes a water sterilization line 50 that sterilizes the water, an undiluted-solution sterilization line 70 that sterilizes the product undiluted solution, and a filling device (a filler) 20 that is connected to the water sterilization line 50 and the undiluted-solution sterilization line 70. The content-filling system 10 further includes a control unit 90 that controls the filling device 20. The content-filling system 10 further includes a bottle-molding unit 30, a sterilizing device (a container-sterilizing device) 11, an air-rinsing device 14, the filling device 20 described above, a cap-mounting device (a capper, a seamer, and a capping machine) 16, and a product-bottle-unloading unit 25. The bottle-molding unit 30, the sterilizing device 11, the air-rinsing device 14, the filling device 20, the cap-mounting device 16, and the product-bottle-unloading unit 25 are arranged in this order from an upstream position to a downstream position in a direction in which the bottles 100 are conveyed. Multiple conveyance wheels 12 that are disposed, for example, between the air-rinsing device 14 and the filling device 20 and between the filling device 20 and the cap-mounting device 16 convey the bottles 100 therebetween. The bottle-molding unit 30, the sterilizing device 11, the air-rinsing device 14, the filling device 20, the cap-mounting device 16, and the product-bottle-unloading unit 25 will now be described.

The bottle-molding unit 30 receives the preforms 100a from the outside and molds the bottles 100. The bottle-molding unit 30 conveys the bottles 100 that are molded toward the sterilizing device 11. This enables a process of supplying the preforms 100a, a process of molding the bottles 100, a process of filling the content in the bottles 100, and a process of capping to be continuously performed at the content-filling system 10. In this case, instead of the bottles 100 that have a large volume, the preforms 100a that have a small volume are conveyed from the outside to the content-filling system 10. For this reason, conveyance costs can be reduced.

The bottle-molding unit 30 includes a preform-conveying unit 31 that conveys the preforms 100a, a blow molding unit (a container-molding device) 32 that performs blow molding on the preforms 100a and that consequently molds the bottles 100 by using the preforms 100a, and a bottle-conveying unit 33 that conveys the bottles 100 that are molded.

Among these, the preform-conveying unit 31 includes a receiving portion 34, a heating portion 35, and a delivering portion 36. Among these, the receiving portion 34 receives the preforms 100a that are supplied from a preform-supplying device 1 via a preform-supplying conveyor 2. The receiving portion 34 includes a preform-sterilizing device 34a that sterilizes the preforms 100a and a preform-air-rinsing device 34b that air-rinses the preforms 100a. In an example illustrated, the receiving portion 34 includes the single preform-sterilizing device 34a and the single preform-air-rinsing device 34b. The number of the preform-sterilizing device 34a and the number of the preform-air-rinsing device 34b are not limited thereto.

At the receiving portion 34, the preform-sterilizing device 34a blows gas or mist of a hydrogen peroxide solution to the preforms 100a and sterilizes the preforms 100a (preliminary sterilization).

A sterilizing agent for sterilizing the preforms 100a has properties for inactivating microorganisms. For example, hydrogen peroxide, peracetic acid, acetic acid, peroxynitric acid, nitric acid, a chlorinated chemical, sodium hydroxide, potassium hydroxide, alcohol such as ethyl alcohol or isopropyl alcohol, chlorine dioxide, ozone water, acid water, or a surfactant alone may be used, or a combination of two or more of these may be used.

The preform-sterilizing device 34a thus sterilizes the preforms 100a in advance (preliminary sterilization). Consequently, microbes adhering to the bottles 100 that are manufactured by using the preforms 100a can be reduced. For this reason, the amount of hydrogen peroxide that is used for the sterilizing device 11 that sterilizes the bottles 100 can be decreased, and the time for sterilization can be decreased. The amount of the sterilizing agent that is used for sterilizing the preforms 100a that have a small volume may be typically smaller than the amount of the sterilizing agent that is used for sterilizing the bottles 100. For this reason, the preliminary sterilization of the preforms 100a enables the total amount of the sterilizing agent that is used to be decreased.

Since the amount of hydrogen peroxide that is used for the sterilizing device 11 can be decreased, and the time for sterilization can be decreased, the size of the sterilizing device 11 can be decreased. Since the time for sterilization for which the bottles 100 are sterilized can be decreased, a thermal load on the bottles 100 can be reduced. For this reason, the bottles 100 can be inhibited from deforming due to the heat of the sterilizing agent even when the bottles 100 are light or the bottles 100 are composed of recycled PET.

Since the preliminary sterilization of the preforms 100*a* enables the microbes adhering to the bottles 100 to be reduced, sterilization conditions as for the sterilizing device 11 may become less strict. In order to improve a sterilizing effect as for the sterilizing device 11, heat setting is typically performed on trunk portions of the bottles 100 in a manner in which warm water in a mold temperature controller (not illustrated) is supplied to a mold at the blow molding unit 32. This enables the sterilizing effect as for the sterilizing device 11 to be improved and can inhibit the bottles 100 from shrinking at the sterilizing device 11. According to the present embodiment, however, the preliminary sterilization of the preforms 100*a* enables the microbes adhering to the bottles 100 to be reduced as described above. For this reason, the blow molding unit (the container-molding device) 32 may mold the bottles 100 without adjusting the temperature of the bottles 100 by using warm water. That is, at the blow molding unit 32, the warm water that is typically supplied to the mold in order to improve the sterilizing effect may not be supplied to the mold. As a result, the amount of carbon dioxide that is discharged by the content-filling system 10 can be decreased. Since the warm water may not be supplied to the mold of the blow molding unit 32, the blow molding unit 32 can be simplified. Since the blow molding unit 32 can be simplified, the amount of heat that is provided to the bottles 100 can be decreased. For this reason, the bottles 100 can be inhibited from shrinking at the sterilizing device 11 even in the case where the warm water described above is not supplied to the mold.

Such a sterilizing process may be performed by not only the receiving portion 34 but also the heating portion 35 or the delivering portion 36. The sterilizing process may be performed between the bottle-conveying unit 33 and the filling device 20 after the bottles 100 are molded. The sterilizing process may be performed at multiple locations. In the sterilizing process, the sterilizing agent may not be used, and the microbes may be inactivated by using, for example, ultraviolet radiation or electron beam radiation.

Referring to FIG. 1, the preform-air-rinsing device 34*b* described above is disposed downstream of the preform-sterilizing device 34*a*. The preforms 100*a* to which the sterilizing agent is blown are dried by using hot air at the preform-air-rinsing device 34*b*. At this time, the hot air is preferably supplied to the preforms 100*a* with the mouths of the preforms 100*a* facing downward. This enables foreign material to be effectively removed from the preforms 100*a*. For this reason, a process of cleaning the preforms 100*a* by using sterile water can be omitted, and the amount of carbon dioxide that is discharged by the content-filling system 10 can be decreased. As for the receiving portion 34, the preform-air-rinsing device 34*b* may not be provided. As for the receiving portion 34, a foreign-material-removing device (not illustrated) that removes foreign material adhering to the preforms 100*a* may be disposed upstream of the preform-sterilizing device 34*a*.

The heating portion 35 receives the preforms 100*a* from the receiving portion 34 and heats the preforms 100*a* while conveying the preforms 100*a*. The heating portion 35 includes a heater 35*a* that heats the preforms 100*a*. An example of the heater 35*a* may be an infrared heater. The heater 35*a* heats the preforms 100*a* roughly to a temperature of, for example, 90° C. or more and 130° C. or less. The temperature of the mouths of the preforms 100*a* is maintained at a temperature of 70° C. or less, for example, so as not to deform.

The delivering portion 36 receives the preforms 100*a* that are heated by the heating portion 35 and delivers the preforms 100*a* to the blow molding unit 32.

The blow molding unit 32 includes the mold not illustrated. The bottles 100 are molded in a manner in which blow molding is performed on the preforms 100*a* by using the mold. The bottle-conveying unit 33 conveys the bottles 100 that are molded to a downstream position.

An adjustment conveying unit 5 that receives the bottles 100 from the bottle-conveying unit 33 and that delivers the bottles 100 to the sterilizing device 11 is disposed between the bottle-molding unit 30 and the sterilizing device 11. At least a portion of the adjustment conveying unit 5 is contained in an atmosphere shielding chamber 70*c* (described later) that is disposed upstream of a sterilizing-agent spray chamber 70*d* (described later). In an example illustrated, the adjustment conveying unit 5 extends over a molding unit chamber 70*b* (described later) that contains the bottle-molding unit 30 and the atmosphere shielding chamber 70*c*. At least a portion of the adjustment conveying unit 5 is thus contained in the atmosphere shielding chamber 70*c*, and consequently, gas or mist of the sterilizing agent that is generated in the sterilizing-agent spray chamber 70*d* or a mixture thereof can be inhibited from entering the molding unit chamber 70*b*.

In an example illustrated, one of the conveyance wheels 12 is disposed between the adjustment conveying unit 5 and the bottle-conveying unit 33 of the bottle-molding unit 30. That is, the bottle-conveying unit 33 of the bottle-molding unit 30, one of the conveyance wheels 12, and the adjustment conveying unit 5 are disposed between the blow molding unit 32 of the bottle-molding unit 30 and the sterilizing device 11. This enables the content-filling system 10 to be compact, unlike the case where the multiple conveyance wheels 12 are disposed between the adjustment conveying unit 5 and the bottle-conveying unit 33 of the bottle-molding unit 30. Only the adjustment conveying unit 5 may be disposed between the blow molding unit 32 of the bottle-molding unit 30 and the sterilizing device 11 although this is not illustrated. In this case, the content-filling system 10 can be more compact.

The sterilizing device 11 sprays the sterilizing agent to the bottles 100 and consequently sterilizes the bottles 100. In this way, the bottles 100 are sterilized by using the sterilizing agent before the content is filled. An example of the sterilizing agent is a hydrogen peroxide solution. At the sterilizing device 11, gas or mist of a hydrogen peroxide solution is generated, and the gas or the mist is sprayed to the inner and outer surfaces of the bottles 100. The bottles 100 are thus sterilized by using the gas or mist of the hydrogen peroxide solution, and accordingly, the inner and outer surfaces of the bottles 100 are uniformly sterilized.

The air-rinsing device 14 supplies heated air or room temperature air that is sterile to the bottles 100 and consequently removes, for example, foreign material and hydrogen peroxide from the bottles 100 while activating the hydrogen peroxide. At this time, the sterile air is preferably supplied to the bottles 100 with the mouths of the bottles 100 facing downward. This enables the foreign material to be effectively removed from the bottles 100. For this reason, a process of cleaning the bottles 100 by using sterile water can be omitted, and the amount of carbon dioxide that is discharged by the content-filling system 10 can be decreased. Condensation mist of hydrogen peroxide having a low concentration may be mixed with the room temperature air that is sterile, and the hydrogen peroxide may be gasified and supplied to the bottles 100 as needed.

The filling device 20 fills the water and the product undiluted solution in the bottles 100. That is, the filling device 20 fills the water and the product undiluted solution that are sterilized in advance in the bottles 100 via the mouths of the bottles 100. In this way, at the filling device 20, the content that is manufactured by diluting the product undiluted solution is filled in the bottles 100 that are empty. At the filling device 20, the content is filled in the bottles 100 while the multiple bottles 100 are rotated and conveyed.

The filling device 20 may include a water-filling device 21 that is connected to the water sterilization line 50 and an undiluted-solution-filling device 22 that is connected to the undiluted-solution sterilization line 70. The water-filling device 21 and the undiluted-solution-filling device 22 are arranged in this order from an upstream position to a downstream position in the direction in which the bottles 100 are conveyed. The water-filling device 21 is disposed in a first sterile chamber 70f described later. The undiluted-solution-filling device 22 is disposed in a second sterile chamber 70h described later. The water-filling device 21 and the undiluted-solution-filling device 22 may be so-called rotary fillers.

The water-filling device 21 fills the sterilized water in the bottles 100. In this case, the water-filling device 21 fills the sterilized water in the bottles 100 that are empty. The undiluted-solution-filling device 22 fills the sterilized product undiluted solution in the bottles in which the water is filled. The filling device 20 thus includes the water-filling device 21 and the undiluted-solution-filling device 22, and consequently, the size of the filling device (that is, the undiluted-solution-filling device 22) that comes into contact with the product undiluted solution or the content can be decreased, unlike the case where a single filling device fills the content. For this reason, a region in which the filling device 20 is cleaned and sterilized can be narrowed as described later.

A filling rate at which the water-filling device 21 fills the water in the bottles 100 may be higher than a filling rate at which the undiluted-solution-filling device 22 fills the product undiluted solution in the bottles 100. That is, the water-filling device 21 fills the water in the bottles 100 that are empty, and consequently, the filling rate at which the water is filled can be increased. In some cases where the content is filled in the bottles 100 at a rapid filling rate, a part of the content splashes to the outside via the mouths of the bottles 100, for example, due to bubbling in the bottles 100. There is a possibility that the content splashes to the outside, and the content leaves a stain around the bottles 100. In the case where the water is filled in the bottles 100 that are empty, however, no stain is left around the bottles 100 even when the water splashes to the outside via the mouths of the bottles 100. For this reason, the filling rate at which the water is filled can be increased. As a result, the number of water-filling nozzles (see, for example, FIG. 16B described later) of the water-filling device 21 can be decreased. For this reason, the size of the water-filling device 21 can be decreased.

As for the water-filling device 21, the filling rate at which the water is filled may be 100 mL/sec or more and 500 mL/sec or less, preferably 200 mL/sec or more and 400 mL/sec or less. When the filling rate at which the water is filled is 100 mL/sec or more, the number of the water-filling nozzles of the water-filling device 21 can be further decreased. For this reason, the size of the water-filling device 21 can be further decreased. When the filling rate at which the water is filled is 500 mL/sec or less, the water can be inhibited from splashing to the outside via the mouths of the bottles 100 while the water is filled in the bottles 100. For this reason, a content volume and a magnification at which the product undiluted solution is diluted can be inhibited from varying among product bottles 101. As for the undiluted-solution-filling device 22, the filling rate at which the product undiluted solution is filled may be 30 mL/sec or more and 200 mL/sec or less.

The cap-mounting device 16 mounts caps 88 on the bottles 100 and caps the bottles 100. At the cap-mounting device 16, the bottles 100 in which the water and the product undiluted solution (the content) are filled are closed by the caps 88 and are sealed such that neither outside air nor microorganisms enter the bottles 100. At the cap-mounting device 16, while the multiple bottles 100 in which the content is filled are rotated (revolved), the caps 88 are mounted on the mouths thereof. In this way, the caps 88 are mounted on the bottles 100, and the product bottles 101 are consequently obtained.

The caps 88 are sterilized by a cap-sterilizing device 18 in advance. The cap-sterilizing device 18 is disposed near the cap-mounting device 16, for example, outside the second sterile chamber 70h (described later). At the cap-sterilizing device 18, a large number of the caps 88 to be loaded from a location outside the content-filling system 10 are collected in advance and are conveyed in a row toward the cap-mounting device 16. The caps 88 are dried by using hot air and are sterilized before reaching the cap-mounting device 16 after gas or mist of hydrogen peroxide is blown to the inner and outer surfaces of the caps 88.

The product-bottle-unloading unit 25 continuously unloads the product bottles 101 on which the caps 88 are mounted by the cap-mounting device 16 toward a location outside the content-filling system 10.

The content-filling system 10 includes a preform-sterilizing chamber 70a, the molding unit chamber 70b, the atmosphere shielding chamber 70c, the sterilizing-agent spray chamber 70d, an air-rinsing chamber (a fourth sterile chamber) 70e, the first sterile chamber 70f, an intermediate area chamber (a third sterile chamber) 70g, the second sterile chamber 70h, and an exit chamber 70i. Among these, the intermediate area chamber (the third sterile chamber) 70g that couples the first sterile chamber 70f and the second sterile chamber 70h with each other is disposed between the first sterile chamber 70f and the second sterile chamber 70h. The air-rinsing chamber (the fourth sterile chamber) 70e is disposed upstream of the first sterile chamber 70f. That is, the preform-sterilizing chamber 70a, the molding unit chamber 70b, the atmosphere shielding chamber 70c, the sterilizing-agent spray chamber 70d, the air-rinsing chamber 70e, the first sterile chamber 70f, the intermediate area chamber 70g, the second sterile chamber 70h, and the exit chamber 70i are arranged in this order from an upstream position to a downstream position in the direction in which the preforms 100a and the bottles 100 are conveyed.

The chambers 70a to 70i are separated from each other by partition walls. The partition walls have a function of preventing, for example, the sterilizing agent from flowing in an unintentional direction between the chambers 70a to 70i and stabilizing pressure in the chambers 70a to 70i. The partition walls have respective gaps sized such that the preforms 100*a* or the bottles 100 can pass therethrough. The gaps have, for example, a size roughly equal to the size of the single preform 100*a* or the single bottle 100 at minimum in order to prevent the pressure in the chambers 70*a* to 70*i* from changing. The partition walls may include shutters that cover the gaps described above. The shutters may automatically open and close, for example, in response to a signal from the control unit 90.

Among the chambers 70*a* to 70*i*, the preform-sterilizing chamber 70*a* contains, for example, the preform-sterilizing device 34*a*.

The molding unit chamber 70*b* contains, for example, the blow molding unit 32 of the bottle-molding unit 30.

The atmosphere shielding chamber 70*c* contains at least a portion of the adjustment conveying unit 5. The atmosphere shielding chamber 70*c* may contain a camera. The camera may be used to inspect whether the bottles 100 have a problem about molding. The atmosphere shielding chamber 70*c* may contain a thermometer. The thermometer may measure the temperature of the bottles 100 before sterilization. The temperature of the bottles 100 is an important factor in sterilization efficiency on the bottles 100. That is, maintaining the appropriate temperature of the bottles 100 enables the sterilization efficiency on the bottles 100 to be improved. For this reason, measuring the temperature of the bottles 100 by using the thermometer before sterilization enables the appropriate temperature of the bottles 100 to be maintained during sterilization and enables the sterilization efficiency on the bottles 100 to be improved.

The sterilizing-agent spray chamber 70*d* contains the sterilizing device 11. The air-rinsing chamber 70*e* contains the air-rinsing device 14.

The first sterile chamber 70*f* contains the water-filling device 21 of the filling device 20. The second sterile chamber 70*h* contains the undiluted-solution-filling device 22 of the filling device 20 described above and the cap-mounting device 16. The exit chamber 70*i* contains the product-bottle-unloading unit 25. The intermediate area chamber 70*g* may contain only the conveyance wheel 12.

In the preform-sterilizing chamber 70*a*, the sterilizing-agent spray chamber 70*d*, the air-rinsing chamber 70*e*, the first sterile chamber 70*f*, the intermediate area chamber 70*g*, the second sterile chamber 70*h*, and the exit chamber 70*i* described above, pressure gauges (not illustrated) that measure the pressure in the chambers are mounted. In the molding unit chamber 70*b* and/or the atmosphere shielding chamber 70*c*, pressure gauges that measure the pressure in the chambers may be mounted.

The content-filling system 10 includes the control unit 90 that controls the filling device 20 as described above. The control unit 90 is electrically connected to the filling device 20 and controls the undiluted-solution-filling device 22 and the water-filling device 21 of the filling device 20. The control unit 90 may be electrically connected to the water sterilization line 50, the undiluted-solution sterilization line 70, the bottle-molding unit 30, the sterilizing device 11, the air-rinsing device 14, the cap-mounting device 16, the product-bottle-unloading unit 25, and the cap-sterilizing device 18. The control unit 90 may controls, for example, the water sterilization line 50.

The control unit 90 may cause the insides of the chambers to be cleaned and sterilized and may cause, for example, a water sterilizer 60 described later in the water sterilization line 50 to be cleaned and sterilized. According to the present embodiment, the control unit 90 causes the inside of the second sterile chamber 70*h* to be cleaned (in the following description, the cleaning of the insides of the chambers is also referred to as COP) with the inside of the first sterile chamber 70*f* kept sterile. The control unit 90 causes the undiluted-solution-filling device 22 to be cleaned (in the following description, cleaning of the inside of the filling device 20 such as the undiluted-solution-filling device 22 is also referred to as CIP (Cleaning in Place)) with the inside of the first sterile chamber 70*f* kept sterile. That is, the control unit 90 keeps the inside of the first sterile chamber 70*f* sterile without cleaning (COP) the inside of the first sterile chamber 70*f* when the inside of the second sterile chamber 70*h* and the undiluted-solution-filling device 22 are cleaned. The control unit 90 keeps the inside of the first sterile chamber 70*f* sterile without cleaning (CIP) the water-filling device 21 when the inside of the second sterile chamber 70*h* and the undiluted-solution-filling device 22 are cleaned.

The first sterile chamber 70*f* contains the water-filling device 21 that fills the sterilized water as described above. No stain due to the content is left around the water-filling device 21 and a flow path for the water in the water-filling device 21. For this reason, hygiene in the first sterile chamber 70*f* can be maintained even in the case where the inside of the first sterile chamber 70*f* is not cleaned (COP) or sterilized (in the following description, the sterilization of the insides of the chambers is also referred to as SOP) when the kind of the content is changed. At this time, the hygiene of the water-filling device 21 can be maintained even in the case where the water-filling device 21 that is contained in the first sterile chamber 70*f* is not cleaned (CIP) or sterilized (SIP (Sterilization in Place)), and a next content can be inhibited from being mixed with the previous content. In the case where the inside of the first sterile chamber 70*f* is thus not cleaned when the inside of the second sterile chamber 70*h* is cleaned, the number of times the inside of the first sterile chamber 70*f* is cleaned can be decreased, and regions to be cleaned at the content-filling system 10 can be narrowed. For this reason, the amount of the water, vapor, electricity, and detergent that are used can be decreased. In addition, since the regions to be cleaned can be narrowed, the time for cleaning can be decreased. For this reason, the amount of carbon dioxide that is discharged by the content-filling system 10 can be decreased.

The control unit 90 causes the inside of the second sterile chamber 70*h* to be sterilized (SOP) with the inside of the first sterile chamber 70*f* kept sterile. The control unit 90 causes the undiluted-solution-filling device 22 to be sterilized (SIP) with the inside of the first sterile chamber 70*f* kept sterile. That is, the control unit 90 keeps the inside of the first sterile chamber 70*f* sterile without sterilizing (SOP) the inside of the first sterile chamber 70*f* when the inside of the second sterile chamber 70*h* and the undiluted-solution-filling device 22 are sterilized. The control unit 90 keeps the inside of the first sterile chamber 70*f* sterile without sterilizing (SIP) the water-filling device 21 when the inside of the second sterile chamber 70*h* and the undiluted-solution-filling device 22 are sterilized. This enables regions to be sterilized to be reduced. For this reason, the amount of the vapor that is used can be decreased. In addition, the time for sterilization can be decreased. For this reason, the amount of carbon dioxide that is discharged by the content-filling system 10 can be decreased.

The pressure in the first sterile chamber 70*f* described above is preferably higher than the pressure in the second sterile chamber 70*h*. This can inhibit air in the second sterile chamber 70*h* from entering the first sterile chamber 70*f*. For this reason, the state of the inside of the first sterile chamber 70*f* that is sterile can be successfully maintained.

When the inside of the second sterile chamber 70h is cleaned and sterilized, the pressure in the first sterile chamber 70f is preferably 40 Pa or more and 100 Pa or less, and the pressure in the second sterile chamber 70h is preferably 0 Pa or more and 20 Pa or less. When the undiluted-solution-filling device 22 is cleaned and sterilized, the pressure in the first sterile chamber 70f is preferably 40 Pa or more and 100 Pa or less, and the pressure in the second sterile chamber 70h is preferably 0 Pa or more and 20 Pa or less. This can effectively inhibit the air in the second sterile chamber 70h from entering the first sterile chamber 70f and enables the state of the inside of the first sterile chamber 70f that is sterile to be more successfully maintained. When the product bottles 101 are manufactured, the pressure in the first sterile chamber 70f is preferably 30 Pa or more and 60 Pa or less, and the pressure in the second sterile chamber 70h is preferably 10 Pa or more and 40 Pa or less.

The pressure in the intermediate area chamber (the third sterile chamber) 70g is preferably lower than the pressure in the first sterile chamber 70f and equal to or more than the pressure in the second sterile chamber 70h. When the pressure in the intermediate area chamber 70g is lower than the pressure in the first sterile chamber 70f, air in the intermediate area chamber 70g can be inhibited from entering the first sterile chamber 70f. When the pressure in the intermediate area chamber 70g is equal to or more than the pressure in the second sterile chamber 70h, the air in the second sterile chamber 70h can be inhibited from entering the intermediate area chamber 70g. For this reason, the air in the second sterile chamber 70h can be inhibited from entering the first sterile chamber 70f via the intermediate area chamber 70g. As a result, the state of the inside of the first sterile chamber 70f that is sterile can be successfully maintained.

When the inside of the second sterile chamber 70h is cleaned and sterilized, the pressure in the intermediate area chamber 70g is preferably 10 Pa or more and 40 Pa or less. When the undiluted-solution-filling device 22 is cleaned and sterilized, the pressure in the intermediate area chamber 70g is preferably 10 Pa or more and 40 Pa or less. This can inhibit the air in the second sterile chamber 70h from entering the intermediate area chamber 70g and enables the state of the inside of the first sterile chamber 70f that is sterile to be more successfully maintained. When the product bottles 101 are manufactured, the pressure in the intermediate area chamber 70g is preferably 20 Pa or more and 50 Pa or less.

The pressure in the air-rinsing chamber (the fourth sterile chamber) 70e is preferably equal to or lower than the pressure in the first sterile chamber 70f. This can inhibit air in the air-rinsing chamber 70e from entering the first sterile chamber 70f. For this reason, the state of the inside of the first sterile chamber 70f that is sterile can be successfully maintained.

When the inside of the second sterile chamber 70h is cleaned and sterilized, the pressure in the air-rinsing chamber 70e is preferably 10 Pa or more and 40 Pa or less. When the undiluted-solution-filling device 22 is cleaned and sterilized, the pressure in the air-rinsing chamber 70e is preferably 10 Pa or more and 40 Pa or less. This can inhibit the air in the air-rinsing chamber 70e from entering the first sterile chamber 70f and enables the state of the inside of the first sterile chamber 70f that is sterile to be more successfully maintained. When the product bottles 101 are manufactured, the pressure in the air-rinsing chamber 70e is preferably 10 Pa or more and 30 Pa or less.

The pressure in the sterilizing-agent spray chamber 70d is preferably equal to or lower than the pressure in the atmosphere shielding chamber 70c. This can inhibit air in the sterilizing-agent spray chamber 70d from entering the atmosphere shielding chamber 70c and the molding unit chamber 70b. Since the air in the sterilizing-agent spray chamber 70d can be inhibited from entering the molding unit chamber 70b, humidity in the molding unit chamber 70b can be inhibited from increasing. The molding unit chamber 70b contains the blow molding unit 32 of the bottle-molding unit 30 as described above. For this reason, since the humidity in the molding unit chamber 70b is inhibited from increasing, a machine that is included in the blow molding unit 32 can be inhibited from corroding.

When the inside of the second sterile chamber 70h is cleaned and sterilized, the pressure in the sterilizing-agent spray chamber 70d is preferably 0 Pa or more and 20 Pa or less. When the undiluted-solution-filling device 22 is cleaned and sterilized, the pressure in the sterilizing-agent spray chamber 70d is preferably 0 Pa or more and 20 Pa or less. This can inhibit the air in the sterilizing-agent spray chamber 70d from entering the atmosphere shielding chamber 70c and the molding unit chamber 70b and can inhibit the humidity in the molding unit chamber 70b from increasing. When the product bottles 101 are manufactured, the pressure in the sterilizing-agent spray chamber 70d is preferably −10 Pa or more and 10 Pa or less.

When the inside of the second sterile chamber 70h is cleaned and sterilized, the pressure in the exit chamber 70i is preferably 0 Pa or more and 20 Pa or less. When the undiluted-solution-filling device 22 is cleaned and sterilized, the pressure in the exit chamber 70i is preferably 0 Pa or more and 20 Pa or less. This can inhibit air in the exit chamber 70i from entering the first sterile chamber 70f via, for example, the second sterile chamber 70h and enables the state of the inside of the first sterile chamber 70f that is sterile to be more successfully maintained. When the product bottles 101 are manufactured, the pressure in the exit chamber 70i is preferably 10 Pa or more and 20 Pa or less.

The above description is summarized. The pressure in the sterilizing-agent spray chamber 70d to the exit chamber 70i may be determined as illustrated in Table 1 bellow.

TABLE 1

| | During Cleaning and Sterilization of Inside of Second Sterile Chamber and/or Undiluted-solution-filling Device | During Manufacturing of Product Bottle |
| --- | --- | --- |
| Sterilizing-agent Spray Chamber 70d | 0 Pa or more and 20 Pa or less | −10 Pa or more and 10 Pa or less |

TABLE 1-continued

| | During Cleaning and Sterilization of Inside of Second Sterile Chamber and/or Undiluted-solution-filling Device | During Manufacturing of Product Bottle |
|---|---|---|
| Air-rinsing Chamber 70e | 10 Pa or more and 40 Pa or less | 10 Pa or more and 30 Pa or less |
| First Sterile Chamber 70f | 40 Pa or more and 100 Pa or less | 30 Pa or more and 60 Pa or less |
| Intermediate Area Chamber 70g | 10 Pa or more and 40 Pa or less | 20 Pa or more and 50 Pa or less |
| Second Sterile Chamber 70h | 0 Pa or more and 20 Pa or less | 10 Pa or more and 40 Pa or less |
| Exit Chamber 70i | 0 Pa or more and 20 Pa or less | 10 Pa or more and 20 Pa or less |

In this case, the pressure in the preform-sterilizing chamber 70a to the atmosphere shielding chamber 70c may be determined as illustrated in Table 2 below.

TABLE 2

| | During Cleaning and Sterilization of Inside of Second Sterile Chamber and/or Undiluted-solution-filling Device | During Manufacturing of Product Bottle |
|---|---|---|
| Preform-sterilizing Chamber 70a | –10 Pa or more and 10 Pa or less | –10 Pa or more and 10 Pa or less |
| Molding unit Chamber 70b | 0 Pa or more and 10 Pa or less | 0 Pa or more and 10 Pa or less |
| Atmosphere Shielding Chamber 70c | –10 Pa or more and 10 Pa or less | 0 Pa or more and 10 Pa or less |

For example, the content-filling system 10 may include a sterile filling system. In this case, the insides of the sterilizing-agent spray chamber 70d, the air-rinsing chamber 70e, the first sterile chamber 70f, the intermediate area chamber 70g, the second sterile chamber 70h, and the exit chamber 70i are kept sterile. A chamber (not illustrated) that couples a sterile zone that is sterile and a non-sterile zone that is not sterile with each other may be disposed downstream of the exit chamber 70i.

The water sterilization line 50 and the undiluted-solution sterilization line 70 of the content-filling system 10 will now be described. The water sterilization line 50 will be first described.

Water Sterilization Line

The water sterilization line 50 sterilizes the water without heating. The water sterilization line 50 may sterilize the water by using ultraviolet rays. In this case, at the water sterilization line 50, ultraviolet rays from at least a low-pressure mercury lamp or an intermediate-pressure mercury lamp may sterilize the water. The water sterilization line 50 may sterilize the water by filtering the water by using a sterile filter (such as a first sterile filter 63 described later). In the present specification, the phrase "to sterilize without heating" means to sterilize the water without using thermal energy from, for example, an electric heater or vapor.

Figure 2A:
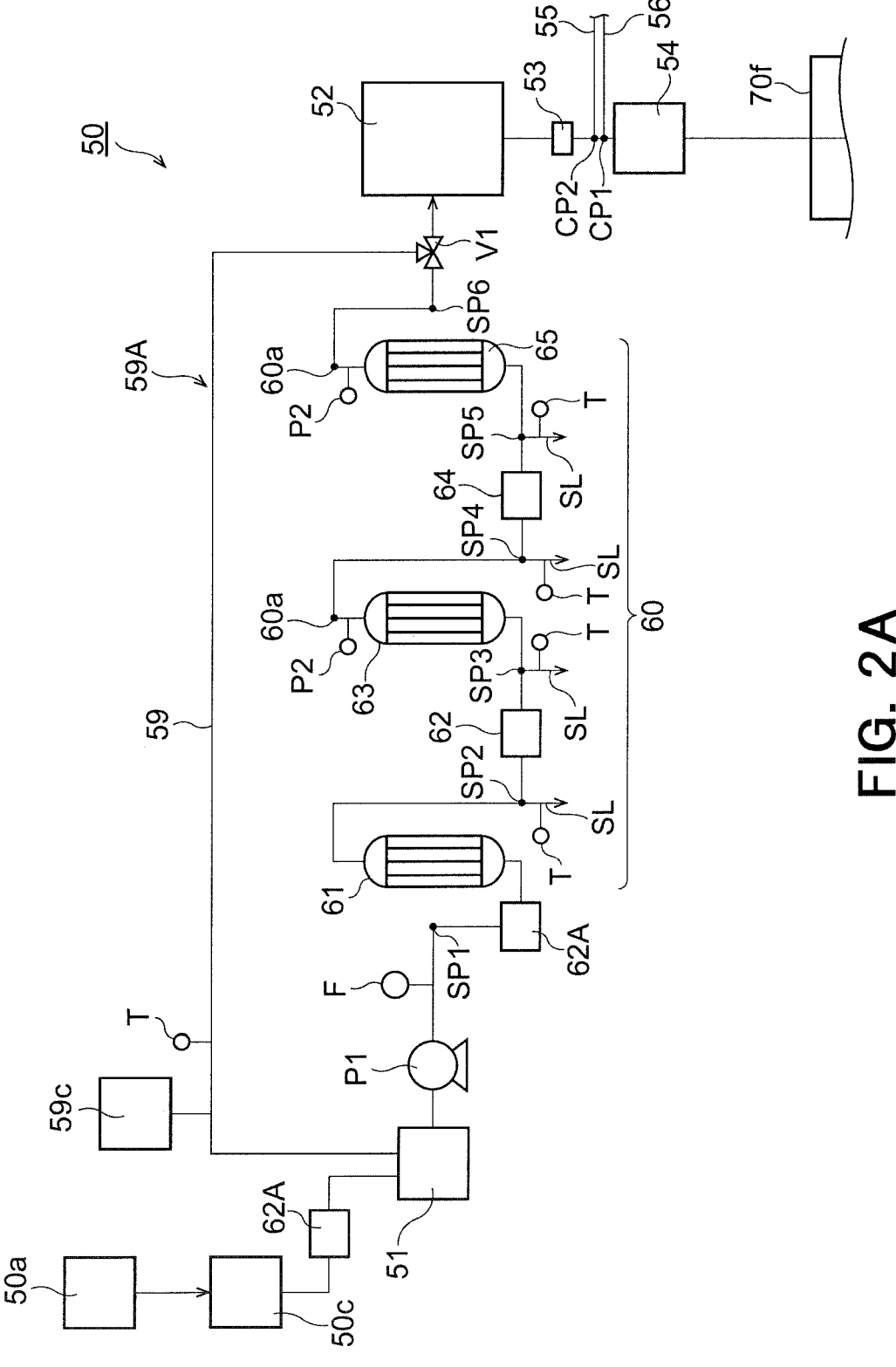
FIG. 2A schematically illustrates a water sterilization line according to an embodiment.

As illustrated in FIG. 2A, the water sterilization line 50 includes at least the water sterilizer 60 that sterilizes the water. In an example illustrated in FIG. 2A, the water sterilization line 50 includes a first water tank 51, the water sterilizer 60, and a second water tank 52. The water sterilization line 50 may further include a pure-water-manufacturing device 50a that manufactures water (pure water) at a position upstream of the first water tank 51 and a pure-water tank 50c that stores the water (the pure water) that is supplied from the pure-water-manufacturing device 50a. The pure-water-manufacturing device 50a, the pure-water tank 50c, the first water tank 51, the water sterilizer 60, and the second water tank 52 are arranged in this order from an upstream position to a downstream position in the direction in which the water is conveyed.

Among these, the pure-water tank 50c stores the water (the pure water) that is supplied from the pure-water-manufacturing device 50a corresponding to a water supply source. It is obligated to use food production water that is defined by the Food Sanitation Act as water for a soft drink. The food production water is the pure water (such as RO water, deionized water, or distilled water) that is manufactured by the pure-water-manufacturing device 50a that has, for example, activated carbon, a reverse osmosis membrane, or ion exchange resin (including EDI). The pure water is water from which impurities such as calcium, magnesium, chlorine, iron, or a mineral component are removed. In this case, the pure water contains an evaporation residue of 20 mg/L or less. The electrical conductivity of the pure water is 0.1 μS/cm or more and 20 μS/cm or less. According to the present embodiment, the water is sterilized by using the ultraviolet rays as described later. For this reason, when the electrical conductivity of the water to be sterilized is 20 μS/cm or less, an inorganic substance (such as a calcium oxide), for example, can be inhibited from adhering to a surface of, for example, a first ultraviolet lamp 67a described later. For this reason, ultraviolet transmittance can be prevented from decreasing. The water that is supplied from the pure-water-manufacturing device 50a is not limited to the pure water but may be ultrapure water.

The pure-water tank 50c has a function of storing the water and consequently causing the water to smoothly flow. The volume of the pure-water tank 50c may be 50 m³ or more and 100 m³ or less and may be, for example, 50 m³.

The number of microbes in the pure-water tank 50c is preferably 0.001 CFU/mL or more and 20 CFU/mL or less.

The pure water that is supplied to the pure-water tank 50$c$ is manufactured in a manner in which chlorine in tap water is removed by using, for example, activated carbon. Accordingly, the microbes are likely to multiply in the pure water that is supplied to the pure-water tank 50$c$. For this reason, an UV lamp is preferably installed in the pure-water tank 50$c$ to inhibit the microbes from multiplying. In the case where the number of the microbes in the pure-water tank 50$c$ is more than 20 CFU/mL, the pure-water tank 50$c$ is preferably sterilized by using, for example, chlorine, hot water, or vapor. The number of the microbes in the pure-water tank 50$c$ may be always monitored and may be controlled so as to be in the range described above. This enables the water that is sterile to be manufactured without additional equipment. For this reason, the cost of the water sterilizer 60 is not high, and the amount of carbon dioxide that is discharged by the water sterilizer 60 can be decreased.

Front sterilizers 62A and the first water tank 51 are disposed downstream of the pure-water tank 50$c$.

In the case where the concentration of the microbes that are supplied from the pure-water-manufacturing device 50$a$ is high (for example, 1 CFU/ml or more), and in the case where a foreign-material removal filter 61 described later is a filtration filter having a pore size (0.1 μm or more and 10 μm or less), the foreign-material removal filter 61 can be contaminated by the microbes in a short time. If a large number of the microbes are supplemented by the foreign-material removal filter 61, and the microbes multiply, the quality of the water is affected in some cases. For this reason, as illustrated in FIG. 2A, the front sterilizers 62A are preferably installed upstream of the foreign-material removal filter 61. This enables high-quality sterile water to be manufactured for a long time. In the example illustrated in FIG. 2A, the two front sterilizers 62A are disposed upstream of the foreign-material removal filter 61. Specifically, one of the front sterilizers 62A is disposed upstream of the foreign-material removal filter 61 and upstream of the first water tank 51, and the other front sterilizer 62A is disposed upstream of the foreign-material removal filter 61 and downstream of the first water tank 51. The number of the front sterilizers 62A may be one, and a single front sterilizer 62A may be disposed upstream or downstream of the first water tank 51. In this case, costs when the water is sterilized can be reduced. The structure of the front sterilizers 62A may be substantially the same as the structure of a first sterilizer 62 illustrated in FIG. 3 to FIG. 6B described later.

The first water tank 51 is a so-called balance tank and has a function of storing the water and consequently causing the water to smoothly flow. The volume of the first water tank 51 may be 30 m³ or more and 100 m³ or less and may be, for example, 50 m³.

A pump P1 that conveys the water and a flow meter F that measures the flow rate of the water may be disposed downstream of the first water tank 51. The pump P1 and the flow meter F may be arranged in this order from an upstream position to a downstream position in the direction in which the water is conveyed. A location at which the flow meter F is installed may be appropriately changed, provided that the location is downstream of the pump P1 and upstream of a valve V1 described later. The water sterilizer 60 described above is disposed downstream of the flow meter F.

The water sterilizer 60 sterilizes the water that stored in the first water tank 51. The water sterilizer 60 will be described in detail later.

The second water tank 52 is a tank (a so-called aseptic tank) that stores the water that is sterilized by the water sterilizer 60. The second water tank 52 has a function of storing the sterilized water and consequently causing the water to smoothly flow. The volume of the second water tank 52 may be 5 m³ or more and 50 m³ or less and may be, for example, 10 m³.

An auxiliary filter 53 that filters the sterilized water and a third water tank 54 that stores the water that passes through the auxiliary filter 53 may be disposed downstream of the second water tank 52. In this case, the third water tank 54 may be a so-called filling tank and may be installed above the water-filling device 21 in the vertical direction in order to improve the filling accuracy of the water-filling device 21. The third water tank 54 may function as a so-called cushion tank that ensures the smooth flow of the water even in the case where the amount of the water that is used at a position downstream of the third water tank 54 changes. The volume of the third water tank 54 may be 0.1 m³ or more and 1 m³ or less and may be, for example, 0.3 m³.

A first bypass line (a bypass line) 55 (see, for example, FIG. 1 and FIG. 2A) that connects the water sterilization line 50 and the cap-sterilizing device 18 to each other may be disposed downstream of the second water tank 52. This enables the water that is sterilized by the water sterilizer 60 to be used to clean the caps 88. The caps 88 can be cleaned by using the sterile water after being sterilized by using the sterilizing agent. Consequently, the caps 88 are cooled, and foreign material adhering to the caps 88 is removed. Since the caps 88 are cleaned by using the sterile water, friction between a conveyance chute (not illustrated) that conveys the caps 88 and the caps 88 can be reduced due to the sterile water adhering to the caps 88. For this reason, the conveyance chute can be inhibited from cutting the caps 88 while the caps 88 are conveyed.

The first bypass line 55 is disposed downstream of the second water tank 52 as described above, and consequently, the water that is sterilized by the water sterilizer 60 can be used for cleaning the caps 88. For this reason, the amount of carbon dioxide that is discharged by the content-filling system 10 can be further decreased, unlike the case where the caps 88 are cleaned by using sterile water that is manufactured by using a sterilizer that heats and sterilizes water. The sterilization conditions, a conveyance speed, and/or the materials of the caps 88, for example, are appropriately determined, and consequently, the caps 88 can be conveyed without being cut. In the case where the caps 88 are thus not cut, the caps 88 may not be cleaned by using the sterile water.

A second bypass line 56 that connects the water sterilization line 50 and the second sterile chamber 70$h$ to each other may be disposed downstream of the second water tank 52. When the inside of the second sterile chamber 70$h$ is cleaned, the control unit 90 may cause the water that is sterilized by the water sterilization line 50 to be supplied to the second sterile chamber 70$h$ via the second bypass line 56. When the undiluted-solution-filling device 22 is cleaned, the control unit 90 may cause the water that is sterilized by the water sterilization line 50 to be supplied to the second sterile chamber 70$h$ via the second bypass line 56. This enables the amount of carbon dioxide that is discharged by the content-filling system 10 to be further decreased, unlike the case where the inside of the second sterile chamber 70$h$ is cleaned by using sterile water that is manufactured by using a sterilizer that heats and sterilizes water.

In the second sterile chamber 70$h$, the undiluted-solution-filling device 22 fills the product undiluted solution in the bottles 100. The mouths of the bottles 100 can be cleaned after the product undiluted solution (the content) is filled in the bottles 100. When the mouths of the bottles 100 are thus cleaned, the water that is supplied to the second sterile chamber 70h via the second bypass line 56 may be used. This enables the amount of carbon dioxide that is discharged by the content-filling system 10 to be further decreased, unlike the case where the mouths of the bottles 100 are cleaned by using sterile water that is manufactured by using a sterilizer that heats and sterilizes water. In the case where the product undiluted solution (the content) does not adhere to the mouths of the bottles 100, the mouths of the bottles 100 may not be cleaned. In the case where there is no possibility that the microbes multiply, the mouths of the bottles 100 may not be cleaned even in the case where the product undiluted solution adheres to the mouths of the bottles 100.

The second bypass line 56 may connect the water sterilization line 50 and the chambers 70a to 70i to each other. When the insides of the chambers 70a to 70i are cleaned, the water that is sterilized by the water sterilization line 50 may be supplied to the chambers 70a to 70i via the second bypass line 56. When machines that are disposed in the chambers 70a to 70i are cleaned, the water that is sterilized by the water sterilization line 50 may be supplied to the chambers 70a to 70i via the second bypass line 56.

As illustrated in FIG. 2A, a circulation line (a first circulation line) 59 may be connected upstream of the second water tank 52 of the water sterilization line 50. An end of the circulation line 59 may be connected to the water sterilization line 50 with the valve V1 that is included in the water sterilization line 50 interposed therebetween. The other end of the circulation line 59 may be connected to the first water tank 51 of the water sterilization line 50. In this way, the foreign-material removal filter 61, the first sterilizer 62, the first sterile filter 63, a second sterilizer 64, a second sterile filter 65, the circulation line 59, and the first water tank 51 described later may be included in a circulation system (a first circulation system) 59A through which the water circulates. The circulation line 59 may include thermometers T. The circulation line 59 may include a concentration meter 59c that measures the concentration of the sterilizing agent or the detergent when the water sterilizer 60 is sterilized. A heating device (such as a heat exchanger or a heater) that heats, for example, the sterilizing agent when the circulation line 59 is cleaned and/or sterilized may be installed at the circulation line 59. The heating device may be used to adjust the temperature of the water that is supplied to, for example, the first sterile filter 63 to a constant temperature (for example, 25° C.) during an integrity test described later. In this case, the water the temperature of which is adjusted to the constant temperature can be used to moisten a membrane of, for example, the first sterile filter 63 described later. This enables data that is not affected by water temperature to be obtained during the integrity test throughout a year. The heating device may be installed at any position other than the position of the circulation line 59, provided that the position is between the first water tank 51 and the valve V1. The single heating device may be installed, or two or more heating devices may be installed. The valve V1 may be electrically connected to the control unit 90 and may be controlled by the control unit 90.

Figure 2B:
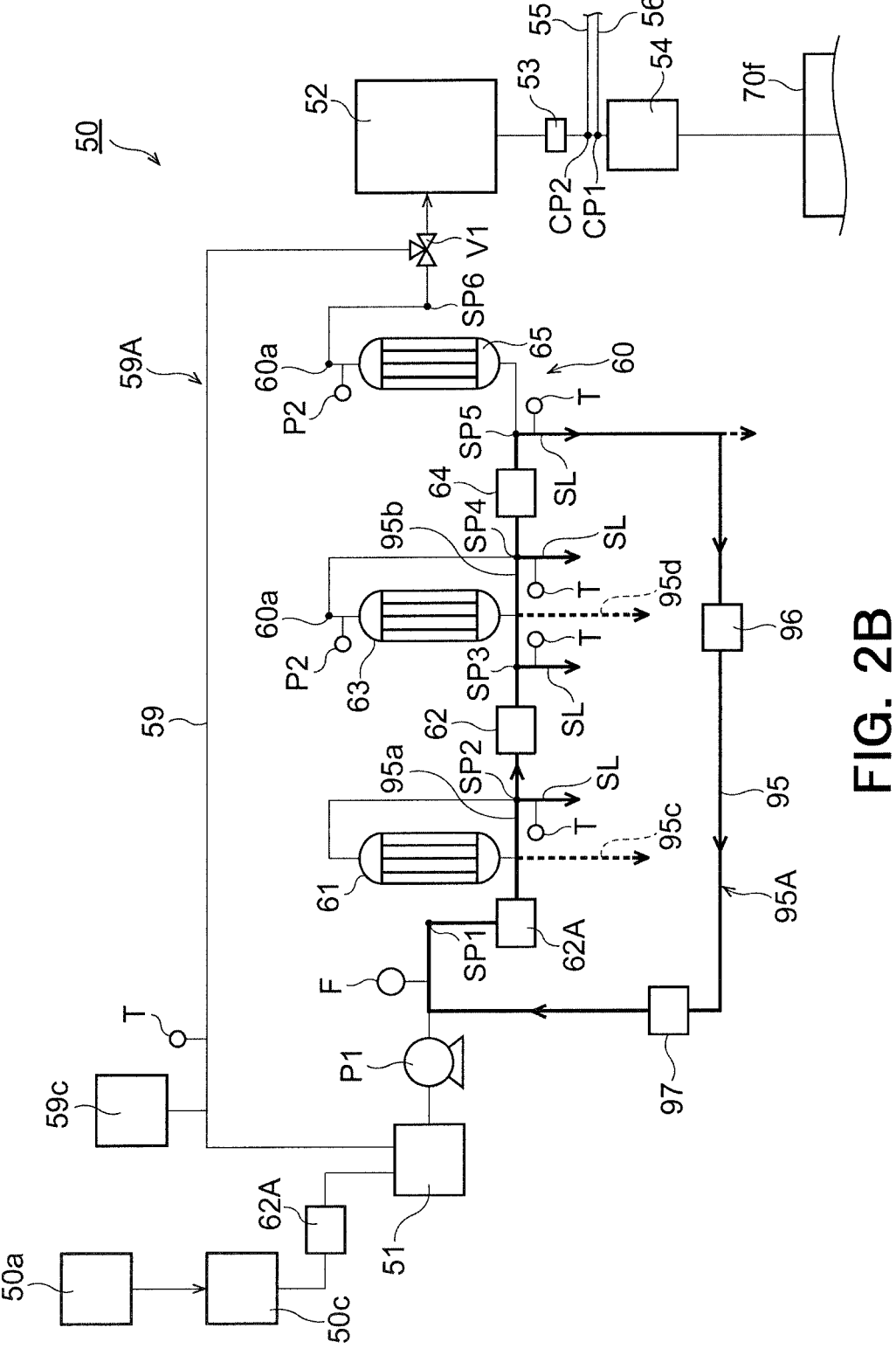
FIG. 2B schematically illustrates another example of the water sterilization line according to an embodiment.

As illustrated in FIG. 2B, a circulation line (a second circulation line) 95 may be connected between the first water tank 51 of the water sterilization line 50 and the water sterilizer 60. An end of the circulation line 95 may be connected to a sampling line SL that is connected to a sampling point SP5 described later. The other end of the circulation line 95 may be connected, for example, between the pump P1 that is disposed downstream of the first water tank 51 and one of the front sterilizers 62A. The other end of the circulation line 95 may be connected, for example, at a position upstream of the pump P1 (for example, between the first water tank 51 and the pump P1). In this way, the front sterilizer 62A, a third bypass line 95a described later, the first sterilizer 62, a fourth bypass line 95b described later, the second sterilizers 64, and the circulation line 95 may be included in a circulation system (a second circulation system) 95A through which the water, for example, circulates. The circulation line 95 may include a sterilizing-agent-supplying unit 96 that includes, for example, a tank, a pump, a heater, and a concentration meter not illustrated. The circulation line 95 may include a heat exchanger 97. The circulation line 95 may further include a pump not illustrated. The circulation system 95A that includes the circulation line 95 may be used to cause the sterilizing agent or the detergent to circulate when the water sterilizer 60 is sterilized as described later.

Figure 2C:
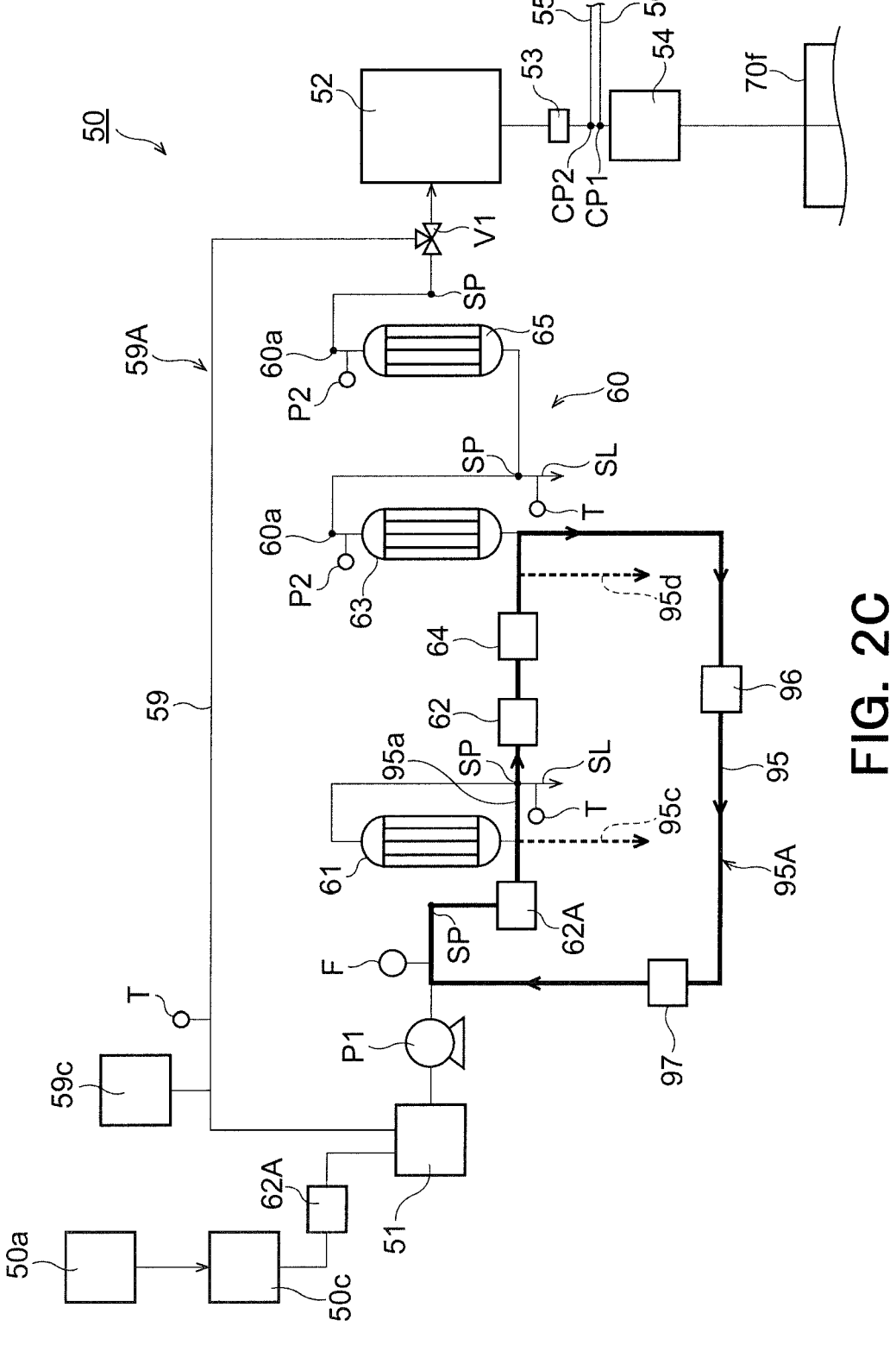
FIG. 2C schematically illustrates another example of the water sterilization line according to an embodiment.

As illustrated in FIG. 2C, an end of the circulation line 95 may be connected, for example, between the second sterilizer 64 and the first sterile filter 63. In this way, the front sterilizer 62A, the third bypass line 95a described later, the first sterilizer 62, the second sterilizer 64, and the circulation line 95 may be included in the circulation system (the second circulation system) 95A.

[Water Sterilizer]

The water sterilizer 60 will now be described. The water sterilizer 60 sterilizes the water that is used by the content-filling system 10. According to the present embodiment, the water sterilizer 60 sterilizes the water without heating. The water sterilizer 60 sterilizes the water (the pure water) that is stored in the first water tank 51 as described above. For this reason, the water sterilizer 60 sterilizes the water having an electrical conductivity of 0.1 μS/cm or more and 20 μS/cm or less.

As illustrated in FIG. 2A and FIG. 2B, the water sterilizer 60 includes at least one sterile filter (the first sterile filter 63 and the second sterile filter 65). The water sterilizer 60 includes at least one sterilizer (the first sterilizer 62 and the second sterilizer 64). Since the water sterilizer 60 includes at least one sterile filter and at least one sterilizer, even in the case where the sterile filter or the sterilizer stops, the other of the sterile filter or the sterilizer can assure the sterile properties of the water.

In the example illustrated in FIG. 2A and an example illustrated in FIG. 2B, the water sterilizer 60 includes the foreign-material removal filter 61, the first sterilizer 62, the first sterile filter 63, the second sterilizer 64, and the second sterile filter 65. The foreign-material removal filter 61, the first sterilizer 62, the first sterile filter 63, the second sterilizer 64, and the second sterile filter 65 are arranged in this order from an upstream position to a downstream position in the direction in which the water is conveyed. Since the sterilizer (in this case, the second sterilizer 64) is thus disposed downstream of the sterile filter (in this case, the first sterile filter 63), the microbes can be killed by the sterilizer even in the case where the microbes pass through the sterile filter. In this case, as illustrated in FIG. 2C, the foreign-material removal filter 61, the first sterilizer 62, the second sterilizer 64, the first sterile filter 63, and the second sterile filter 65 may be arranged in this order from an upstream position to a downstream position in the direction in which the water is conveyed. As illustrated in FIG. 2A to FIG. 2C, since the water sterilizer 60 includes multiple sterile filters (the first sterile filter 63 and the second sterile filter 65), even in the case where one of the sterile filters stops, the other sterile filter can assure the sterile properties of the water. Since the water sterilizer 60 includes multiple sterilizers (the first sterilizer 62 and the second sterilizer 64), even in the case where one of the sterilizers stops, the other sterilizer can assure the sterile properties of the water.

Figure 2D:
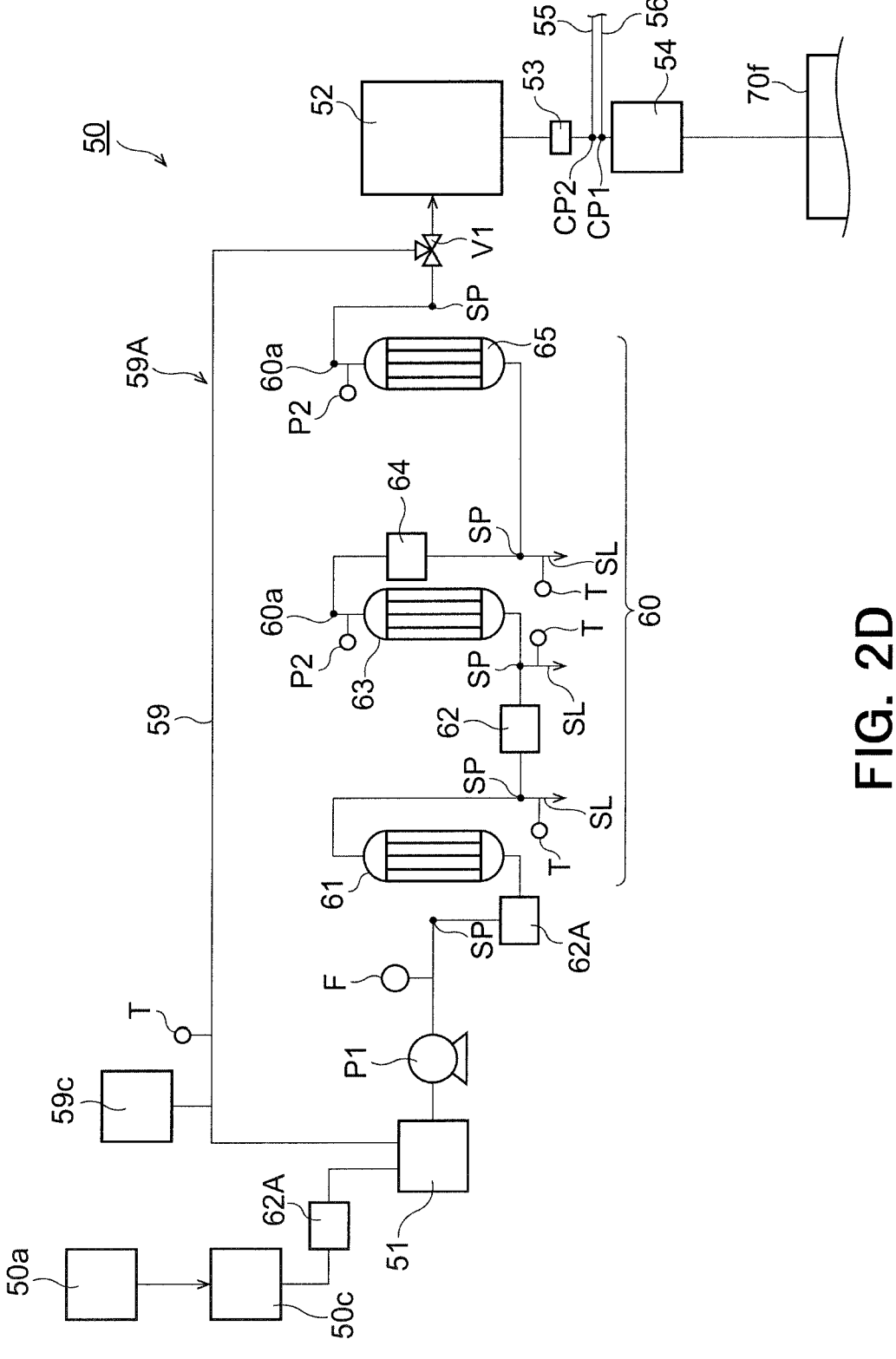
FIG. 2D schematically illustrates another example of the water sterilization line according to an embodiment.

As illustrated in FIG. 2D, the water sterilizer 60 may include the foreign-material removal filter 61, the first sterilizer 62, the first sterile filter 63, and the second sterile filter 65. The foreign-material removal filter 61, the first sterilizer 62, the first sterile filter 63, and the second sterile filter 65 may be arranged in this order from an upstream position to a downstream position in the direction in which the water is conveyed. In this case, the water sterilizer 60 may further include the second sterilizer 64 that is disposed between the first sterile filter 63 and the second sterile filter 65.

As illustrated in FIG. 2E1, the water sterilizer 60 may include the first sterilizer 62, the first sterile filter 63, and the second sterile filter 65. The first sterilizer 62, the first sterile filter 63, and the second sterile filter 65 may be arranged in this order from an upstream position to a downstream position in the direction in which the water is conveyed. In this case, the water sterilizer 60 may further include the second sterilizer 64 that is disposed between the first sterile filter 63 and the second sterile filter 65. As illustrated in FIG. 2E2, the first sterile filter 63, the first sterilizer 62, the second sterile filter 65, and the second sterilizer 64 may be arranged in this order from an upstream position to a downstream position in the direction in which the water is conveyed. As illustrated in FIG. 2E3, the first sterilizer 62, the first sterile filter 63, the second sterile filter 65, and the second sterilizer 64 may be arranged in this order from an upstream position to a downstream position in the direction in which the water is conveyed.

Figure 2F:
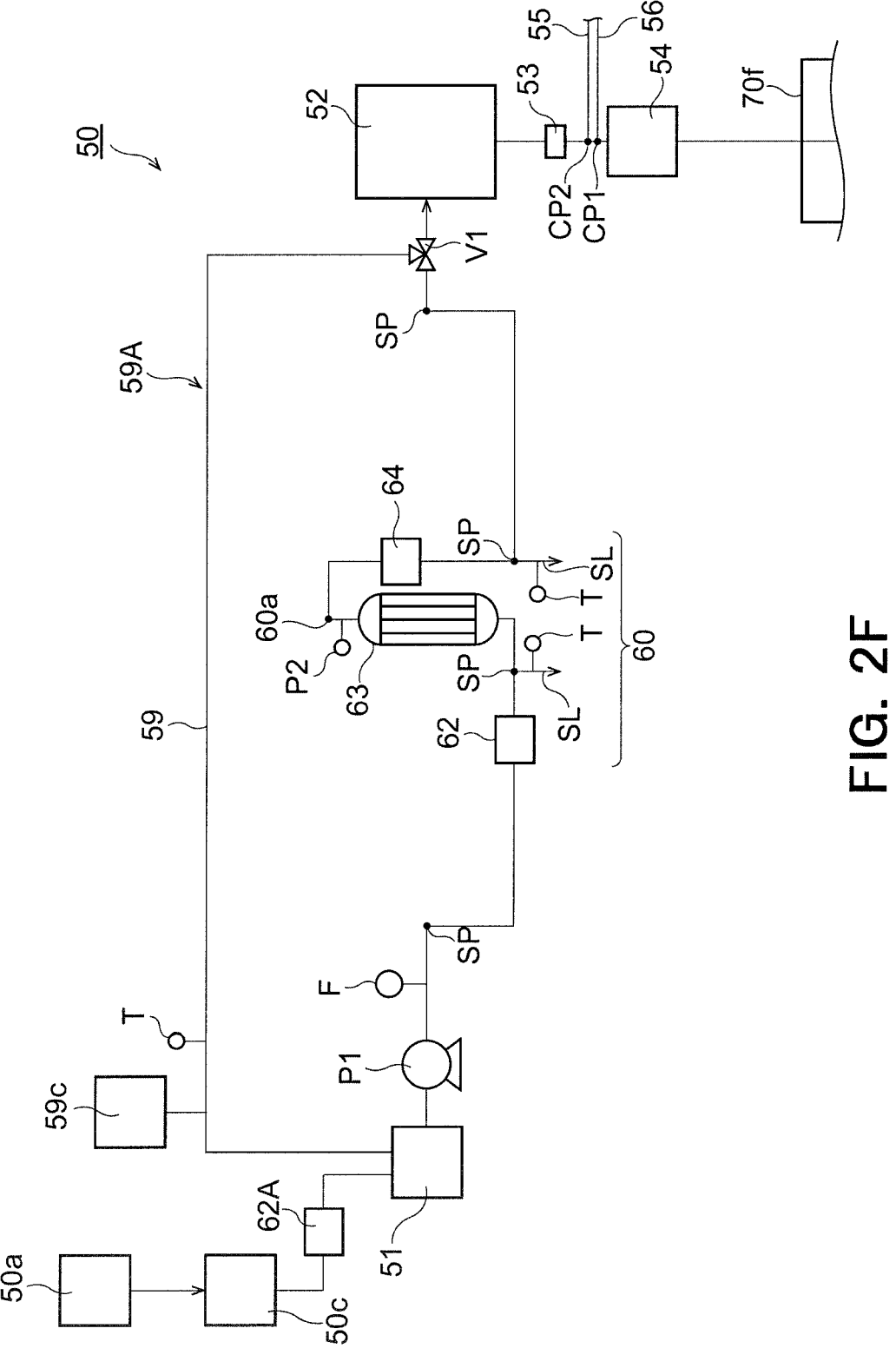
FIG. 2F schematically illustrates another example of the water sterilization line according to an embodiment.
Figure 2G:
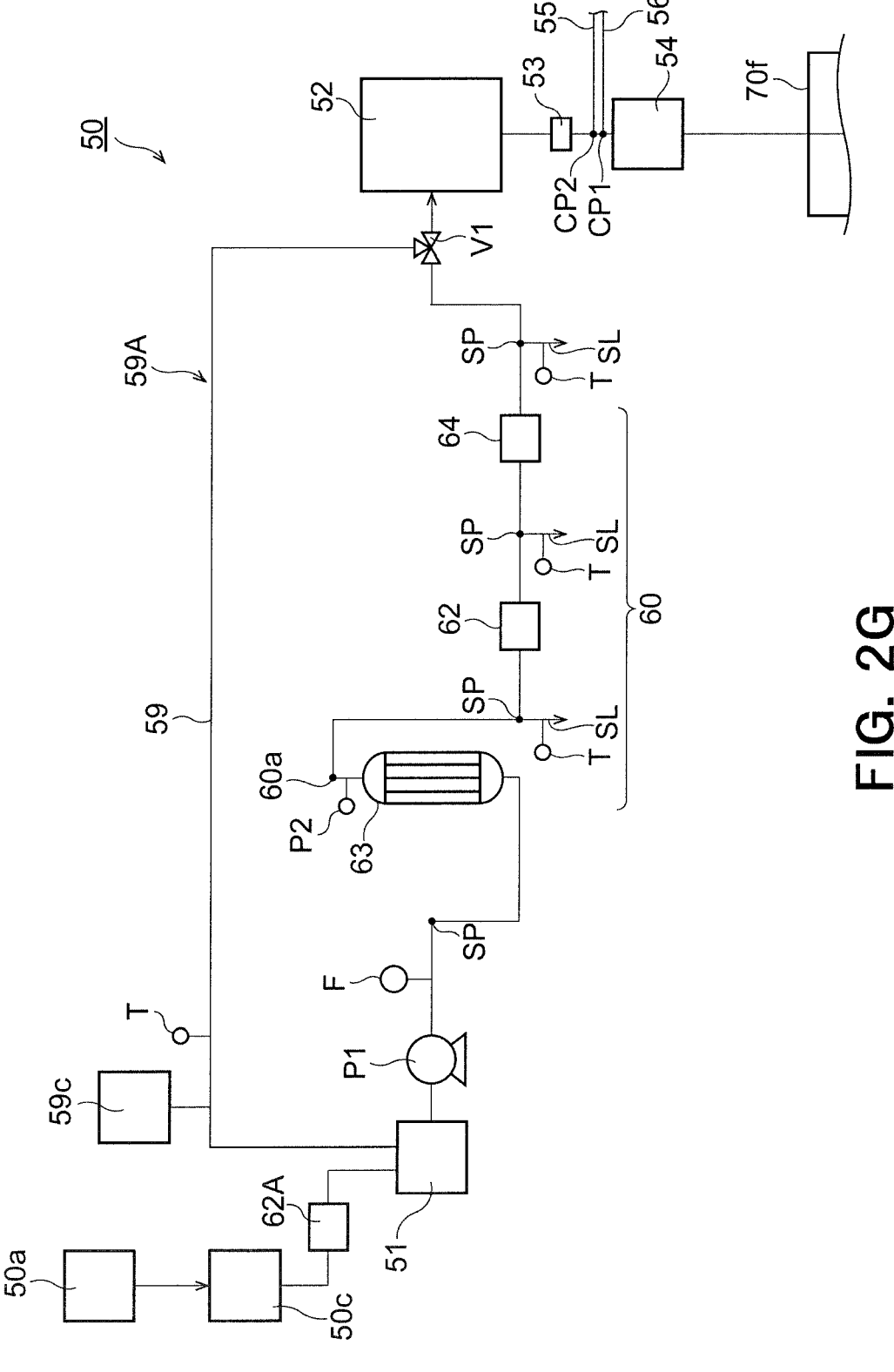
FIG. 2G schematically illustrates another example of the water sterilization line according to an embodiment.
Figure 3:
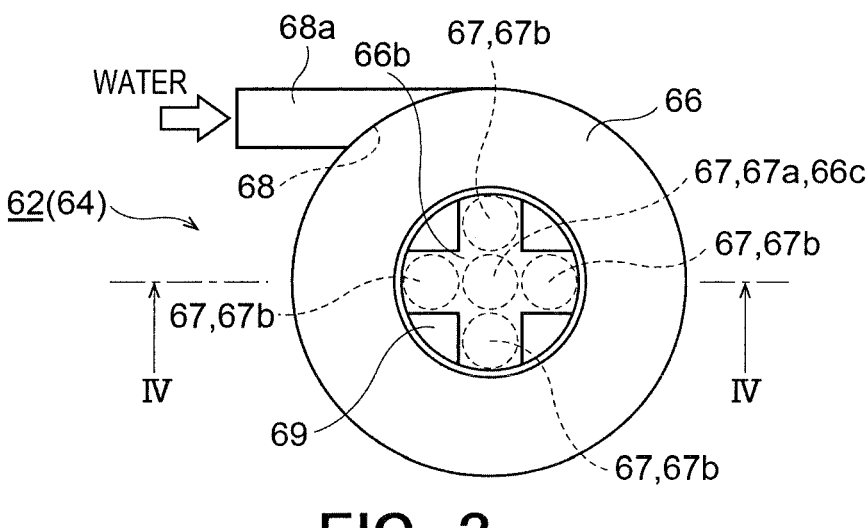

As illustrated in FIG. 2F, the water sterilizer 60 may include the first sterilizer 62 and the first sterile filter 63. The first sterilizer 62 and the first sterile filter 63 may be arranged in this order from an upstream position to a downstream position in the direction in which the water is conveyed. As illustrated in FIG. 2G, the first sterile filter 63 and the first sterilizer 62 may be arranged in this order from an upstream position to a downstream position in the direction in which the water is conveyed. In these cases, the water sterilizer 60 may further include the second sterilizer 64 that is disposed between the first sterile filter 63 and the valve V1 described later.

Figure 2H:
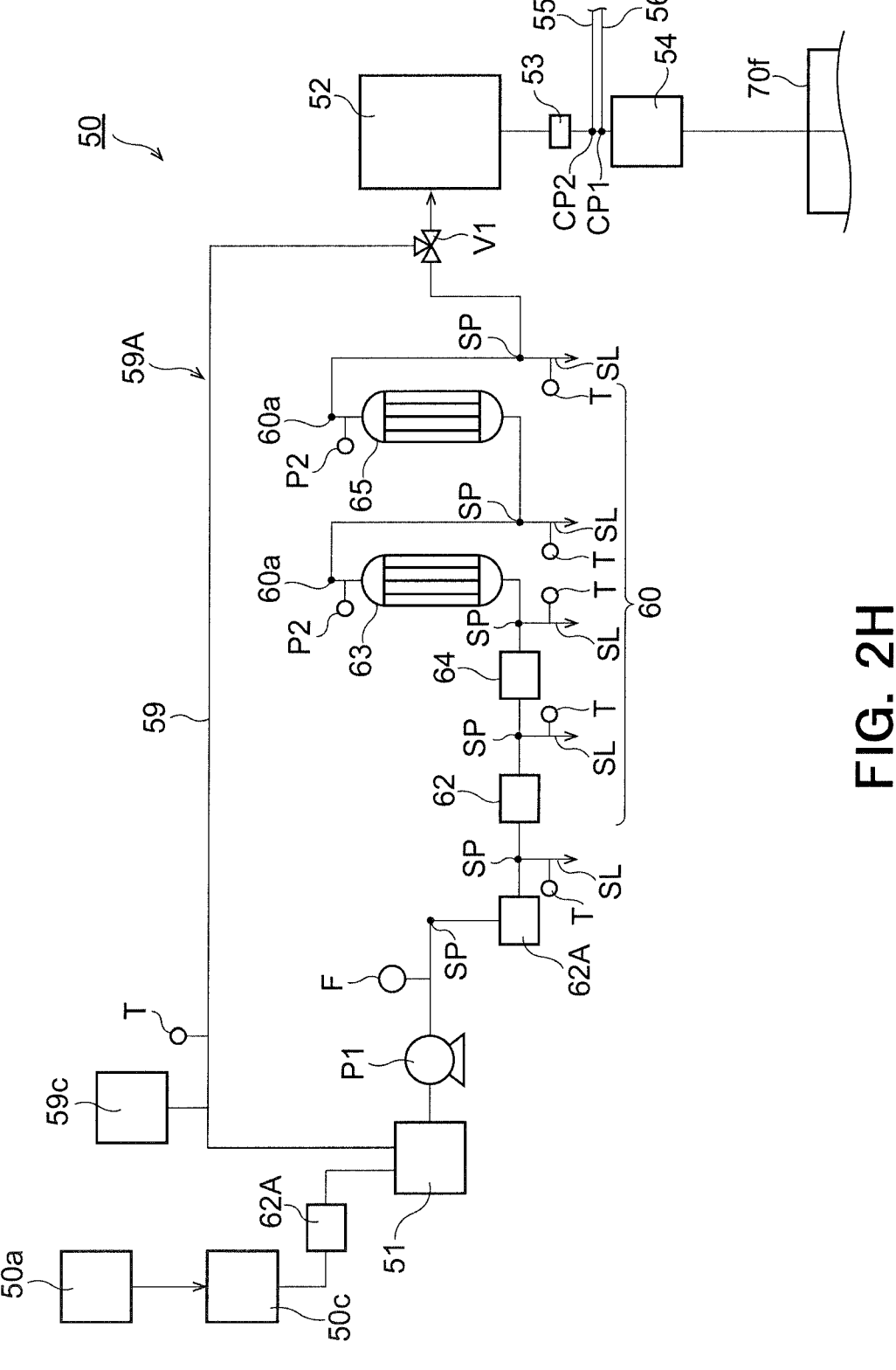
FIG. 2H schematically illustrates another example of the water sterilization line according to an embodiment.

As illustrated in FIG. 2H, the water sterilizer 60 may include the first sterilizer 62, the second sterilizer 64, and the first sterile filter 63. The first sterilizer 62, the second sterilizer 64, and the first sterile filter 63 may be arranged in this order from an upstream position to a downstream position in the direction in which the water is conveyed. In this case, the water sterilizer 60 may further include the second sterile filter 65 that is disposed downstream of the first sterile filter 63.

As illustrated in FIG. 2I, the water sterilizer 60 may include the first sterile filter 63, the second sterile filter 65, and the first sterilizer 62. The first sterile filter 63, the second sterile filter 65, and the first sterilizer 62 may be arranged in this order from an upstream position to a downstream position in the direction in which the water is conveyed. In this case, the water sterilizer 60 may further include the second sterilizer 64 that is disposed downstream of the first sterilizer 62.

Figure 2J:
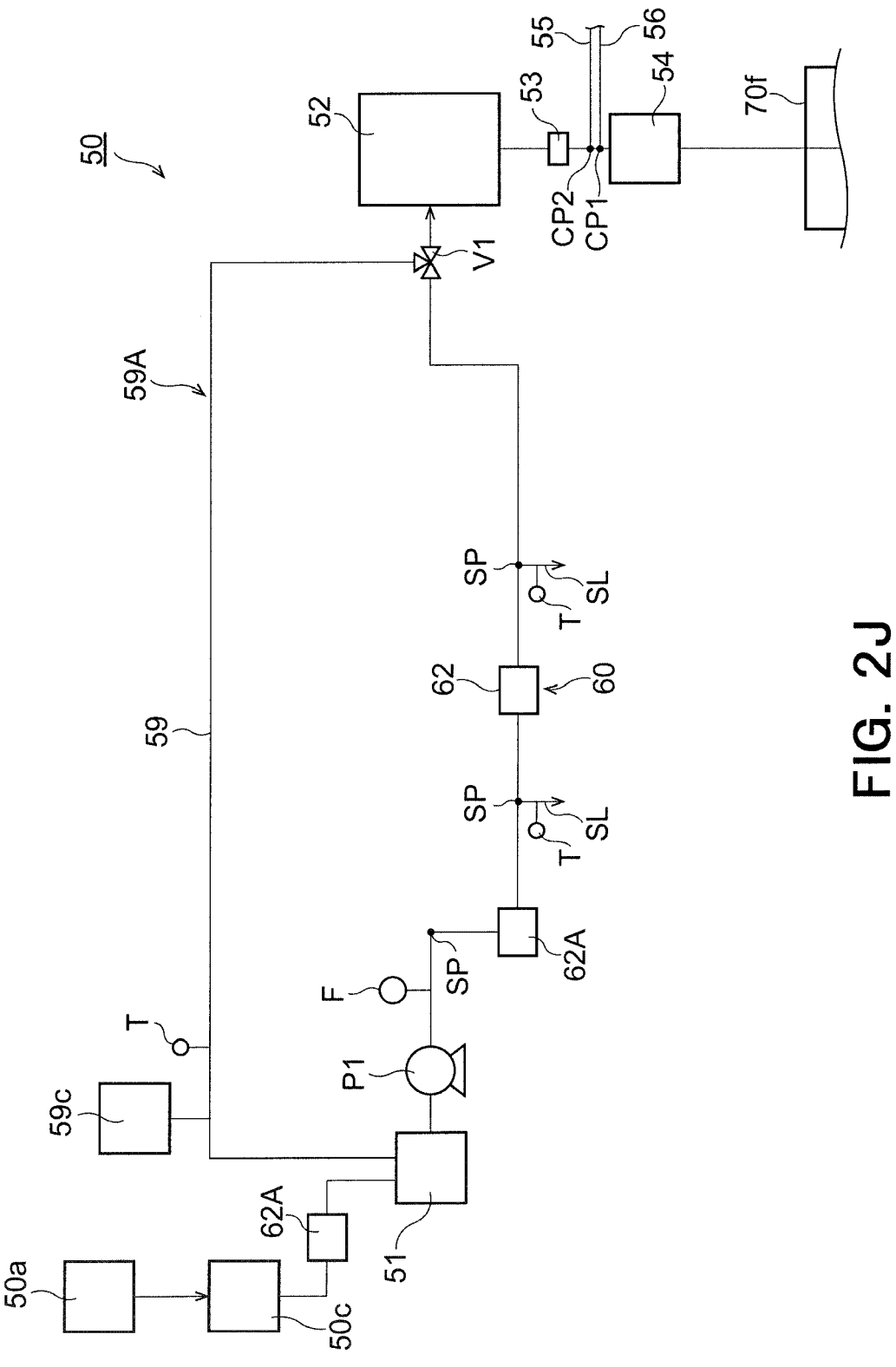
FIG. 2J schematically illustrates another example of the water sterilization line according to an embodiment.
Figure 2K:
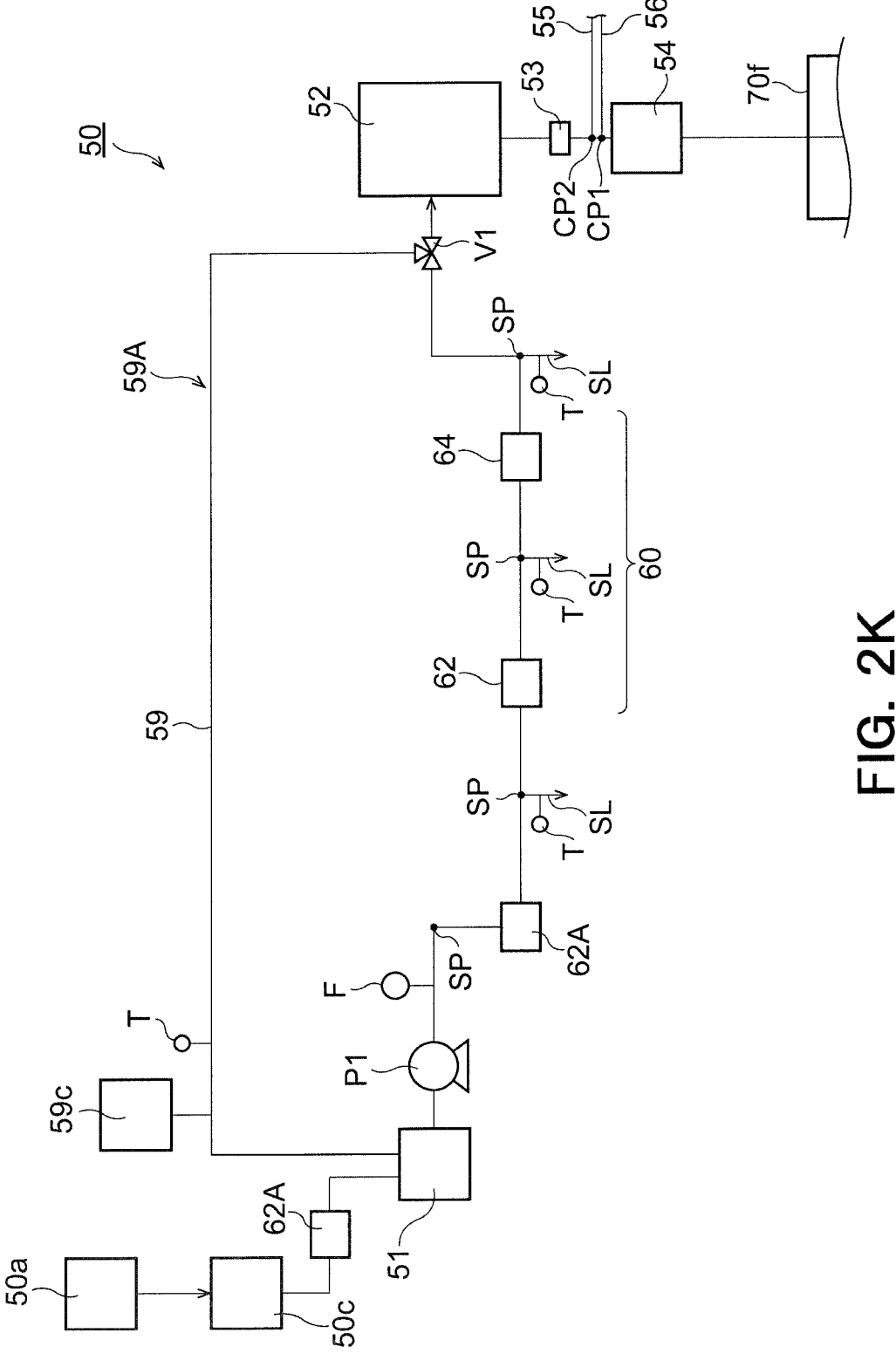
FIG. 2K schematically illustrates another example of the water sterilization line according to an embodiment.
Figure 2L:
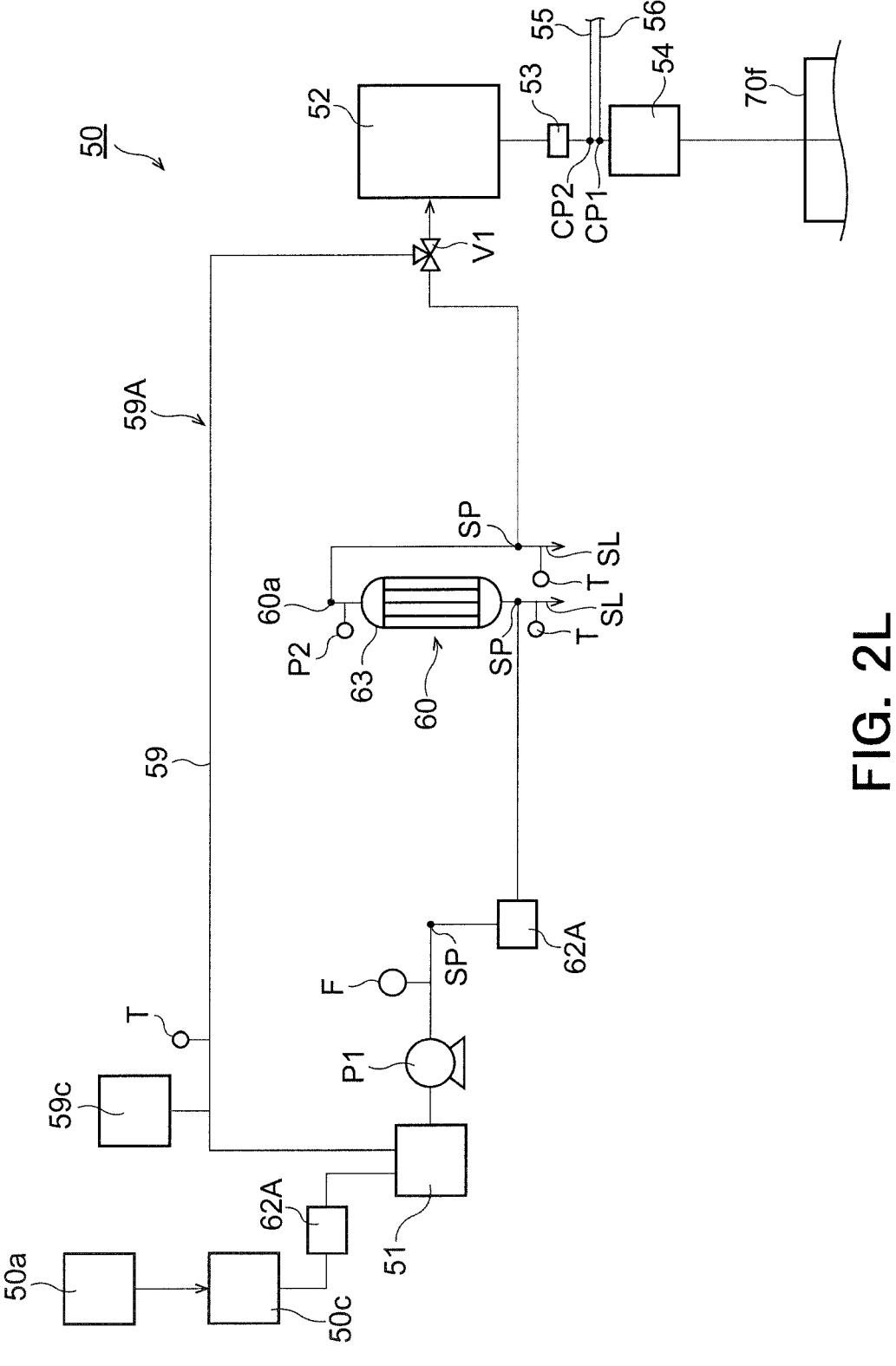
FIG. 2L schematically illustrates another example of the water sterilization line according to an embodiment.

The water sterilizer 60 may include no sterile filters. That is, in some cases, it is not necessary for the water sterilizer 60 to include a sterile filter, for example, because of the sterile quality level of the content that is manufactured by diluting the product undiluted solution with the water and/or the multiplying properties of the microbes in the content. In the case where the sterilized water is used for cleaning (COP) and/or sterilizing (SOP) in the chambers, the water does not directly come into with the content. Also in some of such cases, it is not necessary for the water sterilizer 60 to include a sterile filter. In these cases, as illustrated in, for example, FIG. 2J, the water sterilizer 60 may include only the first sterilizer 62. As illustrated in FIG. 2K, the water sterilizer 60 may include the first sterilizer 62 and the second sterilizer 64. In the case where the water sterilizer 60 thus includes no sterile filters, the manufacturing cost of the water sterilizer 60 can be reduced.

Figure 2M:
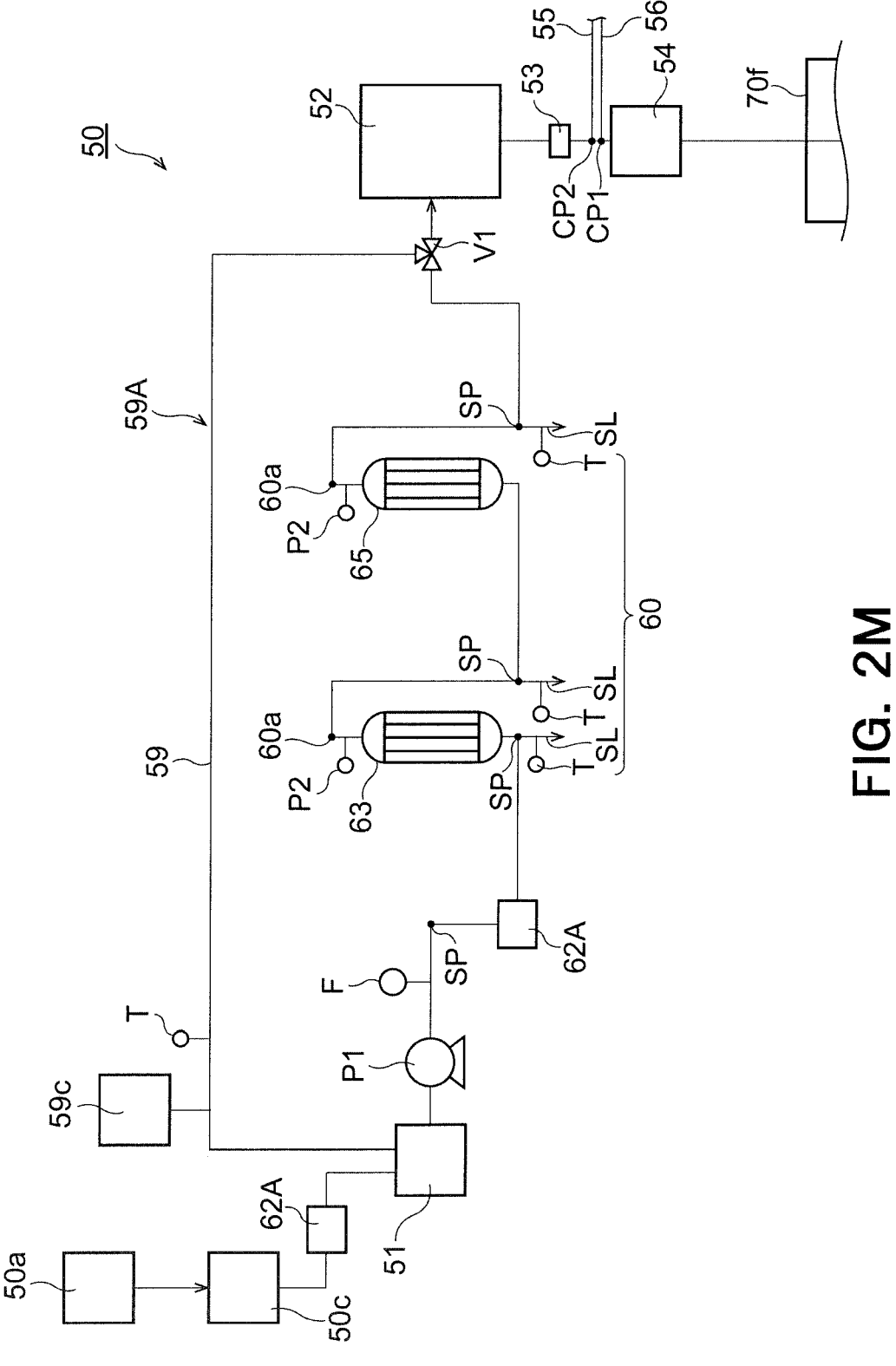
FIG. 2M schematically illustrates another example of the water sterilization line according to an embodiment.

The water sterilizer 60 may include no sterilizers. That is, in some cases, it is not necessary for the water sterilizer 60 to include a sterilizer, for example, because of the sterile quality level of the content that is manufactured by diluting the product undiluted solution with the water and/or the multiplying properties of the microbes in the content. In this case, as illustrated in, for example, FIG. 2L, the water sterilizer 60 may include only the first sterile filter 63. As illustrated in FIG. 2M, the water sterilizer 60 may include the first sterile filter 63 and the second sterile filter 65. The manufacturing cost of the water sterilizer 60 can be reduced also in the case where the water sterilizer 60 includes no sterilizers.

The foreign-material removal filter 61, the first sterilizer 62, the first sterile filter 63, the second sterilizer 64, and the second sterile filter 65 will now be described. In the following description, the water sterilizer 60 illustrated in FIG. 2A is mainly taken as an example for describing the foreign-material removal filter 61, the first sterilizer 62, the first sterile filter 63, the second sterilizer 64, and the second sterile filter 65. The foreign-material removal filter 61 will be first described.

The foreign-material removal filter 61 removes foreign material in the water. In an example illustrated, the water sterilizer 60 includes the single foreign-material removal filter 61. However, this is not a limitation. The water sterilizer 60 may include multiple foreign-material removal filters 61. The mesh size (filter precision) of the foreign-material removal filter 61 may be, for example, 0.20 m or more and 10 μm or less or may be 0.45 μm or more and 10 μm or less. The mesh size of the foreign-material removal filter 61 is preferably a size that enables fungus (such as mold and yeast) to be removed. As for, for example, the first sterilizer 62 that is disposed downstream of the foreign-material removal filter 61, ultraviolet rays are radiated to the water as described later. For this reason, the mesh size of the foreign-material removal filter 61 is preferably a size that enables mold that is resistant to the ultraviolet rays to be removed and is preferably 0.45 μm or more and 1.2 μm or less. The mesh size of the foreign-material removal filter 61 may be 0.2 μm or more and 1.2 μm or less in order to improve the sterile properties of the water that passes through the foreign-material removal filter 61. This enables almost all of the microbes that remain in the water to be collected. A sterile grade filter having a mesh size of 0.1 μm or more and 0.22 μm or less may be used as the foreign-material removal filter 61 in order to improve the sterile properties of the water that passes through the foreign-material removal filter 61.

The first sterilizer 62 is disposed downstream of the foreign-material removal filter 61. The first sterilizer 62 is disposed upstream of the first sterile filter 63. The first sterilizer 62 sterilizes the water by using the ultraviolet rays. This enables the microbes (bacteria other than mold and yeast) that pass through the foreign-material removal filter 61 to be killed. The amount of carbon dioxide that is discharged by the content-filling system can be decreased in a manner in which the first sterilizer 62 sterilizes the water by using the ultraviolet rays, unlike the case where the water is sterilized by being heated. In particular, in the case where the content is manufactured as described above, the product undiluted solution can be diluted with the water by a factor of 1.1 or more and 100 or less, preferably by a factor of 2 or more and 10 or less. In the case where the product undiluted solution is diluted with the water by a factor of 2 or more and 10 or less, 50% or more and 90% or less of the content is the water. For this reason, the water is sterilized without being heated, and the amount of carbon dioxide that is discharged when the content is manufactured can be consequently greatly decreased.

According to the present embodiment, the first sterilizer 62 sterilizes the water by using the ultraviolet rays as described above. In this case, as illustrated in FIG. 3 and FIG. 4, the first sterilizer 62 may include a body 66 and an ultraviolet radiation unit 67 that is disposed in the body 66.

Of these, the body 66 is hollow. The shape of the body 66 is a truncated cone shape. Specifically, the body 66 has an inner surface having a truncated cone shape, and an end portion thereof having a small diameter is higher than an end portion thereof having a large diameter. An introduction portion 68 that introduces the water into the body 66 may be formed at a lower portion of the body 66, and a discharge portion 69 that discharges the sterilized water from the body 66 may be formed at an upper portion of the body 66. An introduction tube 68a may be coupled with the introduction portion 68 that is formed at the body 66, and the introduction tube 68a may extend in a tangential direction of an inner surface of the body 66 in a plan view. In this case, the tangential direction of the inner surface is the direction of a tangent at a position at which the water to be introduced collides with the inner surface of the body 66 among tangents of a circle that is defined by the inner surface of the body 66 in a horizontal section including the introduction portion 68.

The water that is introduced into the body 66 via the introduction portion 68 is guided along the inner surface of the body 66 and consequently turns in a circumferential direction. The water turns, moves upward, and is discharged via the discharge portion 69. This can inhibit the flow of the water that is introduced into the body 66 from deviating. For this reason, a part of the water that is introduced into the body 66 can be prevented from being discharged via the discharge portion 69 in a short time (so-called short pass).

Figure 4:
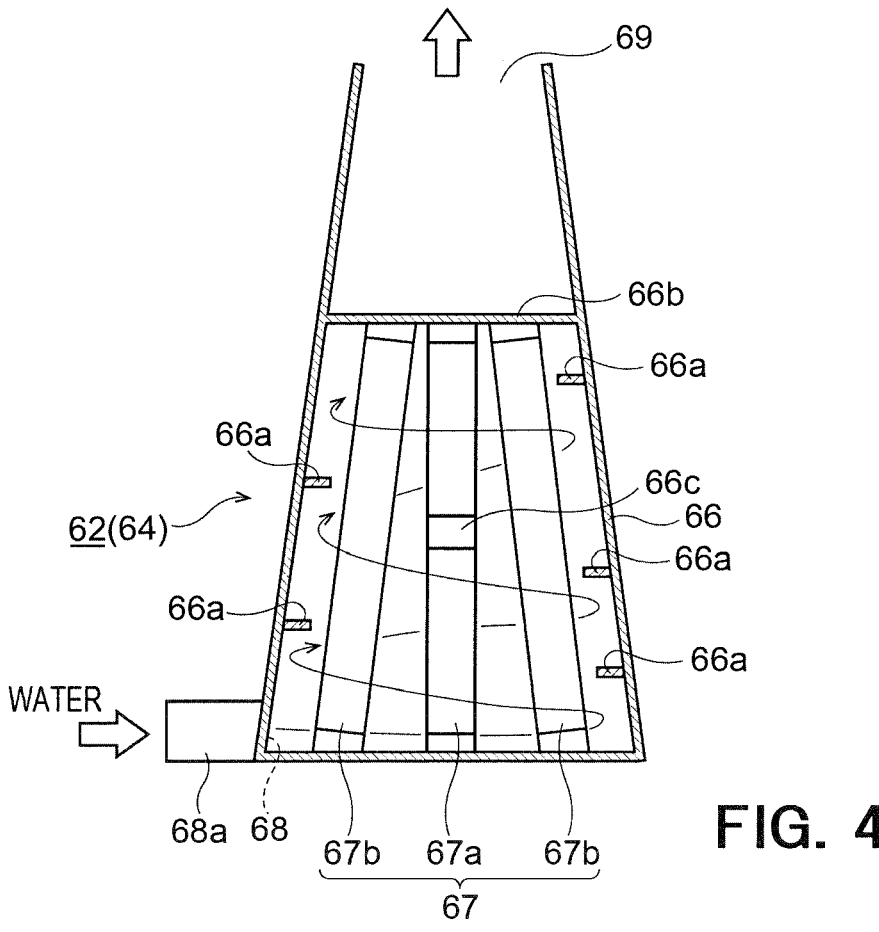
FIG. 4 illustrates a sectional view (a sectional view taken along line IV-IV in FIG. 3) of the first sterilizer of the water sterilizer according to an embodiment.

As illustrated in FIG. 4, a baffle plate 66a that restricts the flow of the water may be disposed in the body 66. The baffle plate 66a may radially protrude from the inner surface of the body 66 so as to be spirally wound. The baffle plate 66a that is disposed in the body 66 can inhibit the water that is introduced into the body 66 via the introduction portion 68 from moving upward without turning in the circumferential direction. For this reason, the so-called short pass can be prevented with certainty. The baffle plate 66a may not be spirally wound in the body 66 although this is not illustrated. In this case, for example, multiple baffle plates 66a that are annular in a plan view may be disposed in the body 66 such that the water passes through a central opening portion.

The body 66 may contain a fixation member 66b that fixes the first ultraviolet lamp 67a and second ultraviolet lamps 67b of the ultraviolet radiation unit 67 described later. The shape of the fixation member 66b is, for example, a cross shape in a plan view. This can inhibit the fixation member

66b from hindering upward movement of the water. Alternatively, the shape of the fixation member 66b may be, for example, a disk shape or may be a circular shape in a plan view. In this case, the fixation member 66b may have a through-hole not illustrated, and the through-hole may allow the water to pass therethrough.

An illuminometer (an intensity meter) 66c that measures the irradiance of the ultraviolet rays that are radiated from the ultraviolet radiation unit 67 may be installed in the body 66. At least one illuminometer 66c is preferably installed near the ultraviolet radiation unit 67. An output meter that measures the outputs of the first ultraviolet lamp 67a and the second ultraviolet lamps 67b of the ultraviolet radiation unit 67 described later may be installed. The flow meter F described above may always monitor a time (a staying time) required for the water to pass through the body 66. The temperature, transmittance (turbidity) and/or chromaticity of the water that passes through the body 66 may be always or appropriately measured, and whether the irradiation amount of the ultraviolet rays is not abnormal may be always checked.

The ultraviolet radiation unit 67 will now be described. The ultraviolet radiation unit 67 may include the first ultraviolet lamp 67a that is disposed at the center of the body 66 in a radial direction and the multiple second ultraviolet lamps 67b that are disposed around the first ultraviolet lamp 67a. In an example illustrated, four second ultraviolet lamps 67b are disposed around the single first ultraviolet lamp 67a.

The second ultraviolet lamps 67b are disposed along the inner surface of the body 66. That is, the second ultraviolet lamps 67b extend upward and radially incline inward. In this case, the second ultraviolet lamps 67b are preferably disposed at a regular interval in the circumferential direction. This can inhibit the cumulative irradiation amount (mJ/cm$^2$) of the ultraviolet rays from varying. The first ultraviolet lamp 67a and the second ultraviolet lamps 67b may be ultraviolet lamps that radiate ultraviolet rays having a wavelength of 200 nm or more and 450 nm or less.

The first ultraviolet lamp 67a and the second ultraviolet lamps 67b may be low-pressure mercury lamps, intermediate-pressure mercury lamps, or an UV-LEDs. In this case, the first ultraviolet lamp 67a and the second ultraviolet lamps 67b are preferably low-pressure mercury lamps or intermediate-pressure mercury lamps.

The ultraviolet rays that are radiated from the first ultraviolet lamp 67a may have a wavelength that differs from the wavelength of the ultraviolet rays that are radiated from the second ultraviolet lamps 67b, and/or the outputs thereof may differ from each other. That is, the first ultraviolet lamp 67a and the second ultraviolet lamps 67b may be different ultraviolet lamps. For example, in the case where the first ultraviolet lamp 67a is a low-pressure mercury lamp, the second ultraviolet lamps 67b may be intermediate-pressure mercury lamps (or UV-LEDs). The ultraviolet rays that are radiated from the multiple second ultraviolet lamps 67b may have different wavelengths, and/or the outputs thereof may differ from each other. That is, the multiple second ultraviolet lamps 67b may be different ultraviolet lamps. For example, in the case where one of the second ultraviolet lamps 67b is a low-pressure mercury lamp, another second ultraviolet lamp 67b may be an intermediate-pressure mercury lamp (or an UV-LED). The low-pressure mercury lamp can efficiently radiate ultraviolet rays having a wavelength (253.7 nm) that improves the sterilizing effect as described later. The intermediate-pressure mercury lamp is a high-output mercury lamp, unlike the low-pressure mercury lamp as described later. For this reason, in the case where the first ultraviolet lamp 67*a* is an ultraviolet lamp that differs from the second ultraviolet lamps 67*b*, the sterilizing effect as for the first sterilizer 62 can be improved, and the first sterilizer 62 can sterilize a large amount of the water. Also in the case where the multiple second ultraviolet lamps 67*b* are different ultraviolet lamps as described above, the sterilizing effect as for the first sterilizer 62 can be improved, and the first sterilizer 62 can sterilize a large amount of the water.

The low-pressure mercury lamp has a mercury vapor pressure of less than 10 Pa while lighting. The low-pressure mercury lamp can efficiently radiate the ultraviolet rays having a wavelength (253.7 nm) that improves the sterilizing effect. For this reason, in the case where the first ultraviolet lamp 67*a* and the second ultraviolet lamps 67*b* are low-pressure mercury lamps, the sterilizing effect as for the first sterilizer 62 (and the second sterilizer 64) can be improved. Each low-pressure mercury lamp may be an amalgam lamp (a low-pressure, high-output amalgam lamp) that includes a light-emitting tube in which amalgam, which is an alloy of mercury and another metal, is enclosed.

The intermediate-pressure mercury lamp has a mercury vapor pressure of 40 kPa or more while lighting. As for the wavelength of the ultraviolet rays that are radiated from the intermediate-pressure mercury lamp, a main wavelength is 365 nm, peaks appear at, for example, 254 nm, 302 nm, 313 nm, 405 nm, and 436 nm. The output of the intermediate-pressure mercury lamp is typically higher than that of the low-pressure mercury lamp. For this reason, in the case where the first ultraviolet lamp 67*a* and the second ultraviolet lamps 67*b* are intermediate-pressure mercury lamps, the first sterilizer 62 (and the second sterilizer 64) can sterilize a large amount of the water. In the case where the first ultraviolet lamp 67*a* and the second ultraviolet lamps 67*b* are intermediate-pressure mercury lamps, the size of the first sterilizer 62 (and the second sterilizer 64) can be decreased because the outputs of the intermediate-pressure mercury lamps are high.

The ultraviolet radiation unit 67 of the first sterilizer 62 may consist of the low-pressure mercury lamp (including a low-pressure, high-output amalgam lamp). The ultraviolet radiation unit 67 of the second sterilizer 64 may consist of an intermediate-pressure mercury lamp. In the case where the water sterilization line 50 includes multiple sterilizers (for example, the first sterilizer 62 and the second sterilizer 64), the low-pressure mercury lamp (including the low-pressure, high-output amalgam lamp) and the intermediate-pressure mercury lamp are preferably thus used. The low-pressure mercury lamp (including the low-pressure, high-output amalgam lamp) and the intermediate-pressure mercury lamp have different sterilize wavelengths. For this reason, the use of the low-pressure mercury lamp (including the low-pressure, high-output amalgam lamp) and the intermediate-pressure mercury lamp enables the sterilizing effect to be improved.

The intermediate-pressure mercury lamp has heat resistance higher than that of the low-pressure mercury lamp and can light at high temperature. Accordingly, when the first sterilizer 62 and the second sterilizer 64 are sterilized, the first sterilizer 62, for example, can be sterilized with the first ultraviolet lamp 67*a*, for example, lighting in a manner in which hot water or the sterilizing agent is circulated in the circulation system 95A (see FIG. 2B and FIG. 2C) as described later. In the case where the low-pressure mercury lamp (including the low-pressure, high-output amalgam lamp) and an ultraviolet lamp that radiates ultraviolet rays having a wavelength that differs from the wavelength of the ultraviolet rays that are radiated from the low-pressure mercury lamp are installed in series, the low-pressure mercury lamp may be used for the front sterilizer 62A between the first water tank 51 and the pure-water tank 50*c* that is not sterilized.

The sterilizing effect of the ultraviolet rays on the microbes changes depending on the cumulative irradiation amount (mJ/cm$^2$) of the ultraviolet rays. That is, as the cumulative irradiation amount of the ultraviolet rays increases, the sterilizing effect of the ultraviolet rays on the microbes improves. The cumulative irradiation amount is calculated as a product of an irradiance (mW/cm$^2$) and an irradiation time (s). For this reason, it is necessary to decrease distances between light sources (the first ultraviolet lamp 67*a* and the second ultraviolet lamps 67*b*) and the water and to increase the irradiation time of the ultraviolet rays in order to improve the sterilizing effect of the ultraviolet rays on the microbes. In particular, the irradiance is inversely proportional to the square of the distances from the light sources that radiate the ultraviolet rays. For example, in the case where the distances from the light sources increase by a factor of two, the irradiance decreases by a factor of ¼. In the case where the distances from the light sources increase by a factor of three, the irradiance decreases by a factor of ⅑. For this reason, the water is caused to pass through a position near the light sources, and the sterilizing effect of the ultraviolet rays on the microbes can be consequently improved.

According to the present embodiment, the introduction portion 68 that introduces the water into the body 66 is formed at the lower portion of the body 66, and the discharge portion 69 that discharges the sterilized water from the body 66 is formed at the upper portion of the body 66 as described above. This can prevent the short pass and enables the time for which the water stays in the body 66 to be increased. For this reason, the irradiation time of the ultraviolet rays to the water can be increased, and the cumulative irradiation amount of the ultraviolet rays can be increased. The water is introduced via the lower portion of the body 66, and the sufficient time for which the water stays in the body 66 can be consequently ensured even as for the water at the beginning of the operation of the first sterilizer 62, that is, the water that is introduced into the body 66 that is empty. For this reason, the irradiation time of the ultraviolet rays to the water can be increased.

The shape of the body 66 is a truncated cone shape. This enables the distances between the first ultraviolet lamp 67*a* and the water and between the second ultraviolet lamps 67*b* and the water to be decreased at the upper portion of the body 66. For this reason, the sterilizing effect of the ultraviolet rays on the microbes can be improved. The ultraviolet radiation unit 67 includes the first ultraviolet lamp 67*a* that is disposed at the center of the body 66 in the radial direction and the multiple second ultraviolet lamps 67*b* that are disposed around the first ultraviolet lamp 67*a*. This enables the ultraviolet rays to be uniformly radiated to the water that turns in the circumferential direction and that moves upward. For this reason, the cumulative irradiation amount of the ultraviolet rays can be inhibited from varying.

The cumulative irradiation amount of the ultraviolet rays to the water is preferably 10 mJ/cm$^2$ or more and 10000 mJ/cm$^2$ or less, more preferably 100 mJ/cm$^2$ or more and 1000 mJ/cm$^2$ or less. That is, when the water passes through the body 66, the cumulative irradiation amount of the ultraviolet rays to the water is preferably 10 mJ/cm$^2$ or more and 10000 mJ/cm$^2$ or less, more preferably 100 mJ/cm$^2$ or more and 1000 mJ/cm$^2$ or less. In this case, the cumulative irradiation amount of the ultraviolet rays to the water is preferably 10 mJ/cm$^2$ or more and 10000 mJ/cm$^2$ or less, more preferably 100 mJ/cm$^2$ or more and 1000 mJ/cm$^2$ or less at a wavelength of 254 nm. When the cumulative irradiation amount of the ultraviolet rays is 10 mJ/cm$^2$ or more, aquatic bacteria (gram-negative bacteria such as Pseudomonas or Methylobacterium that can multiply in water in an oligotrophic environment) that can pass through the second sterile filter 65 can be effectively killed. When the cumulative irradiation amount of the ultraviolet rays is 100 mJ/cm$^2$ or more, bacterial spores can be also killed. When the cumulative irradiation amount of the ultraviolet rays is 10000 mJ/cm$^2$ or less, power consumption can be reduced, and the amount of carbon dioxide that is discharged by the content-filling system 10 can be decreased. The wavelength of the ultraviolet rays may be 250 nm or more and 260 nm or less and may be, for example, 253.7 nm (254 nm). When the wavelength of the ultraviolet rays is 250 nm or more and 260 nm or less, particularly 253.7 nm, the sterilizing effect of the ultraviolet rays on the microbes can be improved. In the present specification, the "aquatic bacteria" means microbes that can pass through a sterile filter having a mesh size of 0.2 μm.

It is preferable that the first sterilizer 62 can be sterilized (SIP). This enables the first sterilizer 62 to be periodically sterilized. In the case where the first sterilizer 62 is sterilized, the control unit 90 described above may cause the first sterilizer 62 to be sterilized by using vapor or hot water. In the case where the first sterilizer 62 is vulnerable to heat, the control unit 90 may cause the first sterilizer 62 to be sterilized in a manner in which the sterilizing agent containing peracetic acid, for example, is circulated through the circulation system 59A that includes the water sterilizer 60. In this case, the control unit 90 may cause the sterilizing agent to circulate through the circulation system 59A at least for a time of 10 seconds or more and 60 minutes or less.

Figure 5A:
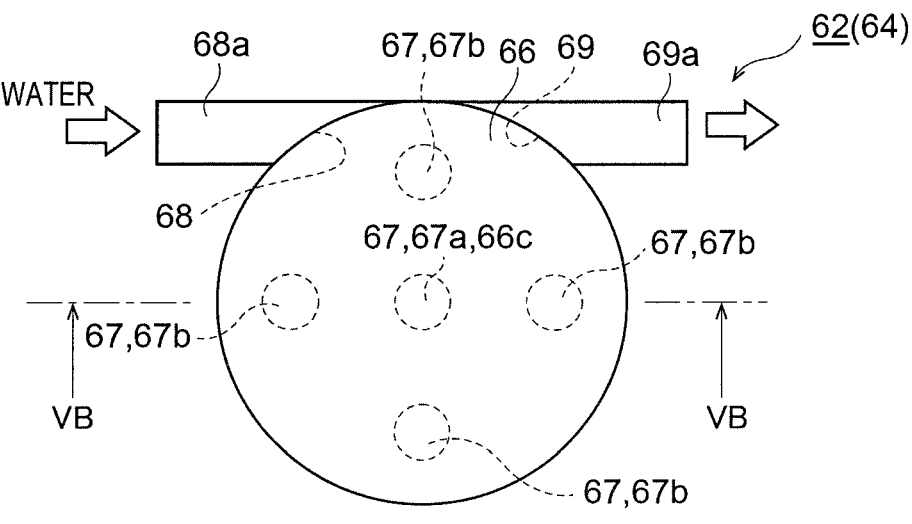
FIG. 5A illustrates a plan view of another example of the first sterilizer of the water sterilizer according to an embodiment.
Figure 5B:
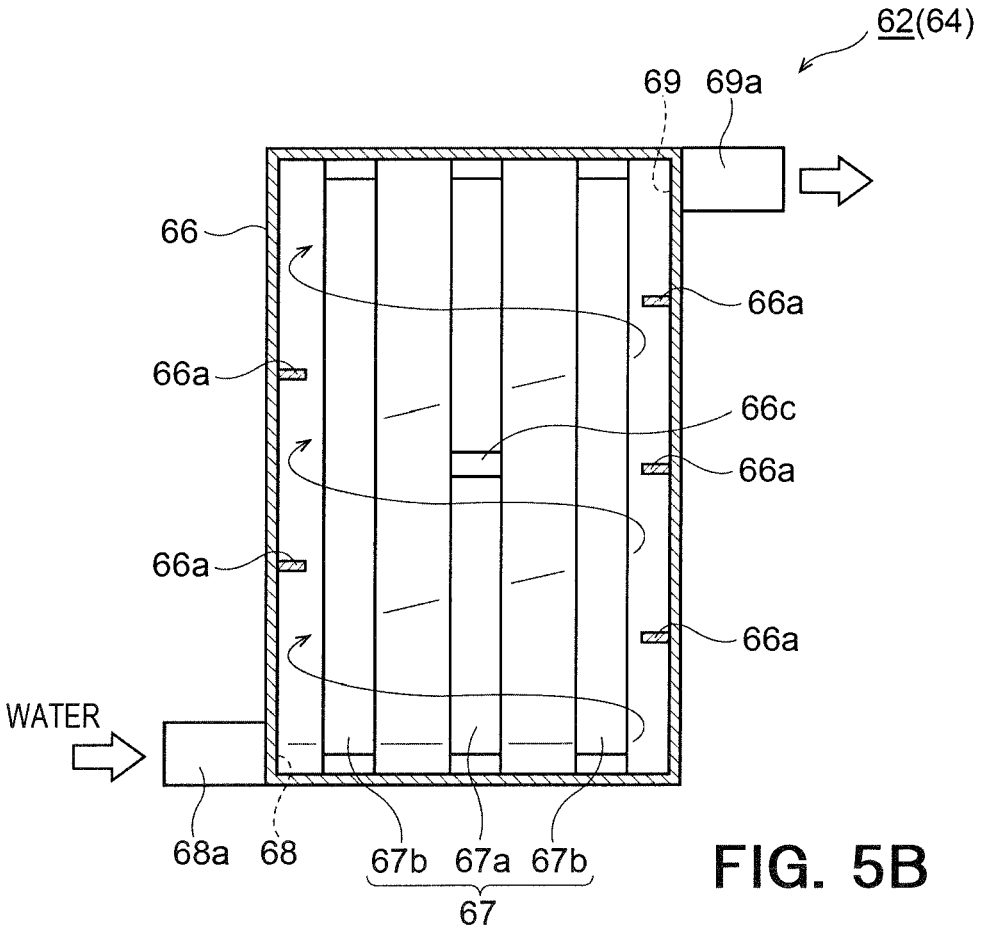
FIG. 5B illustrates a sectional view (a sectional view taken along line VB-VB in FIG. 5A) of another example of the first sterilizer of the water sterilizer according to an embodiment.

As illustrated in FIG. 5A and FIG. 5B, the shape of the body 66 of the first sterilizer 62 may be a cylindrical shape. In this case, a discharge tube 69a may be coupled with the discharge portion 69 that is formed at the body 66, and the discharge tube 69a may extend in a tangential direction of the inner surface of the body 66 in a plan view. In this case, the tangential direction of the inner surface is the direction of a tangent at a position at which the water that is in contact with the inner surface and that turns is separated from the inner surface of the body 66 among tangents of a circle that is defined by the inner surface of the body 66 in a horizontal section including the discharge portion 69. In the case where the shape of the body 66 is a cylindrical shape, the time for which the water stays in the body 66 can be increased. For this reason, the irradiation time of the ultraviolet rays to the water can be increased, and the cumulative irradiation amount of the ultraviolet rays can be increased. In this case, the multiple second ultraviolet lamps 67b may extend upward and radially incline inward although this is not illustrated.

Figure 6A:
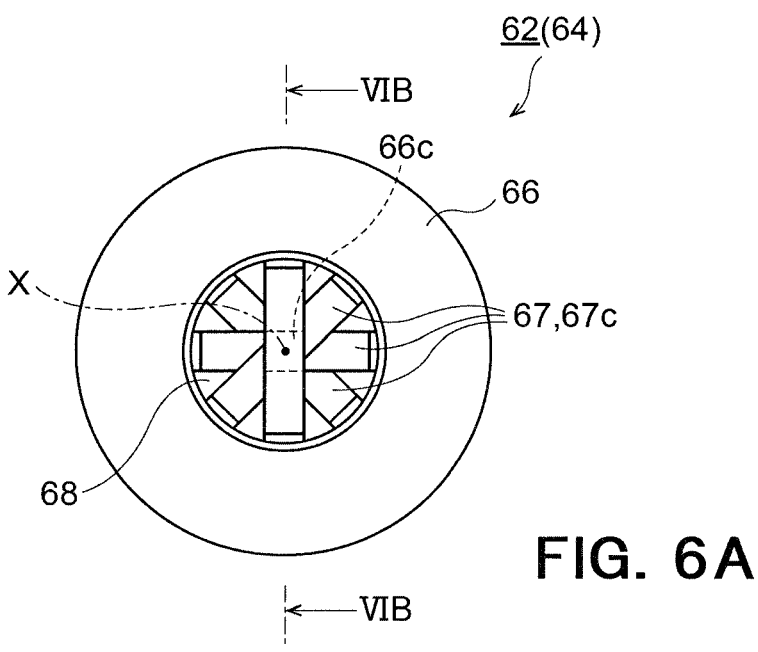
FIG. 6A illustrates a front view of another example of the first sterilizer of the water sterilizer according to an embodiment.
Figure 6B:
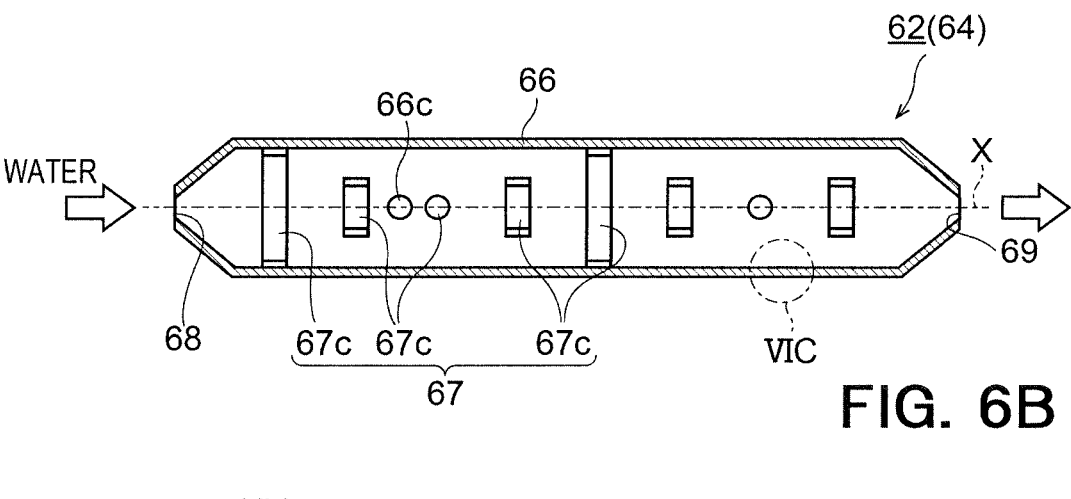
FIG. 6B illustrates a sectional view (a sectional view taken along line VIB-VIB in FIG. 6A) of another example of the first sterilizer of the water sterilizer according to an embodiment.
Figure 6C:
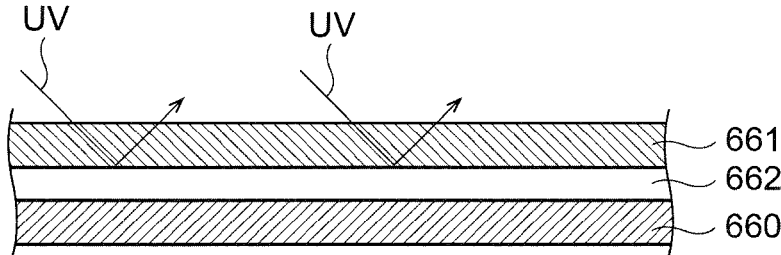
FIG. 6C illustrates a sectional view (an enlarged view of a VIC portion in FIG. 6B) of another example of the first sterilizer of the water sterilizer according to an embodiment.

As illustrated in FIG. 6A and FIG. 6B, the shape of the body 66 may be a substantially cylindrical shape that is elongated. In this case, the introduction portion 68 that introduces the water into the body 66 may be formed at a first end portion of the body 66. The discharge portion 69 that discharges the sterilized water from the body 66 may be formed at a second end portion of the body 66. In this case, the body 66 may be located such that the longitudinal direction (the direction in which the water moves) of the body 66 is parallel with the horizontal direction, or the body 66 may be located such that the longitudinal direction (the direction in which the water moves) of the body 66 is parallel with the up-down direction. In an example illustrated, the shape of the body 66 is a so-called reducer shape such that the diameter decreases as a position is nearer to the first end portion, and the diameter decreases as the position is nearer to the second end portion. However, this is not a limitation. The shape of the body 66 may be a cylindrical shape having a substantially constant diameter from the introduction portion 68 to the discharge portion 69.

According to the present modification, the ultraviolet radiation unit 67 may include multiple third ultraviolet lamps 67c that are arranged in the direction in which the water moves. This enables the ultraviolet rays to be uniformly radiated to the water. For this reason, the cumulative irradiation amount of the ultraviolet rays can be inhibited from varying. In an example illustrated, the ultraviolet radiation unit 67 includes eight third ultraviolet lamps 67c.

The third ultraviolet lamps 67c adjacent to each other in the direction in which the water moves may extend in different directions when viewed in the direction in which the water moves. This can effectively inhibit the cumulative irradiation amount of the ultraviolet rays from varying. In an example illustrated, the third ultraviolet lamps 67c are regularly arranged. That is, an angle at which each third ultraviolet lamp 67c clockwise rotates about the central axis X of the body 66 increases by 45 degrees as the position is nearer to a downstream position (the right in FIG. 6B) in the direction in which the water moves when viewed from an upstream position (the left in FIG. 6B) in the direction in which the water moves. The angle at which each third ultraviolet lamp 67c rotates may be appropriately changed. For example, the angle at which each third ultraviolet lamp 67c clockwise rotates about the central axis X may increase by 90 degrees as the position is nearer to the downstream position in the direction in which the water moves when viewed from the upstream position in the direction in which the water moves. In the case where the ultraviolet radiation unit 67 includes three or more third ultraviolet lamps 67c, the angle at which each third ultraviolet lamp 67c clockwise rotates about the central axis X may increase by 60 degrees as the position is nearer to the downstream position in the direction in which the water moves when viewed from the upstream position in the direction in which the water moves. The third ultraviolet lamps 67c may be irregularly arranged.

The third ultraviolet lamps 67c may be the same as the first ultraviolet lamp 67a and the second ultraviolet lamps 67b. That is, the third ultraviolet lamps 67c may be ultraviolet lamps that radiate ultraviolet rays having a wavelength of 200 nm or more and 450 nm or less. The third ultraviolet lamps 67c may be low-pressure mercury lamps (including low-pressure, high-output amalgam lamps), intermediate-pressure mercury lamps, or UV-LEDs. The ultraviolet rays that are radiated from the multiple third ultraviolet lamps 67c may have different wavelengths, and/or the outputs thereof may differ from each other. That is, the multiple third ultraviolet lamps 67c may be different ultraviolet lamps. For example, in the case where one of the third ultraviolet lamps 67c is a low-pressure mercury lamp, another third ultraviolet lamp 67c may be an intermediate-pressure mercury lamp (or an UV-LED). Also in this case, the sterilizing effect as for the first sterilizer 62 can be improved, and the first sterilizer 62 can sterilize a large amount of the water. The baffle plate 66a that restricts the flow of the water may be disposed in the body 66 although this is not illustrated.

As for the first sterilizer 62 illustrated in FIG. 3 to FIG. 6B, the ultraviolet rays may be reflected in the body 66 in order to improve the sterilization efficiency as for the first sterilizer 62. The first sterilizer 62 illustrated in FIG. 6A and FIG. 6B, for example, is taken as an example for description. As illustrated in FIG. 6C, the body 66 may include an outer member 660 and an inner member 661 that is disposed inside the outer member 660. The outer member 660 may be composed of, for example, a stainless steel tube that is mirror-polished by, for example, electropolishing. The inner member 661 may be composed of a glass tube. An air layer 662 may be interposed between the outer member 660 and the inner member 661. In this case, the use of glass (for example, quartz glass or fluoride glass) having high ultraviolet transmittance as the glass of the glass tube of the inner member 661 enables ultraviolet rays UV to be reflected at the boundary between the inner member 661 and the air layer 662 as illustrated in FIG. 6C. As for the material of the inner member 661, a material having high ultraviolet transmittance may be appropriately selected so as to be suitable for the wavelength of the ultraviolet rays that are radiated from, for example, the third ultraviolet lamps 67*c*. The material of the inner member 661 may be a material other than glass and may be, for example, plastic having the same properties as those of glass. A material having high reflectance may be coated on the inner surface of the outer member 660 and/or the outer surface of the inner member 661. In particular, in the case where the body 66 is elongated as in the first sterilizer 62 illustrated in FIG. 6A and FIG. 6B, coating the material having high reflectance on, for example, the inner surface of the outer member 660 inhibits the ultraviolet rays UV from attenuating and enables the ultraviolet rays UV to be repeatedly reflected. For this reason, the water can be efficiently sterilized. The ultraviolet rays UV are preferably reflected in the body 66 one or more times. In this case, the ultraviolet rays UV are preferably reflected two or more times in a manner in which the distances, for example, between the outer member 660 and the third ultraviolet lamps 67*c* are decreased. The irradiance of ultraviolet rays that are radiated from an intermediate-pressure mercury lamp can be maintained up to a farther distance than that of ultraviolet rays that are radiated from a low-pressure mercury lamp. For this reason, in the case where the third ultraviolet lamps 67*c*, for example, are intermediate-pressure mercury lamps, the sterilizing effect of the ultraviolet rays UV can be effectively inhibited from decreasing even in the case where the ultraviolet rays UV are reflected multiple times in the body 66.

A pass time required for the water to pass through the first sterilizer 62 may be 0.1 seconds or more and less than 10 seconds and is preferably 0.5 seconds or more and less than 5 seconds. The pass time is a time until the water that is introduced via the introduction portion 68 into the body 66 is discharged via the discharge portion 69. When the pass time is 0.1 seconds or more, the sterilizing effect on the water can be inhibited from varying. For this reason, the sufficient sterilizing effect can be obtained. When the pass time is less than 10 seconds, the size of the first sterilizer 62 can be decreased. The pass time required for the water to pass through the first sterilizer 62 may be appropriately changed based on the flow rate of the water that is processed (sterilized) by the first sterilizer 62.

Referring to FIG. 2A again, the first sterile filter 63 is disposed downstream of the first sterilizer 62. The first sterile filter 63 is a microfiltration filter (MF) that collects the microbes that remain in the water and that consequently filters the water. The mesh size of the first sterile filter 63 may be 0.1 μm or more and 0.45 μm or less and is preferably 0.1 μm or more and 0.22 μm or less. When the mesh size of the first sterile filter 63 is 0.1 μm or more, the sterilization efficiency on the water can be inhibited from decreasing. When the mesh size of the first sterile filter 63 is 0.45 μm or less, the first sterile filter 63 can effectively collect the microbes that remain in the water. A filter that has a mesh size of 0.02 μm or more and 0.1 μm or less and that can remove some virus may be used as the first sterile filter 63. The material of the filter membrane of the first sterile filter 63 may be, for example, polyvinylidene fluoride (PVDF), polyether sulfone (PES), mixed cellulose (SCWP), polycarbonate (PC), polypropylene (PP) or polyamide. The filter membrane of the first sterile filter 63 may be, for example, a reverse osmosis membrane (a RO membrane) or may be an ultrafiltration membrane (an UF membrane) depending on the aptitude of the content.

It is preferable that the first sterile filter 63 can be sterilized (SIP). This enables the first sterile filter 63 to be periodically sterilized. The first sterile filter 63 collects the microbes that pass through the first sterilizer 62 and that remain in the water as described above. For this reason, if the water sterilizer 60 continues to sterilize the water for a long time, the collected microbes can multiply in the first sterile filter 63. In the case where the corpses of the microbes, which are organic matters, adheres to, for example, the first sterile filter 63, the corpses of the microbes can become substrates. In this case, the microbes can further multiply in the first sterile filter 63. In the case where the microbes thus multiply in the first sterile filter 63, there is a possibility that the microbes enter the water that passes through the first sterile filter 63. When the first sterile filter 63 can be sterilized, however, the microbes adhering to the first sterile filter 63 can be inhibited from entering the water that passes through the first sterile filter 63. As a result, the filter performance of the first sterile filter 63 can be inhibited from decreasing. In the case where the first sterile filter 63 is sterilized, vapor for sterilization, for example, may be supplied to the first sterile filter 63 via a sterile-air inlet 60*a* described later.

The degree of sterilization of the first sterile filter 63 may be managed by using an F value. In other words, when the water sterilizer 60 that includes the first sterile filter 63 is sterilized, the degree of sterilization of the water sterilizer 60 may be managed by using the F value. At this time, the control unit 90, for example, may measure the temperature of heated vapor (fluid) or hot water (fluid) that flows on the flow path in the first sterile filter 63 and may calculate the F value, based on the measured temperature. In the case where the F value is a desired value or more, the control unit 90 may cause the sterilization of the first sterile filter 63 to end. In the case where the temperature of the heated vapor or the hot water is measured, the control unit 90 may cause the heated vapor or the hot water to flow on the flow path in the first sterile filter 63 and may cause the temperature to be measured by temperature sensors that are disposed at positions on the flow path at which the temperature is unlikely to increase. The control unit 90 may cause heating on the flow path by using, for example, the heated vapor to end when the time required for the temperature from the temperature sensors to reach a predetermined temperature is a predetermined time or more. This enables the first sterile filter 63 to be sterilized and prevents the first sterile filter 63 from being excessively heated. The F value is equal to a heating time required for all of the microbes to be killed when the microbes are heated for a predetermined time, is represented as the lethal time of the microbes at 121.1° C., and is calculated as the following expression.

$$F = \int_{t_0}^{t_1} 10^{(T-T_r)/Z} dt \qquad \text{[Math. 3]}$$

(where T is a freely determined sterilization temperature (° C.), $10^{\{(T-Tr)/Z\}}$ is a lethality ratio at the freely determined sterilization temperature T, Tr is a reference temperature (° C.), and Z is a Z value (° C.)).

The first sterile filter 63 is preferably capable of conducting an integrity test for the mesh size of the first sterile filter 63. The integrity test may be conducted, for example, as a bubble point test. The bubble point test can be conducted as follows. For example, water is first supplied to a housing (not illustrated) in the first sterile filter 63, and a filter (not illustrated) of the first sterile filter 63 is covered by the water. Subsequently, the supply of the water ends, and the water in the first sterile filter 63 is discharged. Sterile air is injected into the first sterile filter 63 the filter of which is covered by the water, for example, via the sterile-air inlet 60a. Subsequently, the pressure of the sterile air is increased until the sterile air is taken out from the first sterile filter 63. The mesh size of the first sterile filter 63 is determined based on the pressure of the sterile air (bubble point) when the sterile air is taken out from the first sterile filter 63. The first sterile filter 63 that can conduct the integrity test for the mesh size of the first sterile filter 63 as above enables the deterioration of the first sterile filter 63 to be readily determined. A pressure gauge P2 may be disposed near the sterile-air inlet 60a in order to measure the pressure in the first sterile filter 63. The integrity test may be conducted as a diffusion flow test or a pressure hold test instead of the bubble point test described above.

The second sterilizer 64 is disposed downstream of the first sterile filter 63. The structure of the second sterilizer 64 may be substantially the same as the structure of the first sterilizer 62 illustrated in FIG. 3 to FIG. 6B. That is, the second sterilizer 64 may sterilize the water by using the ultraviolet rays.

The second sterile filter 65 is disposed downstream of the second sterilizer 64. The second sterile filter 65 collects the microbes that pass through the second sterilizer 64 and that remain in the water and consequently filters the water. The mesh size of the second sterile filter 65 is preferably equal to or smaller than the mesh size of the first sterile filter 63. This enables the second sterile filter 65 to collect the microbes even in the case where the microbes in the water pass through the first sterile filter 63. For this reason, the sterile properties of the water can be sufficiently ensured. In the case where the mesh size of the second sterile filter 65 is equal to the mesh size of the first sterile filter 63, two sterilization sets each of which includes a sterilizer and a sterile filter can be arranged in the direction in which the water is conveyed. That is, a first sterilization set that includes the first sterilizer 62 and the first sterile filter 63 and a second sterilization set that includes the second sterilizer 64 and the second sterile filter 65 can be arranged in series in the direction in which the water is conveyed. For this reason, even in the case where one of the sterilization sets becomes abnormal, the sterile properties of the water can be assured. Multiple sterilization sets may be provided depending on sterility assurance level (SAL) of a final product (the content) or the water (see FIG. 2A, FIG. 2B, and FIG. 2D to FIG. 2E3). As illustrated in, for example, FIG. 2F, the number of the sterilization sets may be one. The number of the sterilization sets may be three or more although this is not illustrated.

The mesh size of the second sterile filter 65 may be 0.1 μm or more and 0.45 μm or less and is preferably 0.1 μm or more and 0.22 μm or less. When the mesh size of the second sterile filter 65 is 0.1 μm or more, the sterilization efficiency on the water can be inhibited from decreasing. When the mesh size of the second sterile filter 65 is 0.45 μm or less, the second sterile filter 65 can effectively collect the microbes that remain in the water. An example of the filter membrane of the second sterile filter 65 may be a reverse osmosis membrane (a RO membrane) or an ultrafiltration membrane (an UF membrane).

The other structure of the second sterile filter 65 may be substantially the same as the structure of the first sterile filter 63. That is, the second sterile filter 65 may be sterilized (SIP). The second sterile filter 65 may conduct the integrity test for the mesh size of the second sterile filter 65.

As for the water sterilizer 60, the intensity of the sterilization of the water may be adjusted based on a target value (FSO (Food Safety Objective/ISO13409-1996) (=log N)) for a microbial level.

In this case, for example, an initial microbial level in the water before the water enters a filter (for example, the first sterile filter 63) is $H_0(=\log N_0)$. In this case, the initial microbial level $H_0$ of the filter decreases depending on the filtering effect (a microbial decrease level in the water: $IR_1$ (=log $(N_0/NR_1)>0$) of the filter (for example, the first sterile filter 63). The "No" means the number of the initial microbes in the water. The "$NR_1$" means the number of the microbes in the water that is filtered by the filter (for example, the first sterile filter 63).

It is thought that the number of the microbes in the water increases at a certain rate while the water passes through the filter (a microbial increase level in the water: $\Sigma I$ (=log $(N_1 \leq 0)$). The "$N_1$" means the increased number of the microbes while the water passes through the filter.

The microbes in the water decrease again depending on the sterilizing effect (the microbial decrease level in the water: $\Sigma R_2$ (=log $(N_1/NR_2)>0$)) of a sterilizer (for example, the second sterilizer 64). When the microbial level in the water after the water passes through the water sterilizer 60 is the target value (FSO (Food Safety Objective/ISO13409-1996) (=log N)) or less, it can be thought that the sterile properties of the water that is sterilized by the water sterilization line 50 have no problem. The "$NR_2$" means the number of the microbes in the water after the water is sterilized by the sterilizer (for example, the second sterilizer 64). The "N" means the target value of the number of the microbes in the water after the water is sterilized by the sterilizer (for example, the second sterilizer 64).

A relationship among $H_0$, $IR_1$, $\Sigma I$, $\Sigma R_2$, and FSO described above is expressed as an expression:

$$H_0 - \sum R_1 + \sum I - \sum R_2 \leq FSO. \qquad \text{(expression 1)}$$

For this reason, the sterilization performance of the sterilizer (for example, the second sterilizer 64) is determined such that the value of $\Sigma R_2$ is equal to or more than ($H_0-\Sigma R_1+\Sigma I$)−FSO, and the sterile properties of the water can be consequently the target value (FSO) or less.

As illustrated in FIG. 2A to FIG. 2M, sampling points SP1 to SP6 (SP) for sampling the water in a sterile manner may be provided, for example, at the entrance of the water sterilizer 60, at the first sterilizer 62, and between the foreign-material removal filter 61 and the first sterilizer 62. The sampling line SL may be connected to at least one of the sampling points SP1 to SP6 with a valve, not illustrated, interposed therebetween. This enables the number of the microbes and the number of fine particles in the water to be readily measured and enables a variation in a state in the water such as multiplying microbes to be readily checked in a manner in which the water is sampled in a sterile manner from the sampling points SP1 to SP6 or the sampling line SL. In the case where the number of the microbes in the water, for example, is measured, and/or in the case where the variation in the state such as multiplying microbes is checked, the number of the microbes, for example, may be counted by using, for example, a plate culture medium. The number of the microbes in the water and/or the variation in the state of the microbes, for example, may be measured and/or checked by using, for example, a microorganisms-measuring instrument or a fine-particle-measuring instrument (an underwater particle counter). The microorganisms-measuring instrument detects fluorescence that is emitted when a laser beam is radiated to particles, identifies non-living things or microorganisms, based on MIE scattering theory, and consequently counts the microorganisms. Examples of the microorganisms-measuring instrument include a biological-particles-measuring instrument made by RION Co., Ltd., a microorganism detection analyzer 7000RMS made by Mettler-Toledo International Inc., and a real-time microorganism detector IMD-W (registered trademark) made by Azbil Corporation. In the case where the water is sampled from the sampling line SL in a sterile manner, the sampling line SL is preferably sterilized in advance. In this case, the sampling line SL may be sterilized, for example, by using a sterilizing agent such as peracetic acid or hot water. The sampling line SL that is sterilized by using the sterilizing agent may be rinsed by using the pure water that is filtered by the first sterile filter 63 and the second sterile filter 65.

The sampling line SL may include a thermometer T. When the first sterile filter 63 and the second sterile filter 65 are sterilized by using vapor, the thermometer T may monitor the temperature of the vapor.

As illustrated in FIG. 2B and FIG. 2C, the third bypass line 95a may be disposed between the front sterilizers 62A and the first sterilizer 62. This can inhibit the sterilizing agent or the detergent from passing through the foreign-material removal filter 61 when the water sterilization line 50 is sterilized by using the sterilizing agent or the detergent. A first drainpipe 95c may be connected upstream of the foreign-material removal filter 61. Rinse water described later may be discharged from the first drainpipe 95c. The first drainpipe 95c may be connected to the third bypass line 95a.

As illustrated in FIG. 2B, the fourth bypass line 95b may be disposed between the first sterilizer 62 and the second sterilizer 64. This can inhibit the sterilizing agent or the detergent from passing through the first sterile filter 63 when the water sterilization line 50 is sterilized by using the sterilizing agent or the detergent. As illustrated in FIG. 2B and FIG. 2C, a second drainpipe 95d may be connected upstream of the first sterile filter 63. The rinse water described later, for example, may be discharged from the second drainpipe 95d. The second drainpipe 95d may be connected to the fourth bypass line 95b.

The capacity of the water sterilizer 60 is preferably equal to or more than 105% of the maximum capacity required for manufacturing the product bottles 101, more preferably equal to or more than 110% of the maximum capacity required for manufacturing the product bottles 101. For example, the capacity of the water sterilizer 60 may be 5 m³/h or more and 50 m³/h or less and may be, for example, 24 m³/h. In the case where the capacity of the water sterilizer 60 is equal to or more than 105% of the maximum capacity required for manufacturing the product bottles 101, a predetermined amount of the water can be stored in the second water tank 52 when the product bottles 101 are manufactured. In this case, the appropriate design of the volume of the second water tank 52 prevents the water from lacking even when the first sterile filter 63 described above, for example, is sterilized (SIP) or during the integrity test, enables the product bottles 101 to be manufactured, enables the first sterile filter 63, for example, to be sterilized (SIP), and enables the integrity test to be conducted. The time required for sterilizing (SIP), for example, the first sterile filter 63 and the time required for conducting the integrity test are roughly 30 minutes or more and roughly 1 hour or less. For this reason, the volume of the second water tank 52 may be equal to or more than the amount of the water that is used by the content-filling system 10 when the product bottles 101 are manufactured for 1 hour.

The capacity of the water sterilizer 60 may be controlled by the control unit 90. For example, the control unit 90 may determine the amount of the water that is used to clean and sterilize the content-filling system 10 and may determine the amount of the water that is sterilized by the water sterilizer 60 in the water sterilization line 50 while the product bottles 101 are manufactured, based on the determined amount of the water. The amount of the sterile water required to clean and/or sterilize, for example, the insides of the chambers after the product bottles 101 are manufactured can be grasped for every chamber. For this reason, the capacity of the water sterilizer 60 may be controlled by the control unit 90 such that the sterile water that is used after the product bottles 101 are manufactured is stored while one lot of the product bottles 101 are manufactured. This enables the insides of the chambers, for example, to be cleaned and/or sterilized immediately after the product bottles 101 are manufactured. For this reason, a downtime can be decreased.

The control unit 90 may cause the water to be discharged to a location outside the water sterilization line 50 in the case where the irradiation amount or irradiance of the ultraviolet rays is a predetermined value or less. The predetermined value is a reference value (a threshold) for determine whether the water is discharged to the location outside the water sterilization line 50. The predetermined value can be freely determined depending on, for example, the volume of the body 66 or the flow rate of the water. For example, the predetermined value may be equal to the irradiation amount or the irradiance that enables the level to be lower than the sterility assurance level of the water or the final product (the content). The predetermined value may be 10 mJ/cm² or more and 10000 mJ/cm² or less and may be, for example, 100 mJ/cm², for example, depending on the volume of the body 66. The irradiation amount of the ultraviolet rays that are radiated from the ultraviolet radiation unit 67 may be determined based on a RED (Reduction Equivalent UV Dose) that is calculated by an actual chemical dosimeter or a biological dosimeter. The detail can be referred in "ULTRAVIOLET DISINFECTION GUIDANCE MANUAL FOR THE FINAL LONG TERM 2 ENHANCED SURFACE WATER TREATMENT RULE, United States Environmental Protection Agency, EPA 815-R-06-007, November 2006".

In the case where the control unit 90 causes the water to be discharged to the location outside the water sterilization line 50, the control unit 90 may cause the water to be discharged to the location outside the water sterilization line 50 via the circulation line 59. In this case, the control unit 90 may change the valve V1 in the case where the value of the illuminometer 66c is a predetermined value or less when the water sterilizer 60 sterilizes the water by using the ultraviolet rays. The water may be supplied to the circulation line 59 in response to the change in the valve V1 by using the control unit 90. This enables the sterile properties at a position downstream of the valve V1 to be maintained. The water that is supplied to the circulation line 59 may not be supplied to the first water tank 51 but may be discharged from the circulation line 59. Alternatively, the water that is supplied to the circulation line 59 may be supplied to the first water tank 51. In this case, the water may circulate in the circulation system 59A until the value of the illuminometer 66c becomes a sufficient value. After the value of the illuminometer 66c becomes the sufficient value, the control unit 90 may change the valve V1, and the water in the circulation system 59A may be consequently supplied to the second water tank 52.

In the case where a difference (a differential pressure) between pressure at a position upstream of a sterile filter (the first sterile filter 63 or the second sterile filter 65) and pressure at a position downstream thereof is a predetermined value or more, the control unit 90 may cause the water to be discharged to the location outside the water sterilization line 50. That is, similarly in the case where the difference (the differential pressure) between the pressure at the position upstream of the first sterile filter 63 (or the second sterile filter 65) and the pressure at the position downstream thereof is abnormal, the control unit 90 may cause the water to be discharged to the location outside of the water sterilization line 50. Also in this case, the sterile properties, for example, at the position downstream of the valve V1 can be maintained.

In the case where at least the number of the microbes or the number of the fine particles in the water that is sampled from the water sterilization line 50 is the predetermined value or more, the control unit 90 may cause the water to be discharged to the location outside the water sterilization line 50. That is, similarly in the case where the number of the microbes and/or the number of the fine particles in the water that is sampled from the sampling line SL is abnormal, the control unit 90 may cause the water to be discharged to the location outside the water sterilization line 50. Also in this case, the sterile properties, for example, at the position downstream of the valve V1 can be maintained.

In these cases, the water sterilizer 60 is sterilized by using a sterilizing agent such as peracetic acid, hot water, or vapor after a failure in the water sterilizer 60 is removed as described later. Subsequently, the water sterilizer 60 starts sterilizing the water again.

The water sterilizer 60 in the water sterilization line 50 preferably continues to sterilize the water without stopping sterilizing the water while the product bottles 101 are manufactured in a manner in which the content is filled in the bottles 100 at the content-filling system 10. This can inhibit the microbes from multiplying in the first sterile filter 63 and the second sterile filter 65. That is, in the case where the water stops flowing in the water sterilizer 60, there is a possibility that the microbes multiply in the first sterile filter 63 and the second sterile filter 65. However, the microbes can be inhibited from multiplying in the first sterile filter 63 and the second sterile filter 65 in a manner in which the pump P1 is not stopped, and the water continues to be sterilized while the product bottles 101 are manufactured at the content-filling system 10. In the case where the second water tank 52 is completely filled with the water while the product bottles 101 are manufactured at the content-filling system 10, the sterilized water may be circulated in the circulation system 59A (see, for example, FIG. 2A). This can inhibit the water from stopping flowing in the water sterilizer 60 even in the case where the second water tank 52 is completely filled with the water. For this reason, the microbes can be inhibited from multiplying in the first sterile filter 63 and the second sterile filter 65. In some cases where the time for which the sterilized water circulates increases, the temperature of the sterilized water increases due to the radiant energy of the ultraviolet rays that are radiated from the ultraviolet radiation unit 67. In this case, the water that flows through the circulation line 59 may not be supplied to the first water tank 51 but may be discharged from the circulation line 59. The temperature of the circulating water may be inhibited from increasing in a manner in which the pure-water-manufacturing device 50a supplies new pure water to the first water tank 51. For example, in the case where the sterilized water is circulated by using the circulation system 59A, a part of the water that stays in the circulation line 59 in an amount of roughly 3% or more and 30% or less may be discharged once an hour, and the pure-water-manufacturing device 50a may supply the new pure water to the first water tank 51. This enables the water always having a constant temperature to be supplied to the second water tank 52. The ratio of the part of the water to be discharged may be appropriately changed depending on, for example, the number or amount of the radiant exposure of, for example, the first ultraviolet lamp 67a may be appropriately changed.

Figure 2N:
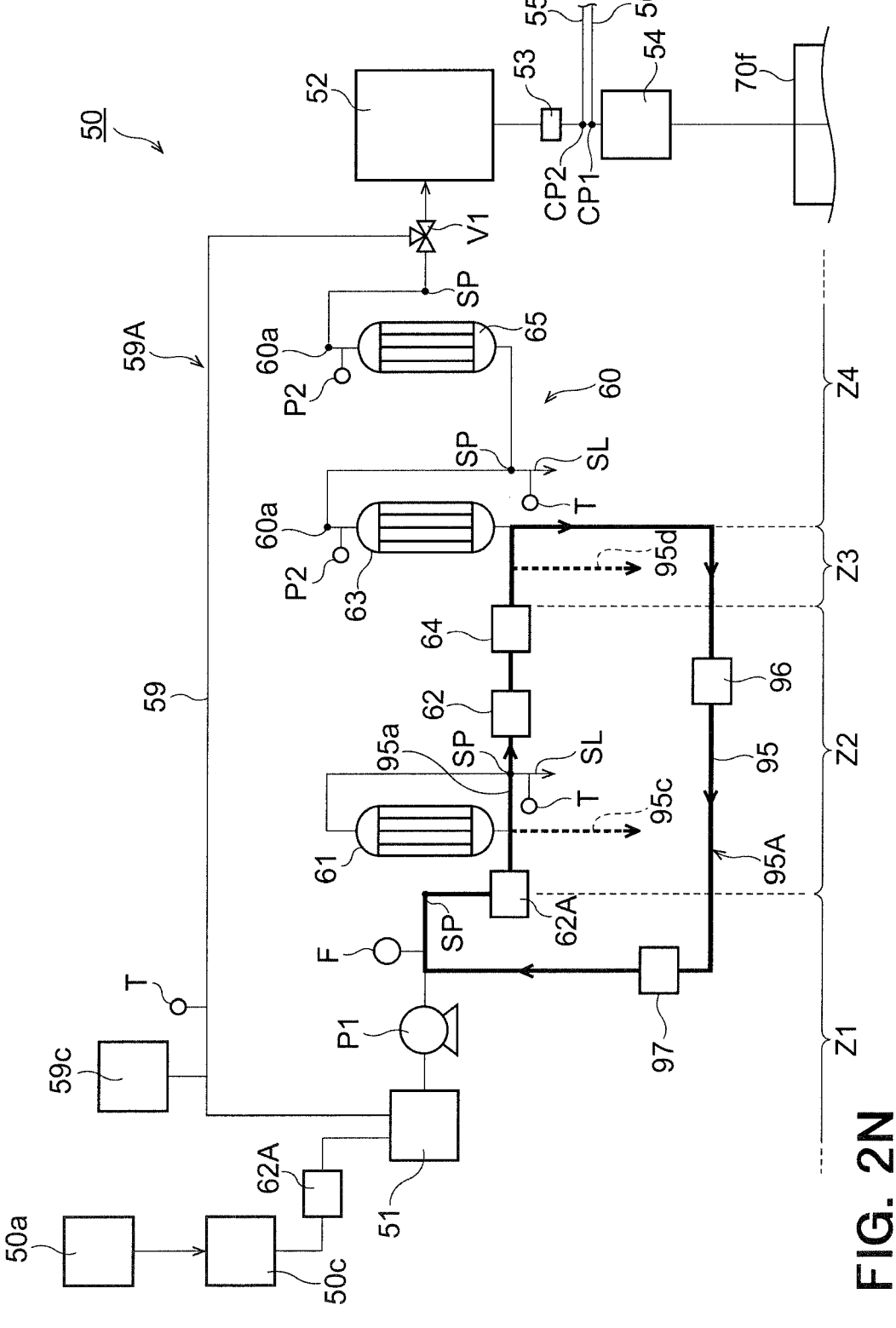
FIG. 2N schematically illustrates another example of the water sterilization line according to an embodiment.

As illustrated in FIG. 2N, the water sterilization line 50 is divided into a non-sterile zone Z1, a first gray zone Z2, a second gray zone Z3, and a sterile zone Z4. The non-sterile zone Z1, the first gray zone Z2, the second gray zone Z3, and the sterile zone Z4 are arranged in this order from an upstream position to a downstream position in the direction in which the water is conveyed.

Among these, the non-sterile zone Z1 is in a non-sterile atmosphere where the microbes can be present. In an example illustrated, the non-sterile zone Z1 corresponds to a region upstream of the front sterilizers 62A. In the non-sterile zone Z1, the first water tank 51 and a flow path at a position downstream of the first water tank 51 are sterilized before the product bottles 101 are manufactured. In the non-sterile zone Z1, the microbes enter from a position upstream of the first water tank 51 after the product bottles 101 start to be manufactured, and the first water tank 51, for example, can be contaminated by the microbes.

The first gray zone Z2 and the second gray zone Z3 isolate the non-sterile atmosphere and a sterile atmosphere. Of these, the first gray zone Z2 is a zone in which the microbes in the water are killed. The second gray zone Z3 maintains a state in which no microbes are present in the water when the product bottles 101 are manufactured. In an example illustrated, the first gray zone Z2 corresponds to a region from the front sterilizers 62A to the exit of the second sterilizer 64. The second gray zone Z3 corresponds to a region from the exit of the second sterilizer 64 to the entrance of the first sterile filter 63. The pure-water-manufacturing device 50a that supplies the water to the water sterilization line 50 is sterilized (SIP) before the water is sterilized by the water sterilization line 50. At this time, the conditions for sterilization are such that at least aquatic bacteria can be killed. The temperature of the vapor or the hot water that is used for sterilization may be at least 60° C. or more, preferably 85° C., and the time for sterilization may be 5 minutes or more, preferably 30 minutes or more. The temperature of the vapor or the hot water that is used for sterilization may be 90° C., and the time for sterilization may be 3 minutes, which are equivalent conditions to those when a sterilization titre satisfies Z value=5° C. The sterilization conditions may be high-temperature, short-time conditions in which the temperature of the vapor or the hot water that is used for sterilization is 95° C., and the time for sterilization is 0.3 minutes. As for the sterilization titre in these sterilization conditions, bacterial spores typically cannot be killed. Accordingly, the bacterial spores can be present in a region up to the front of the first sterile filter 63. For this reason, a region from the front sterilizers 62A to the front of the first sterile filter 63 is referred to as a gray zone. The water is always continuously supplied to the second gray zone Z3 after the pure-water-manufacturing device 50a is sterilized, and pressure in the second gray zone Z3 is maintained at positive pressure. Consequently, a state in which no aquatic bacteria is present is maintained in the second gray zone Z3. The positive pressure in the second gray zone Z3 is managed by a pressure gauge (not illustrated). The pure-water-manufacturing device 50a may be sterilized (SIP) by using, for example, a chemical that inactivates the aquatic bacteria instead of the vapor or the hot water.

The sterile zone Z4 is in the sterile atmosphere. That is, the sterile zone Z4 is kept sterile. In an example illustrated, the sterile zone Z4 is downstream of the first sterile filter 63. After the equipment is sterilized (SIP (the $F_0$ value is three or more, and the Z value is 10° C.)) by using the vapor or the hot water, and all of the microbes including the bacterial spores are killed, sterile air or sterile water is supplied to the sterile zone Z4. Consequently, pressure in the sterile zone Z4 is maintained at positive pressure, and the sterile zone Z4 is kept sterile. In the case where the sterile zone Z4 is sterilized (SIP), the sterile zone Z4 is preferably sterilized at least up to a boundary portion between the sterile zone Z4 and the second gray zone Z3. When the sterile zone Z4 is sterilized, a pipe in the second gray zone Z3 may be sterilized together with the sterile zone Z4.

In the first gray zone Z2 among the non-sterile zone Z1, the first gray zone Z2, the second gray zone Z3, and the sterile zone Z4, the ultraviolet rays can be radiated to the water. In the first gray zone Z2, the cumulative irradiation amount of the ultraviolet rays from the front sterilizers 62A to the water may be at least 10 mJ/cm² or more and is preferably 100 mJ/cm² or more at a wavelength of 254 nm. In this case, the front sterilizers 62A may include low-pressure mercury lamps. In the first gray zone Z2, the sum of the cumulative irradiation amounts of the ultraviolet rays from the first sterilizer 62 and the second sterilizer 64 to the water may be 100 mJ/cm² or more at a wavelength of 254 nm. When the sum of the cumulative irradiation amounts of the ultraviolet rays from the first sterilizer 62 and the second sterilizer 64 to the water is thus 100 mJ/cm² or more, the aquatic bacteria can be killed in the first gray zone Z2. For this reason, the sterile properties of the water in the second gray zone Z3 can be assured. In this case, the first sterilizer 62 and the second sterilizer 64 may include respective intermediate-pressure mercury lamps.

In the case where the sum of the cumulative irradiation amounts of the ultraviolet rays from the first sterilizer 62 and the second sterilizer 64 to the water in the first gray zone Z2 is less than 100 mJ/cm² at a wavelength of 254 nm, the water may be circulated by the circulation line 95 before being supplied to the first sterile filter 63. This can prevent the water in which the aquatic bacteria can be present from being supplied to the first sterile filter 63. For this reason, the sterile properties of the water in the sterile zone Z4 can be assured. In this case, the front sterilizers 62A, the foreign-material removal filter 61, the first sterilizer 62, and the second sterilizer 64 may be sterilized (SIP) before the water is supplied to the sterile zone Z4 (the first sterile filter 63).

At least the first sterile filter 63 or the second sterile filter 65 preferably passes the integrity tests (a first integrity test and a second integrity test) before and after manufacturing described later. This enables at least the first sterile filter 63 or the second sterile filter 65 to filter and sterilize the microbes other than the aquatic bacteria. For this reason, the sterile properties of the water in the sterile zone Z4 can be assured. In the case where the first sterile filter 63 and the second sterile filter 65 fail to pass the integrity tests before and after manufacturing, a sterile grade filter having a mesh size of 0.1 μm or more and 0.22 μm or less, for example, may be used as the foreign-material removal filter 61. In this case, the foreign-material removal filter 61 preferably passes the integrity tests before and after manufacturing. This enables the foreign-material removal filter 61 to filter and sterilize the microbes other than the aquatic bacteria and enables the sterile properties of the water in the sterile zone Z4 to be assured.

As for the water sterilizer 60 in the water sterilization line 50 according to the present embodiment, the sterile properties of the water are thus guaranteed when the irradiation amount of the ultraviolet rays is a predetermined value or more or is in a predetermined range during manufacturing, and the integrity tests before and after manufacturing are passed.

The undiluted-solution sterilization line 70 will now be described. The undiluted-solution sterilization line 70 heats and sterilizes the product undiluted solution.

Figure 7:
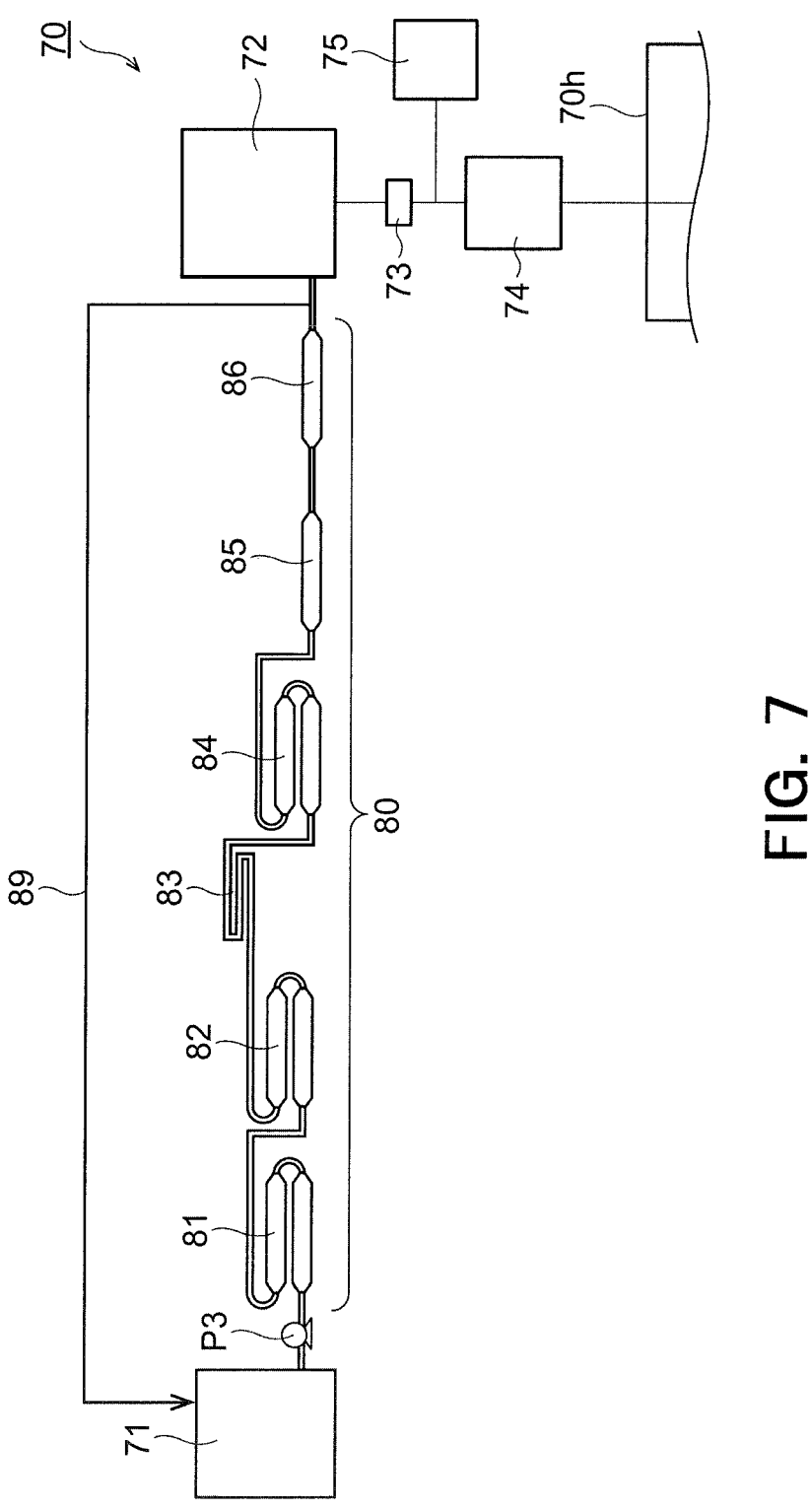
FIG. 7 schematically illustrates an undiluted-solution sterilization line according to an embodiment.

As illustrated in FIG. 7, the undiluted-solution sterilization line 70 includes a first undiluted-solution tank 71, a product-undiluted-solution sterilizer 80, and a second undiluted-solution tank 72. The first undiluted-solution tank 71, the product-undiluted-solution sterilizer 80, and the second undiluted-solution tank 72 are arranged in this order from an upstream position to a downstream position in a direction in which the product undiluted solution is conveyed. A circulation line (a third circulation line) 89 may be connected to the undiluted-solution sterilization line 70 between a third cooling portion 86 described later and the second undiluted-solution tank 72. The product undiluted solution that passes through the third cooling portion 86 may be returned to the first undiluted-solution tank 71 via the circulation line 89.

The first undiluted-solution tank 71 stores the product undiluted solution that is supplied from a supply source not illustrated. The first undiluted-solution tank 71 has a function of storing the product undiluted solution and consequently causing the product undiluted solution to smoothly flow. The volume of the first undiluted-solution tank 71 may be 0.3 m³ or more and 3 m³ or less and may be, for example, 1 m³.

A pump P3 that conveys the product undiluted solution may be disposed downstream of the first undiluted-solution tank 71. The product-undiluted-solution sterilizer 80 described above is disposed downstream of the pump P3.

The product-undiluted-solution sterilizer 80 heats and sterilizes the product undiluted solution that is stored in the first undiluted-solution tank 71. According to the present embodiment, the product-undiluted-solution sterilizer 80 may be a sterilizer (Ultra High-temperature, which is simply referred to below as UHT) that sterilizes the product undiluted solution by using an ultra-high-temperature heat treatment method. The UHT 80 includes a first heating portion

81, a second heating portion 82, a holding tube 83, a first cooling portion 84, a second cooling portion 85, and the third cooling portion 86. The product undiluted solution that is supplied to the UHT 80 is gradually heated by the first heating portion 81 and the second heating portion 82 and is heated to a target temperature in the holding tube 83. In this case, for example, the product undiluted solution may be heated to a temperature of 60° C. or more and 80° C. or less by using the first heating portion 81 and may be heated to a temperature of 80° C. or more and 150° C. or less by using the second heating portion 82. The temperature of the product undiluted solution is maintained in the holding tube 83 for a predetermined time. The product undiluted solution that passes through the holding tube 83 is gradually cooled by the first cooling portion 84, the second cooling portion 85, and the third cooling portion 86. The number of the heating portions and the cooling portions are increased or decreased as needed. The pressure loss of the product undiluted solution can increase between the first heating portion 81 and the second heating portion 82. For this reason, an additional pump (not illustrated) may be disposed between the first heating portion 81 and the second heating portion 82. A homogenizer that makes the quality of the product undiluted solution uniform may be disposed, for example, between the first heating portion 81 and the second heating portion 82 or between the first cooling portion 84 and the second cooling portion 85.

The capacity of the UHT 80 may be 3 m³/h or more and 30 m³/h or less and may be, for example, 6 m³/h.

The temperature of a location on the UHT 80 at which the temperature is highest (for example, the second heating portion 82) may be monitored, and scale (such as a calcium deposit) adhering to the UHT 80 may be consequently monitored. When the UHT 80 is cleaned (CIP), the state of removal of the scale may be monitored. This enables a process of cleaning the UHT 80 to be optimized. For this reason, the time for cleaning can be decreased, and the amount of the water, the vapor, and the detergent that are used for cleaning can be decreased. As a result, the amount of carbon dioxide that is discharged by the content-filling system 10 can be decreased.

The UHT 80 may use an injection or infusion method. A heat exchanger that is used to exchange heat at the content-filling system 10 such as a heat exchanger in the UHT 80 may be a plate heat exchanger, a shell and tube heat exchanger, or a scraped surface heat exchanger.

The second undiluted-solution tank 72 is a tank (a so-called aseptic tank) that stores the product undiluted solution that is sterilized by the product-undiluted-solution sterilizer 80. The second undiluted-solution tank 72 has a function of storing the sterilized product undiluted solution and consequently causing the product undiluted solution to smoothly flow. The volume of the second undiluted-solution tank 72 may be 1 m³ or more and 20 m³ or less and may be, for example, 2 m³.

An auxiliary filter 73 that filters the sterilized product undiluted solution and a third undiluted-solution tank 74 that stores the product undiluted solution that passes through the auxiliary filter 73 may be disposed downstream of the second undiluted-solution tank 72. In this case, the third undiluted-solution tank 74 may be a so-called filling tank and may be installed above the undiluted-solution-filling device 22 in the vertical direction in order to improve the filling accuracy of the undiluted-solution-filling device 22. The third undiluted-solution tank 74 may have a function of ensuring the smooth flow of the product undiluted solution even in the case where the amount of the product undiluted solution that is used at a position downstream of the third undiluted-solution tank 74 changes, that is, may function as a so-called cushion tank. The volume of the third undiluted-solution tank 74 may be 0.1 m³ or more and 1 m³ or less and may be, for example, 0.3 m³. The auxiliary filters 73 may be disposed at ends of or inside all of the undiluted-solution-filling nozzles (see, for example, FIG. 16C described later) of the undiluted-solution-filling device 22.

An addition unit 75 that adds a solid into the product undiluted solution may be coupled downstream of the second undiluted-solution tank 72. This enables the content that contains the solid to be filled in the bottles 100 at the content-filling system 10. In this case, examples of the solid that is added into the product undiluted solution by using the addition unit 75 may include a pulp, nata de coco, tapioca or aloe. The solid may be a sterile solid that is sterilized in advance.

(Method of Filling Content)

A method of filling the content by using the content-filling system 10 (FIG. 1) described above will now be described with reference to FIG. 8.

Figure 8:
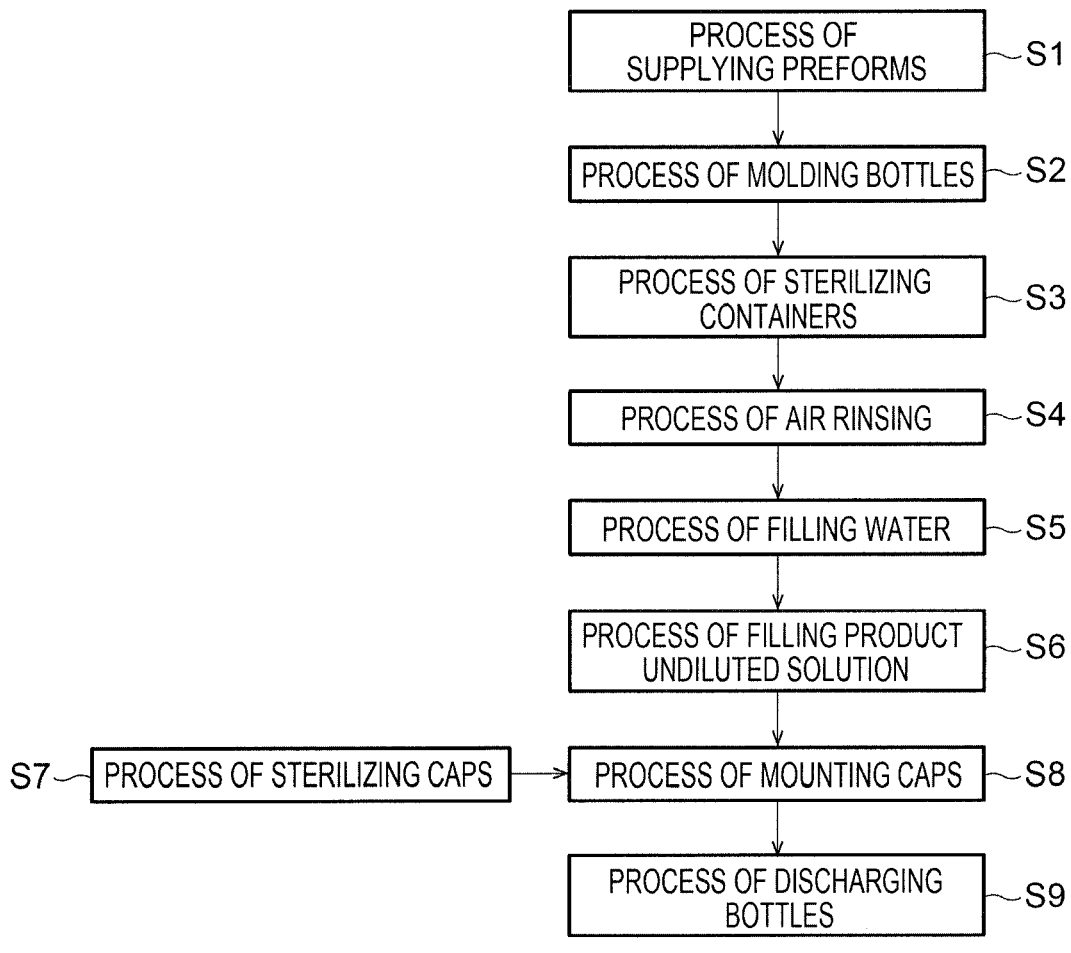
FIG. 8 is a flowchart illustrating a method of filling a content by using the content-filling system according to an embodiment.

First, the preform-supplying device 1 sequentially supplies the multiple preforms 100a to the receiving portion 34 of the preform-conveying unit 31 via the preform-supplying conveyor 2 (a process of supplying the preforms, a symbol S1 in FIG. 8). At this time, at the preform-sterilizing device 34a, gas or mist of hydrogen peroxide is blown to the preforms 100a, and the preforms 100a are consequently sterilized and are subsequently dried by using hot air.

Subsequently, the preforms 100a are conveyed to the heating portion 35 and are heated by the heater 35a roughly to a temperature of, for example, 90° C. or more and 130° C. or less. Subsequently, the preforms 100a that are heated by the heating portion 35 are conveyed to the delivering portion 36. The preforms 100a are conveyed from the delivering portion 36 to the blow molding unit 32.

Subsequently, blow molding is performed on the preforms 100a that are conveyed to the blow molding unit 32 by using the mold not illustrated, and the bottles 100 are blow-molded (a process of molding the bottles, a symbol S2 in FIG. 8). The bottles 100 that are blow-molded are conveyed to the bottle-conveying unit 33.

Subsequently, at the sterilizing device 11, the bottles 100 are sterilized by using the hydrogen peroxide solution that serves as a sterilizing agent (a process of sterilizing the containers, a symbol S3 in FIG. 8). At this time, the sterilizing agent may be gas or mist that is obtained by evaporating the hydrogen peroxide solution once at a boiling point or more. The gas or mist of the hydrogen peroxide solution adheres to the inner surface and outer surface of the bottles 100 and sterilizes the inner and outer surfaces of the bottles 100.

Subsequently, the bottles 100 are conveyed to the air-rinsing device 14. At the air-rinsing device 14, the room temperature air or the heated air that is sterile is supplied to the bottles 100. Consequently, hydrogen peroxide is activated, and foreign material and the hydrogen peroxide, for example, are removed from the bottles 100 (a process of air rinsing, a symbol S4 in FIG. 8). In the process of air rinsing, condensation mist of the hydrogen peroxide having a low concentration may be mixed with the room temperature air that is sterilized or the heated air that is sterile as needed. In this case, the hydrogen peroxide is gasified by the sterile air. In the process of air rinsing, the gasified hydrogen peroxide may be supplied to the bottles 100.

Subsequently, the bottles 100 are conveyed to the filling device 20. At this time, at the water-filling device 21 of the filling device 20, the water is first filled in the bottles 100 (a process of filling the water, a symbol S5 in FIG. 8). At the water-filling device 21, while the bottles 100 are rotated (revolved), the water is filled in the bottles 100 via the mouths thereof. The water is sterilized at the water sterilization line 50 in advance before being filled in the bottles 100 by using the water-filling device 21.

At the water-filling device 21, the sterilized water is filled at room temperature in the bottles 100 that are sterilized. The temperature of the water when the water is filled is, for example, roughly 3° C. or more and 40° C. or less. The filling rate at which the water-filling device 21 fills the water in the bottles 100 may be higher than the filling rate at which the undiluted-solution-filling device 22 fills the product undiluted solution in the bottles 100. At the water-filling device 21, the filling rate at which the water is filled may be 100 mL/sec or more and 500 mL/sec or less.

Subsequently, at the undiluted-solution-filling device 22 of the filling device 20, the product undiluted solution is filled in the bottles 100 in which the water is filled (a process of filling the product undiluted solution, a symbol S6 in FIG. 8). At the undiluted-solution-filling device 22, while the bottles 100 are rotated (revolved), the product undiluted solution is filled in the bottles 100 via the mouths thereof. The product undiluted solution is heated and sterilized in advance at the undiluted-solution sterilization line 70 before being filled in the bottles 100 by using the undiluted-solution-filling device 22. In the case where the acidity of the content is less than a pH of 4.5, a heating temperature at which the product undiluted solution is heated may typically be roughly 60° C. or more and 120° C. or less, and the heating time may be roughly 30 seconds or more and 120 seconds or less. In the case where the acidity of the content is a pH of 4.5 or more, the heating temperature at which product undiluted solution is heated may be roughly 115° C. or more and 150° C. or less. The heating time may be roughly 30 seconds or more and 120 seconds or less. Consequently, all of microorganisms that can grow in the product bottles 101 among microorganisms in the product undiluted solution before the product undiluted solution is filled are killed. The product undiluted solution that is heated and sterilized is cooled roughly to a temperature of 3° C. or more and 40° C. or less.

At the undiluted-solution-filling device 22, the product undiluted solution that is sterilized as above and that is cooled to room temperature is filled at room temperature in the bottles 100 in which the water is filled. The temperature of the product undiluted solution when the product undiluted solution is filled is, for example, roughly 3° C. or more and 40° C. or less. At the undiluted-solution-filling device 22, the filling rate at which the product undiluted solution is filled may be 30 mL/sec or more and 200 mL/sec or less.

Subsequently, the bottles 100 in which the content is filled are conveyed to the cap-mounting device 16 by using the conveyance wheels 12.

The caps 88 are sterilized by the cap-sterilizing device 18 in advance (a process of sterilizing the caps, a symbol S7 in FIG. 8). Meanwhile, the caps 88 are loaded onto the cap-sterilizing device 18 from a location outside the content-filling system 10. Subsequently, at the cap-sterilizing device 18, gas or mist of hydrogen peroxide is blown to the caps 88, the inner and outer surfaces thereof are sterilized, and subsequently, the caps 88 are dried by using hot air and are conveyed to the cap-mounting device 16.

Subsequently, at the cap-mounting device 16, the caps 88 that are sterilized are mounted on the mouths of the bottles 100 that are conveyed from the filling device 20. Consequently, the bottles 100 are capped, and the product bottles 101 are obtained (a process of mounting the caps, a symbol S8 in FIG. 8).

Subsequently, the product bottles 101 are conveyed from the cap-mounting device 16 to the product-bottle-unloading unit 25 and are unloaded onto a location outside the content-filling system 10 (a process of discharging the bottles, a symbol S9 in FIG. 8). The product bottles 101 are conveyed to a packaging line not illustrated and packed.

The process of sterilizing the containers, the process of air rinsing, the process of filling the water, the process of filling the product undiluted solution, the process of mounting the caps, and the process of discharging the bottles described above are performed in a sterile atmosphere that is surrounded by the sterilizing-agent spray chamber 70*d*, the air-rinsing chamber 70*e*, the first sterile chamber 70*f*, the intermediate area chamber 70*g*, the second sterile chamber 70*h*, and the exit chamber 70*i*, that is, a sterile environment. The process of sterilizing the caps is performed by the cap-sterilizing device 18. In this case, the sterilizing-agent spray chamber 70*d*, the air-rinsing chamber 70*e*, the first sterile chamber 70*f*, the intermediate area chamber 70*g*, the second sterile chamber 70*h*, the exit chamber 70*i*, and the cap-sterilizing device 18 are sterilized in advance, for example, in a manner in which hydrogen peroxide or peracetic acid is splayed, or hot water is sprayed.

After the chambers are sterilized, sterile air having positive pressure is supplied into the sterilizing-agent spray chamber 70*d*, the air-rinsing chamber 70*e*, the first sterile chamber 70*f*, the intermediate area chamber 70*g*, the second sterile chamber 70*h*, and the exit chamber 70*i* such that the sterile air is always blown out from the sterilizing-agent spray chamber 70*d*, the air-rinsing chamber 70*e*, the first sterile chamber 70*f*, the intermediate area chamber 70*g*, the second sterile chamber 70*h*, and the exit chamber 70*i*. The sterile air having positive pressure is supplied into the cap-sterilizing device 18 such that the sterile air is always blown out from the cap-sterilizing device 18.

In the case where the sterile air having positive pressure is thus supplied into the chambers 70*d* to 70*i*, the sterile air in the chambers and the sterilizing agent that is used for sterilizing the bottles are exhausted by using the atmosphere shielding chamber 70*c*, the sterilizing-agent spray chamber 70*d*, and the exit chamber 70*i*. At this time, the pressure in the chambers may be adjusted such that the pressure in the sterilizing-agent spray chamber 70*d*, the air-rinsing chamber 70*e*, the first sterile chamber 70*f*, the intermediate area chamber 70*g*, the second sterile chamber 70*h*, and the exit chamber 70*i* is positive pressure. In this case, the pressure in the sterilizing-agent spray chamber 70*d* may be −10 Pa or more and 10 Pa or less as described above. The pressure in the air-rinsing chamber 70*e* may be 10 Pa or more and 30 Pa or less. The pressure in the first sterile chamber 70*f* may be 30 Pa or more and 60 Pa or less. The pressure in the intermediate area chamber 70*g* may be 20 Pa or more and 50 Pa or less. The pressure in the second sterile chamber 70*h* may be 10 Pa or more and 40 Pa or less. The pressure in the exit chamber 70*i* may be 10 Pa or more and 20 Pa or less.

A rate at which the bottles 100 are manufactured (conveyed) at the content-filling system 10 is preferably 100 bpm or more and 1500 bpm or less. The bpm (the bottles per minute) represents the conveyance speed of the bottles 100 per one minute.

(Method of Sterilizing Content-Filling System)

A method of sterilizing the content-filling system 10 described above (FIG. 1) will now be described. A method (simply referred to below as a method of sterilizing the chambers) of sterilizing the first sterile chamber 70f, the intermediate area chamber 70g, and the second sterile chamber 70h will be described below with reference to FIG. 9.

Method of Sterilizing Chambers

An operation button of the control unit 90, for example, is first operated after the content-filling system 10 ends filling the beverage. In response to this, the water-filling nozzles of the water-filling device 21 are covered by CIP cups (not illustrated). The water-filling nozzles of the water-filling device 21 are thus covered by the CIP cups (not illustrated), and the inside of the water-filling device 21 is consequently kept sterile. That is, the water-filling device 21 is physically protected such that no microbes enter the water-filling device 21 via the ends of the water-filling nozzles. The operation button of the control unit 90 is operated, and the gaps of the partition walls that separate the sterilizing-agent spray chamber 70d, the air-rinsing chamber 70e, the first sterile chamber 70f, the intermediate area chamber 70g, and the second sterile chamber 70h from each other are covered by the shutters (not illustrated).

Subsequently, the pressure in the first sterile chamber 70f is increased. At this time, sterile air is supplied into the first sterile chamber 70f from a sterile-air-supplying device (not illustrated), and the pressure in the first sterile chamber 70f is consequently increased. At this time, an intake amount and/or a displacement amount of each chamber is adjusted such that the pressure in the first sterile chamber 70f is predetermined pressure. At this time, the pressure in the first sterile chamber 70f is increased, for example, from 30 Pa to, for example, 40 Pa. Consequently, the air in the sterilizing-agent spray chamber 70d and the air in the intermediate area chamber 70g do not enter the first sterile chamber 70f.

In this case, the pressure in the sterilizing-agent spray chamber 70d may be 0 Pa or more and 20 Pa or less as described above. The pressure in the air-rinsing chamber 70e may be 10 Pa or more and 40 Pa or less. The pressure in the first sterile chamber 70f may be 40 Pa or more and 100 Pa or less. The pressure in the intermediate area chamber 70g may be 10 Pa or more and 40 Pa or less. The pressure in the second sterile chamber 70h may be 0 Pa or more and 20 Pa or less. The pressure in the exit chamber 70i may be 0 Pa or more and 20 Pa or less.

Figure 9:
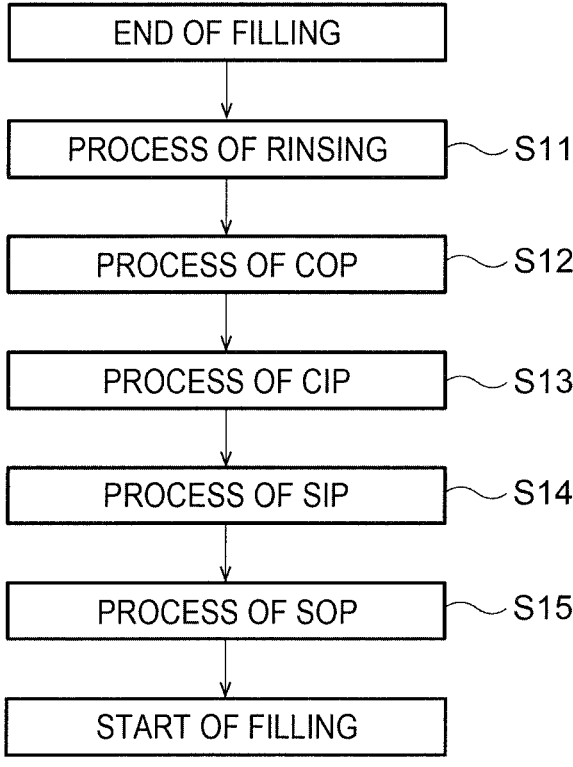
FIG. 9 is a flowchart illustrating a method of sterilizing a chamber corresponding to a method of sterilizing the content-filling system according to an embodiment.

Subsequently, sterile water is supplied into the intermediate area chamber 70g and the second sterile chamber 70h (a process of rinsing, a symbol S11 in FIG. 9). Consequently, the content adhering to the inside of the intermediate area chamber 70g and the inside of the second sterile chamber 70h is rinsed by using the sterile water. At this time, the sterile water may be the water that is sterilized by the water sterilizer 60. There is a possibility that the content enters the first sterile chamber 70f from the second sterile chamber 70h via the intermediate area chamber 70g. For this reason, the sterile water may be supplied into the first sterile chamber 70f, and the content adhering to the inside of the first sterile chamber 70f may be consequently rinsed. If the caps 88 or the bottles 100, for example, fall into the second sterile chamber 70h, the caps 88 or the bottles 100 are collected. The conveyance wheel 12 that is disposed downstream of the cap-mounting device 16 may be replaced with a different type of the conveyance wheel 12 so as to be suitable for, for example, the shapes of the bottles 100 to be subsequently used. At the cap-mounting device 16, a chuck (not illustrated) of a capper head may be replaced so as to be suitable for, for example, the sizes of the caps 88 to be subsequently used.

Subsequently, the inside of the second sterile chamber 70h is cleaned with the inside of the first sterile chamber 70f kept sterile. At this time, the inside of the intermediate area chamber 70g and the inside of the second sterile chamber 70h are first cleaned (COP) (a process of COP, a symbol 512 in FIG. 9). At this time, detergent such as an alkali chemical and water, for example, are sprayed into the intermediate area chamber 70g and the second sterile chamber 70h via spraying nozzles (not illustrated) that are disposed in the intermediate area chamber 70g and the second sterile chamber 70h. Consequently, an inner wall surface of, for example, the intermediate area chamber 70g and the surface of equipment of, for example, the filling device 20 are cleaned. At this time, the water may be the sterile water that is sterilized by the water sterilizer 60.

When the inside of the second sterile chamber 70h is cleaned (COP), of the first bypass line 55 and the second bypass line 56, at least the second bypass line 56 is preferably cleaned (CIP) and is sterilized (SIP) in advance. In the case where the second bypass line 56 is cleaned (CIP) or sterilized (SIP), detergent or a sterilizing agent may be supplied to the second bypass line 56 from a connection point CP1 (see, for example, FIG. 1 and FIG. 2A) at which the second bypass line 56 is connected to the water sterilization line 50. Examples of the detergent and the sterilizing agent may include peracetic acid, hydrogen peroxide, an alkali chemical, an acid chemical, and sodium hypochlorite. Subsequently, the sterile water may be supplied from the second water tank 52 that stores the sterile water in advance to the second bypass line 56, and the second bypass line 56 may be consequently rinsed by using the sterile water. In the case where the first bypass line 55 is cleaned (CIP) or sterilized (SIP), the detergent or the sterilizing agent may be supplied to the first bypass line 55 from a connection point CP2 (see, for example, FIG. 1 and FIG. 2A) at which the first bypass line 55 is connected to the water sterilization line 50.

Subsequently, the undiluted-solution-filling device 22 is cleaned (CIP) (a process of CIP, a symbol S13 in FIG. 9) with the inside of the first sterile chamber 70f kept sterile. At this time, the undiluted-solution-filling nozzles of the undiluted-solution-filling device 22 are first covered by CIP cups (not illustrated). Subsequently, the flow path for the content in the undiluted-solution-filling device 22 is rinsed by water, and detergent obtained by adding an alkali chemical such as caustic soda or an acid chemical such as nitric acid into the water, for example, is supplied to the flow path. Consequently, a residue of the previous beverage adhering to the flow path for the content in the undiluted-solution-filling device 22, for example, is removed. At this time, the water may be the sterile water that is sterilized by the water sterilizer 60.

Subsequently, the inside of the second sterile chamber 70h is sterilized with the inside of the first sterile chamber 70f kept sterile. At this time, the undiluted-solution-filling device 22 is first sterilized (SIP) (a process of SIP, a symbol S14 in FIG. 9). At this time, heated vapor or hot water is supplied to the flow path for the content in the undiluted-solution-filling device 22. Consequently, the flow path for the content in the undiluted-solution-filling device 22 is sterilized. At this time, the water may be the sterile water that is sterilized by the water sterilizer 60.

Subsequently, the inside of the intermediate area chamber 70g and the inside of the second sterile chamber 70h are sterilized (SOP) (a process of SOP, a symbol S15 in FIG. 9). At this time, a sterilizing agent such as peracetic acid or a hydrogen peroxide solution is sprayed to the inside of the intermediate area chamber 70g and the inside of the second sterile chamber 70h from the spraying nozzles (not illustrated) that are disposed in the intermediate area chamber 70g and in the second sterile chamber 70h. Subsequently, sterile water is sprayed to the inside of the intermediate area chamber 70g and the inside of the second sterile chamber 70h from the spraying nozzles (not illustrated). Consequently, the inner wall surface of, for example, the intermediate area chamber 70g and the surface of the equipment of, for example, the filling device 20 are sterilized. At this time, the sterile water may be the sterile water that is sterilized by the water sterilizer 60. This enables the amount of carbon dioxide that is discharged by the content-filling system 10 to be decreased. Before and after or simultaneously while the inside of the second sterile chamber 70h is sterilized by using the sterilizing agent, at least the inside of the first sterile chamber 70f and the insides of the air-rinsing chamber 70e and the sterilizing-agent spray chamber 70d may also be cleaned by using peracetic acid detergent and may be rinsed by using the sterile water that is sterilized by the water sterilizer 60. This enables the sterile properties that are stable to be maintained for a long time and enables the level of the sterile properties to be increased.

The inside of the first sterile chamber 70f may be sterilized again over the entire area while the inside of the second sterile chamber 70h is sterilized. At this time, the inside of the first sterile chamber 70f may be sterilized again over the entire area, for example, in a manner in which a sterilizing agent such as a hydrogen peroxide solution is sprayed to the inside of the first sterile chamber 70f, and subsequently, the inside of the first sterile chamber 70f is dried by using hot air.

In this way, the content-filling system 10 is sterilized.

Subsequently, the CIP cups (not illustrated) by which the water-filling nozzles of the water-filling device 21 are covered are removed. The sterile water that is held in the water-filling nozzles of the water-filling device 21 is discharged into the first sterile chamber 70f. This can prevent the sterilizing agent from being filled in the bottles 100 even though the sterilizing agent, for example, enters the water-filling nozzles from locations outside the CIP cups. In addition, in the case where the inside of the first sterile chamber 70f is sterilized again as described above and even in the case where the sterilizing agent is not completely removed from the CIP cups by which the water-filling nozzles are covered, and the sterilizing agent adheres to the CIP cups, the sterilizing agent, for example, can be prevented from being filled in the bottles 100. The amount of the water that is discharged into the first sterile chamber 70f is preferably equal to or more than that for the single bottle 100 that is used for next manufacturing. Subsequently, the gaps that are covered by the shutters are uncovered, and the next content starts to be filled.

A method of sterilizing the water sterilizer 60 will now be described with reference to FIG. 10A to FIG. 10E.

Method of Sterilizing Water Sterilizer

The operation button of the control unit 90, for example, is first operated after the content-filling system 10 ends filling the beverage. In response to this, the water sterilizer 60 starts to be sterilized (SIP). The water sterilizer 60 may be sterilized while the product bottles 101 are manufactured. In this case, even in the case where the water sterilizer 60 stops sterilizing the water, the use of the sterile water that is stored in the second water tank 52 enables the product bottles 101 to be manufactured.

Figure 10A:
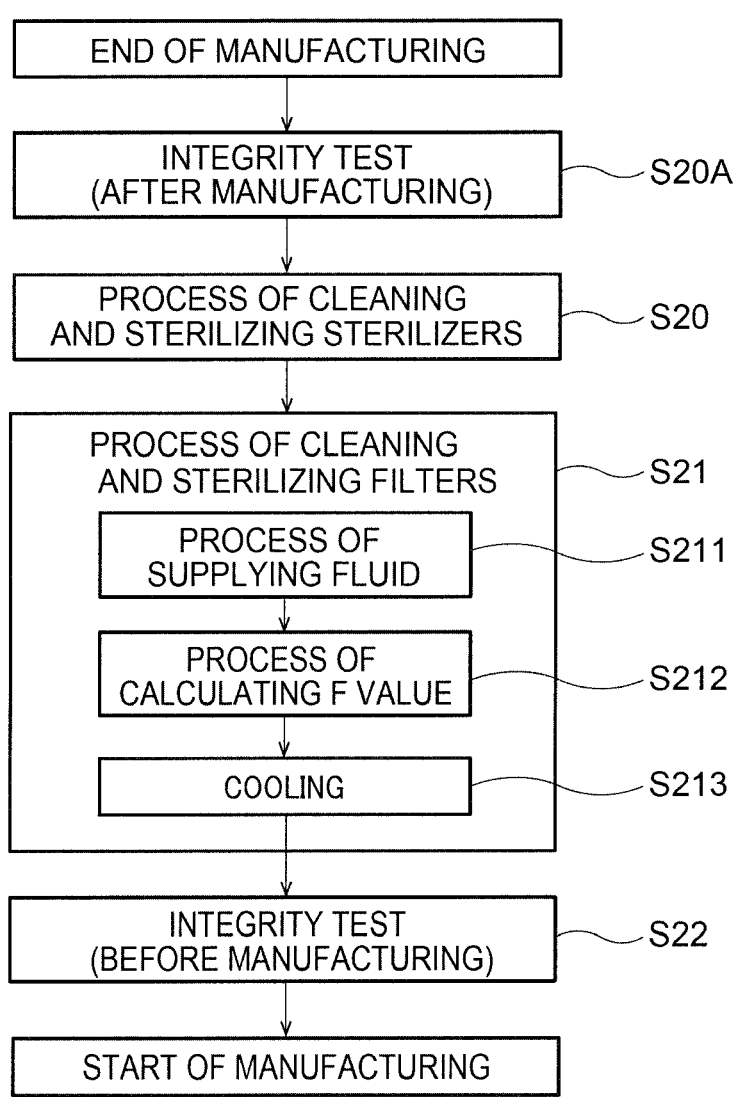
FIG. 10A is a flowchart illustrating a method of sterilizing the water sterilizer corresponding to the method of sterilizing the content-filling system according to an embodiment.

When the water sterilizer 60 is sterilized, the content-filling system 10 first ends filling (manufacturing) the content (the end of manufacturing in FIG. 10A).

Subsequently, the integrity test (the first integrity test) after manufacturing is conducted for at least one of sterile filters (the first sterile filter 63 and the second sterile filter 65) of the water sterilizer 60 (a symbol S20A in FIG. 10A). That is, the integrity test after manufacturing is conducted for at least the first sterile filter 63 or the second sterile filter 65 of the water sterilizer 60. In the case where the foreign-material removal filter 61 is a sterile filter, the integrity test of at least one or more filters of the three filters is conducted. The sterile properties of the water are guaranteed when the integrity tests after and before manufacturing are passed (there is no leak), and the irradiation amount of the ultra-violet rays is the predetermined value or more or is in the predetermined range during manufacturing.

Subsequently, one or more sterilizers (the first sterilizer 62 and/or the second sterilizer 64 (also simply referred to below as the first sterilizer 62, for example,)) is cleaned and/or sterilized (a process of cleaning and sterilizing the sterilizers, a symbol S20 in FIG. 10A). At this time, the first sterilizer 62, for example, is cleaned (a process of CIP). The process of CIP is performed in a manner in which an acid cleaning solution obtained by adding a nitric acid or phosphoric acid chemical into water is caused to flow on the flow path after an alkali cleaning solution is caused to flow on the flow path, or before the alkali cleaning solution is caused to flow on the flow path. The alkali cleaning solution is obtained by adding an alkali chemical that contains, for example, caustic soda (sodium hydroxide), potassium hydroxide, sodium carbonate, sodium silicate, sodium phosphate, sodium hypochlorite, a surfactant and a chelating agent into water. A process of alkali cleaning by using the alkali cleaning solution and a process of acid cleaning by using the acid cleaning solution may be freely combined and performed. Consequently, a residue adhering to the flow path on which the water passes, for example, is removed. The process of CIP by using warm water or hot water suffices without detergent. The content does not adhere to the water sterilization line 50. As for, for example, the first sterilizer 62 of the water sterilization line 50, the ultraviolet rays are radiated from, for example, the first ultraviolet lamp 67a when the product bottles 101 are manufactured. This reduces a possibility that the water sterilization line 50 is contaminated by the microbes. For this reason, the process of CIP for the water sterilization line 50 may be omitted.

Subsequently, the first sterilizer 62, for example, is sterilized (the process of SIP). In the process of SIP, vapor or hot water is first supplied to the water sterilizer 60 (a process of supplying the hot water, a symbol S201a in FIG. 10I). In this case, the vapor or the hot water is supplied to, for example, the circulation system 59A that includes the water sterilizer 60. Consequently, the first ultraviolet lamp 67a, the second ultraviolet lamps 67b, and the third ultraviolet lamps 67c (also simply referred to below as the first ultraviolet lamp 67a, for example,) of, for example, the first sterilizer 62 are heated and sterilized by using the vapor or the hot water. The inside of the pipe of the first sterilizer 62 and the inside of the pipe of the second sterilizer 64 are heated and sterilized over the entire area by using the vapor or the hot water. When the first sterilizer 62 and the second sterilizer 64 are sterilized, the foreign-material removal filter 61, the first sterile filter 63, and the second sterile filter 65 may be simultaneously sterilized. The temperature, concentration, and/or time of the detergent that is used for the process of CIP described above may be adjusted to inactivate the microbes (the process of SIP) simultaneously, and the process of SIP may not be subsequently performed (a process of CSIP). After the process of CIP and the process of SIP end, or the process of CSIP ends, the detergent is discharged from the circulation system 59A. Subsequently, the process of rinsing is performed to completely remove the detergent.

As for the rinse water, the pure water is supplied from the pure-water tank 50c. In the process of rinsing, the first ultraviolet lamp 67a, for example, is preferably lighted, and it is preferably checked that the irradiation amount or irradiance of the ultraviolet rays is the predetermined value or more.

In the case where the first sterilizer 62, for example, is vulnerable to heat, the first sterilizer 62, for example, may be sterilized by using a sterilizing agent (a chemical) or detergent (a chemical). At this time, the sterilizing agent is first supplied to the water sterilizer 60 (a process of supplying the sterilizing agent, a symbol S201b in FIG. 10B2). In this case, the sterilizing agent is supplied to, for example, the circulation system 59A that includes the water sterilizer 60. The sterilizing agent or the detergent may be supplied from the sterilizing-agent-supplying unit 96 (see FIG. 2B and FIG. 2C) to, for example, the front sterilizers 62A, the first sterilizer 62, and the second sterilizer 64 that are disposed at the water sterilization line 50. At this time, the sterilizing agent or the detergent is preferably prevented from passing through the foreign-material removal filter 61 and the first sterile filter 63. That is, the sterilizing agent or the detergent is preferably circulated in the circulation system 95A. Specifically, as illustrated, for example, by using thick lines in FIG. 2B and FIG. 2C, the sterilizing agent or the detergent preferably passes through the third bypass line 95a that is disposed between the front sterilizers 62A and the first sterilizer 62. As illustrated by using the thick line in FIG. 2B, the sterilizing agent or the detergent preferably passes through the fourth bypass line 95b that is disposed between the first sterilizer 62 and the second sterilizer 64. This can inhibit the sterilizing agent or the detergent from passing through the foreign-material removal filter 61 and the first sterile filter 63 when the water sterilization line 50 is sterilized by using the sterilizing agent or the detergent. The sterilizing agent or the detergent may be supplied from the sampling points SP2 to SP4.

The sterilizing agent may contain peracetic acid. In the case where the sterilizing agent contains peracetic acid, the concentration of the sterilizing agent may be 1000 ppm or more and 3000 ppm or less. When the concentration of the sterilizing agent is 1000 ppm or more, the sterilizing effect of the sterilizing agent on, for example, the first sterilizer 62 can be improved. When the concentration of the sterilizing agent is 3000 ppm or less, the amount of the peracetic acid that is used can be decreased, and costs when the water sterilizer 60 is sterilized can be reduced.

The temperature of the hot water, the sterilizing agent, or the detergent that is supplied to the circulation system 59A may be 50° C. or more and 150° C. or less. When the temperature of the hot water, the sterilizing agent, or the detergent is 50° C. or more, the sterilizing effect and the cleaning effect of the sterilizing agent on, for example, the first sterilizer 62 can be improved. When the temperature of the hot water, the sterilizing agent or the detergent is 150° C. or less, the first sterilizer 62, for example, can be manufactured at low costs without using a special material having heat resistance.

Subsequently, in the circulation system 95A that includes one or more sterilizers (the first sterilizer 62 and/or the second sterilizer 64), the hot water, the sterilizing agent, or the detergent is circulated (a process of circulating the hot water, a symbol S202a in FIG. 10B1, a process of circulating the sterilizing agent, a symbol S202b in FIG. 10B2). For example, in the circulation system 95A that includes the front sterilizer 62A, the first sterilizer 62, and the second sterilizer 64 that are included in the water sterilization line 50, the hot water, the sterilizing agent, or the detergent is circulated. In this case, the sterilizing agent, for example, may be circulated through the circulation system 95A that includes the front sterilizer 62A, the first sterilizer 62, and the second sterilizer 64 at least for 10 seconds or more and 60 minutes or less, and the front sterilizers 62A, the first sterilizer 62, and the second sterilizer 64 may be consequently sterilized. When the time for circulation is 10 seconds or more, the sterilizing effect of, for example, the sterilizing agent on, for example, the first sterilizer 62 can be improved. When the time for circulation is 60 minutes or less, the time for sterilizing, for example, the first sterilizer 62 can be decreased. For this reason, the downtime can be decreased. In the process of circulating the sterilizing agent, the hot water, the sterilizing agent, or the detergent may be circulated in the circulation system 59A instead of the circulation system 95A.

The hot water, the sterilizing agent, or the detergent may be circulated with the first ultraviolet lamp 67a, for example, being lighted. In the case where the first ultraviolet lamp 67a, for example, does not have heat resistance, the first ultraviolet lamp 67a, for example, is preferably cooled to a temperature at which the first ultraviolet lamp 67a, for example, can light while the hot water, the sterilizing agent, or the detergent is circulated. At this time, the heat exchanger 97 that is included in the circulation system 95A preferably exchanges heat between the first ultraviolet lamp 67a, for example, and the sterilizing agent or the detergent.

Subsequently, the sterilizing agent, for example, is discharged from any one of the sampling points SP2 to SP5 (a process of discharging the hot water, a symbol S203a in FIG. 10B1, a process of discharging the sterilizing agent, a symbol S203b in FIG. 10B2), and the circulation system 95A is subsequently cooled or rinsed (a process of cooling, a symbol S204a in FIG. 10B1, a process of rinsing, a symbol S204b in FIG. 10B2). That is, in the case where the hot water is supplied to the circulation system 59A that includes the water sterilizer 60 (the process of supplying the hot water described above, the symbol S201a in FIG. 10B1), the circulation system 59A is cooled (the process of cooling, the symbol S204a in FIG. 10B1). In the case where the sterilizing agent, for example, is supplied to the circulation system 59A that includes the water sterilizer 60 (the process of supplying the sterilizing agent described above, the symbol S201b in FIG. 10B2), the circulation system 95A is rinsed (the process of rinsing, the symbol S204b in FIG. 10B2). When the sterilizing agent, for example, is discharged, the sterilizing agent may be discharged in a short time with sterile air supplied to a pipe in order to prevent contamination by the microbes in the pipe that is sterilized. The process of rinsing may be performed without performing the process of discharging the sterilizing agent.

In the process of rinsing, the front sterilizers 62A is first rinsed sufficiently by using the rinse water such that the sterilizing agent does not adhere to the foreign-material removal filter 61. At this time, the rinse water may be discharged from the first drainpipe 95c that is disposed upstream of the foreign-material removal filter 61. At this time, the water is preferably discharged from the first drainpipe 95c with a pipe that supplies the water to the foreign-material removal filter 61 having positive pressure. In this case, it is preferably checked that the pressure in the pipe is positive pressure while the water is discharged from the first drainpipe 95c. Subsequently, the rinse water is caused to pass through the foreign-material removal filter 61.

Subsequently, the sterilizing agent that remains in the first sterilizer 62 is sufficiently rinsed by using the rinse water. At this time, the rinse water may be discharged from the second drainpipe 95*d* that is disposed upstream of the first sterile filter 63. Also at this time, the water is preferably discharged from the second drainpipe 95*d* with a pipe that supplies the water to the first sterile filter 63 having positive pressure. In this case, it is preferably checked that the pressure in the pipe is positive pressure while the water is discharged from the second drainpipe 95*d*. Subsequently, the rinse water is caused to pass through the first sterile filter 63. Subsequently, the same operation is performed in turn in a downstream direction. The first drainpipe 95*c*, for example, may be sterilized by using vapor or hot water before the water is discharged from the first drainpipe 95*c* or the second drainpipe 95*d*.

Subsequently, the sterile filters (the first sterile filter 63 and the second sterile filter 65 (also simply referred to below as the first sterile filter 63, for example,)) are sterilized (a process of cleaning and sterilizing the filters, a symbol S21 in FIG. 10A). At this time, heated vapor (fluid) or hot water (fluid) is supplied to the flow path in, for example, the first sterile filter 63 (a process of supplying the fluid, a symbol S211 in FIG. 10A). At this time, the vapor for sterilization is supplied to, for example, the first sterile filter 63 from, for example, the sterile-air inlet 60*a*.

Subsequently, the temperature of the heated vapor or the hot water that is supplied to the flow path in, for example, the first sterile filter 63 is measured, and the F value is calculated based on the measured temperature (a process of calculating the F value, a symbol S212 in FIG. 10A).

Subsequently, in the case where the F value is the desired value or more, sterilizing the first sterile filter 63, for example, ends. In this way, the first sterile filter 63, for example, is sterilized. The first sterile filter 63, for example, is thus heated and sterilized by using the F value, and the first sterile filter 63, for example, can be consequently sterilized without excessively heating, for example, the first sterile filter 63. For this reason, the amount of carbon dioxide that is discharged by the content-filling system 10 can be decreased. Since the first sterile filter 63, for example, can be sterilized without excessively heating, for example, the first sterile filter 63, the membrane of, for example, the first sterile filter 63 can be inhibited from being damaged. For this reason, the lifetime of the first sterile filter 63, for example, can be increased, and the first sterile filter 63, for example, can be used for a long time without being replaced. The F value may not be calculated, and the first sterile filter 63, for example, may be sterilized, for example, at 121° C. or more for 20 minutes (in a timer manner).

When the first sterile filter 63, for example, is sterilized, valves (not illustrated) that are disposed at the sampling points SP1 to SP6 may be opened or closed, and a region to be sterilized by using the vapor may be consequently divided. For example, the vapor that is used to sterilize the first sterile filter 63 may be supplied to a region between the sampling point SP3 and the sampling point SP4, and the region may be consequently sterilized. The vapor that is used to sterilize the second sterile filter 65 may be supplied to a region between the sampling point SP5 and the sampling point SP6, and the region may be consequently sterilized. The foreign-material removal filter 61 may be sterilized together with the first sterile filter 63 and the second sterile filter 65.

In this way, the process of SIP is performed on the first sterile filter 63 and the second sterile filter 65. Subsequently, the first sterile filter 63 and the second sterile filter 65 are cooled (a symbol S213 in FIG. 10A).

Subsequently, the integrity test (the second integrity test) is conducted for at least one of the sterile filters (the first sterile filter 63 and the second sterile filter 65) of the water sterilizer 60 (a symbol S22 in FIG. 10A). That is, the integrity test before manufacturing is conducted for at least the first sterile filter 63 or the second sterile filter 65 of the water sterilizer 60 (the symbol S22 in FIG. 10A). In the integrity test, water is first supplied to the housing (not illustrated) in, for example, the first sterile filter 63 (a process of moistening (not illustrated)). The process of moistening is performed with the first ultraviolet lamp 67*a*, for example, being lighted. Consequently, the water to which the ultraviolet rays are radiated passes through the first sterile filter. Subsequently, a valve (not illustrated) that is near, for example, the first sterile filter 63 is closed, the water in, for example, the first sterile filter 63 is discharged, and sterile air is supplied to, for example, the first sterile filter 63. At this time, the sterile air is injected into, for example, the first sterile filter 63 in which the water is filled via, for example, the sterile-air inlet 60*a*. The pressure of the sterile air that is supplied to, for example, the first sterile filter 63 is gradually increased, and the value of the bubble point of, for example, the first sterile filter 63 is measured. Subsequently, whether the first sterile filter 63, for example, is perfect (whether the sterile air does not leak at predetermined pressure) is checked by using the value of the bubble point that is measured multiple times (for example, three times).

The water cannot be supplied to the first sterile filter 63, for example, while the integrity test is conducted for the first sterile filter 63. In the case where the water continues to stay in the body 66 (see FIG. 3 to FIG. 6B) in, for example, the first sterilizer 62, the temperature of the water in the body 66 increases due to the heat of, for example, the first ultraviolet lamp 67*a*. In particular, in the case where the first ultraviolet lamp 67*a*, for example, is an intermediate-pressure mercury lamp, the temperature at which the intermediate-pressure mercury lamp operates is high (roughly 600° C. or more and 900° C. or less), and accordingly, the temperature of the water in the body 66 can be readily increased. For this reason, as illustrated by using, for example, the thick line in FIG. 2C, the water to which the first ultraviolet lamp 67*a*, for example, radiates the ultraviolet rays is preferably circulated in the circulation system 95A, for example, while the integrity test is conducted for the first sterile filter 63. This can reduce excessive heat from, for example, the first ultraviolet lamp 67*a* and can inhibit the first ultraviolet lamp 67*a*, for example, from being damaged.

Subsequently, the content-filling system 10 starts filling (manufacturing) the content again. The water that is used during the integrity test is preferably the water that is sterilized by the first sterilizer 62. The air that is used during the integrity test is preferably sterile air.

Figure 10C:
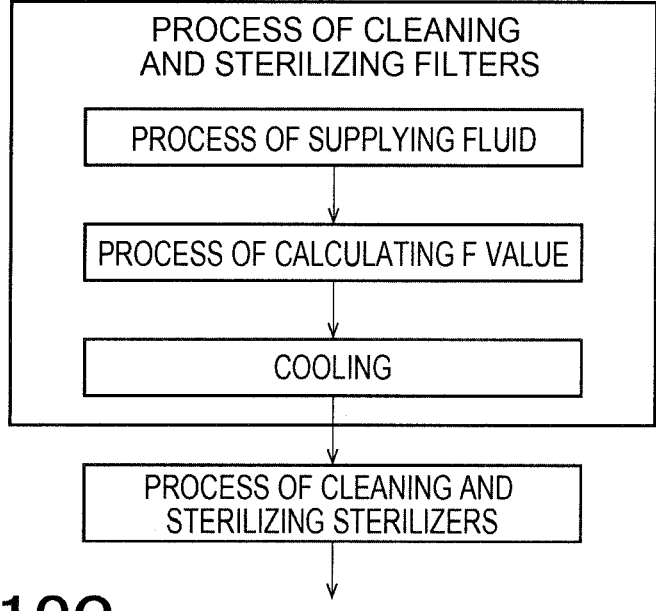
FIG. 10C is a flowchart illustrating another example of the method of sterilizing the water sterilizer corresponding to the method of sterilizing the content-filling system according to an embodiment.
Figure 10D:
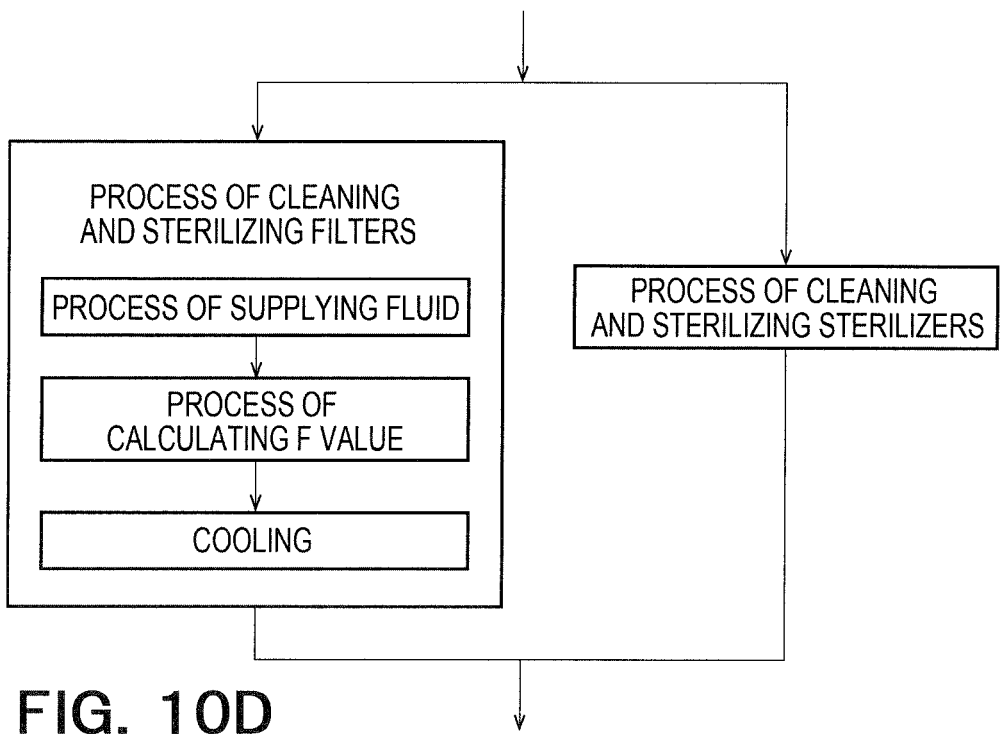
FIG. 10D is a flowchart illustrating another example of the method of sterilizing the water sterilizer corresponding to the method of sterilizing the content-filling system according to an embodiment.

As illustrated in FIG. 10C, the order of the process of cleaning and sterilizing the sterilizers (S20 in FIG. 10A) and the process of cleaning and sterilizing the filters (S21 in FIG. 10A) may be reversed. As illustrated in FIG. 10D, the process of cleaning and sterilizing the first sterilizer 62 and the second sterilizer 64 may be simultaneously performed during the SIP of the foreign-material removal filter 61, the first sterile filter 63, and the second sterile filter 65 (for example, while the first sterile filter 63, for example, is cooled). In this case, the pipe or the valve that is upstream or downstream of, for example, the first sterile filter 63 comes into contact with the sterilizing agent. For this reason, the time for cooling can be decreased. Specifically, the sterilizing agent may start to be supplied to the first sterilizer 62 and the second sterilizer 64 when the foreign-material removal filter 61, the first sterile filter 63, and the second sterile filter 65 are cooled to less than 110° C. This enables the process of cleaning and sterilizing the sterilizers to end while the foreign-material removal filter 61, the first sterile filter 63, and the second sterile filter 65 are cooled.

As for, for example, the first sterilizer 62, the ultraviolet rays are radiated by using, for example, the first ultraviolet lamp 67a when the product bottles 101 are manufactured. This reduces a possibility that the first sterilizer 62, for example, is contaminated by the microbes. For this reason, when the water sterilizer 60 is sterilized, the first sterilizer 62, for example, may not be sterilized.

Figure 10E:
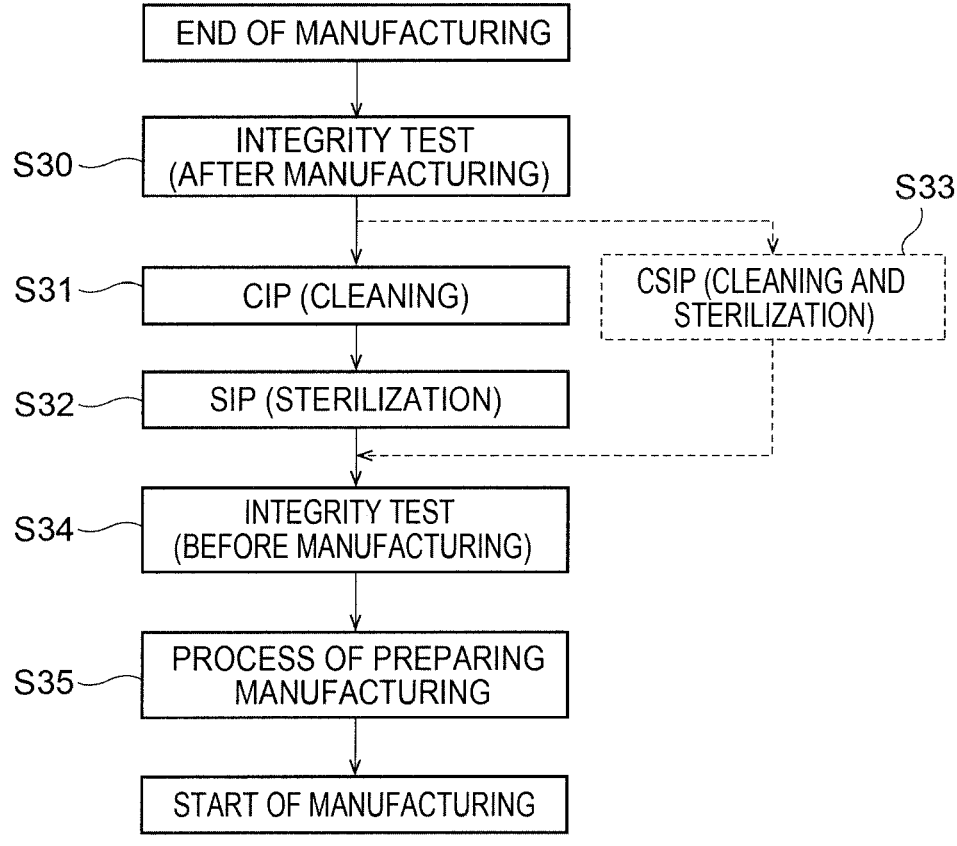
FIG. 10E is a flowchart illustrating another example of the method of sterilizing the water sterilizer corresponding to the method of sterilizing the content-filling system according to an embodiment.

According to another embodiment, as illustrated in FIG. 10E, the process of sterilizing the sterile filters (the first sterile filter 63 and the second sterile filter 65) of the water sterilizer 60 may be performed while the process of cleaning the sterilizers (the first sterilizer 62 and the second sterilizer 64) or the process of sterilizing the sterilizers (the first sterilizer 62 and the second sterilizer 64) is performed. That is, the first sterile filter 63 and the second sterile filter 65 of the water sterilizer 60 may be cleaned and sterilized simultaneously while the first sterilizer 62 and the second sterilizer 64 are cleaned and sterilized.

In this case, as illustrated in FIG. 10E, filling (manufacturing) first ends. Subsequently, the integrity test (the first integrity test) after manufacturing is conducted for at least the first sterile filter 63 or the second sterile filter 65 (a symbol S30 in FIG. 10E).

Subsequently, a process of cleaning (CIP) the first sterile filter 63, the second sterile filter 65, the first sterilizer 62, and the second sterilizer 64 is performed (a symbol S31 in FIG. 10E). At this time, detergent and a sterilizing agent are supplied from positions in front of (upstream of) the foreign-material removal filter 61, the circulation line 59 is used, and the detergent and the sterilizing agent are circulated in the circulation system 59A for a predetermined time.

After the process of CIP is performed, the process of sterilizing (SIP) the first sterile filter 63, the second sterile filter 65, the first sterilizer 62, and the second sterilizer 64 may be performed (a symbol S32 in FIG. 10E). Alternatively, the first sterile filter 63, the second sterile filter 65, the first sterilizer 62, and the second sterilizer 64 may be simultaneously cleaned and sterilized (the process of CSIP) (a symbol S33 in FIG. 10E) instead of the process of CIP and the process of SIP.

Examples of the detergent and the sterilizing agent that are used for the process of CIP and the process of SIP, or the process of CSIP may include acid chemicals such as peracetic acid, acetic acid, hydrogen peroxide, peroxynitric acid, nitric acid, and phosphoric acid, alkali chemicals such as sodium hydroxide and potassium hydroxide, chlorinated chemicals such as sodium hypochlorite and chlorine dioxide, alcohol such as ethyl alcohol and isopropyl alcohol, ozone water, acid water, a surfactant alone, and a combination of two or more of these. The temperature of the detergent and the sterilizing agent may be increased by using a heater not illustrated. The process of CIP and the process of SIP, or the process of CSIP may be performed based on the values of the thermometers T and the concentration meter 59c that are installed in the water sterilizer 60 and the circulation line 59 in predetermined conditions (temperature, concentration, time).

The detergent and the sterilizing agent may be discharged from the circulation system 59A while the pure water is supplied from the pure-water tank 50c to the circulation system 59A, the pure water is conveyed by the pump P1, and the sterilizing agent is consequently replaced with the pure water. Water may be supplied from another device (not illustrated) to the circulation system 59A, and the sterilizing agent may be discharged. The sterilizing agent may be discharged while the value of the concentration meter 59c that is disposed downstream of the circulation line 59 is monitored. In this case, the circulation system 59A is preferably rinsed by using the rinse water, for example, until the value of the concentration meter 59c becomes equal to the value of a concentration meter (not illustrated) that is included in the pure-water-manufacturing device 50a. In the process of rinsing, the time for rinsing may be managed by using a timer. The process of rinsing may be performed so as to end after a predetermined time has passed. In the process of CIP and the process of SIP, or in the process of CSIP, the first ultraviolet lamp 67a, for example, may light or may not light. The first ultraviolet lamp 67a, for example, may light only in the process of rinsing. After the process of CIP and the process of SIP end, or the process of CSIP ends, the integrity test (the second integrity test) before manufacturing is conducted for at least the first sterile filter 63 or the second sterile filter 65, (a symbol S34 in FIG. 10E). That is, the integrity test before manufacturing is conducted for either the first sterile filter 63 or the second sterile filter 65, or both of these.

Subsequently, in the case where the integrity test before manufacturing is passed (in the case where there is no leak), a process of preparing manufacturing is performed (a symbol S35 in FIG. 10E). In the process of preparing manufacturing, it is checked that the irradiance of the ultraviolet rays that are radiated from, for example, the first ultraviolet lamp 67a is the predetermined value or more while the pure water is circulated in the circulation system 59A. In this case, as for a sterilizer (the first sterilizer 62 or the second sterilizer 64), the total irradiation amount of, for example, the first ultraviolet lamp 67a may be, for example, 10 mJ/cm² or more and is preferably 100 mJ/cm² or more.

Subsequently, manufacturing starts.

No content adheres to the water sterilizer 60. As for, for example, the first sterilizer 62, the first ultraviolet lamp 67a, for example, radiates the ultraviolet rays when the product bottles 101 are manufactured. This reduces a possibility that the first sterilizer 62, for example, is contaminated by the microbes. For this reason, when the water sterilizer 60 is sterilized, the first sterilizer 62, for example, may not be sterilized.

According to the present embodiment described above, the content-filling system 10 includes the water sterilization line 50 that sterilizes the water without heating, the undiluted-solution sterilization line 70 that heats and sterilizes the product undiluted solution, and the filling device 20 that is connected to the water sterilization line 50 and the undiluted-solution sterilization line 70 and that fills the water and the product undiluted solution in the bottles 100. This enables the amount of carbon dioxide that is discharged when the content is manufactured to be decreased, unlike the case where a product undiluted solution is diluted with sterile water that is manufactured by using a sterilizer that heats and sterilized water. For this reason, the amount of carbon dioxide that is discharged by the content-filling system 10 can be decreased.

According to the present embodiment, the content-filling system 10 further includes the control unit 90 that controls the water sterilization line 50. In the case where the irradiation amount or irradiance of the ultraviolet rays is the predetermined value or less, the control unit 90 causes the water to be discharged to the location outside the water sterilization line 50. This enables the sterile properties of, for example, the second water tank 52 to be maintained.

According to the present embodiment, the filling device 20 includes the water-filling device 21 that is connected to the water sterilization line 50 and the undiluted-solution-filling device 22 that is connected to the undiluted-solution sterilization line 70. The water-filling device 21 fills the water that is sterilized in the bottles 100. The undiluted-solution-filling device 22 fills the product undiluted solution that is sterilized in the bottles 100. This enables regions to which a stain due to the content adheres to be narrowed. For this reason, the regions to be cleaned and sterilized can be narrowed. As a result, the amount of the vapor that is used, for example, can be decreased. The time for cleaning and the time for sterilization can be decreased. For this reason, the amount of carbon dioxide that is discharged by the content-filling system 10 can be decreased.

According to the present embodiment, the water-filling device 21 fills the water in the bottles 100 that are empty. The filling rate at which the water-filling device 21 fills the water in the bottles 100 is higher than the filling rate at which the undiluted-solution-filling device 22 fills the product undiluted solution in the bottles 100. This prevents a stain from adhering to the vicinity of the bottles 100 and enables the number of the water-filling nozzles of the water-filling device 21 to be decreased. For this reason, no stain adheres to the vicinity of the bottles 100, and the size of the water-filling device 21 can be decreased.

According to the present embodiment, the water sterilization line 50 includes the first water tank 51 that stores the water, the water sterilizer 60 that sterilizes the water that is stored in the first water tank 51 without heating, and the second water tank 52 that stores the water that is sterilized by the water sterilizer 60. The undiluted-solution sterilization line 70 includes the first undiluted-solution tank 71 that stores the product undiluted solution, the product-undiluted-solution sterilizer 80 that heats and sterilizes the product undiluted solution that is stored in the first undiluted-solution tank 71, and the second undiluted-solution tank 72 that stores the product undiluted solution that is sterilized by the product-undiluted-solution sterilizer 80. This enables the water and the product undiluted solution to smoothly flow.

According to the present embodiment, the first bypass line 55 that connects the water sterilization line 50 and the cap-sterilizing device 18 to each other is disposed downstream of the second water tank 52. This enables the water that is sterilized by the water sterilizer 60 to be used to clean the caps 88. For this reason, the amount of carbon dioxide that is discharged by the content-filling system 10 can be further decreased.

According to the present embodiment, the addition unit 75 that adds a solid into the product undiluted solution is coupled downstream of the second undiluted-solution tank 72. This enables the content that contains the solid to be filled in the bottles 100 at the content-filling system 10.

According to the present embodiment, the content-filling system 10 further includes the preform-sterilizing device 34a that sterilizes the preforms 100a, the blow molding unit (the container-molding device) 32 that molds the bottles 100 by using the preforms 100a, and the sterilizing device (the container-sterilizing device) 11 that sterilizes the bottles 100. The blow molding unit (the container-molding device) 32 molds the bottles 100 without adjusting the temperature of the bottles 100 by using the warm water in the mold temperature controller. This enables the microbes adhering to the bottles 100 to be reduced and enables the amount of carbon dioxide that is discharged by the content-filling system 10 to be decreased. In addition, it is not necessary to supply the warm water to the mold of the blow molding unit 32, and the blow molding unit 32 can be consequently simplified.

(Modifications to Content-Filling System)

Modifications to the content-filling system will now be described.

(First Modification)

In an example described according to the embodiment described above, the water sterilization line 50 (the water sterilizer 60) sterilizes the water without heating, but this is not a limitation. For example, the water sterilization line 50 (the water sterilizer 60) may sterilize the water by heating the water to a predetermined temperature. The number of the microbes in the pure water that is manufactured by the pure-water-manufacturing device 50a is typically smaller than that in the product undiluted solution, provided that the pure-water-manufacturing device 50a is appropriately managed. Accordingly, in the case where the content has a pH of less than 4.5 after filling, or after the caps 88 are mounted on the bottles 100, the water sterilization line 50 (the first sterilizer 62 and the second sterilizer 64) may sterilize the water such that the $F_0$ value is 0.00029 or more and less than 3.1. In the case where the content has a pH of 4.5 or more, the water sterilization line 50 (the first sterilizer 62 and the second sterilizer 64) may sterilize the water such that the $F_0$ value is 3.1 or more and 100 or less. In the case where contents that have different values of pH are filled in turn, the water sterilization line 50 (the first sterilizer 62 and the second sterilizer 64) may sterilize the water such that the $F_0$ value is uniformly 3.1 or more and 100 or less in order to decrease the number of times of cleaning and/or sterilization of the water sterilization line 50. The $F_0$ value is equal to the F value that is calculated in the case where the reference temperature Tr is 121.1° C., and the Z value is 10° C. in the above-described expression:

$$F = \int_{t_0}^{t_1} 10^{(T-T_r)/Z} dt \qquad \text{[Math, 4]}$$

(where T is the freely determined sterilization temperature (° C.), $10^{\{(T-T_r)/Z\}}$ is the lethality ratio at the freely determined sterilization temperature T, Tr is the reference temperature (° C.), and Z is the Z value (° C.)).

According to the present modification, the amount of carbon dioxide that is discharged when the water is sterilized can be decreased, unlike the case of using a sterilizer that simultaneously heats water and a product undiluted solution to high temperature and sterilizes the water and the product undiluted solution at the same sterilization intensity (typically, the $F_0$ value is roughly 30 or more and 80 or less). For this reason, the amount of carbon dioxide that is discharged by the content-filling system 10 can be decreased. In the case where the water sterilization line 50 (the first sterilizer 62 and the second sterilizer 64) changes the sterilization conditions, based on the pH of the content, the amount of carbon dioxide that is discharged when the water is sterilized can be further decreased, and the amount of carbon dioxide that is discharged by the content-filling system 10 can be further decreased.

(Second Modification)

In an example described according to the embodiment described above, the water-filling device 21 fills the water that is sterilized in the bottles 100, and the undiluted-solution-filling device 22 fills the product undiluted solution that is sterilized in the bottles 100 in which the water is filled, but this is not a limitation. For example, the undiluted-solution-filling device 22 may fill the product undiluted solution that is sterilized in the bottles 100, and the water-filling device 21 may fills the water that is sterilized in the bottles 100 in which the product undiluted solution is filled.

Figure 11:
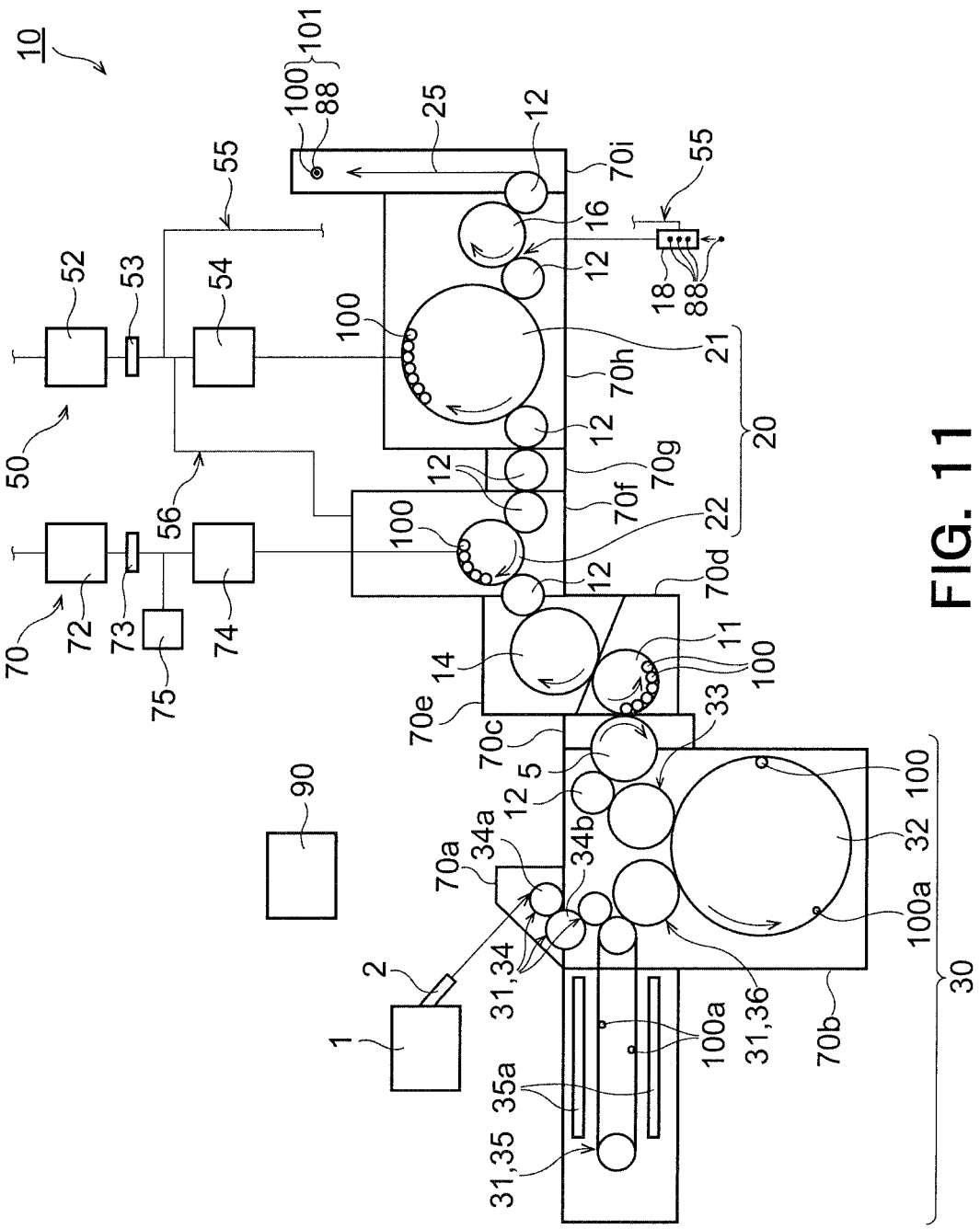
FIG. 11 schematically illustrates a plan view of a second modification to the content-filling system according to an embodiment.

In this case, as illustrated in FIG. 11, the undiluted-solution-filling device 22 may be disposed upstream of the water-filling device 21 in the direction in which the bottles 100 are conveyed. The undiluted-solution-filling device 22 may be contained in the first sterile chamber 70*f*. The water-filling device 21 may be contained in the second sterile chamber 70*h*.

(Third Modification)

In an example described according to the embodiment described above, the product undiluted solution is diluted with the water, but this is not a limitation. For example, the water or the product undiluted solution may be filled in the bottles 100 by using only the water-filling device 21 or the undiluted-solution-filling device 22. Specifically, only the water may be filled in the bottles 100 by using only the water-filling device 21. That is, at the content-filling system 10, mineral water may be manufactured by using only the water-filling device 21. Only the product undiluted solution may be filled in the bottles 100 by using only the undiluted-solution-filling device 22. That is, at the content-filling system 10, a so-called concentrated product may be manufactured by using only the undiluted-solution-filling device 22. In the case where only the product undiluted solution that does not need to be sterilized is filled in the bottles 100, the bottles 100 may be supplied to the conveyance wheel 12 that is contained in the intermediate area chamber 70*g*.

According to the present modification, the water or the product undiluted solution is filled in the bottles 100 by using only the water-filling device 21 or the undiluted-solution-filling device 22. This enables the mineral water and the so-called concentrated product to be manufactured at the content-filling system 10. For this reason, the kind of the product bottles 101 that are manufactured at the content-filling system 10 can be increased.

(Fourth Modification)

In an example described according to the embodiment described above, the filling device 20 includes the water-filling device 21 that is connected to the water sterilization line 50 and the undiluted-solution-filling device 22 that is connected to the undiluted-solution sterilization line 70. In this case, the filling device 20 may include multiple undiluted-solution-filling devices 22. As illustrated in, for example, FIG. 12A, the content-filling system 10 may include multiple (for example, two) undiluted-solution sterilization lines 70. The filling device 20 may include the multiple (for example, two) undiluted-solution-filling devices 22 that are connected to the respective undiluted-solution sterilization lines 70.

In this case, the filling device 20 may include a first undiluted-solution-filling device 22*a* that fills a product undiluted solution that has no flavor and a second undiluted-solution-filling device 22*b* that fills a product undiluted solution that has flavor. In other words, one of the two undiluted-solution-filling devices 22 may be, for example, the filling device (the first undiluted-solution-filling device 22*a*) that fills the product undiluted solution that has no flavor such as a tea beverage. The other undiluted-solution-filling device 22 may be the filling device (the second undiluted-solution-filling device 22*b*) that fills the product undiluted solution that has flavor such as a fruit beverage, a milk beverage, or a sports drink. The second undiluted-solution-filling device 22*b* may be a filling device that fills a solid.

Since the filling device 20 thus includes the first undiluted-solution-filling device 22*a* and the second undiluted-solution-filling device 22*b*, the scent of the previous content can be inhibited from being transferred to the content when the content that has no flavor such as a tea beverage is filled in the bottles 100. In the case where one of the undiluted-solution-filling devices 22 is the filling device (the first undiluted-solution-filling device 22*a*) that fills the product undiluted solution that has no flavor, no flavor is transferred to, for example, a flow path for the product undiluted solution in the first undiluted-solution-filling device 22*a*. For example, no flavor is transferred to seal elements such as packings that are disposed, for example, at positions at which the pipes and the devices are connected. For this reason, when the kind of the content is changed, the regions to be cleaned (CIP) can be narrowed. This enables the time for cleaning to be decreased. For this reason, the amount of carbon dioxide that is discharged by the content-filling system 10 can be decreased.

In an example illustrated, the first undiluted-solution-filling device 22*a*, the second undiluted-solution-filling device 22*b*, and the cap-mounting device 16 are contained in the second sterile chamber 70*h*. As illustrated in FIG. 128, the second sterile chamber 70*h* contains a chamber wall 710. The chamber wall 710 separates a first space (a space) 701 in which the first undiluted-solution-filling device 22*a* is contained, a second space 702 in which the second undiluted-solution-filling device 22*b* is contained, and a third space 703 in which the cap-mounting device 16 is contained from each other. In other words, the first undiluted-solution-filling device 22*a* is contained in the first space 701 that is divided by the chamber wall 710. The second undiluted-solution-filling device 22*b* is contained in the second space 702 that is divided by the chamber wall 710. The cap-mounting device 16 is contained in the third space 703 that is divided by the chamber wall 710.

The chamber wall 710 has a function of preventing, for example, the sterilizing agent in the spaces from flowing into an unintentional space and stabilizing pressure in the spaces. The chamber wall 710 has gaps G1 to G6 (see FIG. 12C described later) through which the bottles 100 can pass. The gaps G1 to G6 have, for example, a size roughly equal to the size of the single bottle 100 at minimum such that the pressure in the spaces does not change. The chamber wall 710 may include shutters sh1 to sh6 (see FIG. 12C described later) that cover and uncover the gaps G1 to G6 described above. The shutters sh1 to sh6 may automatically open and close, for example, in response to a signal from the control unit 90.

Since the second sterile chamber 70*h* thus contains the chamber wall 710, the second space 702 can be cleaned (COP) and sterilized (SOP), and the second undiluted-solution-filling device 22*b* can be cleaned (CIP) and sterilized (SIP), for example, while the first undiluted-solution-filling device 22*a* operates. This enables the downtime to be greatly decreased and enables the productivity of the product bottles 101 to be improved. The shutter sh1 that is included in the chamber wall 710, for example, may be closed when the second undiluted-solution-filling device 22*b* is cleaned (CIP) and sterilized (SIP), for example, while the first undiluted-solution-filling device 22*a* operates. In this way, the sterilizing agent, for example, may be prevented from entering the space (a sterile space) in which the first undiluted-solution-filling device 22*a* is contained from the space (an unsterile space) in which the second undiluted-solution-filling device 22*b* is contained.

Among the conveyance wheels 12 that are contained in the second sterile chamber 70*h*, a first conveyance wheel (a first wheel) 12*a* that delivers the bottles 100 to the first undiluted-solution-filling device 22*a* and a second conveyance wheel 12*b* that receives the bottles 100 from the first undiluted-solution-filling device 22*a* are disposed outside the first space 701. Among the conveyance wheels 12 that are contained in the second sterile chamber 70*h*, a third conveyance wheel 12*c* that delivers the bottles 100 to the second undiluted-solution-filling device 22*b* and a fourth conveyance wheel 12*d* that receives the bottles 100 from the second undiluted-solution-filling device 22*b* are disposed outside the second space 702.

Figure 12A:
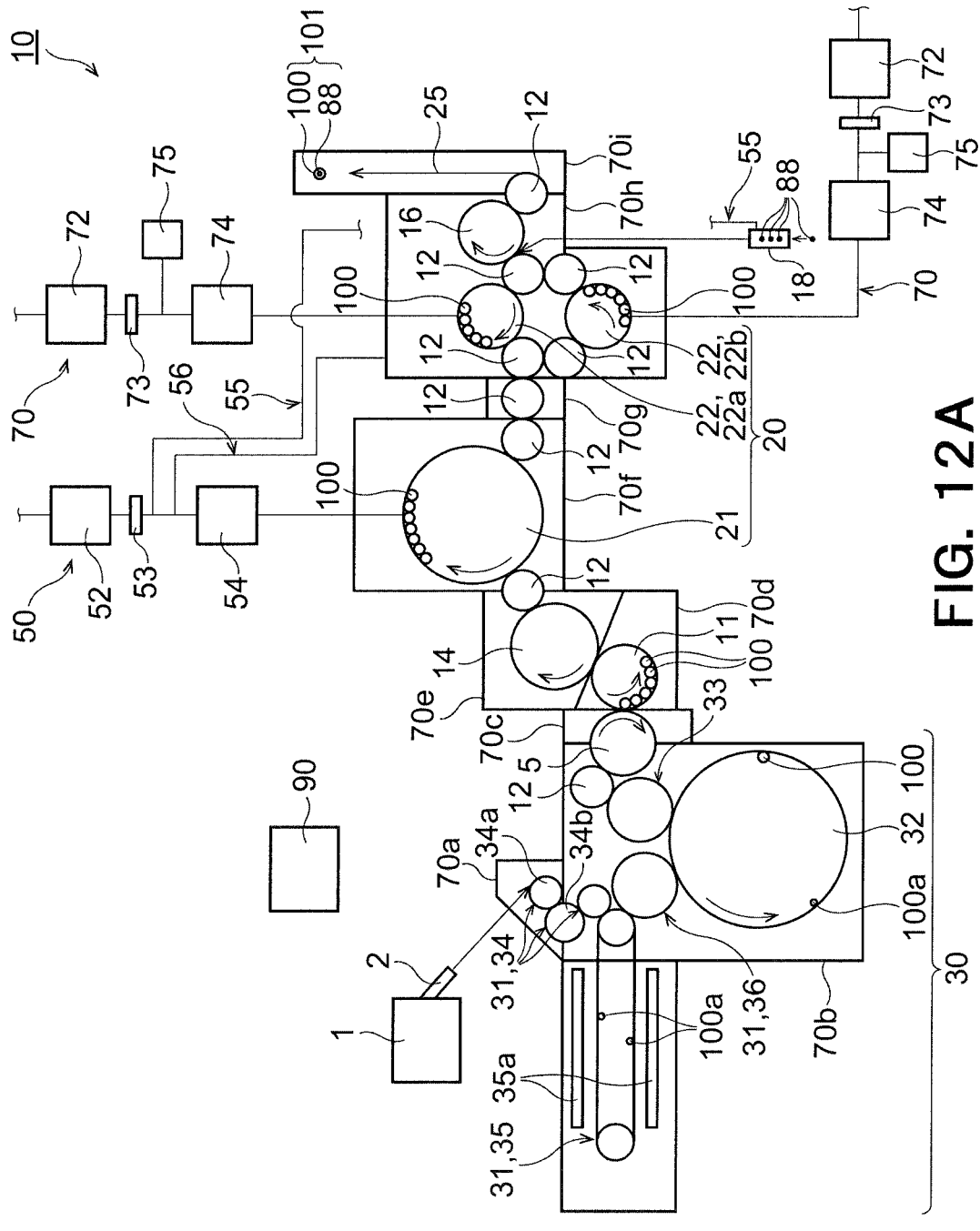
FIG. 12A schematically illustrates a plan view of a fourth modification to the content-filling system according to an embodiment.
Figure 12B:
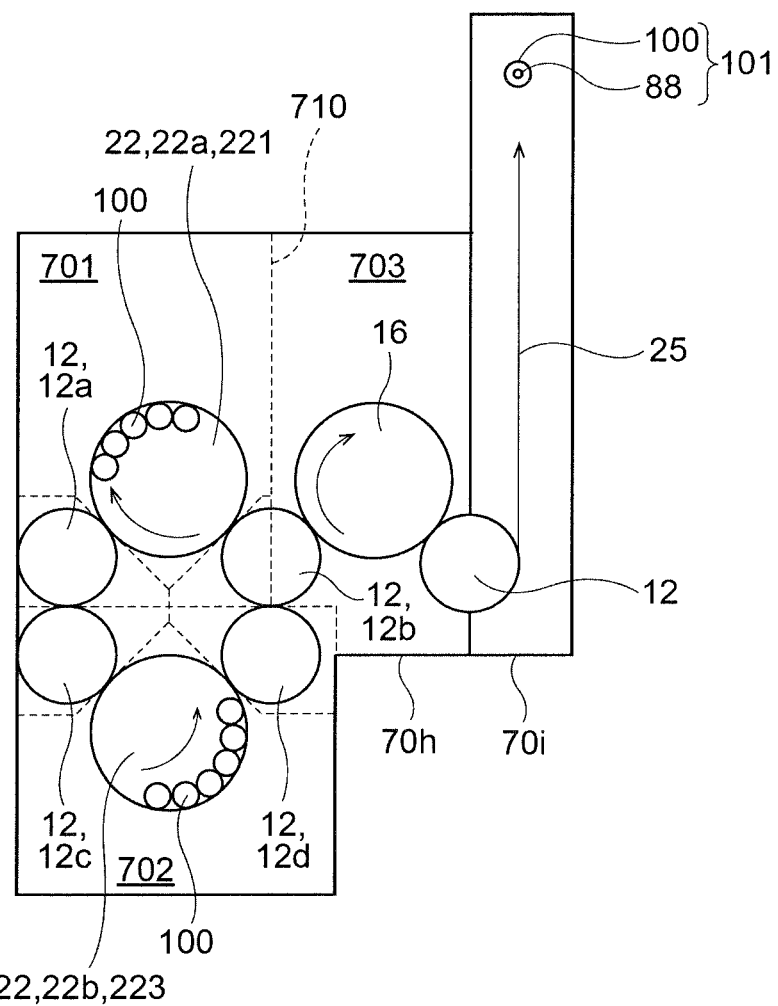
FIG. 12B schematically illustrates an enlarged plan view of a second sterile chamber and an exit chamber according to the fourth modification to the content-filling system according to an embodiment.
Figure 12C:
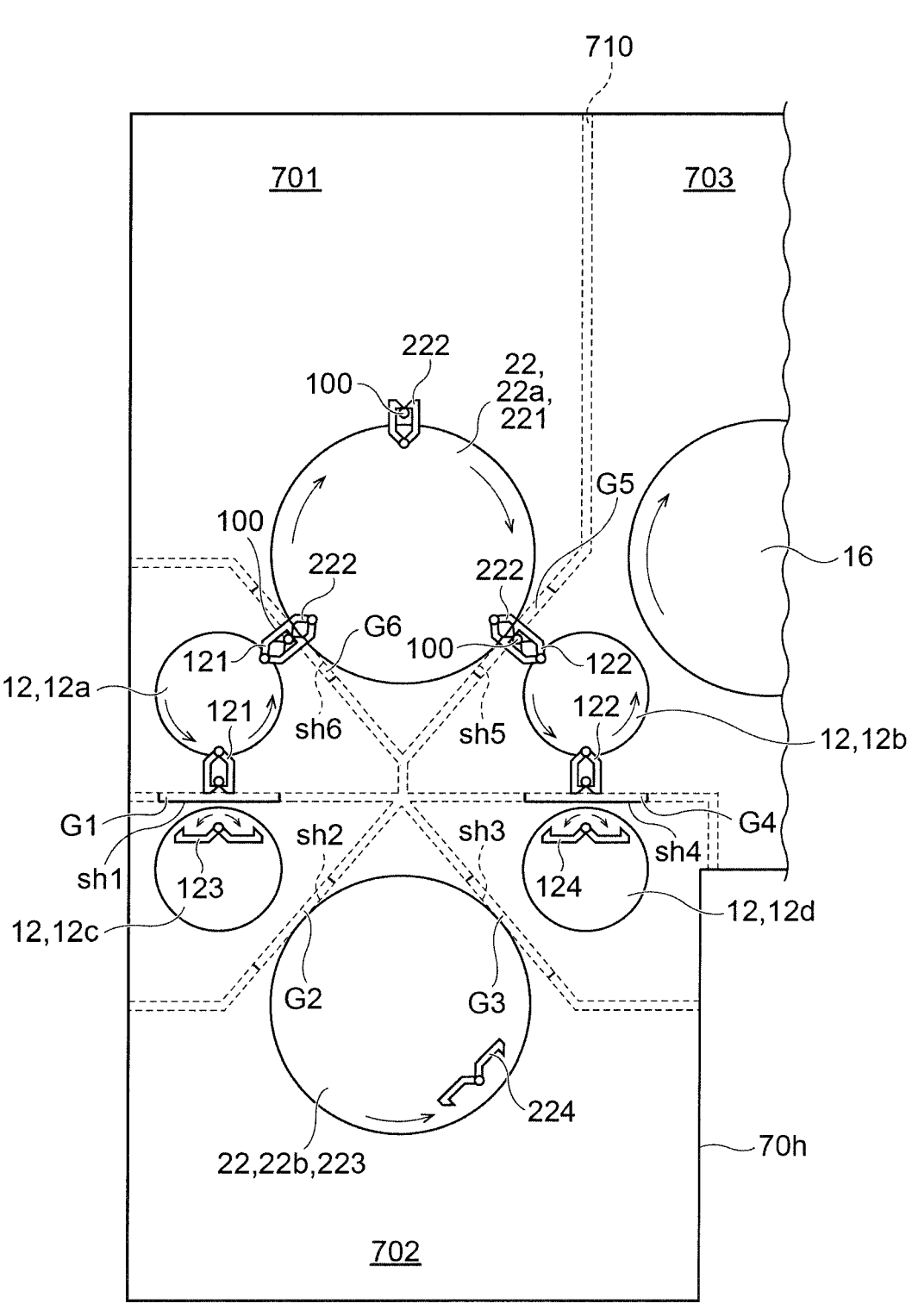
FIG. 12C schematically illustrates a plan view for illustrating a method of filling the content by using the fourth modification to the content-filling system according to an embodiment.

As illustrated in FIG. 12C, the first conveyance wheel 12*a* includes grippers (first grippers) 121 that convey the bottles 100. The grippers 121 are provided so as to be capable of opening and closing.

Similarly, the second conveyance wheel 12*b* to the fourth conveyance wheel 12*d* include respective grippers 122, 123, and 124 that convey the bottles 100. The grippers 122, 123, and 124 are provided so as to be capable of opening and closing.

The first undiluted-solution-filling device 22*a* includes a wheel 221 (a second wheel). The wheel 221 (the second wheel) is disposed in the first space 701. The wheel 221 includes grippers (second grippers) 222 that convey the bottles 100. The grippers 222 are provided so as to be capable of opening and closing.

Similarly, the second undiluted-solution-filling device 22*b* includes a wheel 223. The wheel 223 is disposed in the second space 702. The wheel 223 includes a gripper 224 that conveys the bottles 100. The gripper 224 is provided so as to be capable of opening and closing.

The following description with reference to FIG. 12C contains the case where the second space 702 (and/or the second undiluted-solution-filling device 22*b*) is cleaned and sterilized while the first undiluted-solution-filling device 22*a* that is contained in the first space 701 operates. That is, the following description contains the case where the second space 702 and/or the second undiluted-solution-filling device 22*b* (also simply referred to below as the second space 702, for example,) is cleaned and sterilized while the first undiluted-solution-filling device 22*a* fills the product undiluted solution in the bottles 100.

After the second undiluted-solution-filling device 22*b* ends filling the product undiluted solution, the operation button of the control unit 90, for example, is first operated. In response to this, the gap G1 and G4, for example, among the gaps G1 to G6 of the chamber wall 710 are covered by the shutters sh1 and sh4.

Subsequently, the bottles 100 are conveyed from the first conveyance wheel 12*a* to the first undiluted-solution-filling device 22*a*. At this time, the gripper 123 of the third conveyance wheel 12*c* moves to an open position so as not to interfere with the grippers 121 of the first conveyance wheel 12*a*. According to the present embodiment, as for the gripper 123, a pair of pawls of the gripper 123 rotates 90 degrees from a close position to the open position in the horizontal direction. An angle at which each pawl rotates may be 60 degrees or more and 130 degrees or less.

At the open position, the gripper 123 does not interfere with the shutter sh1 that covers the gap G1. This enables the inside of the first space 701 to be kept sterile when the second space 702, for example, is cleaned and sterilized and enables the bottles 100 to be conveyed to the first undiluted-solution-filling device 22*a*.

In the case where the first undiluted-solution-filling device 22*a* fills the product undiluted solution in the bottles 100, the grippers (the second grippers) 222 of the wheel 221 of the first undiluted-solution-filling device 22*a* receive the bottles 100 from the grippers (the first grippers) 121 of the first conveyance wheel 12*a*. That is, the bottles 100 are delivered from the first conveyance wheel (the first wheel) 12*a* that is disposed outside the first space 701 to the wheel 221 (the second wheel) that is disposed in the first space 701.

Subsequently, at the first undiluted-solution-filling device 22*a*, the product undiluted solution is filled in the bottles 100. At this time, the product undiluted solution is filled in the bottles 100 that are conveyed by the grippers 222.

Subsequently, the bottles 100 in which the content is filled are conveyed to the cap-mounting device 16 by using the second conveyance wheel 12*b*. At this time, the gripper 124 of the fourth conveyance wheel 12*d* moves to an open position so as not to interfere with the grippers 122 of the second conveyance wheel 12*b*. According to the present embodiment, as for the gripper 124, a pair of pawls of the gripper 124 rotates 90 degrees from a close position to the open position in the horizontal direction. An angle at which each pawl rotates may be 60 degrees or more and 130 degrees or less.

At the open position, the gripper 124 does not interfere with the shutter sh4 that covers the gap G4. This enables the insides of the first space 701 and the third space 703 to be kept sterile when the second space 702, for example, is cleaned and sterilized and enables the bottles 100 to be conveyed to the cap-mounting device 16.

In this way, the product bottles 101 in which the product undiluted solution is filled by the first undiluted-solution-filling device 22*a* are obtained. Meanwhile, the second space 702, for example, is cleaned and sterilized.

When the second space 702 is thus cleaned while the first undiluted-solution-filling device 22*a* that is contained in the first space 701 operates, the pressure in the first space 701 is preferably 10 Pa or more and 40 Pa or less, the pressure in the second space 702 is preferably −10 Pa or more and 10 Pa or less, and the pressure in the third space 703 is preferably 5 Pa or more and 30 Pa or less. This can effectively inhibit air in the second space 702 and air in the third space 703 from entering the first space 701 and enables the state of the inside of the first space 701 that is sterile to be more successfully maintained.

The pressure in the second space 702 when the second space 702 is sterilized while the first undiluted-solution-filling device 22*a* that is contained in the first space 701 operates may be higher than the pressure in the second space 702 when the second space 702 is cleaned while the first undiluted-solution-filling device 22*a* that is contained in the first space 701 operates. When the second space 702 is sterilized, the pressure in the first space 701 is preferably 10 Pa or more and 40 Pa or less, the pressure in the second space 702 is preferably 0 Pa or more and 20 Pa or less, and the pressure in the third space 703 is preferably 5 Pa or more and 30 Pa or less. This can effectively inhibit the air in the second space 702 and the air in the third space 703 from entering the first space 701 and enables the state of the inside of the first space 701 that is sterile to be successfully maintained.

Figure 12D:
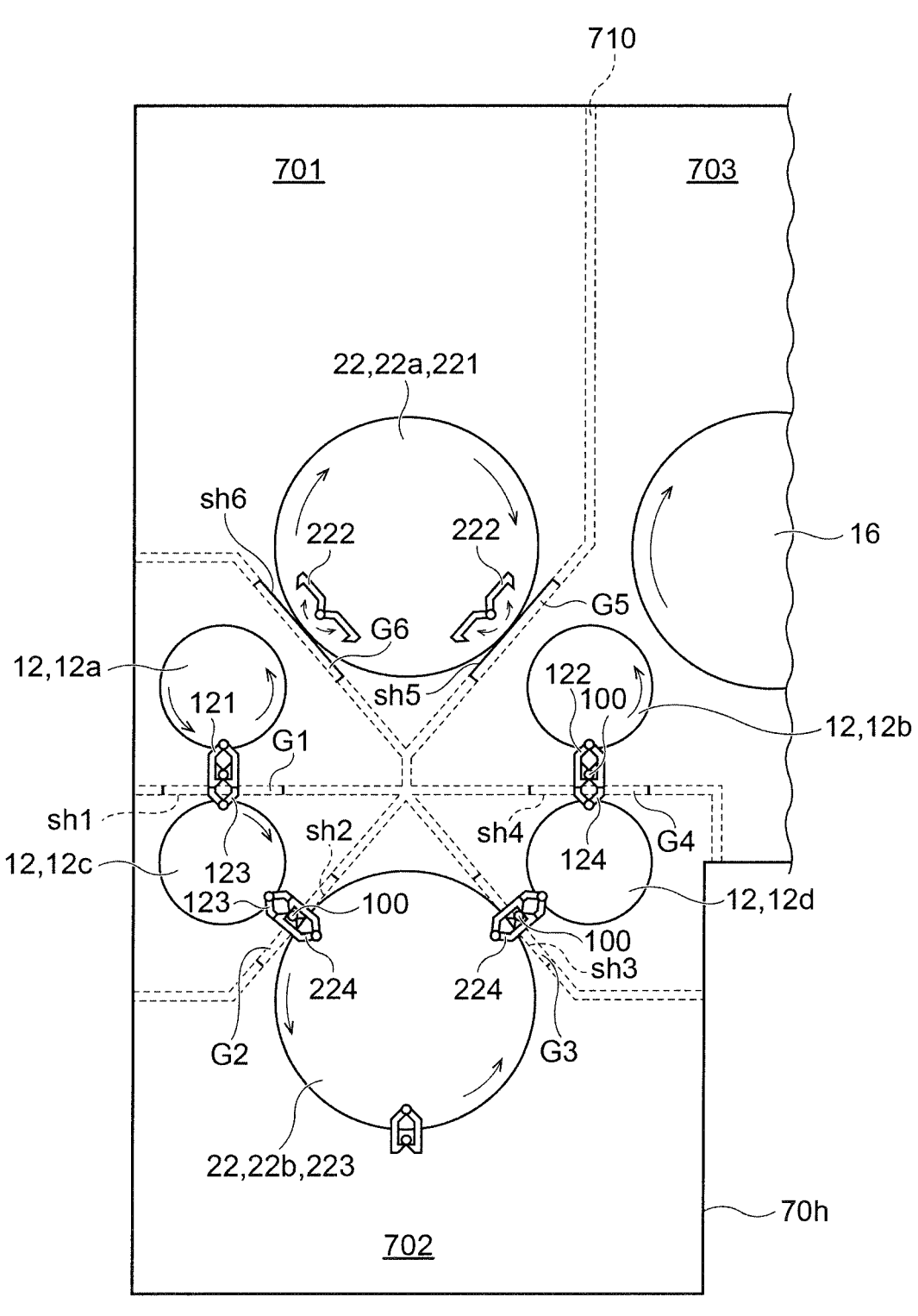
FIG. 12D schematically illustrates a plan view for illustrating the method of filling the content by using the fourth modification to the content-filling system according to an embodiment.

The following description contains the case where the first undiluted-solution-filling device 22*a* does not fill the product undiluted solution in the bottles 100. The description herein with reference to FIG. 12D contains the case where the first space 701 and/or the first undiluted-solution-filling device 22a (also simply referred to below as the first space 701, for example,) is cleaned and sterilized while the second undiluted-solution-filling device 22b that is contained in the second space 702 operates. That is, the description contains the case where the first space 701, for example, is cleaned and sterilized while the second undiluted-solution-filling device 22b fills the product undiluted solution in the bottles 100.

After the first undiluted-solution-filling device 22a ends filling the product undiluted solution, the operation button of the control unit 90, for example, is first operated. In response to this, the gaps G5 and G6, for example, among the gaps G1 to G6 of the chamber wall 710 are covered by the shutters sh5 and sh6.

Subsequently, the bottles 100 are conveyed from the first conveyance wheel 12a to the second undiluted-solution-filling device 22b. At this time, the grippers (the second grippers) 222 of the wheel 221 (the second wheel) of the first undiluted-solution-filling device 22a move to an open position so as not to interfere with the gripper (the first gripper) 121 of the first conveyance wheel 12a. According to the present embodiment, as for each gripper 222, a pair of pawls of the gripper 222 rotates 90 degrees from a close position to the open position in the horizontal direction. An angle at which each pawl rotates may be 60 degrees or more and 130 degrees or less.

At the open position, the grippers 222 do not interfere with the shutter sh6 that covers the gap G6. This enables the inside of the second space 702 to be kept sterile when the first space 701, for example, is cleaned and sterilized and enables the bottles 100 to be conveyed to the second undiluted-solution-filling device 22b.

In the case where the second undiluted-solution-filling device 22b fills the product undiluted solution in the bottles 100, the grippers 123 of the third conveyance wheel 12c receive the bottles 100 from the gripper 121 of the first conveyance wheel 12a.

In the case where the second undiluted-solution-filling device 22b fills the product undiluted solution in the bottles 100, the grippers 224 of the wheel 223 of the second undiluted-solution-filling device 22b receive the bottles 100 from the grippers 123 of the third conveyance wheel 12c. That is, the bottles 100 are delivered from the third conveyance wheel 12c that is disposed outside the second space 702 to the wheel 223 that is disposed in the second space 702.

Subsequently, at the second undiluted-solution-filling device 22b, the product undiluted solution is filled in the bottles 100. At this time, the product undiluted solution is filled in the bottles 100 that are conveyed by the grippers 224.

Subsequently, the fourth conveyance wheel 12d conveys the bottles 100 in which the content is filled to the second conveyance wheel 12b.

Subsequently, the second conveyance wheel 12b conveys the bottles 100 to the cap-mounting device 16. At this time, the grippers 222 of the wheel 221 of the first undiluted-solution-filling device 22a move to the open position so as not to interfere with the gripper 122 of the second conveyance wheel 12b. At the open position, the grippers 222 do not interfere with the shutter sh5 that covers the gap G5. This enables the state of the insides of the second space 702 and the third space 703 that are sterile to be maintained when the first space 701, for example, is cleaned and sterilized and enables the bottles 100 to be conveyed to the cap-mounting device 16.

In this way, the product bottles 101 in which the product undiluted solution is filled by the second undiluted-solution-filling device 22b are obtained. Meanwhile, the first space 701, for example, is cleaned and sterilized.

When the first space 701 is cleaned while the second undiluted-solution-filling device 22b that is contained in the second space 702 operates, the pressure in the first space 701 is preferably −10 Pa or more and 10 Pa or less, the pressure in the second space 702 is preferably 10 Pa or more and 40 Pa or less, and the pressure in the third space 703 is preferably 5 Pa or more and 30 Pa or less. This can effectively inhibit the air in the first space 701 and the air in the third space 703 from entering the second space 702 and enables the state of the inside of the second space 702 that is sterile to be more successfully maintained.

The pressure in the first space 701 when the first space 701 is sterilized while the second undiluted-solution-filling device 22b that is contained in the second space 702 operates may be higher than the pressure in the first space 701 when the first space 701 is cleaned while the second undiluted-solution-filling device 22b that is contained in the second space 702 operates. When the first space 701 is sterilized, the pressure in the first space 701 is preferably 0 Pa or more and 20 Pa or less, the pressure in the second space 702 is preferably 10 Pa or more and 40 Pa or less, and the pressure in the third space 703 is preferably 5 Pa or more and 30 Pa or less. This can effectively inhibit the air in the first space 701 and the air in the third space 703 from entering the second space 702 and enables the state of the inside of the second space 702 that is sterile to be successfully maintained.

The above description is summarized. The pressure in the spaces may be determined as illustrated in Table 3 and Table 4 below.

TABLE 3

| | During Operation of First Undiluted-solution-filling Device 22a | |
| --- | --- | --- |
| | During Cleaning of Second Space 702 | During Sterilization of Second Space 702 |
| First Space 701 | 10 Pa or more and 40 Pa or less | 10 Pa or more and 40 Pa or less |
| Second Space 702 | −10 Pa or more and 10 Pa or less | 0 Pa or more and 20 Pa or less |
| Third Space 703 | 5 Pa or more and 30 Pa or less | |

TABLE 4

| During Operation of Second Undiluted-solution-filling Device 22b | | |
|---|---|---|
| | | During Sterilization of First Space |
| | During Cleaning of First Space 701 | 701 |
| First Space 701 | −10 Pa or more and 10 Pa or less | 0 Pa or more and 20 Pa or less |
| Second Space 702 | 10 Pa or more and 40 Pa or less | 10 Pa or more and 40 Pa or less |
| Third Space 703 | | 5 Pa or more and 30 Pa or less |

According to the present modification, the filling device 20 includes the multiple undiluted-solution-filling devices 22. This enables the second undiluted-solution-filling device 22b to be cleaned (CIP) and sterilized (SIP), for example, while the first undiluted-solution-filling device 22a operates. This enables the downtime to be greatly decreased and enables the productivity of the product bottles 101 to be improved.

According to the present modification, the content-filling system 10 includes the multiple undiluted-solution sterilization lines 70. The multiple undiluted-solution-filling devices 22 are connected to the respective undiluted-solution sterilization lines 70. This enables the kind of the product bottles 101 that are manufactured at the content-filling system 10 to be increased.

According to the present modification, the filling device 20 includes the first undiluted-solution-filling device 22a that fills the product undiluted solution that has no flavor and the second undiluted-solution-filling device 22b that fills the product undiluted solution that has flavor. This can inhibit the scent of the previous content from being transferred when the content that has no flavor is filled in the bottles 100. Since the first undiluted-solution-filling device 22a fills the product undiluted solution that has no flavor, no flavor is transferred to the flow path for the product undiluted solution in the first undiluted-solution-filling device 22a. For this reason, when the kind of the content is changed, the regions to be cleaned (CIP) can be narrowed. This enables the time for cleaning to be decreased. For this reason, the amount of carbon dioxide that is discharged by the content-filling system 10 can be decreased. At this time, since the first undiluted-solution-filling device 22a and the second undiluted-solution-filling device 22b are connected to the respective undiluted-solution sterilization lines 70, cleaning (so-called deodorization CIP) for removing flavor is not needed, for example, at the undiluted-solution sterilization line 70 to which the first undiluted-solution-filling device 22a is connected. The deodorization CIP needs time and energy more than normal CIP. For this reason, the downtime can be decreased, and the energy can be reduced in the case where the deodorization CIP is not performed, unlike the case where the deodorization CIP is performed.

According to the present modification, in the case where the first undiluted-solution-filling device 22a fills the product undiluted solution in the bottles 100, the grippers (the second grippers) 222 of the wheel 221 of the first undiluted-solution-filling device 22a receive the bottles 100 from the gripper (the first gripper) 121 of the first conveyance wheel 12a. In the case where the first undiluted-solution-filling device 22a does not fill the product undiluted solution in the bottles 100, the grippers (the second grippers) 222 of the wheel 221 (the second wheel) of the first undiluted-solution-filling device 22a move to the open position so as not to interfere with the gripper (the first gripper) 121 of the first conveyance wheel 12a. This enables the bottles 100 to be conveyed to the first undiluted-solution-filling device 22a when the second space 702, for example, is cleaned and sterilized.

According to the present modification, in the case where the first undiluted-solution-filling device 22a does not fill the product undiluted solution in the bottles 100, the gaps G5 and G6 are covered by the shutters sh5 and sh6. The grippers (the second grippers) 222 of the wheel 221 of the first undiluted-solution-filling device 22a move to the open position so as not to interfere with the shutters sh5 and sh6 that cover the gaps G5 and G6. This enables the bottles 100 to be conveyed to the first undiluted-solution-filling device 22a with the state of the insides of the second space 702 and the third space 703 that are sterile being maintained when the second space 702, for example, is cleaned and sterilized.

In an example described above, the pair of pawls of, for example, each gripper 222 rotates from the close position in the horizontal direction, and consequently, the gripper 222, for example, moves to the open position, but this is not a limitation. The gripper 222, for example, may move to the open position by using a freely determined structure. For example, the gripper 222, for example, may move to the open position such that the pair of pawls is folded upward or downward. The pair of pawls may be capable of expanding and contracting, and the gripper 222, for example, may be consequently capable of opening and closing.

Other Examples of Fourth Modification

The other examples of the fourth modification will now be described.

First Example

Figure 12E:
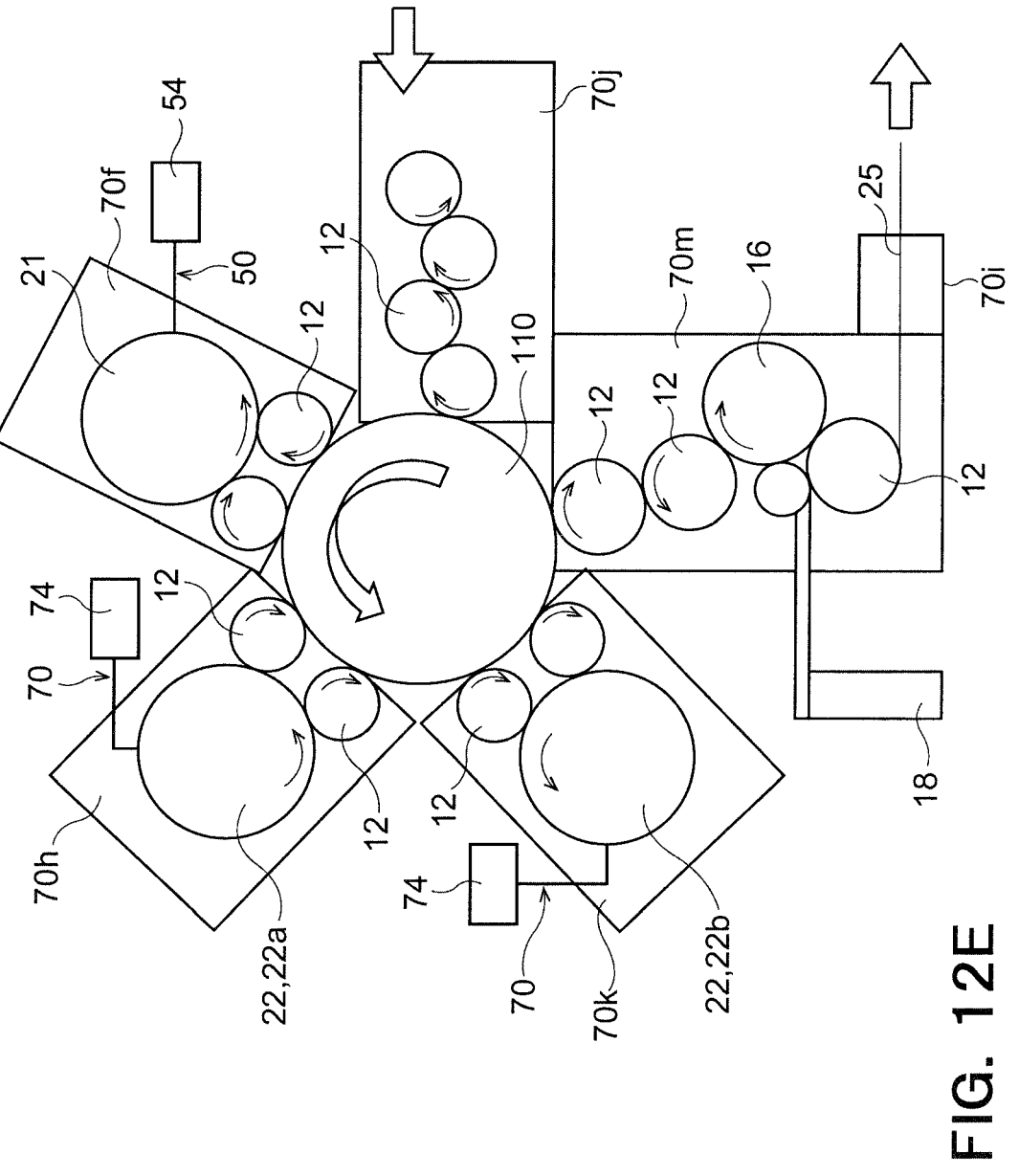
FIG. 12E schematically illustrates a plan view for illustrating another example (a first example) of the fourth modification to the content-filling system according to an embodiment.

In a first example illustrated in FIG. 12E, the content-filling system further includes a fifth sterile chamber 70j, a sixth sterile chamber 70k, and a seventh sterile chamber 70m. The fifth sterile chamber 70j is disposed upstream of the first sterile chamber 70f. The sixth sterile chamber 70k is disposed downstream of the second sterile chamber 70h. The seventh sterile chamber 70m is disposed downstream of the sixth sterile chamber 70k. That is, in the example illustrated, the fifth sterile chamber 70j, the first sterile chamber 70f, the second sterile chamber 70h, the sixth sterile chamber 70k, the seventh sterile chamber 70m, and the exit chamber 70i are arranged in this order from an upstream position to a downstream position in the direction in which the bottles 100 (see, for example, FIG. 12A) are conveyed. The fifth sterile chamber 70j, the first sterile chamber 70f, the second sterile chamber 70h, the sixth sterile chamber 70k, and the seventh sterile chamber 70m are arranged along the outer circumference of a circular conveyor 110 that rotates and conveys the bottles 100.

Among these, the fifth sterile chamber 70j may contain conveyance wheels 12 that conveys the bottles 100 that are air-rinsed. The sixth sterile chamber 70k contains the second undiluted-solution-filling device 22*b*. The seventh sterile chamber 70*m* contains the cap-mounting device 16. That is, in the example illustrated in FIG. 12E, the second undiluted-solution-filling device 22*b* and the cap-mounting device 16 are contained in a sterile chamber (the sixth sterile chamber 70*k* or the seventh sterile chamber 70*m*) that differs from the second sterile chamber 70*h* that contains the first undiluted-solution-filling device 22*a*.

In FIG. 12E, the bottles 100 that are sterilized in advance at an upstream position are conveyed to the first sterile chamber 70*f* via the conveyance wheels 12 that are disposed in the fifth sterile chamber 70*j* and the circular conveyor 110. The bottles 100 are conveyed to the water-filling device 21 via the conveyance wheels 12 that are disposed in the first sterile chamber 70*f*.

Subsequently, at the water-filling device 21, the water that is sterilized by the water sterilization line 50 is filled in the bottles 100 that are empty. At the water-filling device 21, the water is filled in the bottles 100 while the multiple bottles 100 are rotated and conveyed.

Subsequently, the bottles 100 in the first sterile chamber 70*f* are conveyed to the first undiluted-solution-filling device 22*a* via the conveyance wheels 12 that are disposed in the first sterile chamber 70*f*, the circular conveyor 110, and the conveyance wheels 12 that are disposed in the second sterile chamber 70*h*.

Subsequently, at the first undiluted-solution-filling device 22*a*, the product undiluted solution that is sterilized by the undiluted-solution sterilization line 70 is filled in the bottles 100 in which the water is filled by the water-filling device 21 in advance. At the first undiluted-solution-filling device 22*a*, the product undiluted solution is filled in the bottles 100 while the multiple bottles 100 are rotated and conveyed.

Subsequently, the bottles 100 in the second sterile chamber 70*h* are conveyed to the second undiluted-solution-filling device 22*b* via the conveyance wheels 12 that are disposed in the second sterile chamber 70*h*, the circular conveyor 110, and conveyance wheels 12 that are disposed in the sixth sterile chamber 70*k*.

Subsequently, at the second undiluted-solution-filling device 22*b*, another product undiluted solution that is sterilized by the undiluted-solution sterilization line 70 is filled in the bottles 100 in which the water and the product undiluted solution are filled in advance. At the second undiluted-solution-filling device 22*b*, the other product undiluted solution is filled in the bottles 100 while the multiple bottles 100 are rotated and conveyed.

Subsequently, the bottles 100 in the sixth sterile chamber 70*k* are conveyed to the cap-mounting device 16 via the conveyance wheels 12 that are disposed in the sixth sterile chamber 70*k*, the circular conveyor 110, and conveyance wheels 12 that are disposed in the seventh sterile chamber 70*m*.

Subsequently, at the cap-mounting device 16, the bottles 100 in which the water and the product undiluted solutions are filled are capped by the caps 88 (see, for example, FIG. 12A). In this way, the bottles 100 are sealed such that outside air and/or microorganisms do not enter the bottles 100. At the cap-mounting device 16, the caps 88 are mounted on the mouths of the bottles 100 while the multiple bottles 100 in which the water and the product undiluted solutions are filled are rotated and conveyed. In this way, the product bottles 101 (see, for example, FIG. 12A) are obtained.

Second Example

Figure 12F:
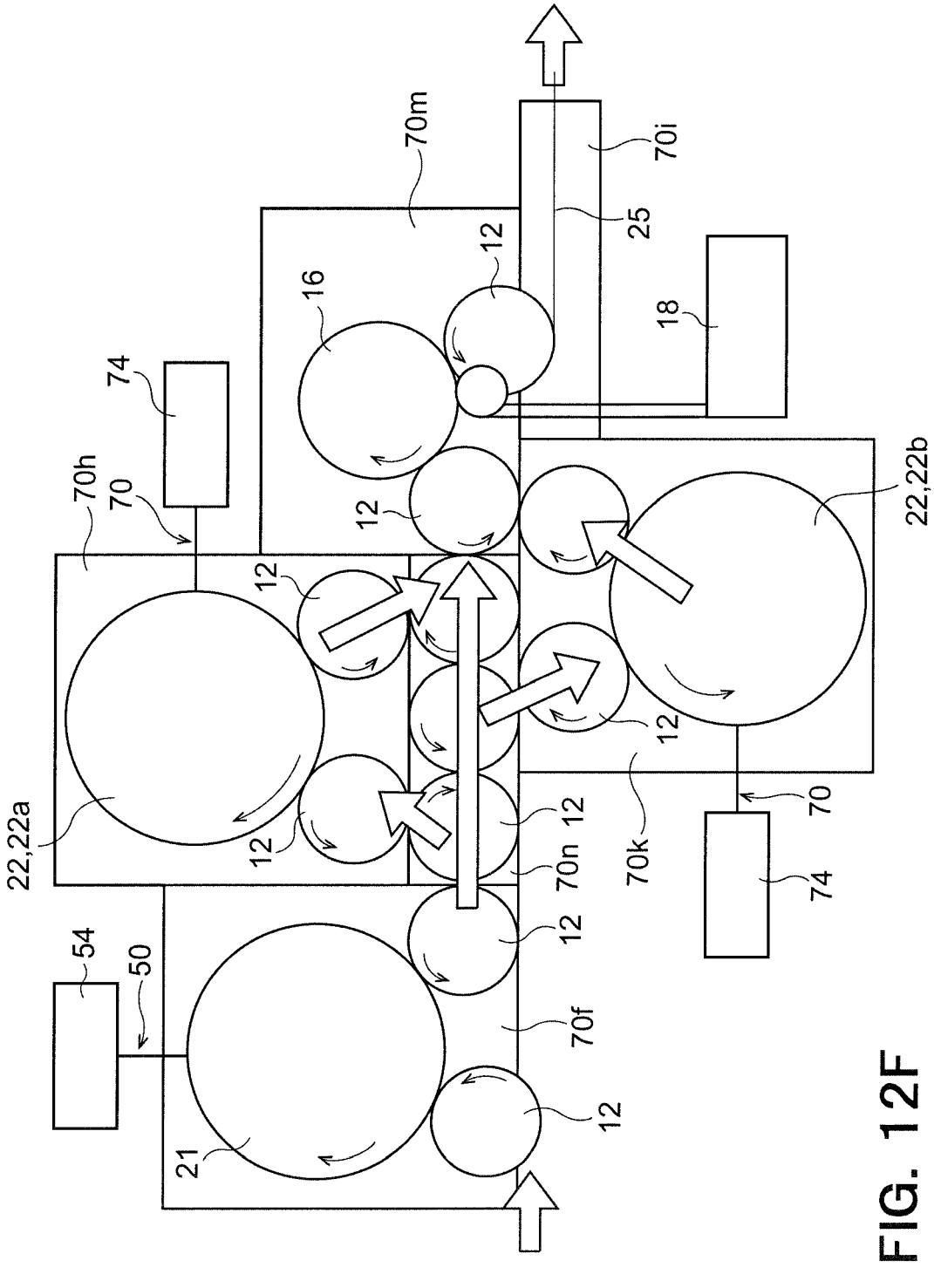
FIG. 12F schematically illustrates a plan view for illustrating another example (a second example) of the fourth modification to the content-filling system according to an embodiment.

A second example will now be described with reference to FIG. 12F. In the second example illustrated in FIG. 12F, the content-filling system further includes the sixth sterile chamber 70*k*, the seventh sterile chamber 70*m*, and an eighth sterile chamber 70*n*. The sixth sterile chamber 70*k* is disposed downstream of the first sterile chamber 70*f*. The seventh sterile chamber 70*m* is disposed downstream of the second sterile chamber 70*h* and the sixth sterile chamber 70*k*. The eighth sterile chamber 70*n* is disposed between the second sterile chamber 70*h* and the sixth sterile chamber 70*k*. In FIG. 12F, the second sterile chamber 70*h* and the sixth sterile chamber 70*k* are arranged in parallel at positions downstream of the first sterile chamber 70*f* in the direction in which the bottles 100 (see, for example, FIG. 12A) are conveyed. That is, in the example illustrated, the first sterile chamber 70*f*, the second sterile chamber 70*h* or the sixth sterile chamber 70*k*, the seventh sterile chamber 70*m*, and the exit chamber 70*i* are arranged in this order from an upstream position to a downstream position in the direction in which the bottles 100 (see, for example, FIG. 12A) are conveyed.

Among these, the sixth sterile chamber 70*k* contains the second undiluted-solution-filling device 22*b*. The seventh sterile chamber 70*m* contains the cap-mounting device 16. The eighth sterile chamber 70*n* may contain conveyance wheels 12 that convey the bottles 100 in which the water is filled by the water-filling device 21.

In FIG. 12F, the bottles 100 that are sterilized in advance at an upstream position are conveyed to the water-filling device 21 via a conveyance wheel 12 that is disposed in the first sterile chamber 70*f*.

Subsequently, at the water-filling device 21, the water that is sterilized by the water sterilization line 50 is filled in the bottles 100 that are empty. At the water-filling device 21, the water is filled in the bottles 100 while the multiple bottles 100 are rotated and conveyed.

Subsequently, the bottles 100 in the first sterile chamber 70*f* are conveyed to the first undiluted-solution-filling device 22*a*, for example, via a conveyance wheel 12 that is disposed in the first sterile chamber 70*f*, a conveyance wheel 12 that is disposed in the eighth sterile chamber 70*n*, and a conveyance wheel 12 that is disposed in the second sterile chamber 70*h*.

Subsequently, at the first undiluted-solution-filling device 22*a*, the product undiluted solution that is sterilized by the undiluted-solution sterilization line 70 is filled in the bottles 100 in which the water is filled by the water-filling device 21 in advance. At the first undiluted-solution-filling device 22*a*, the product undiluted solution is filled in the bottles 100 while the multiple bottles 100 are rotated and conveyed.

Subsequently, the bottles 100 in the second sterile chamber 70*h* are conveyed to the cap-mounting device 16 via a conveyance wheel 12 that is disposed in the second sterile chamber 70*h*, a conveyance wheel 12 that is disposed in the eighth sterile chamber 70*n*, and a conveyance wheel 12 that is disposed in the seventh sterile chamber 70*m*.

Subsequently, at the cap-mounting device 16, the bottles 100 in which the water and the product undiluted solution are filled are capped by the caps 88 (see, for example, FIG. 12A). In this way, the product bottles 101 (see, for example, FIG. 12A) are obtained.

The bottles 100 in the first sterile chamber 70*f* may not be conveyed to the first undiluted-solution-filling device 22*a* but may be conveyed to the second undiluted-solution-filling device 22*b*. The bottles 100 in the first sterile chamber 70*f*, for example, may be conveyed to the second undiluted-solution-filling device 22*b* via a conveyance wheel 12 that is disposed in the first sterile chamber 70*f*, conveyance wheels 12 that are disposed in the eighth sterile chamber 70*n*, and a conveyance wheel 12 that is disposed in the sixth sterile chamber 70*k*. In this case, the bottles 100 in the first sterile chamber 70*f* are not conveyed to the first undiluted-solution-filling device 22*a* that is disposed in the second sterile chamber 70*h*.

After the bottles 100 are conveyed to the second undiluted-solution-filling device 22*b*, at the second undiluted-solution-filling device 22*b*, another product undiluted solution that is sterilized by the undiluted-solution sterilization line 70 is filled in the bottles 100 in which the water is filled in advance. At the second undiluted-solution-filling device 22*b*, the other product undiluted solution is filled in the bottles 100 while the multiple bottles 100 are rotated and conveyed.

Subsequently, the bottles 100 in the sixth sterile chamber 70*k* are conveyed to the cap-mounting device 16 via a conveyance wheel 12 that is disposed in the sixth sterile chamber 70*k* and a conveyance wheel 12 that is disposed in the seventh sterile chamber 70*m*.

In the second example illustrated in FIG. 12F, the bottles 100 thus pass through the first sterile chamber 70*f*, the eighth sterile chamber 70*n*, the sixth sterile chamber 70*k*, and the seventh sterile chamber 70*m* in this order in the case where the second undiluted-solution-filling device 22*b* fills the product undiluted solution in the bottles 100.

In an example illustrated in FIG. 12F, the bottles 100 in which the water is filled by the water-filling device 21 in the first sterile chamber 70*f* may be directly conveyed to the cap-mounting device 16 that is disposed in the seventh sterile chamber 70*m* in the case where mineral water is manufactured at the content-filling system 10. That is, the bottles 100 in which the water is filled may not be conveyed to the first undiluted-solution-filling device 22*a* or the second undiluted-solution-filling device 22*b* but may be directly conveyed to the cap-mounting device 16 via the conveyance wheels 12 that are disposed in the eighth sterile chamber 70*n*. In this case, the caps 88 are mounted on the mouths of the bottles 100 in which only the water is filled, and the product bottles 101 are consequently obtained. In this case, the grippers of the conveyance wheels 12 adjacent to the first undiluted-solution-filling device 22*a* or the second undiluted-solution-filling device 22*b* preferably move to the open position as described with reference to FIG. 12C and FIG. 12D. This can inhibit the grippers from interfering with each other.

Third Example

Figure 12G:
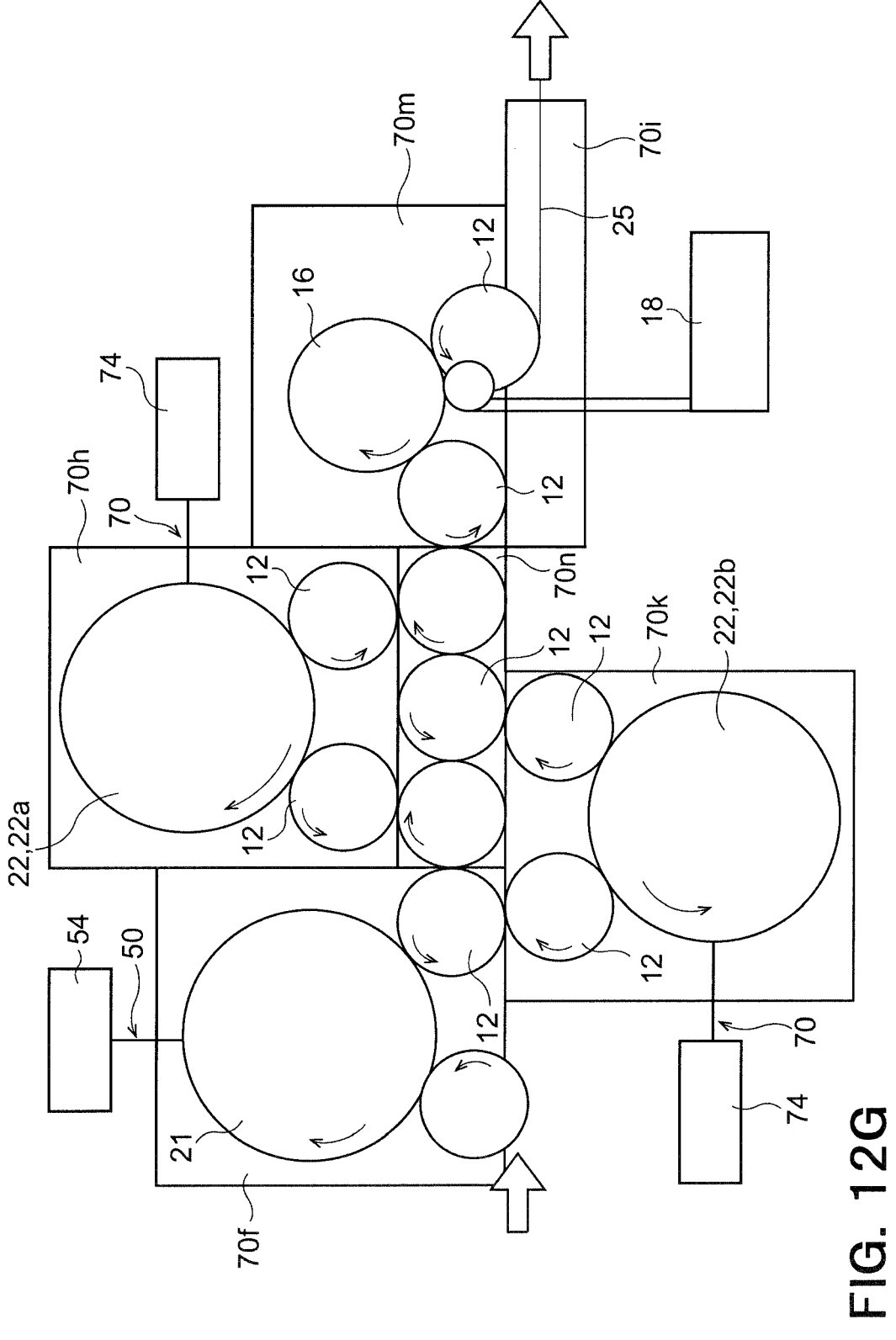
FIG. 12G schematically illustrates a plan view for illustrating another example (a third example) of the fourth modification to the content-filling system according to an embodiment.

A third example will now be described with reference to FIG. 12G. In the third example illustrated in FIG. 12G, the bottles 100 pass through the first sterile chamber 70*f*, the sixth sterile chamber 70*k*, the eighth sterile chamber 70*n*, and the seventh sterile chamber 70*m* in this order in the case where the second undiluted-solution-filling device 22*b* fills the product undiluted solution in the bottles 100, unlike the second example illustrated in FIG. 12F. The other structure of the content-filling system 10 in the third example is the same as that in the second example illustrated in FIG. 12F, and the detailed description thereof is omitted.

Fourth Example

A fourth example will now be described with reference to FIG. 12H. In the fourth example illustrated in FIG. 12H, the content-filling system further includes the sixth sterile chamber 70*k*, the seventh sterile chamber 70*m*, and a ninth sterile chamber 70*p*. The sixth sterile chamber 70*k* is disposed downstream of the first sterile chamber 70*f* and the second sterile chamber 70*h*. The seventh sterile chamber 70*m* is disposed downstream of the sixth sterile chamber 70*k*. The ninth sterile chamber 70*p* is disposed between the first sterile chamber 70*f* and the seventh sterile chamber 70*m*, between the second sterile chamber 70*h* and the seventh sterile chamber 70*m*, and between the sixth sterile chamber 70*k* and the seventh sterile chamber 70*m*.

The sixth sterile chamber 70*k* contains the second undiluted-solution-filling device 22*b*. The seventh sterile chamber 70*m* contains the cap-mounting device 16. The ninth sterile chamber 70*p* may contain conveyance wheels 12.

Figure 12H:
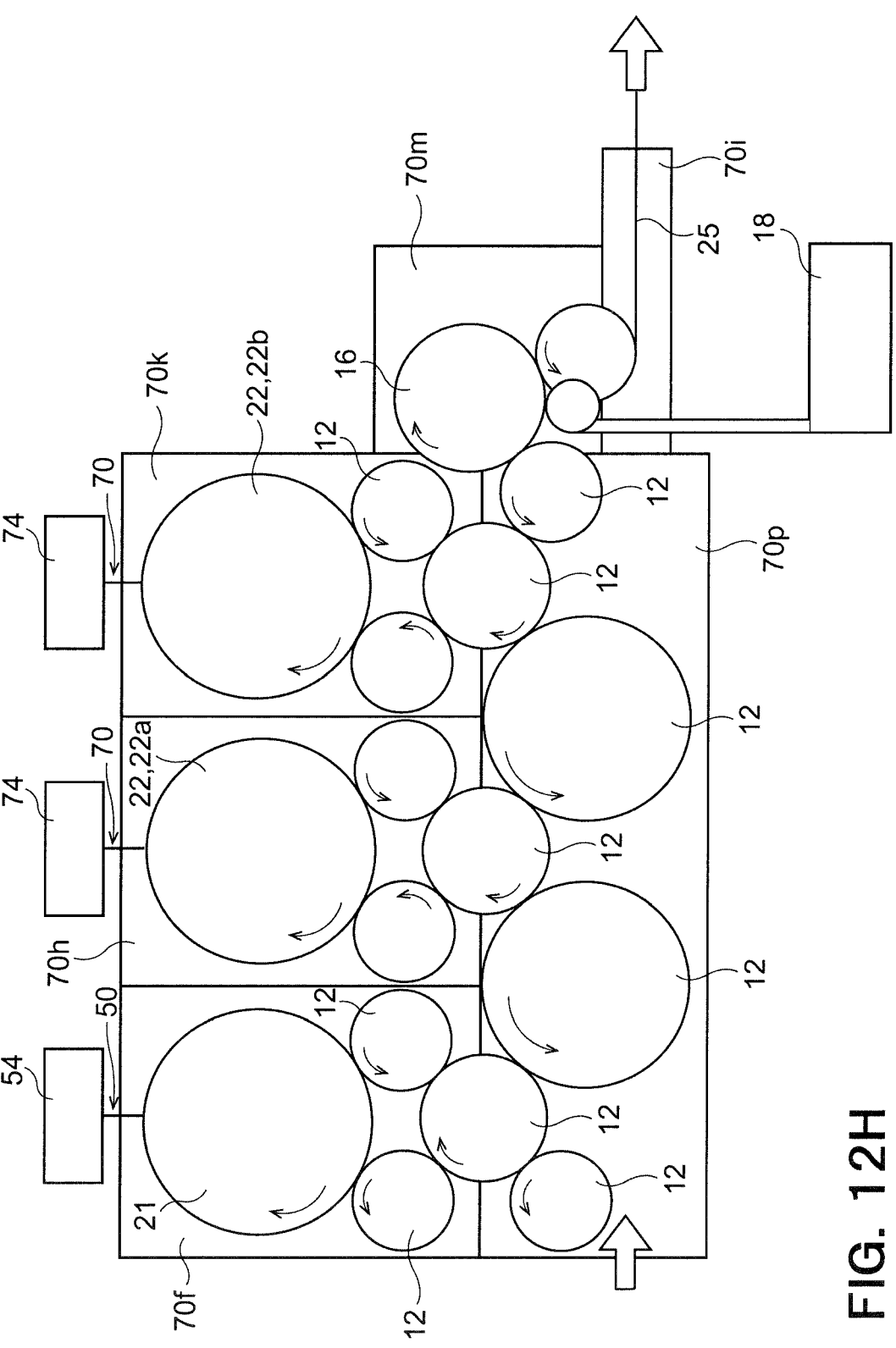
FIG. 12H schematically illustrates a plan view for illustrating another example (a fourth example) of the fourth modification to the content-filling system according to an embodiment.

In FIG. 12H, the bottles 100 that are sterilized in advance at an upstream position are conveyed to the water-filling device 21 via a conveyance wheel 12 that is disposed in the ninth sterile chamber 70*p* and a conveyance wheel 12 that is disposed in the first sterile chamber 70*f*.

Subsequently, at the water-filling device 21, the water that is sterilized by the water sterilization line 50 is filled in the bottles 100 that are empty. At the water-filling device 21, water is filled in the bottles 100 while the multiple bottles 100 are rotated and conveyed.

Subsequently, the bottles 100 in the first sterile chamber 70*f* are conveyed to the first undiluted-solution-filling device 22*a* via a conveyance wheel 12 that is disposed in the first sterile chamber 70*f*, a conveyance wheel 12 that is disposed in the ninth sterile chamber 70*p*, and a conveyance wheel 12 that is disposed in the second sterile chamber 70*h*.

Subsequently, at the first undiluted-solution-filling device 22*a*, the product undiluted solution that is sterilized by the undiluted-solution sterilization line 70 is filled in the bottles 100 in which the water is filled by the water-filling device 21 in advance. At the first undiluted-solution-filling device 22*a*, the product undiluted solution is filled in the bottles 100 while the multiple bottles 100 are rotated and conveyed.

Subsequently, the bottles 100 in the second sterile chamber 70*h* are conveyed to the second undiluted-solution-filling device 22*b* via a conveyance wheel 12 that is disposed in the second sterile chamber 70*h*, a conveyance wheel 12 that is disposed in the ninth sterile chamber 70*p*, and a conveyance wheel 12 that is disposed in the sixth sterile chamber 70*k*.

Subsequently, at the second undiluted-solution-filling device 22*b*, another product undiluted solution that is sterilized by the undiluted-solution sterilization line 70 is filled in the bottles 100 in which the water is filled in advance. At the second undiluted-solution-filling device 22*b*, the other product undiluted solution is filled in the bottles 100 while the multiple bottles 100 are rotated and conveyed.

Subsequently, the bottles 100 in the sixth sterile chamber 70*k* are conveyed to the cap-mounting device 16 via a conveyance wheel 12 that is disposed in the sixth sterile chamber 70*k*, a conveyance wheel 12 that is disposed in the ninth sterile chamber 70*p*, and a conveyance wheel 12 that is disposed in the seventh sterile chamber 70*m*.

In the fourth example illustrated in FIG. 12H, the bottles 100 thus pass through the first sterile chamber 70*f*, the ninth sterile chamber 70*p*, the second sterile chamber 70*h*, the ninth sterile chamber 70*p*, the sixth sterile chamber 70*k*, the ninth sterile chamber 70*p*, and the seventh sterile chamber 70*m* in this order in the case where the first undiluted-solution-filling device 22*a* and the second undiluted-solution-filling device 22*b* fill the product undiluted solutions in the bottles 100.

Fifth Example

A fifth example will now be described with reference to FIG. 12I. In the fifth example illustrated in FIG. 12I, the content-filling system further includes the sixth sterile chamber 70k, the seventh sterile chamber 70m, and a tenth sterile chamber 70q. The sixth sterile chamber 70k is disposed downstream of the first sterile chamber 70f and the second sterile chamber 70h. The seventh sterile chamber 70m is disposed downstream of the sixth sterile chamber 70k. The tenth sterile chamber 70q is disposed between the second sterile chamber 70h and the sixth sterile chamber 70k.

The sixth sterile chamber 70k contains the second undiluted-solution-filling device 22b. The seventh sterile chamber 70m contains the cap-mounting device 16. The tenth sterile chamber 70q may contain a conveyance wheel 12.

Figure 12I:
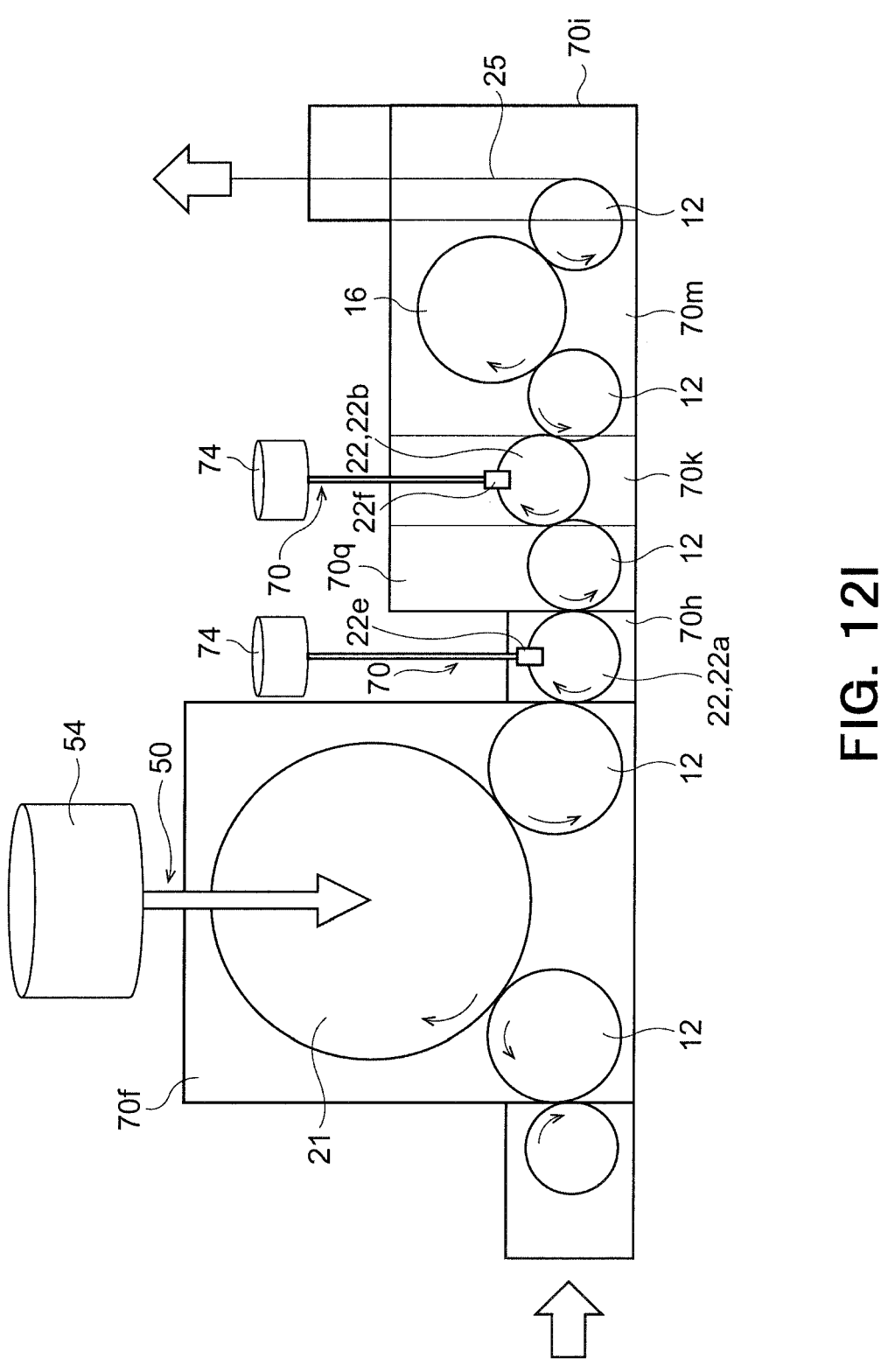
FIG. 12I schematically illustrates a plan view for illustrating another example (a fifth example) of the fourth modification to the content-filling system according to an embodiment.

In the fifth example illustrated in FIG. 12I, the first undiluted-solution-filling device 22a and the second undiluted-solution-filling device 22b are used in the case where the amount of the product undiluted solution to be filled is small. In this case, the first undiluted-solution-filling device 22a and the second undiluted-solution-filling device 22b include a filling nozzle 22e and a filling nozzle 22f of a fixed-quantity type that are fixed on the mouths of the bottles 100 and used. The first undiluted-solution-filling device 22a and the second undiluted-solution-filling device 22b may include multiple filling nozzles 22e and multiple filling nozzles 22f.

After the bottles 100 reach the filling nozzles 22e and 22f, the bottles 100 are detected by using near infrared. Consequently, the product undiluted solution is intermittently filled in the bottles 100 via the filling nozzles 22e and 22f only while the mouths of the bottles 100 pass through positions below the filling nozzles 22e and 22f. The filling nozzles 22e and 22f may not be filling nozzles via which the product undiluted solution is intermittently filled but may be filling nozzles via which the product undiluted solution is continuously filled.

In FIG. 12I, the bottles 100 that are sterilized in advance at an upstream position are conveyed to the water-filling device 21 via a conveyance wheel 12 that is disposed in the first sterile chamber 70f.

Subsequently, at the water-filling device 21, the water that is sterilized by the water sterilization line 50 is filled in the bottles 100 that are empty. At the water-filling device 21, the water is filled in the bottles 100 while the multiple bottles 100 are rotated and conveyed.

Subsequently, the bottles 100 in the first sterile chamber 70f are conveyed to the first undiluted-solution-filling device 22a via a conveyance wheel 12 that is disposed in the first sterile chamber 70f.

Subsequently, at the first undiluted-solution-filling device 22a, the product undiluted solution that is sterilized by the undiluted-solution sterilization line 70 is filled in the bottles 100 in which the water is filled by the water-filling device 21 in advance. At the first undiluted-solution-filling device 22a, the product undiluted solution is intermittently filled in the bottles 100.

Subsequently, the bottles 100 in the second sterile chamber 70h are conveyed to the second undiluted-solution-filling device 22b via the conveyance wheel 12 that is disposed in the tenth sterile chamber 70q.

Subsequently, at the second undiluted-solution-filling device 22b, another product undiluted solution that is sterilized by the undiluted-solution sterilization line 70 is filled in the bottles 100 in which the water is filled in advance. At the second undiluted-solution-filling device 22b, the other product undiluted solution is intermittently filled in the bottles 100.

Subsequently, the bottles 100 in the sixth sterile chamber 70k are conveyed to the cap-mounting device 16 via a conveyance wheel 12 that is disposed in the seventh sterile chamber 70m.

(Fifth Modification)

Figure 13:
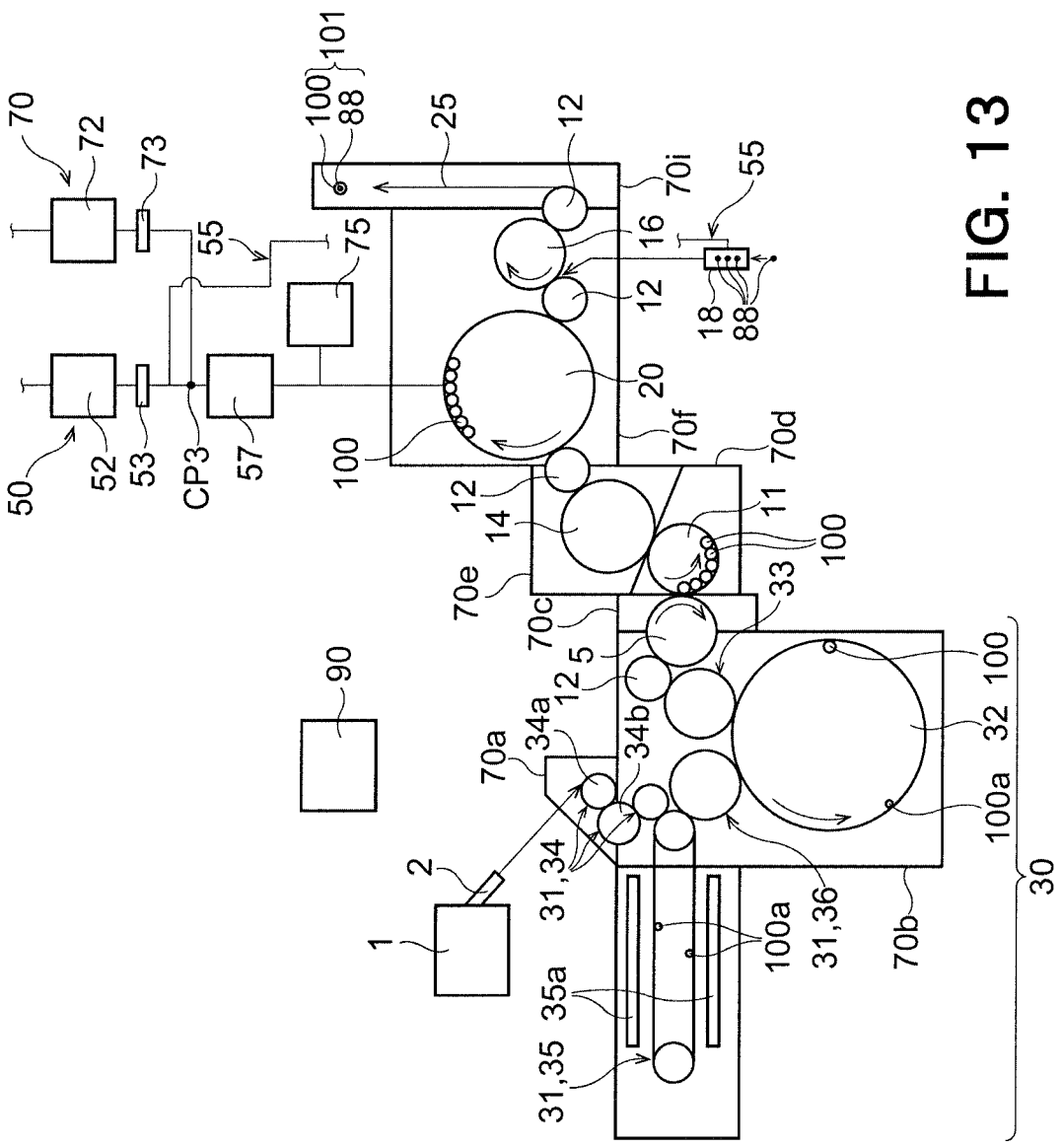
FIG. 13 schematically illustrates a plan view of a fifth modification to the content-filling system according to an embodiment.

In an example described according to the embodiment described above, the filling device 20 includes the water-filling device 21 that is connected to the water sterilization line 50 and the undiluted-solution-filling device 22 that is connected to the undiluted-solution sterilization line 70, but this is not a limitation. For example, as illustrated in FIG. 13, the content-filling system 10 may include the single filling device 20.

In this case, the content-filling system 10 may include the preform-sterilizing chamber 70a, the molding unit chamber 70b, the atmosphere shielding chamber 70c, the sterilizing-agent spray chamber 70d, the air-rinsing chamber 70e, the first sterile chamber 70f, and the exit chamber 70i. That is, the content-filling system 10 may not include the intermediate area chamber 70g and the second sterile chamber 70h. The first sterile chamber 70f may contain the filling device 20 and the cap-mounting device 16.

According to the present modification, a mixing tank 57 that mixes the water and the product undiluted solution may be interposed between the water sterilization line 50 and the filling device 20 and between the undiluted-solution sterilization line 70 and the filling device 20. This enables the content to be prepared in a manner in which the product undiluted solution is diluted with the water before being filled. In this case, the mixing tank 57 may be a so-called filling tank and may be installed above the filling device 20 in the vertical direction in order to improve the filling accuracy of the filling device 20. The mixing tank 57 may function as a so-called cushion tank that ensures the smooth flow of the content even in the case where the amount of the content that is used at a position downstream of the mixing tank 57 changes.

For the mixing tank 57, a concentration meter that measures the concentration of the prepared content may be installed. At least one or more tanks such as one or more filling tanks may be disposed downstream of the mixing tank 57 for which the concentration meter is installed in order to guarantee the concentration of the content that is prepared at the mixing tank 57. The volume of the mixing tank 57 may be 0.1 m$^3$ or more and 30 m$^3$ or less and may be, for example, 0.3 m$^3$. According to the present modification, the addition unit 75 described above may be coupled downstream of the mixing tank 57.

According to the present modification, in the case where the inside of the first sterile chamber 70f is cleaned (COP) and sterilized (SOP), a portion downstream of the connection point CP3 may be cleaned (CIP) and sterilized (SIP), for example, with a portion of the water sterilization line 50 upstream of the connection point CP3 at which the water sterilization line 50 and the undiluted-solution sterilization line 70 are connected to each other kept sterile. Similarly, in the case where the filling device 20 that is contained in the first sterile chamber 70f is cleaned (CIP) and sterilized (SIP), the portion downstream of the connection point CP3 may be cleaned (CIP) and sterilized (SIP), for example, with the portion upstream of the connection point CP3 kept sterile. Also in this case, the regions to be cleaned and sterilized can be narrowed. For this reason, the amount of the vapor that is used, for example, can be decreased. In addition, since the regions to be cleaned and sterilized can be narrowed, the time for cleaning and the time for sterilization can be decreased. For this reason, the amount of carbon dioxide that is discharged by the content-filling system 10 can be decreased.

Also according to the present modification, the amount of carbon dioxide that is discharged when the content is manufactured can be decreased, unlike the case where the product undiluted solution is diluted with sterile water that is manufactured by using a sterilizer that heats and sterilizes water. For this reason, the amount of carbon dioxide that is discharged by the content-filling system 10 can be decreased.

Figure 14:
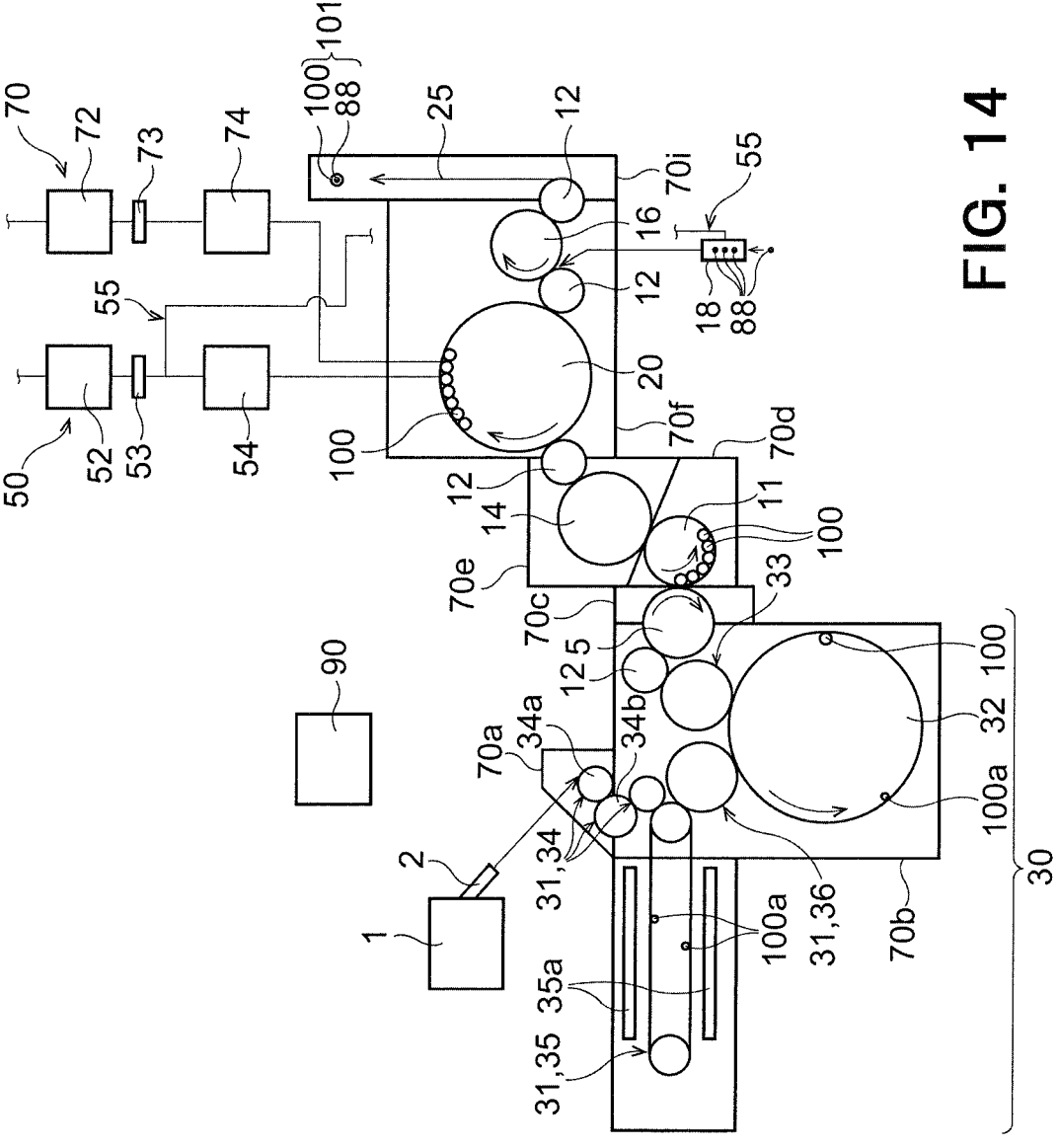
FIG. 14 schematically illustrates a plan view of another example of the fifth modification to the content-filling system according to an embodiment.

As illustrated in FIG. 14, the mixing tank 57 that mixes the water and the product undiluted solution may not be interposed between the water sterilization line 50 and the filling device 20 and between the undiluted-solution sterilization line 70 and the filling device 20. In this case, the filling device 20 may include multiple filling nozzles 20*a* (see FIG. 15) that fill the water and the product undiluted solution, and the water sterilization line 50 and the undiluted-solution sterilization line 70 may be connected to the filling nozzles 20*a*. The water and the product undiluted solution may be filled by using one of the filling nozzles 20*a*.

Figure 15:
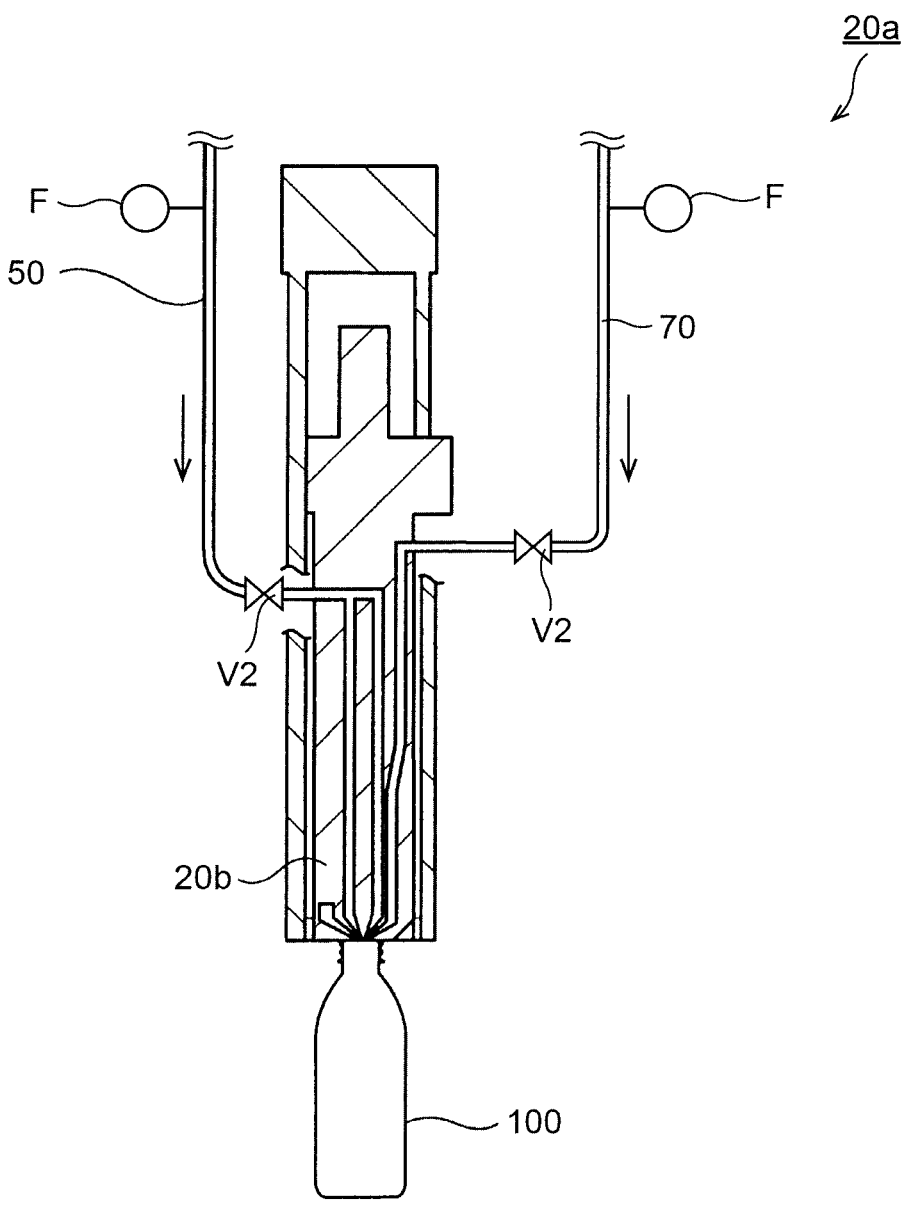
FIG. 15 schematically illustrates a sectional view of a filling nozzle of a filling device in another example of the fifth modification to the content-filling system according to an embodiment.

Specifically, as illustrated in FIG. 15, the filling nozzles 20*a* may include nozzle bodies 20*b*. The water sterilization line 50 and the undiluted-solution sterilization line 70 may be connected to the nozzle bodies 20*b*. The water sterilization line 50 and the undiluted-solution sterilization line 70 may include respective flow meters F that measure the flow rate of the water or the product undiluted solution and respective valves V2. A load cell may detect the actual weight of the water or the product undiluted solution that is filled, and the amount of the water or the product undiluted solution that is filled may be consequently measured. In this case, the order in which the water and the product undiluted solution are filled in the bottles 100 may be appropriately changed, for example, in consideration for bubbles in the bottles 100 or ease of mixing the water and the product undiluted solution. For example, the product undiluted solution may be filled after the water is filled, or the water may be filled after the product undiluted solution is filled. In the case where the water is filled after the product undiluted solution is filled, a risk of causing a stain due to the content to adhere to an end of each filling nozzle 20*a* can be reduced. The product undiluted solution may be filled after the water is filled, and subsequently, the water may be further filled. The water and the product undiluted solution may be simultaneously filled.

In an example illustrated in FIG. 14, in the case where the inside of the first sterile chamber 70*f* is cleaned (COP) and sterilized (SOP), a portion downstream of the third water tank 54 may be cleaned (CIP) and sterilized (SIP), for example, with a portion of the water sterilization line 50 up to the third water tank 54 kept sterile. Similarly, in the case where the filling device 20 that is contained in the first sterile chamber 70*f* is cleaned (CIP) and sterilized (SIP), the portion downstream of the third water tank 54 may be cleaned (CIP) and sterilized (SIP), for example, with the portion of the water sterilization line 50 up to the third water tank 54 kept sterile. Also in this case, the regions to be cleaned and sterilized can be narrowed. For this reason, the amount of the vapor that is used, for example, can be decreased. In addition, since the regions to be cleaned and sterilized can be narrowed, the time for cleaning and the time for sterilization can be decreased. For this reason, the amount of carbon dioxide that is discharged by the content-filling system 10 can be decreased.

Also according to the present modification, the amount of carbon dioxide that is discharged when the content is manufactured can be decreased, unlike the case where the product undiluted solution is diluted with sterile water that is manufactured by using a sterilizer that heats and sterilizes water. For this reason, the amount of carbon dioxide that is discharged by the content-filling system 10 can be decreased.

(Sixth Modification)

Figure 16A:
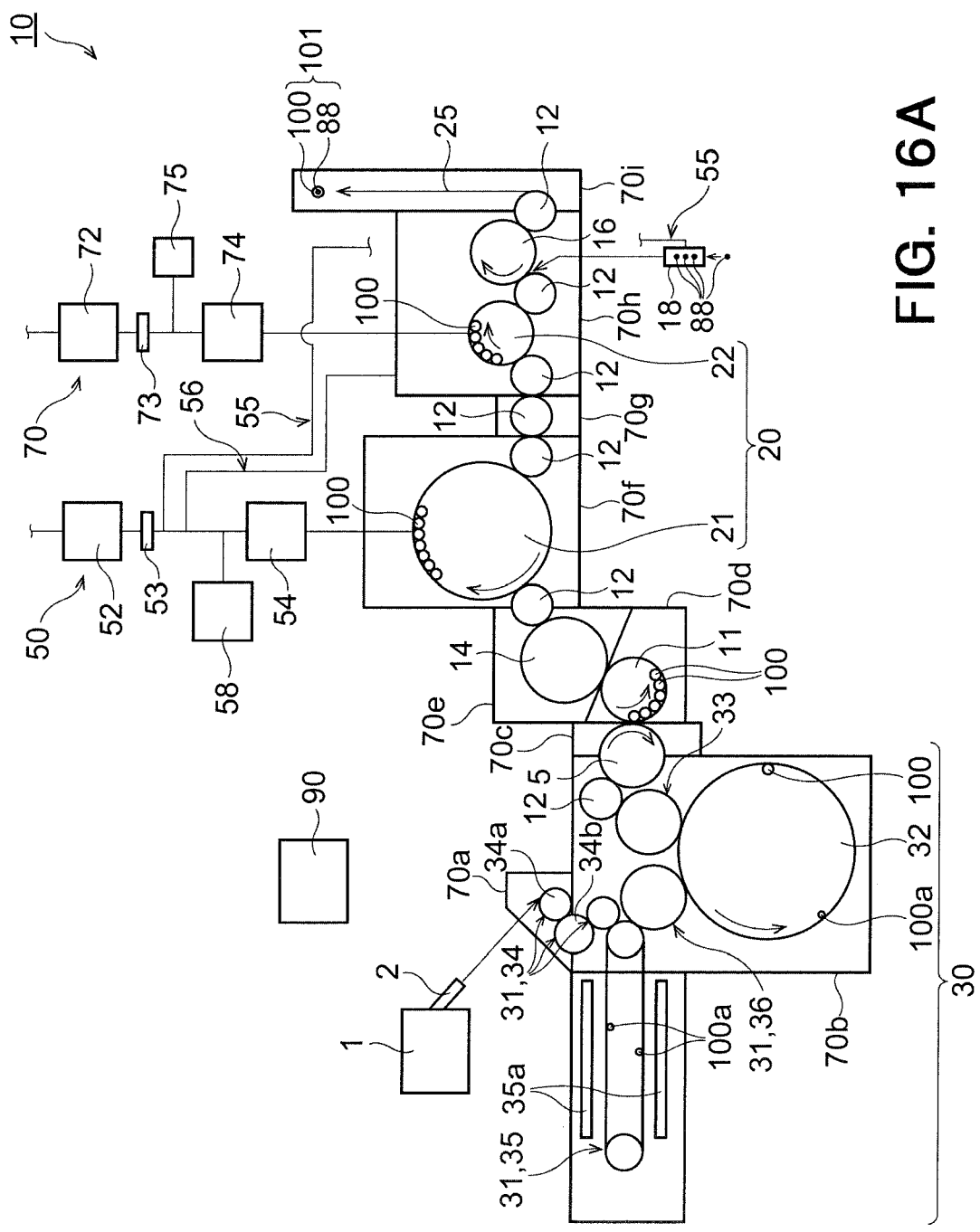
FIG. 16A schematically illustrates a plan view of a sixth modification to the content-filling system according to an embodiment.

In an example described according to the embodiment described above, the third water tank 54 is disposed downstream of the second water tank 52. In this case, as illustrated in FIG. 16A, a carbonic-acid-adding device 58 that adds carbonic acid into the water may be coupled upstream of the third water tank 54.

Figure 16B:
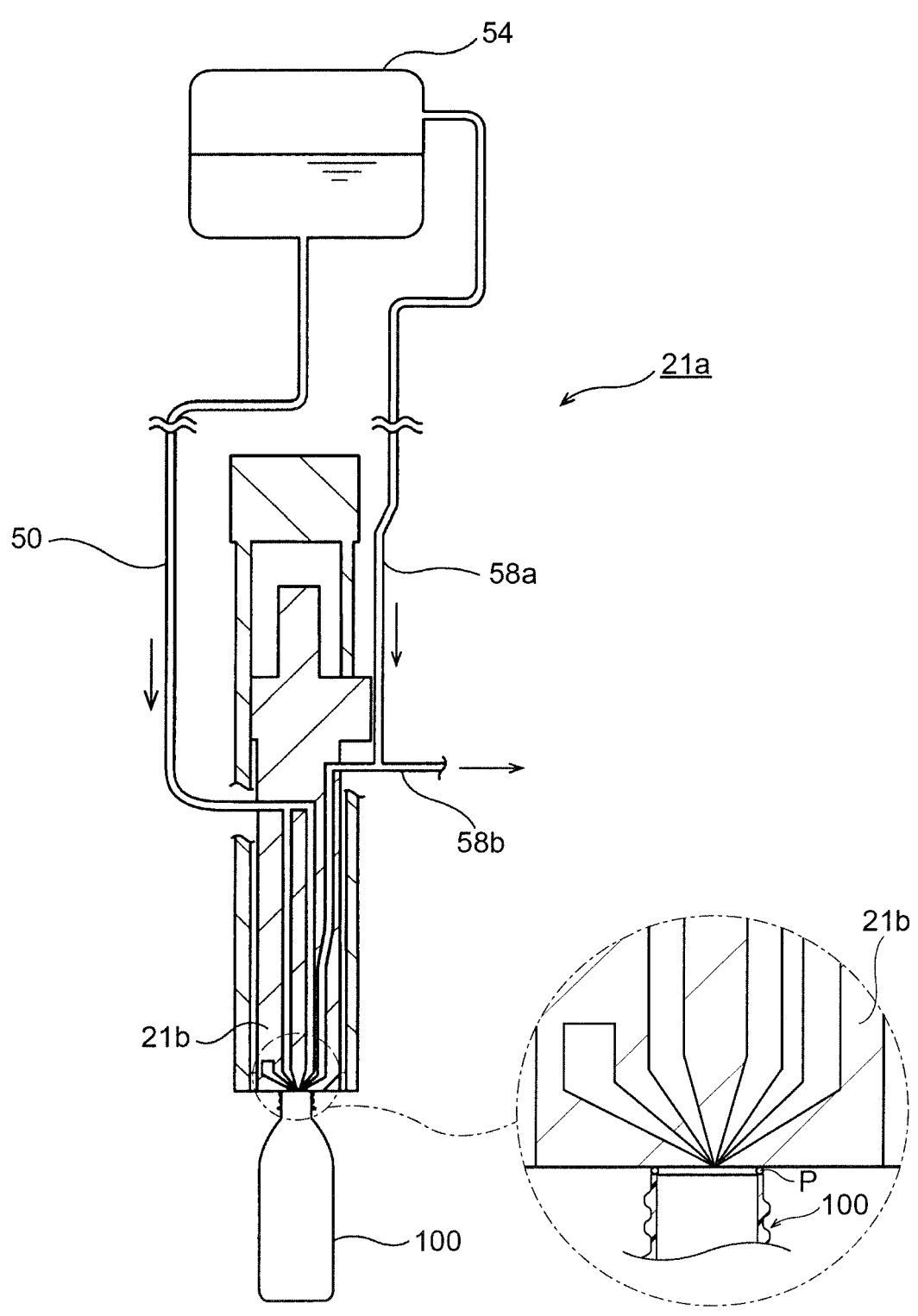
FIG. 16B schematically illustrates a sectional view of a water-filling nozzle of a water-filling device according to the sixth modification to the content-filling system according to an embodiment.

The water-filling device 21 includes multiple water-filling nozzles 21*a* (see FIG. 16B) that fill the water. According to the present modification, the water-filling nozzles 21*a* of the water-filling device 21 fill carbonated water. As illustrated in FIG. 16B, the water sterilization line 50 and a counter gas line 58*a* are connected to the water-filling nozzles 21*a*. Specifically, the water-filling nozzles 21*a* include nozzle bodies 21*b*. The water sterilization line 50 and the counter gas line 58*a* are connected to the nozzle bodies 21*b*. Of these, as for the water sterilization line 50, an end thereof is connected to the third water tank 54 in which sterile carbonated water is filled, and the other end is in communication with the insides of the bottles 100. The sterile carbonated water that is supplied from the third water tank 54 passes through the water sterilization line 50 and is injected into the bottles 100.

The counter gas line 58*a* supplies sterile carbon dioxide that is filled in the third water tank 54 toward the water-filling nozzles 21*a*. An end of the counter gas line 58*a* is connected to the third water tank 54, and the other end is in communication with the insides of the bottles 100. Gas for counter pressure composed of the sterile carbon dioxide that is supplied from the third water tank 54 passes through the counter gas line 58*a* and is filled in the bottles 100.

Snifting lines 58*b* for discharging the gas in the bottles 100 are connected to the respective water-filling nozzles 21*a*. Ends of the snifting lines 58*b* are connected to the counter gas line 58*a*. The gas in the bottles 100 is discharged from the other ends of the snifting lines 58*b* into the first sterile chamber 70*f* via the snifting lines 58*b*.

Packings P (seal members) that inhibit the gas in the bottles 100 from leaking by coming into close contact with the bottles 100 are disposed at ends of the respective water-filling nozzles 21*a*. When a carbonated beverage is filled in the bottles 100, the water-filling device 21 fills the carbonated beverage in the bottles 100 with the packings P being in close contact with the mouths of the bottles 100 (close contact filling). The sterile carbon dioxide for counter pressure can be inhibited from leaking from the bottles 100. For this reason, the internal pressure of the bottles 100 can be increased to pressure higher than atmospheric pressure such that the internal pressure of the bottles 100 is equal to the internal pressure of the third water tank 54. The water sterilization line 50, for example, may include, for example, a flow meter that measures the flow rate of, for example, the water and a valve although this is not illustrated.

According to the present modification, the carbonic-acid-adding device 58 that adds carbonic acid into the water is coupled upstream of the third water tank 54. This enables the carbonated beverage to be filled in the bottles 100 at the content-filling system 10. The carbonic-acid-adding device 58 is thus coupled with the water sterilization line 50, and the flavor of the previous content can be inhibited from being transferred to the carbonated water in the case where the carbonated water is filled as the content. Only in the case where the carbonated beverage is filled in the bottles 100, the water from the second water tank 52 may be supplied to the carbonic-acid-adding device 58 and cooled, carbon dioxide may be added by a sterile carbonator in a sterile manner, and the water containing carbonic acid may be supplied to the third water tank 54. In the case where the carbonated water is manufactured as the content, the undiluted-solution-filling device 22 may be used or may not be used.

Also in the case where the water-filling device 21 includes the water-filling nozzles 21a that can fill the carbonated water, the water-filling device 21 may fill the water that contains no carbon dioxide. In this case, at the content-filling system 10, mineral water may be manufactured by using only the water-filling device 21. Also in this case, the water-filling device 21 may fill the water with the packings P being in close contact with the mouths of the bottles 100. This can inhibit the water from spilling from the bottles 100 as much as possible. In this case, the water-filling device 21 may compress and fill the water. This enables the water to be filled in a short time. In the case where the bottles 100 have low pressure resistance, the water-filling device 21 preferably compresses and fills the water with the gas in the bottles 100 being to be discharged via the snifting lines 58b. For example, the water-filling device 21 preferably compresses and fills the water with the snifting lines 58b opened after the packings P are brought into close contact with the mouths of the bottles 100. This can inhibit the bottles 100 from deforming and/or breaking due to pressure even in the case where the water is compressed and filled. For this reason, the water can be filled in a short time, and the bottles 100 can be inhibited from deforming and/or breaking.

In the case where the undiluted-solution-filling device 22 is used together with the water-filling device 21, the level of the liquid surface of the water that is filled by the water-filling device 21 is lower than that in the case where only the water-filling device 21 is used. Accordingly, there is a low risk of causing the filled water to spill. For this reason, the filling rate at which the water is filled may be 100 mL/sec or more and is preferably 200 mL/sec or more. This enables the number of the water-filling nozzles 21a to be further decreased. In this case, the water can be filled in the bottles 100 with the internal pressure of the third water tank 54 being higher than the internal pressure of the third undiluted-solution tank 74. During the close contact filling, the internal pressure of the third undiluted-solution tank 74 may be 0.02 MPa or more and 0.1 MPa or less, and the internal pressure of the third water tank 54 may be 0.03 MPa or more and 0.9 MPa or less.

The water-filling device 21 may fill the water in the bottles 100 in a state in which the packings P are not in close contact with the mouths of the bottles 100 and gaps are formed between the water-filling nozzles 21a (the packings P) and the bottles 100 (over mouth filling). Also in this case, the water can be filled in the bottles 100 with the internal pressure of the third water tank 54 being higher than the internal pressure of the third undiluted-solution tank 74. Specifically, during the over mouth filling, the internal pressure of the third undiluted-solution tank 74 may be 0.02 MPa or more and 0.1 MPa or less, and the internal pressure of the third water tank 54 may be 0.03 MPa or more and 0.07 MPa or less.

Figure 16C:
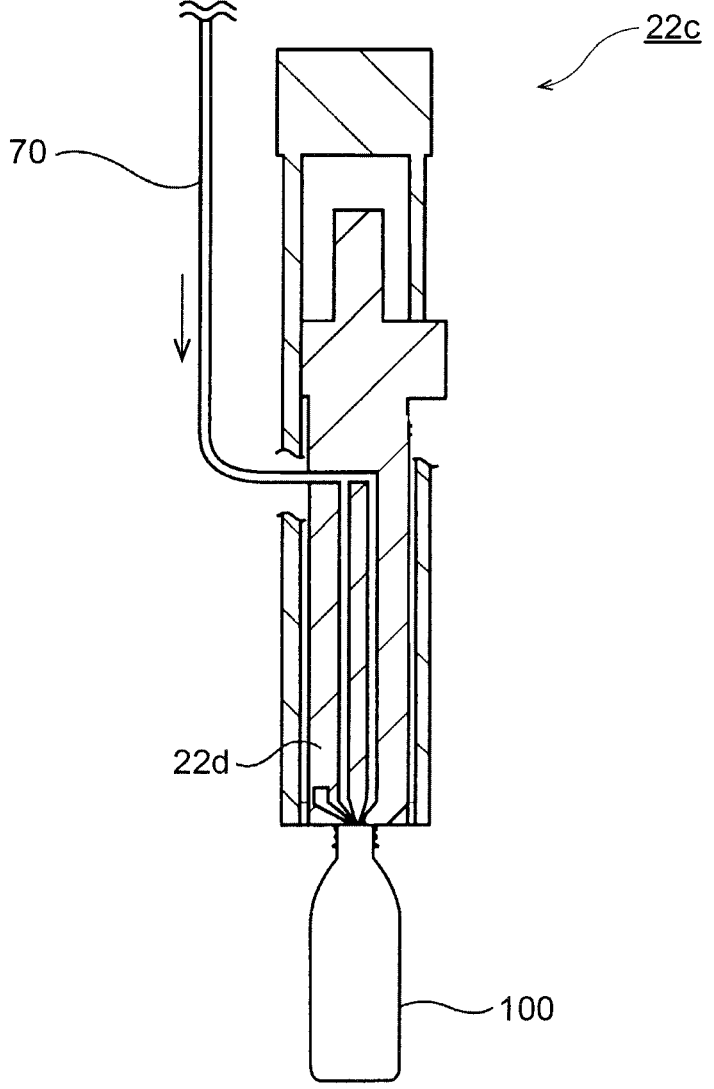
FIG. 16C schematically illustrates a sectional view of an undiluted-solution-filling nozzle of an undiluted-solution-filling device according to the sixth modification to the content-filling system according to an embodiment.

In the case where the undiluted-solution-filling device 22 is used together with the water-filling device 21, the water-filling device 21 may fill the water in the bottles 100 that are empty as described above. In this case, bubbles in the bottles 100 can be reduced, and accordingly, there is a low risk of causing a part of a filled liquid to splash toward a location outside the mouths of the bottles 100. The undiluted-solution-filling device 22 includes multiple undiluted-solution-filling nozzles 22c (see FIG. 16C) that fill the product undiluted solution. As illustrated in FIG. 16C, the undiluted-solution sterilization line 70 is connected to the undiluted-solution-filling nozzles 22c. Specifically, the undiluted-solution-filling nozzles 22c include nozzle bodies 22d. The undiluted-solution sterilization line 70 is connected to the nozzle bodies 22d. The undiluted-solution sterilization line 70 may include, for example, a flow meter that measures the flow rate of the product undiluted solution and a valve although this is not illustrated.

In the case where the water-filling device 21 fills the water in the bottles 100 that are empty as described above, bubbles in the bottles 100 can be reduced, and accordingly, there is a low risk of causing a part of the filled liquid to splash toward a location outside the mouths of the bottles 100. For this reason, the diameters of the water-filling nozzles 21a of the water-filling device 21 may be larger than the diameters of the undiluted-solution-filling nozzles 22c of the undiluted-solution-filling device 22. This enables the time for filling the water to be decreased. For example, the diameters of the water-filling nozzles 21a of the water-filling device 21 may be 1.2 times the diameters of the undiluted-solution-filling nozzles 22c of the undiluted-solution-filling device 22 or more and 1.5 times the diameters of the undiluted-solution-filling nozzles 22c of the undiluted-solution-filling device 22 or less. When the diameters of the water-filling nozzles 21a are equal to or more than 1.2 times the diameters of the undiluted-solution-filling nozzles 22c, the time for filling the water can be further decreased. When the diameters of the water-filling nozzles 21a are equal to or less than 1.5 times the diameters of the undiluted-solution-filling nozzles 22c, the risk of causing a part of the filled liquid to splash toward a location outside the mouths of the bottles 100 can be further reduced. The method of filling (the close contact filling or the over mouth filling), filling pressure, and/or the diameters of the water-filling nozzles 21a, for example, may be appropriately changed in order to decrease the number of the water-filling nozzles 21a of the water-filling device 21 and to enable the water-filling device 21 to be compact.

(Seventh Modification)

Figure 17A:
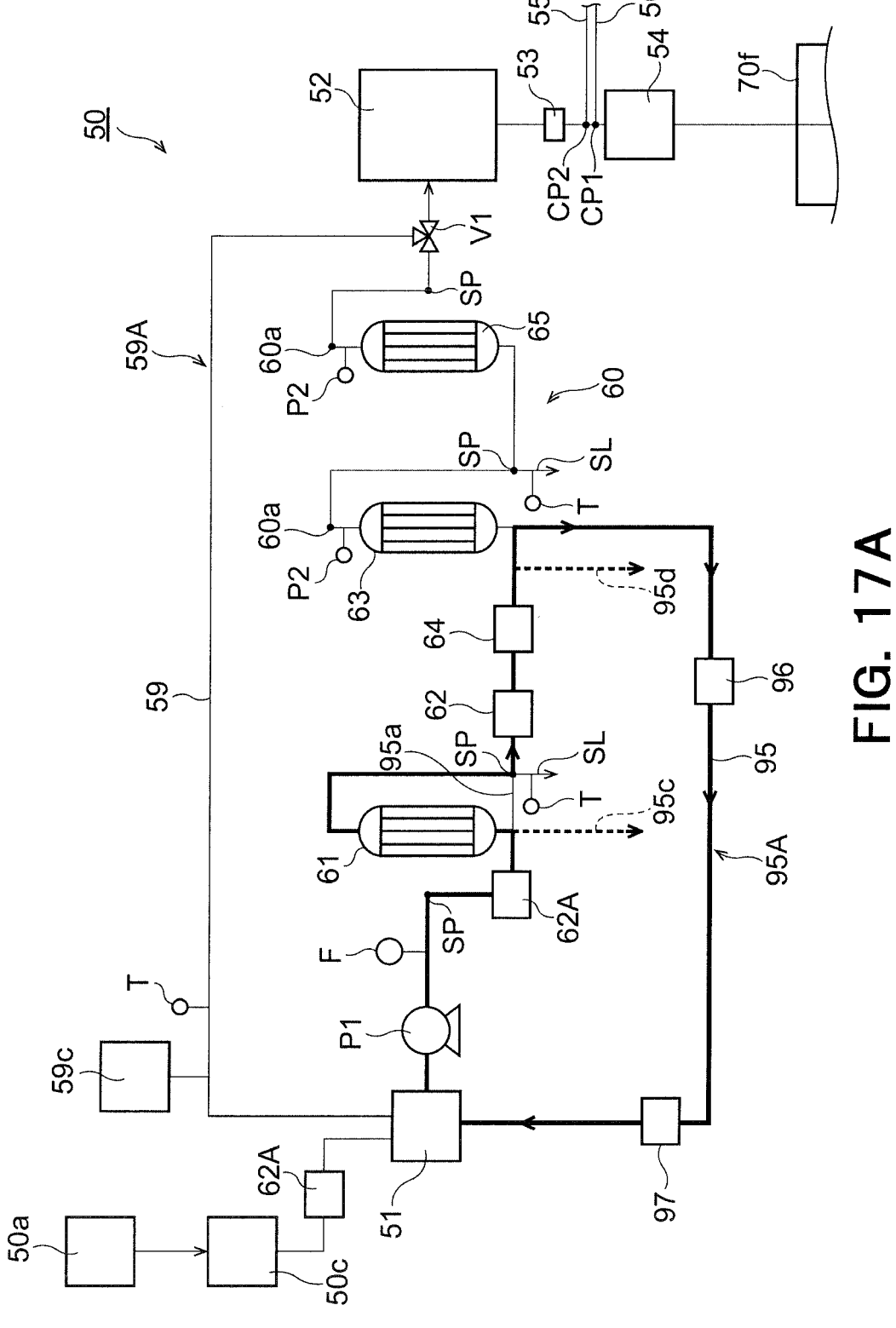
FIG. 17A schematically illustrates a water sterilization line according to a seventh modification to the content-filling system according to an embodiment.
Figure 17B:
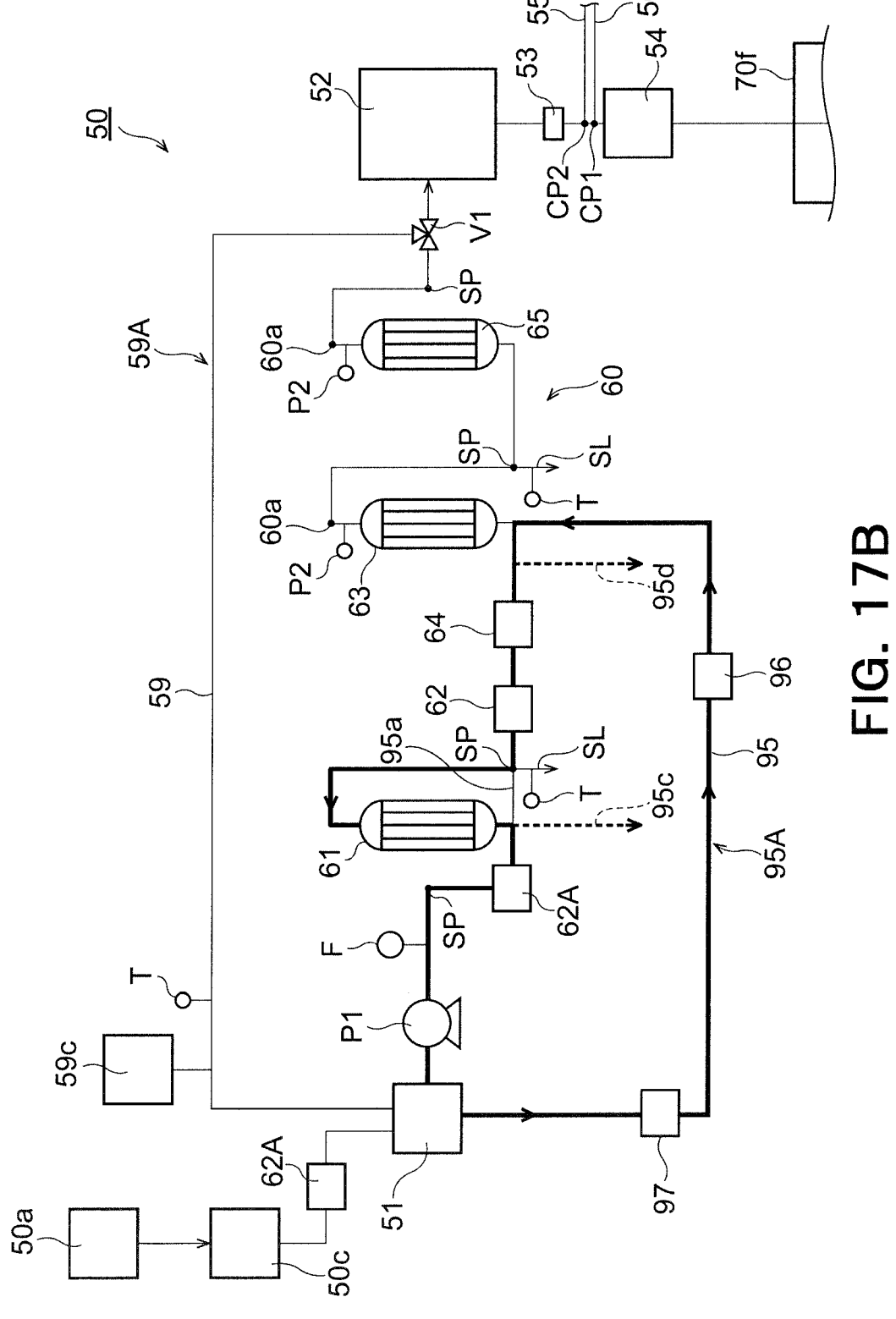
FIG. 17B schematically illustrates a water sterilization line in another example of the seventh modification to the content-filling system according to an embodiment.

In an example (see, for example, FIG. 2C) described according to the embodiment described above, the circulation system (the second circulation system) 95A includes the front sterilizer 62A, the third bypass line 95a, the first sterilizer 62, the second sterilizer 64, and the circulation line 95. In this case, the water may be circulated through the circulation system 95A with the first ultraviolet lamp 67a, for example, being lighted, and consequently, the microbes that are collected by the foreign-material removal filter 61 may be regularly killed. The microbes that are collected by the foreign-material removal filter 61 may be killed, for example, while the product bottles 101 are not manufactured. At this time, as illustrated in, for example, FIG. 17A, an end of the circulation line 95 may be connected between the second sterilizer 64 and the first sterile filter 63, and the other end of the circulation line 95 may be connected to the first water tank 51. The frequency of the pump P1 may be changed, and a difference (differential pressure) between pressure at a position upstream of the foreign-material removal filter 61 and pressure at a position downstream of the foreign-material removal filter 61 may be consequently changed. The difference (differential pressure) between the pressure at the position upstream of the foreign-material removal filter 61 and the pressure at the position downstream of the foreign-material removal filter 61 may be changed, and the microbes that are collected by the foreign-material removal filter 61 may be consequently actively pushed toward the position downstream of the foreign-material removal filter 61. Specifically, when the water is circulated through the circulation system 95A, and the microbes are consequently killed, the pressure at the position upstream of the foreign-material removal filter 61 may be higher than pressure when the product bottles 101 are manufactured by 0.05 MPa or more, preferably by 0.1 MPa or more. If the structure of the foreign-material removal filter 61 has no problem, as illustrated in FIG. 17B, the water may be caused to flow in the opposite direction, and the microbes that are collected by the foreign-material removal filter 61 may be consequently circulated through the circulation system 95A. In these cases, the difference between the pressure at the position upstream of the foreign-material removal filter 61 and the pressure at the position downstream of the foreign-material removal filter 61 is adjusted within the permissible maximum pressure as for the positive pressure and the negative pressure of the foreign-material removal filter 61. The microbes that are collected by the foreign-material removal filter 61 are thus regularly killed, and the sterile properties of the water that is sterilized by the water sterilization line 50 can be consequently guaranteed even in the case where the water is continuously sterilized by the water sterilization line 50 for a long time.

(Eighth Modification)

Figure 17C:
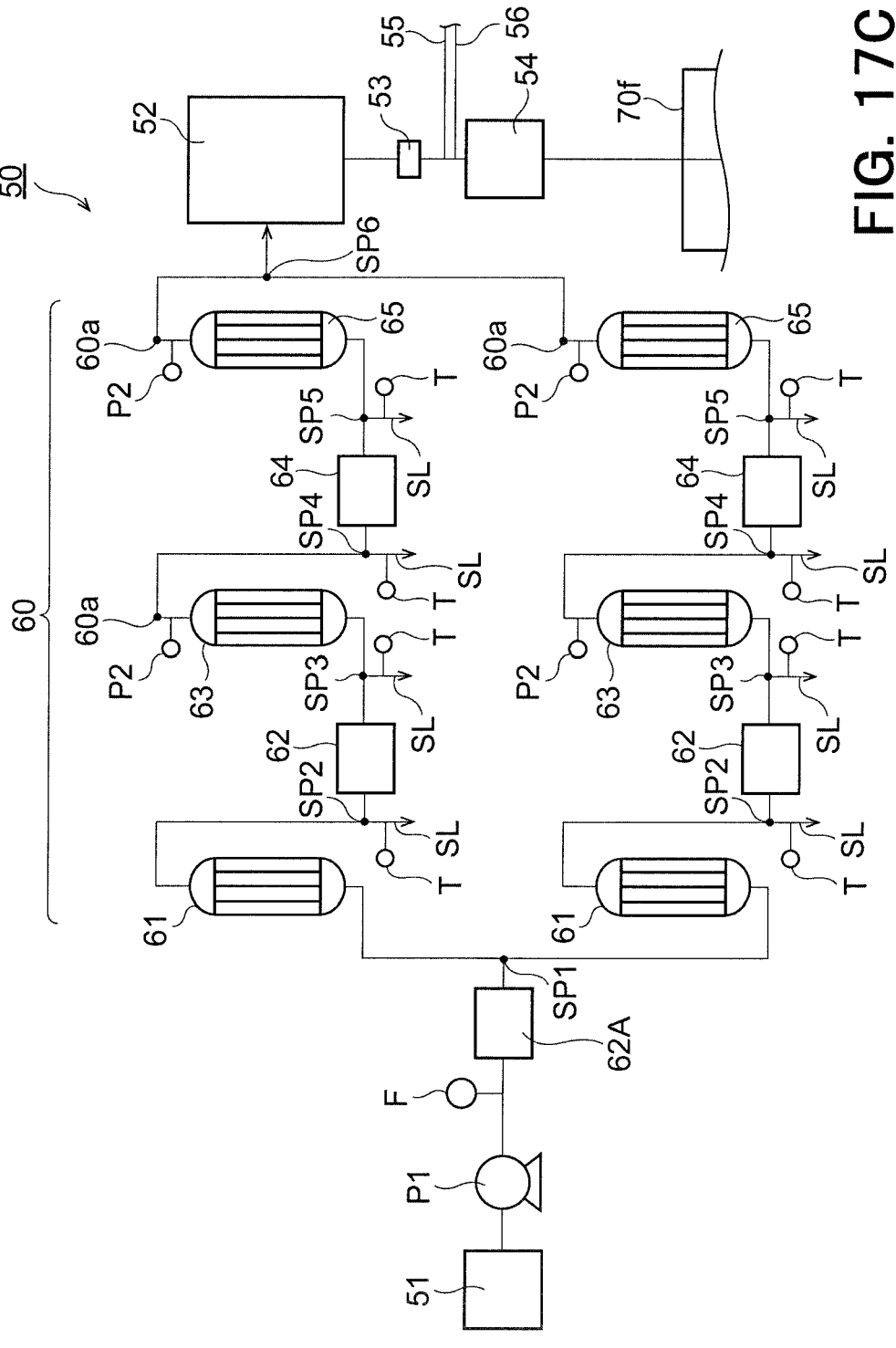
FIG. 17C schematically illustrates a water sterilization line according to an eighth modification to the content-filling system according to an embodiment.

In an example described according to the embodiment described above, the water sterilization line 50 includes the first water tank 51, the water sterilizer 60, and the second water tank 52. In this case, as illustrated in FIG. 17C, the water sterilization line 50 may include multiple (for example, two) water sterilizers 60. This enables the sterile properties of the water to be guaranteed by the other water sterilizer 60 even in the case where one of the water sterilizers 60 stops, or in the case where the irradiation amount of the ultraviolet rays decreases at one of the water sterilizers 60. In the case where one of the water sterilizers 60 is cleaned (CIP) or sterilized (SIP), the water can be sterilized by using the other water sterilizer 60. For this reason, the product bottles 101 can be continuously manufactured. For example, in the case where while one of the water sterilizers 60 is cleaned (CIP) or sterilized (SIP), the inside of the second sterile chamber 70h, for example, is cleaned by using the other water sterilizer 60, the water that is supplied to, for example, the second sterile chamber 70h can be inhibited from lacking. For example, in the case where while the first sterile filter 63 of one of the water sterilizers 60, for example, is sterilized (SIP) or the integrity test is conducted, and the inside of the second sterile chamber 70h, for example, is cleaned by using the other water sterilizer 60, the water that is supplied to, for example, the second sterile chamber 70h can be inhibited from lacking. In an example illustrated in FIG. 17C, the structures of the water sterilizers 60 are the same as the structure of the water sterilizer 60 illustrated in FIG. 2A, but this is not a limitation. Each water sterilizer 60, for example, may be the water sterilizer 60 illustrated in any one of FIG. 2B to FIG. 2M although this is not illustrated. In the case where the water sterilization line 50 includes the multiple water sterilizers 60, the water sterilizers 60 that are included in the water sterilization line 50 may differ from each other. For example, the water sterilization line 50 may include the water sterilizer 60 illustrated in FIG. 2A and the water sterilizer 60 illustrated in FIG. 2C.

(Ninth Modification)

In an example described according to the embodiment described above, the water sterilizer 60 includes the foreign-material removal filter 61, the first sterilizer 62, the first sterile filter 63, the second sterilizer 64, and the second sterile filter 65, but this is not a limitation. For example, in the case where the hygiene of the pure water that is manufactured by the pure-water-manufacturing device 50a is high, and no mold is detected in the first water tank 51, the water sterilizer 60 may not include the foreign-material removal filter 61. In the case where the number of the microbes in the first water tank 51 is large, the water sterilizer 60 may further include a third sterilizer (not illustrated) that is disposed upstream of the foreign-material removal filter 61. In this case, the structure of the third sterilizer may be substantially the same as that of the first sterilizer 62 illustrated in FIG. 3 to FIG. 6B. That is, the third sterilizer may sterilize the water by using ultraviolet rays.

(Tenth Modification)

Figure 18A:
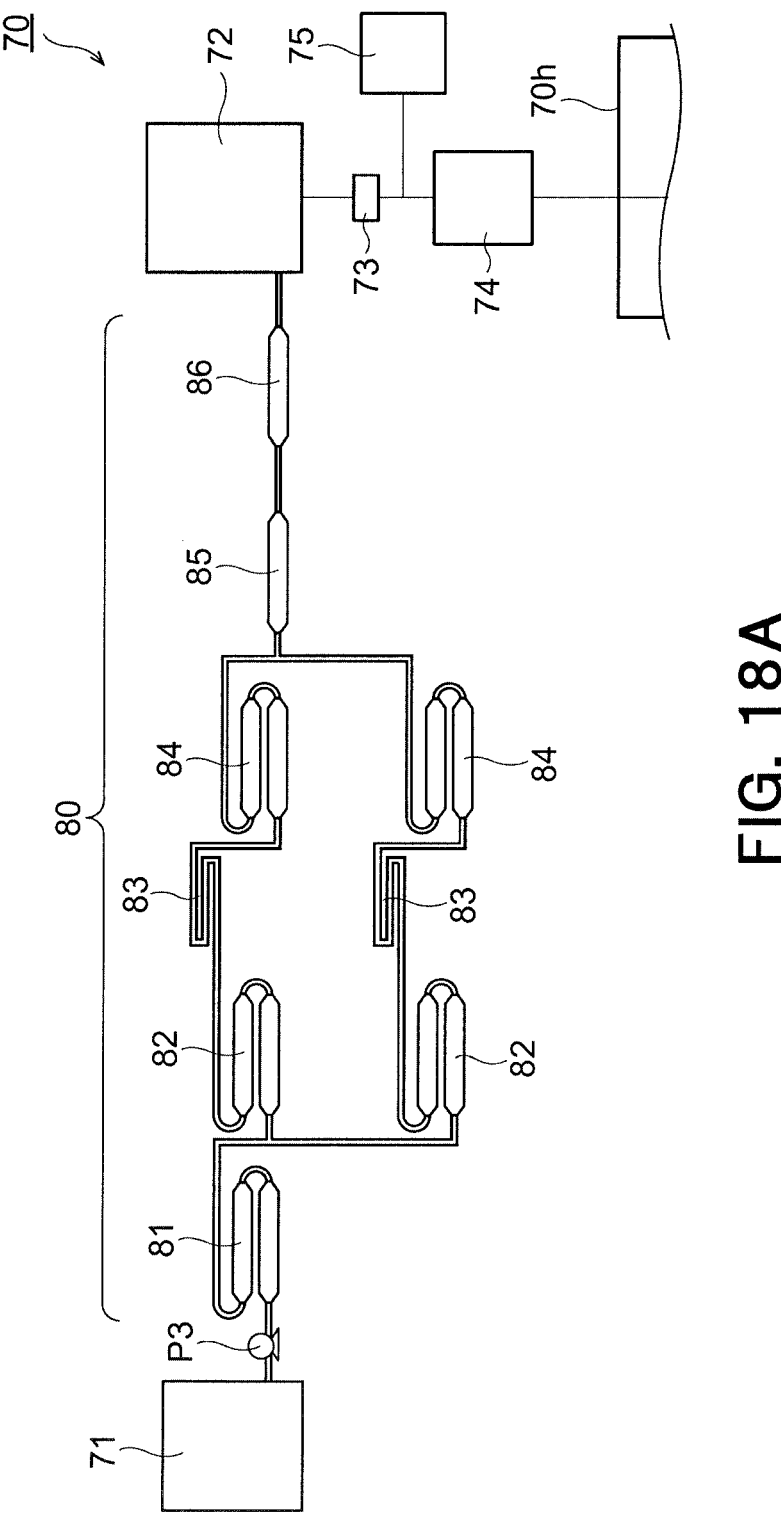
FIG. 18A schematically illustrates an undiluted-solution sterilization line according to a tenth modification to the content-filling system according to an embodiment.

In an example described according to the embodiment described above, the UHT 80 includes the first heating portion 81, the second heating portion 82, the holding tube 83, the first cooling portion 84, the second cooling portion 85, and the third cooling portion 86. In this case, as illustrated in FIG. 18A, the UHT 80 may include multiple (for example, two) second heating portions 82, multiple (for example, two) holding tubes 83, and multiple (for example, two) first cooling portions 84. This enables the product undiluted solution to be sterilized by using, for example, the other holding tube 83 even in the case where a charred substance, for example, adheres to, for example, one of the second heating portions 82, one of the holding tubes 83 or one of the first cooling portions 84. That is, in the case where one of the holding tubes 83, for example, is cleaned (CIP), sterilized (SIP), or cleaned and sterilized (CSIP), the product undiluted solution can be sterilized by using, for example, the other holding tube 83. For this reason, the product bottles 101 can be continuously manufactured.

(Eleventh Modification)

In an example described according to the embodiment described above, the product-undiluted-solution sterilizer 80 is the UHT, but this is not a limitation. For example, the product-undiluted-solution sterilizer 80 may be an ohmic (joule) heating sterilizer that directly conducts electricity though the product undiluted solution for self-heat generation. The product-undiluted-solution sterilizer 80 may sterilize the product undiluted solution by using a microwave (at 915 MHz or 2450 MHz). In this case, the microwave may be radiated from a location outside a pipe through which the product undiluted solution or the solid passes. This enables the temperature of the product undiluted solution or the solid to be increased and enables the product undiluted solution or the solid to be sterilized. Also in these cases, the amount of carbon dioxide that is discharged by the content-filling system 10 can be decreased.

(Twelfth Modification)

In an example described according to the embodiment described above, the filling device 20 (the water-filling device 21 and the undiluted-solution-filling device 22) is a so-called rotary filler, but this is not a limitation. For example, the filling device 20 may be a so-called linear sterile filling device that fills, for example, the water in a container (such as a cup or a paper container) that is conveyed by, for example, a conveyor. In this case, for example, the sterile water may be first filled, and the product undiluted solution may be subsequently filled. An undiluted-solution-filling device 22 that fills a product undiluted solution or a solid that has flavor may be disposed downstream of the undiluted-solution-filling device 22 that fills the product undiluted solution. The order in which the sterile water and the product undiluted solution are filled is not limited thereto. For example, the product undiluted solution may be first filled, and the sterile water may be subsequently filled. The sterile water and the product undiluted solution may be filled by using one of the filling nozzles 20*a* as described with reference to FIG. 15.

Figure 18B:
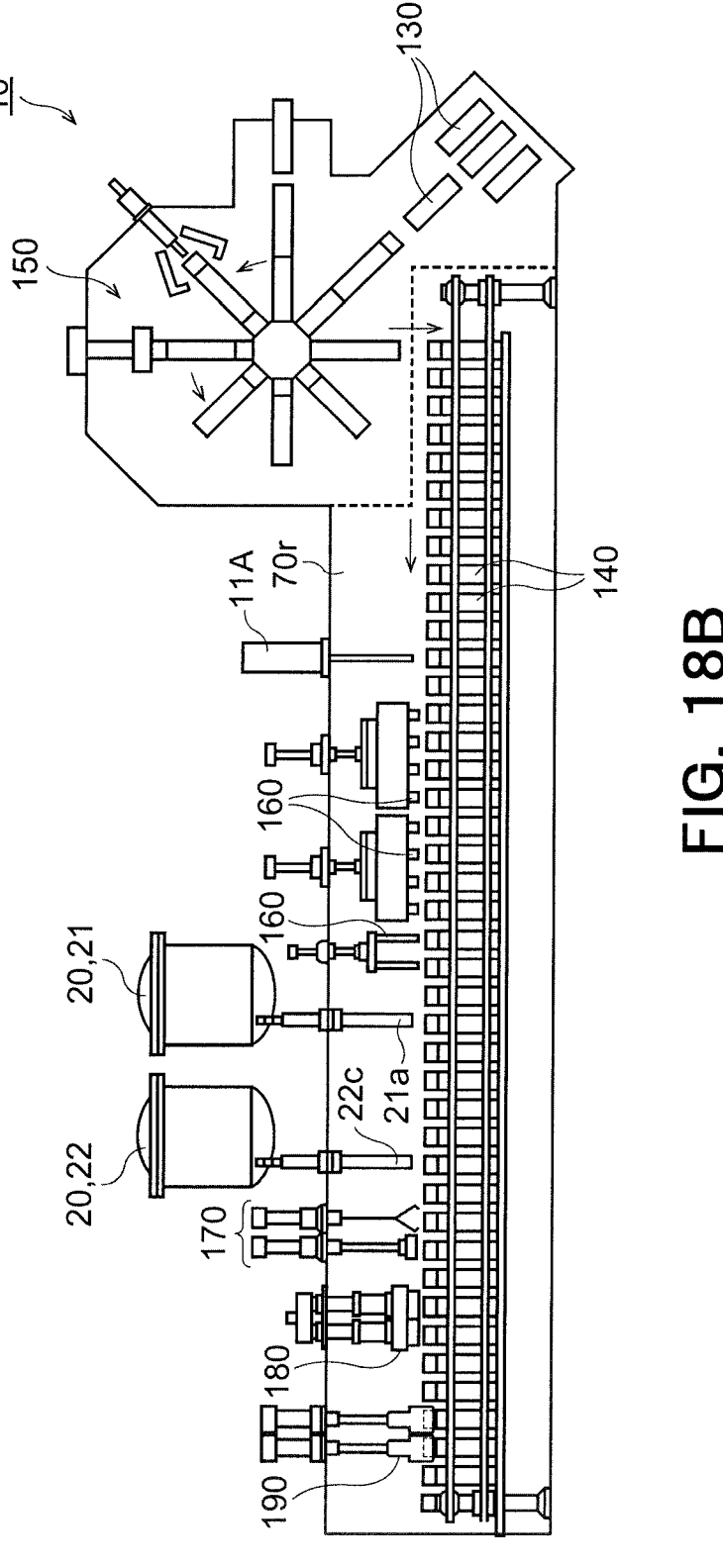
FIG. 18B schematically illustrates a plan view of a twelfth modification to the content-filling system according to an embodiment.

In the case where the filling device 20 is the so-called linear sterile filling device, as illustrated in FIG. 18B, the content-filling system 10 may include a container-molding unit 150 that molds containers 140 (paper containers or cartons) by using packaging materials 130 (sleeves). The container-molding unit 150 may be disposed in an eleventh sterile chamber 70*r*. A conveyor 125 that conveys the containers 140 may be disposed in the eleventh sterile chamber 70*r*. The content-filling system 10 may include a sterilizing-agent-spraying nozzle 11A, air-rinsing nozzles 160, a folding portion 170, a heating portion 180, and a seal portion 190. Among these, the sterilizing-agent-spraying nozzle 11A sprays a sterilizing agent to the inner and outer surfaces of the containers 140. The air-rinsing nozzles 160 blow sterile air to the inner surface of the containers 140. The folding portion 170 folds the containers 140. The heating portion 180 heats the containers 140. The seal portion 190 seals the containers 140. The sterilizing-agent-spraying nozzle 11A, the air-rinsing nozzles 160, the water-filling device 21, the undiluted-solution-filling device 22, the folding portion 170, the heating portion 180, and the seal portion 190 may be arranged in this order from an upstream position to a downstream position in the direction in which the containers 140 are conveyed. As for the content-filling system 10, the water and the product undiluted solution may be simultaneously filled in each of the containers 140 via the water-filling nozzles 21*a* and the undiluted-solution-filling nozzles 22*c*. The order in which the water and the product undiluted solution are filled in the containers 140 may be appropriately changed, for example, in consideration for bubbles in the containers 140, ease of mixing the water and the product undiluted solution, or manufacturing capacity. The sterile water and the product undiluted solution may be filled by using one of the filling nozzles 20*a* as described with reference to FIG. 15.

Figure 18C:
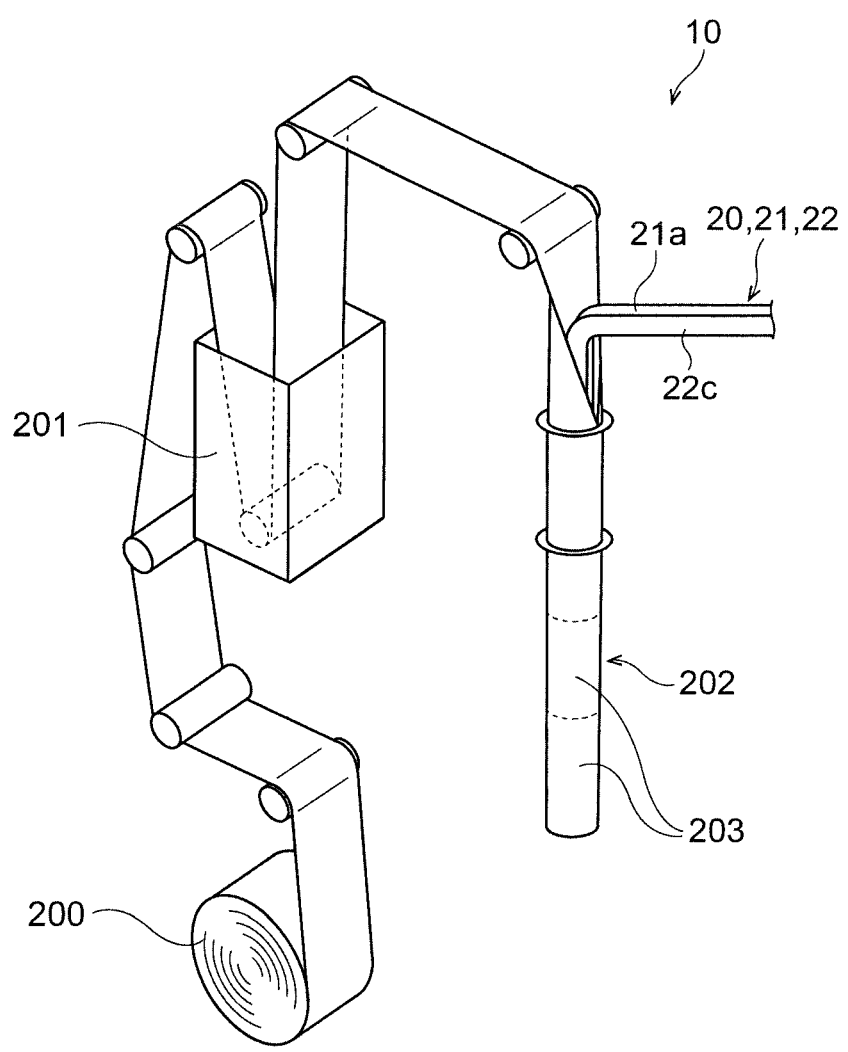
FIG. 18C schematically illustrates a perspective view of another example of the twelfth modification to the content-filling system according to an embodiment.

The content-filling system 10 may not be a sterile filling system that molds the containers 140 by using the packaging materials 130 (the sleeves) but may be a so-called roll-supply sterile filling system. The roll-supply sterile filling system molds a container (a paper container or a pouch) by using, for example, a packaging material that is supplied in the form of a roll and fills the content in the molded container. In this case, as illustrated in FIG. 18C, a packaging material 200 that is supplied in the form of a roll is first immersed in a sterilization liquid (such as hydrogen peroxide) in a sterilization tank 201 and is consequently sterilized. After gas or mist of the sterilizing agent is blown to both surfaces of the packaging material, the sterilizing agent may be dried and removed by using hot air, and both surfaces of the packaging material may be consequently sterilized. An electron beam may be radiated to both surfaces of the packaging material, and both surfaces of the packaging material may be consequently sterilized. Subsequently, at a molding portion 202, a predetermined process is performed on the packaging material, and a container (a paper container or a pouch) 203 is molded. In an example illustrated, at the molding portion 202, a heat sealing process, for example, is performed on the packaging material, and the paper container 203 is consequently molded. At this time, the water and the product undiluted solution may be simultaneously filled via the water-filling nozzle 21*a* and the undiluted-solution-filling nozzle 22*c*. The sterile water and the product undiluted solution may be filled by using one of the filling nozzles 20*a* as described with reference to FIG. 15 although this is not illustrated. Subsequently, at the molding portion 202, the paper container 203 is cut into a predetermined shape, and a product that contains the content is consequently obtained.

(Thirteenth Modification)

In the case described according to the embodiment described above, sterilizing devices for hydrogen peroxide sterilization are used as the sterilizing device for the preforms and the sterilizing device for the containers, but this is not a limitation. For example, a sterilizing device for hydrogen peroxide sterilization may be the sterilizing device for the preforms or the sterilizing device for the containers. The sterilizing device for the preforms and the sterilizing device for the containers may use a peracetic acid sterilization method in which the inner and outer surfaces of the bottles are sterilized by using a peracetic acid solution (or gas, mist, or a mixture thereof), and subsequently, the inner and outer surfaces are rinsed in a sterile manner. The sterilizing device for preforms and the sterilizing device for the containers may use, for example, peracetic acid, acetic acid, peroxynitric acid, nitric acid, sodium hypochlorite, chlorine, or caustic soda alone as the sterilizing agent other than hydrogen peroxide and ethanol or may use a combination of two or more of these as the sterilizing agent. A sterilizing device may be used not only to sterilize the bottles but also to sterilize a cup, a pouch, a paper container or a composite thereof. The sterilizing device for the preforms may sterilize the preforms by chemical spraying, or chemical rinsing, or by using vapor, sterile water, sterile air, electron beams, X-rays, or ultraviolet rays. Similarly, the sterilizing device for the containers may sterilize the containers by chemical spraying, or chemical rinsing, or by using vapor, sterile water, sterile air, electron beams, X-rays, or ultraviolet rays.

(Fourteenth Modification)

In the case described according to the embodiment described above, the content-filling system 10 includes the bottle-molding unit 30, but this is not a limitation. For example, the content-filling system may sequentially receive the bottles 100 that are molded and that are empty from the outside, for example, through air transportation and may convey the bottles 100 that are received toward the sterilizing device 11. Also in this case, the effects described above can be exerted.

(Fifteenth Modification)

In the case described by way of example according to the embodiment described above, the content-filling system 10 fills the content in the bottles 100, but this is not a limitation. The content-filling system 10 according to the present embodiment can be used for a filling system that fills a so-called chilled beverage such as a milk beverage in a container such as a cup. Also in this case, the amount of carbon dioxide that is discharged when the content is manufactured can be decreased, unlike the case where the product undiluted solution is diluted with sterile water that is manufactured by using a sterilizer that heats and sterilizes water. For this reason, the amount of carbon dioxide that is discharged by the content-filling system 10 can be decreased. In the case where the content is, for example, a milk beverage, the number of the microbes in the product undiluted solution can increase. Even in the case where the number of the microbes in the product undiluted solution thus increases, the product undiluted solution is heated and sterilized. For this reason, even when the content is, for example, a milk beverage, the sterile properties of the content can be sufficiently ensured. At the content-filling system 10 according to the present embodiment, a freely selected liquid to be sterilized (such as seasoning, an alcohol beverage, or a milk beverage) may be filled in a container.

(Sixteenth Modification)

In the case described by way of example according to the embodiment described above, the content-filling system 10 fills the content in the bottles 100, but this is not a limitation. For example, the content-filling system 10 may fill the water (or the product undiluted solution, or the content) in the preforms 100a and may consequently mold the bottles 100 by using the preforms 100a (so-called Blow-Fill-Seal (BFS)).

In this case, as illustrated in FIG. 18D1, a part of the filling device 20 (in an example illustrated, the water-filling device 21) may be incorporated into the bottle-molding unit 30. For example, in the case where the product undiluted solution is filled in the preforms 100a, and the bottles 100 are consequently molded by using the preforms 100a although this is not illustrated, the undiluted-solution-filling device 22 may be incorporated into the bottle-molding unit 30.

As illustrated in FIG. 18D1, at the preform-conveying unit 31 of the bottle-molding unit 30, the preform-sterilizing device 34a may be disposed downstream of the heating portion 35. The preform-sterilizing device 34a may sterilize the preforms 100a that are heated by the heating portion 35. The preform-sterilizing device 34a may be disposed in a twelfth sterile chamber 70s.

According to the present modification, at the water-filling device 21, compressed water can be filled in the preforms 100a that are sterilized. This enables the bottles 100 to be molded simultaneously while the water is filled in the bottles 100.

In an example described according to the present modification, the filling device 20 includes the water-filling device 21 that is connected to the water sterilization line 50 and the undiluted-solution-filling device 22 that is connected to the undiluted-solution sterilization lines 70, but this is not a limitation. For example, as illustrated in FIG. 18D2, the content-filling system 10 may include the single filling device 20. In this case, the mixing tank 57 that mixes the water and the product undiluted solution may be interposed between the water sterilization line 50 and the filling device 20 and between the undiluted-solution sterilization lines 70 and the filling device 20 as described with reference to FIG. 13. The mixing tank 57 that mixes the water and the product undiluted solution may not be interposed between the water sterilization line 50 and the filling device 20 and between the undiluted-solution sterilization lines 70 and the filling device 20 as described with reference to FIG. 14 and FIG. 15 although this is not illustrated. In these cases, at the filling device 20, compressed content (or water, or product undiluted solution) can be filled in the preforms 100a that are sterilized. This enables the bottles 100 to be molded simultaneously while the content, for example, is filled in the bottles 100.

(Seventeenth Modification)

In an example described according to the embodiment described above, the water sterilizer 60 sterilizes the water having an electrical conductivity of 0.1 μS/cm or more and 20 μS/cm or less, but this is not a limitation. For example, the water that is sterilized by the water sterilizer 60 may have the electrical conductivity more than 20 μS/cm. In this case, the water may be tap water or well water. That is, the water that is sterilized by the water sterilizer 60 may not be used as water for a soft drink but may be used as mineral water, purified water for manufacturing medicine, water for injection, or another water. In the case where the water for manufacturing medicine, for example, is sterilized, it is necessary to inactivate or reduce endotoxin in addition to the microbes. In this case, the cumulative irradiation amount of the ultraviolet rays to the water is preferably 500 mJ/cm$^2$ or more. This enables the endotoxin to be inactivated or reduced.

Figure 18E:
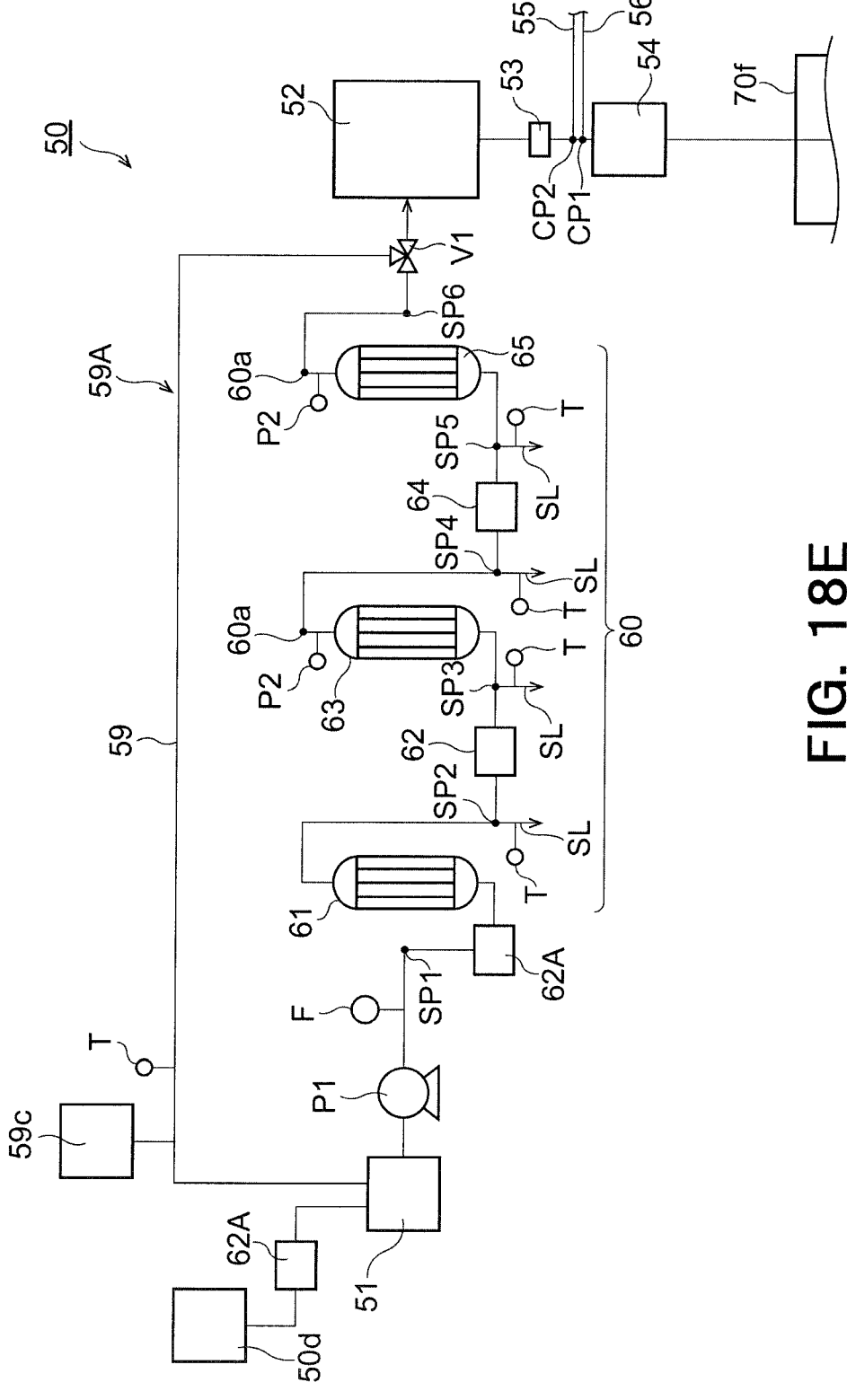
FIG. 18E schematically illustrates a water sterilization line according to a seventeenth modification to the content-filling system according to an embodiment.

According to the present modification, as illustrated in FIG. 18E, the water sterilization line 50 may include a front water tank 50d that is disposed upstream of the first water tank 51 and that stores water (such as tap water or well water). In the case where the water sterilizer 60 sterilizes, for example, tap water, an inorganic substance (such as a calcium oxide), for example, can adhere to a surface (for example, a surface composed of quartz glass) of a quartz sleeve that protects, for example, the first ultraviolet lamp 67a. In the case where the inorganic substance, for example, adheres to the surface of the quartz sleeve of, for example, the first ultraviolet lamp 67a, the intensity (the irradiation amount) of the ultraviolet rays at the water sterilizer 60 can decrease. For this reason, in the case where the intensity (the irradiation amount) of the ultraviolet rays at the water sterilizer 60 decreases, it is preferable that the water sterilizer 60 be cleaned (CIP) and sterilized (SIP) and that the inorganic substance adhering to the surface of the quartz sleeve, for example, be consequently removed.

In this case, the water sterilization line 50 may include the multiple (for example, two) water sterilizers 60 as described with reference to FIG. 17C. This enables the water to be sterilized by using the other water sterilizer 60 in the case where one of the water sterilizers 60 is cleaned (CIP) or sterilized (SIP). For this reason, the product bottles 101 can be continuously manufactured. When the water sterilizers 60 are cleaned (CIP) and sterilized (SIP), the sterilizing agent or the detergent may not pass through the foreign-material removal filter 61 and the first sterile filter 63. That is, the sterilizing agent or the detergent may pass through the third bypass line 95a and the fourth bypass line 95b, and only the first sterilizer 62 and the second sterilizer 64 may be consequently cleaned and sterilized as described with reference to FIG. 2B and FIG. 2C.

(Modifications to Method of Sterilizing Content-Filling System)

Modifications to the method of sterilizing the content-filling system will now be described.

(First Modification)

Figure 19:
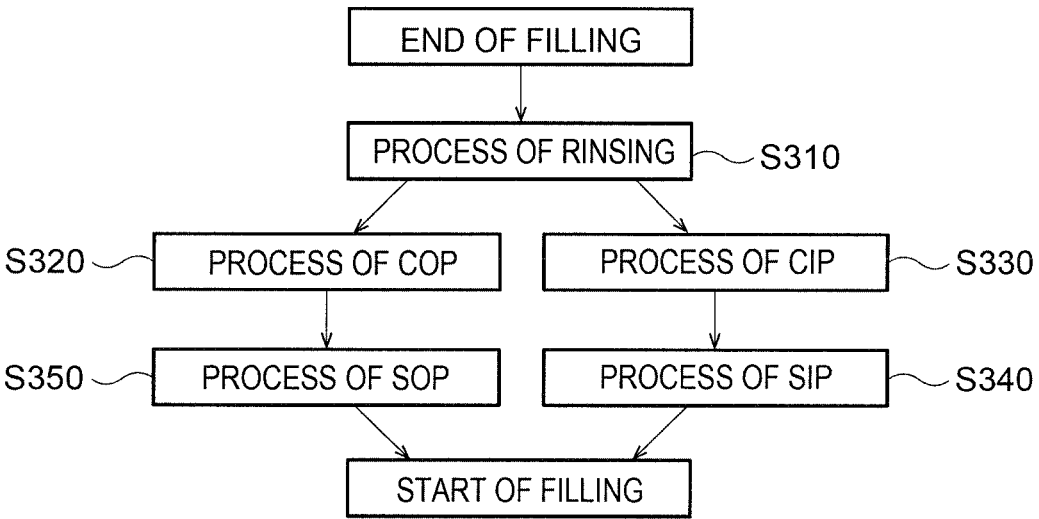
FIG. 19 is a flowchart illustrating a first modification to the method of sterilizing the content-filling system according to an embodiment.

In an example described according to the embodiment described above, the method of sterilizing the chambers includes the process of COP (the symbol S12 in FIG. 9), the process of CIP (the symbol S13 in FIG. 9), the process of SIP (the symbol S14 in FIG. 9), and the process of SOP (the symbol S15 in FIG. 9) that are sequentially performed, but this is not a limitation. As for the method of sterilizing the chambers, as illustrated in, for example, FIG. 19, the process of COP (a symbol S320 in FIG. 19) and the process of CIP (a symbol S330 in FIG. 19) may be simultaneously performed after the process of rinsing (a symbol S310 in FIG. 19). The process of SIP (a symbol S340 in FIG. 19) and the process of SOP (a symbol S350 in FIG. 19) may be simultaneously performed after the process of COP and the process of CIP. This enables the downtime to be greatly decreased and enables the productivity of the product bottles 101 to be improved.

Figure 20:
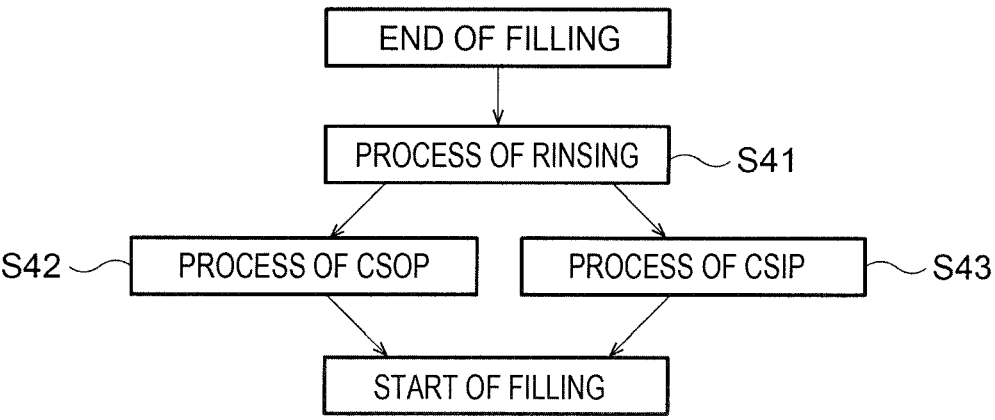
FIG. 20 is a flowchart illustrating another example of the first modification to the method of sterilizing the content-filling system according to an embodiment.
Figure 21:
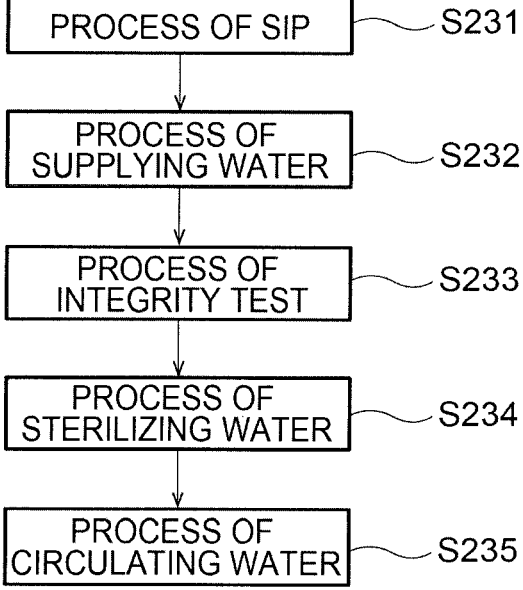

As for the method of sterilizing the chambers, as illustrated in FIG. 20, a process of CSOP (a symbol S42 in FIG. 20) in which the process of COP and the process of SOP are simultaneously performed, and a process of CSIP (a symbol S43 in FIG. 20) in which the process of CIP and the process of SIP are simultaneously performed may be simultaneously performed after the process of rinsing (a symbol S41 in FIG. 20). In this case, for example, during the process of CSOP, detergent having a temperature of 70° C. or more is preferably sprayed to the inside of the intermediate area chamber 70*g* and the inside of the second sterile chamber 70*h* at least for one minute or more, preferably five minutes or more. Consequently, the inner wall surface of, for example, the intermediate area chamber 70*g* and the surface of the equipment of, for example, the filling device 20 are purified and sterilized. For example, during the process of CSIP, a flow path for the product undiluted solution in the undiluted-solution-filling device 22 is rinsed by using sterile water, and the detergent having a temperature of 70° C. or more is supplied to a circulation path (not illustrated) including the flow path. The detergent is preferably circulated through the circulation path at least for five minutes or more, preferably 10 minutes or more. Consequently, the flow path for the product undiluted solution in the undiluted-solution-filling device 22 is sterilized. Also in this case, the downtime can be greatly decreased and the productivity of the product bottles 101 can be improved.

Also according to the present modification, the number of times the inside of the first sterile chamber 70*f* is cleaned and sterilized can be decreased, and as for the content-filling system 10, the regions to be cleaned and sterilized can be narrowed. In addition, the number of times the filling device 20 that is contained in the first sterile chamber 70*f* is cleaned and sterilized can be decreased, and as for the content-filling system 10, the regions to be cleaned and sterilized can be narrowed. For this reason, the amount of the vapor that is used, for example, can be decreased. Since the regions to be cleaned and sterilized can be narrowed, the time for cleaning and the time for sterilization can be decreased. For this reason, the amount of carbon dioxide that is discharged by the content-filling system 10 can be decreased.

In the case where the process of CSIP in which the process of CIP and the process of SIP are simultaneously performed is performed, it is necessary to rinse the used detergent with the inside of the undiluted-solution-filling device 22, for example, kept sterile after the process of CSIP. At this time, the use of the water that is sterilized by the water sterilization line 50 for rinsing enables the amount of carbon dioxide that is discharged by the content-filling system 10 to be decreased. The water that is sterilized by the water sterilization line 50 can be stored in the second water tank 52, and accordingly, the detergent can be rinsed right after the process of CSIP. For this reason, the downtime can be decreased. A flow path from the second water tank 52 to a sterile area at which the process of CSIP and the process of CSOP are performed is preferably cleaned (CIP) and sterilized (SIP) before the detergent is rinsed after the process of CSIP. In this case, the detergent or a sterilizing agent may be supplied to the second bypass line 56, for example, from the connection point CP1 (see, for example, FIG. 1 and FIG. 2A) at which the second bypass line 56 is connected to the water sterilization line 50, or the flow path described above may be sterilized by using, for example, vapor or hot water.

(Second Modification)

In an example described according to the embodiment described above, the first sterilizer 62, for example, is sterilized by using the vapor, the hot water, or the sterilizing agent in the case where the first sterilizer 62 of the water sterilizer 60, for example, is sterilized, but this is not a limitation. For example, in the case where the first sterilizer 62, for example, is vulnerable to heat and/or has low chemical resistance, the first sterilizer 62, for example, may be sterilized by using sterilized water. In this case, the sterilized water may be the water that is sterilized by using the ultraviolet rays in, for example, the first sterilizer 62. The control unit 90 may cause the sterilized water to circulate through the circulation system 59A (see, for example, FIG. 2A) that includes the water sterilizer 60 such that the number of the microbes in the circulating water is gradually decreased and may consequently cause the first sterilizer 62, for example, to be sterilized. At this time, the control unit 90 may cause the sterilized water to circulate through the circulation system 59A at least three times or more, preferably 10 times or more.

Figure 21:
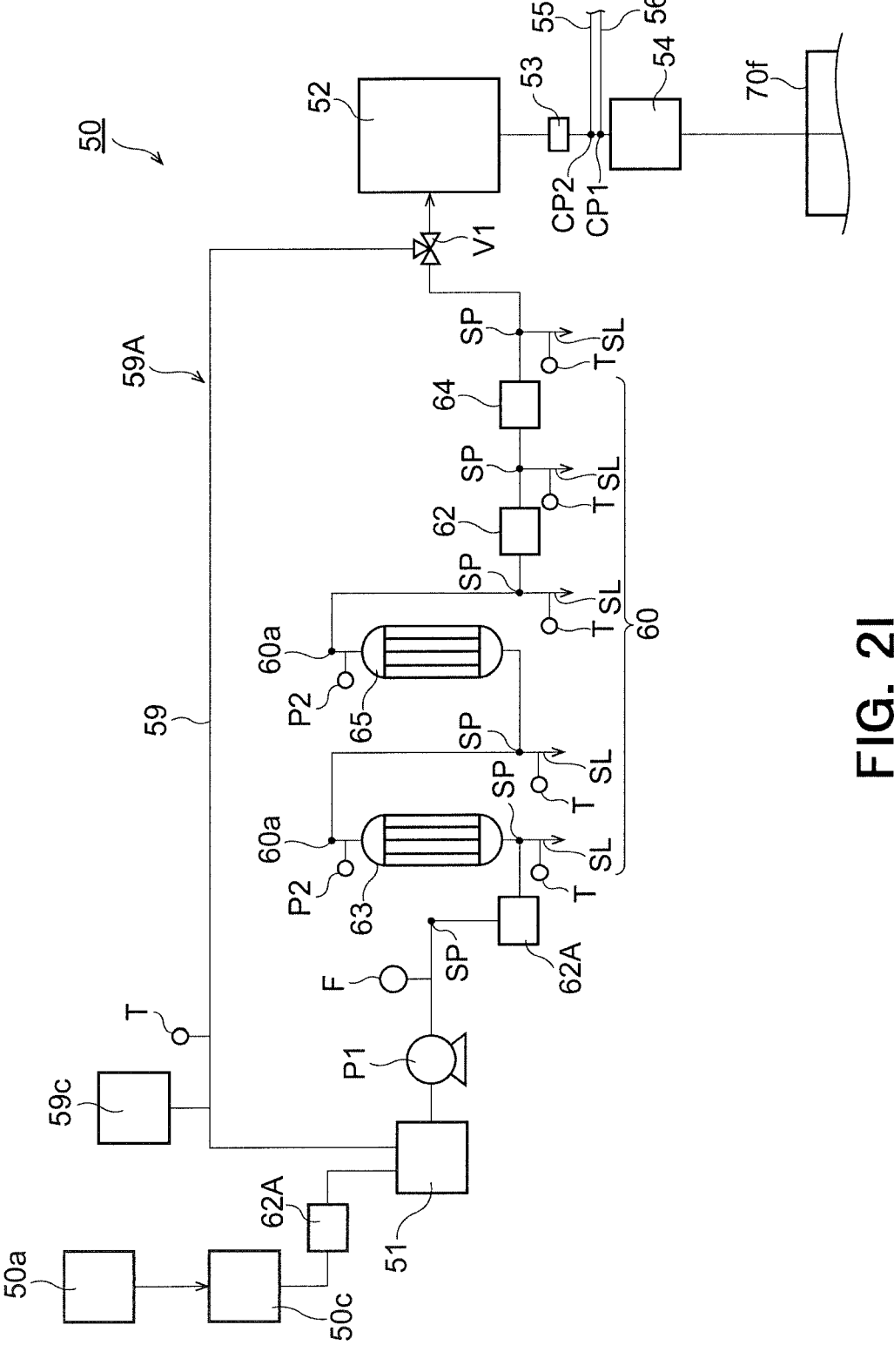
FIG. 21 is a flowchart illustrating a second modification to the method of sterilizing the content-filling system according to an embodiment.

According to the present modification, the first sterile filter 63 and the second sterile filter 65 are first sterilized (SIP) (the process of SIP, a symbol S231 in FIG. 21). In this case, the foreign-material removal filter 61 is preferably sterilized (SIP) by using vapor in advance.

Subsequently, the water is supplied to the circulation system 59A that includes the water sterilizer 60 (a process of supplying the water, a symbol S232 in FIG. 21). At this time, the pump P1 first conveys pure water. At this time, the pure water the temperature of which is adjusted to a predetermined temperature (for example, 25° C.) by using, for example, a heat exchanger (not illustrated) is supplied to, for example, the first sterile filter 63. Consequently, the membrane of, for example, the first sterile filter 63 is moistened. Subsequently, the pump P1 is stopped.

Subsequently, the integrity test (a process of the integrity test, a symbol S233 in FIG. 21) is conducted for at least the first sterile filter 63 or the second sterile filter 65. During the integrity test, the valve (not illustrated) near, for example, the first sterile filter 63 is closed, and sterile air is supplied to, for example, the first sterile filter 63. The sterile air that is supplied to, for example, the first sterile filter 63 is gradually compressed, and the value of the bubble point of, for example, the first sterile filter 63 is measured. Subsequently, whether the first sterile filter 63, for example, is perfect (whether the sterile air does not leak at predetermined pressure) is checked by using the value of the bubble point that is measured multiple times (for example, three times). In the case where it is determined that the first sterile filter 63, for example, is not perfect during the integrity test, the first sterile filter 63, for example, is replaced.

Subsequently, the water is sterilized in, for example, the first sterilizer 62 (a process of sterilizing the water, a symbol S234 in FIG. 21). At this time, the pump P1 first conveys the pure water. After the first sterilizer 62, for example, is filled with the water, the first ultraviolet lamp 67*a*, for example, radiates the ultraviolet rays to the water. In this case, the irradiation time (the time for sterilization) for which the ultraviolet rays are radiated is preferably 10 seconds or more and 30 minutes or less. At this time, the irradiance of the ultraviolet rays that are radiated from, for example, the first ultraviolet lamp 67*a* may be checked. In the case where the irradiance of the ultraviolet rays that are radiated from, for example, the first ultraviolet lamp 67*a*, is abnormal, the first ultraviolet lamp 67*a*, for example, may be replaced.

An intermediate-pressure mercury lamp operates roughly at a temperature of 600° C. or more and 900° C. or less. For this reason, in the case where the first ultraviolet lamp 67a, for example, is an intermediate-pressure mercury lamp, the ultraviolet rays are preferably radiated to the water while the pump P1 conveys the water. This can inhibit the first ultraviolet lamp 67a, for example, from excessively generating heat. At this time, the water to which the ultraviolet rays are radiated may be stored in, for example, the second water tank 52. Alternatively, the water to which the ultraviolet rays are radiated may be circulated in the circulation system 59A. In the case where the water to which the ultraviolet rays are radiated is circulated in the circulation system 59A, the level of the sterile properties of the water can be increased.

A low-pressure mercury lamp operates roughly at a temperature of 40° C. or more and 100° C. or less. For this reason, in the case where the first ultraviolet lamp 67a, for example, is a low-pressure mercury lamp, the ultraviolet rays may be radiated to the water with the pump P1 stopped.

Subsequently, the sterilized water is circulated through the circulation system 59A that includes the water sterilizer 60 (a process of circulating the water, a symbol S235 in FIG. 21). At this time, the water to which the ultraviolet rays are radiated passes through the second sterile filter 65. The pure water that passes through the second sterile filter 65 is supplied to the first water tank 51 via the circulation line 59. In this way, the sterilized pure water circulates in the circulation system 59A.

Subsequently, the sterilized water may be circulated through the circulation system 59A at least one time or more, preferably three times or more. Since the pure water is thus circulated in the circulation system 59A three times or more, the sterilizing effect of the water on, for example, the first sterilizer 62 can be improved. At this time, the cumulative irradiation amount of the ultraviolet rays to the circulating sterilized water is preferably at least 100 mJ/cm² or more and 3000 mJ/cm² or less, more preferably 1000 mJ/cm² or more and 3000 mJ/cm² or less. When the cumulative irradiation amount of the ultraviolet rays to the circulating water is 100 mJ/cm² or more, the sterilizing effect of the ultraviolet rays on the water can be improved. When the cumulative irradiation amount of the ultraviolet rays is 3000 mJ/cm² or less, power consumption can be reduced, and the amount of carbon dioxide that is discharged by the content-filling system 10 can be decreased.

In this way, the first sterilizer 62, for example, is sterilized.

The first sterilizer 62, for example, may be sterilized by using, for example, detergent. In this case, the detergent may be supplied to only the first sterilizer 62 and the second sterilizer 64, and the first sterilizer 62, for example, may be consequently sterilized. Examples of the detergent may include detergent that contains peracetic acid and may include hydrogen peroxide, an alkali chemical, an acid chemical, and sodium hypochlorite. Subsequently, the sterile water may be supplied from the second water tank 52 that stores the sterile water in advance to the circulation system 59A, and the first sterilizer 62, for example, may be consequently rinsed by using the sterile water.

According to the present modification, the control unit 90 causes the sterilized water to circulate through the circulation system 59A that includes the water sterilizer 60 and consequently causes the first sterilizer 62 to be sterilized. The first sterilizer 62 is thus sterilized without using vapor, hot water, and heated sterilizing agent. This enables the amount of carbon dioxide that is discharged by the content-filling system 10 to be decreased and enables the costs when the water sterilizer 60 is sterilized to be reduced.

According to the present modification, the ultraviolet rays sterilize the water in the first sterilizer 62. This enables the amount of carbon dioxide that is discharged by the content-filling system to be decreased, unlike the case where the water is sterilized by being heated.

Multiple components disclosed in the embodiments and the modifications described above can be appropriately combined as needed. Some components may be removed from all of the components disclosed in the embodiments and the modifications described above.

The invention claimed is:

1. A content-filling system comprising:
a water sterilization line that sterilizes water without heating;
an undiluted-solution sterilization line that heats and sterilizes a product undiluted solution;
a filling device that is connected to the water sterilization line and the undiluted-solution sterilization line and that fills the water and the product undiluted solution in a container; and
a control unit that controls the water sterilization line,
wherein the water sterilization line sterilizes the water by using an ultraviolet ray, and
wherein the control unit causes the water to be discharged to a location outside the water sterilization line in a case in which an irradiation amount or irradiance of the ultraviolet ray is equal to or less than a predetermined value.

2. The content-filling system according to claim 1, wherein at the water sterilization line, the water is sterilized by using the ultraviolet ray at least from a low-pressure mercury lamp or an intermediate-pressure mercury lamp.

3. The content-filling system according to claim 1, wherein the water sterilization line sterilizes the water by filtering the water using a sterile filter.

4. The content-filling system according to claim 1, wherein the product undiluted solution is diluted with the water by a factor that is greater than or equal to 1.1 and less than or equal to 100.

5. The content-filling system according to claim 1, wherein a mixing tank that mixes the water and the product undiluted solution is interposed between the water sterilization line and the filling device and between the undiluted-solution sterilization line and the filling device.

6. The content-filling system according to claim 1, wherein the filling device includes a plurality of filling nozzles that fill the water and the product undiluted solution, and the water sterilization line and the undiluted-solution sterilization line are connected to a corresponding one of the plurality of filling nozzles.

7. A sterilizing method of sterilizing the content-filling system according to claim 1,
wherein the water sterilization line includes at least a water sterilizer,
wherein the water sterilizer includes at least one sterile filter and at least one sterilizer, and
wherein the sterilizing method comprises: a step of conducting a first integrity test for the at least one sterile filter;
a step of sterilizing the at least one sterile filter; and
a step of conducting a second integrity test for the at least one sterile filter.

8. The sterilizing method according to claim 7, further comprising: a step of sterilizing the at least one sterilizer.

9. The sterilizing method according to claim 8, wherein the step of sterilizing the at least one sterilizer includes:

a step of supplying hot water to the water sterilizer, a step of circulating the hot water in a circulation system that includes the at least one sterilizer, and a step of cooling the circulation system.

10. The sterilizing method according to claim 8, wherein the step of sterilizing the at least one sterilizer includes:

a step of supplying a chemical to the water sterilizer, a step of circulating the chemical in a circulation system that includes the at least one sterilizer, and a step of rinsing the circulation system.

11. The sterilizing method according to claim 8, wherein the step of sterilizing the at least one sterile filter is performed while the step of sterilizing the at least one sterilizer is performed.

12. A content-filling system comprising:

a water sterilization line that sterilizes water without heating;

an undiluted-solution sterilization line that heats and sterilizes a product undiluted solution;

a filling device that is connected to the water sterilization line and the undiluted-solution sterilization line and that fills the water and the product undiluted solution in a container; and a control unit that controls the water sterilization line, wherein the water sterilization line includes at least a water sterilizer that sterilizes the water, wherein the water sterilizer includes at least a sterile filter, and wherein the control unit causes the water to be discharged to a location outside the water sterilization line in a case which a difference between pressure at a position upstream of the sterile filter and pressure at a position downstream of the sterile filter is a predetermined value or more.

13. A content-filling system comprising:

a water sterilization line that sterilizes water without heating;

an undiluted-solution sterilization line that heats and sterilizes a product undiluted solution;

a filling device that is connected to the water sterilization line and the undiluted-solution sterilization line and that fills the water and the product undiluted solution in a container; and a control unit that controls the water sterilization line, wherein the control unit causes the water to be discharged to a location outside the water sterilization line in a case in which at least a number of a microbe or a number of a fine particle in the water that is sampled from the water sterilization line is a predetermined value or more.

14. A content-filling system comprising:

a water sterilization line that sterilizes water without heating;

an undiluted-solution sterilization line that heats and sterilizes a product undiluted solution; and a filling device that is connected to the water sterilization line and the undiluted-solution sterilization line and that fills the water and the product undiluted solution in a container;

wherein the filling device includes a water-filling device that is connected to the water sterilization line and an undiluted-solution-filling device that is connected to the undiluted-solution sterilization line, the water-filling device fills the water that is sterilized in the container, and the undiluted-solution-filling device fills the product undiluted solution that is sterilized in the container.

15. The content-filling system according to claim 14, wherein the water-filling device fills the water in the container when the container is empty, and a filling rate at which the water-filling device fills the water in the container is higher than a filling rate at which the undiluted-solution-filling device fills the product undiluted solution in the container.

16. The content-filling system according to claim 14, wherein the water-filling device includes a plurality of water-filling nozzles that fills the water, a snifting line for discharging gas in the container is connected to a corresponding one of the plurality of water-filling nozzles, and the water-filling device compresses and fills the water with the gas in the container being discharged via the snifting line.

17. The content-filling system according to claim 16, wherein a seal member that inhibits the gas in the container from leaking by coming into close contact with the container is disposed at an end of the plurality of water-filling nozzles, and the water-filling device compresses and fills the water with the seal member being in close contact with the container.

18. The content-filling system according to claim 16, wherein the undiluted-solution-filling device includes a plurality of undiluted-solution-filling nozzles that fills the product undiluted solution, and a diameter of the plurality of water-filling nozzles is larger than a diameter of the plurality of undiluted-solution-filling nozzles.

19. The content-filling system according to claim 18, wherein the diameter of the plurality of water-filling nozzles is greater than or equal to 1.2 times the diameter of the plurality of undiluted-solution-filling nozzles and less than or equal to 1.5 times the diameter of the plurality of undiluted-solution-filling nozzles.

20. The content-filling system according to claim 14, wherein the filling device includes a plurality of undiluted-solution-filling devices.

21. The content-filling system according to claim 20, further comprising: a plurality of undiluted-solution sterilization lines, wherein each of the plurality of undiluted-solution-filling devices is connected to a corresponding one of the plurality of undiluted-solution sterilization lines.

22. The content-filling system according to claim 21, wherein the plurality of undiluted-solution-filling devices include a first undiluted-solution-filling device that fills a product undiluted solution that has no flavor, and a second undiluted-solution-filling device that fills a product undiluted solution that has flavor.

23. The content-filling system according to claim 22, wherein the first undiluted-solution-filling device is contained in a space that is divided by a chamber wall, wherein the chamber wall has a gap through which the container passes, wherein a first wheel that includes a first gripper that conveys the container is disposed outside the space so as to be capable of opening and closing, wherein a second wheel that includes a second gripper that conveys the container is disposed in the space so as to be capable of opening and closing, wherein the second gripper receives the container from the first gripper in a case in which the first undiluted-solution-filling device fills the product undiluted solution that has no flavor in the container, and wherein the second gripper moves to an open position so as not to interfere with the first gripper in a case in which the first undiluted-solution-filling device does not fill the product undiluted solution that has no flavor in the container.

24. The content-filling system according to claim 23, wherein the chamber wall includes a shutter that covers and uncovers the gap, wherein the shutter covers the gap in a case in which the first undiluted-solution-filling device does not fill the product undiluted solution that has no flavor in the container, and wherein the second gripper moves to the open position so as not to interfere with the shutter that covers the gap.

25. A content-filling system comprising:

a water sterilization line that sterilizes water without heating;

an undiluted-solution sterilization line that heats and sterilizes a product undiluted solution; and a filling device that is connected to the water sterilization line and the undiluted-solution sterilization line and that fills the water and the product undiluted solution in a container;

wherein the filling device includes a water-filling device that is connected to the water sterilization line and an undiluted-solution-filling device that is connected to the undiluted-solution sterilization line, and the water or the product undiluted solution is filled in the container by using only the water-filling device or the undiluted-solution-filling device, respectively.

26. A content-filling system comprising:

a water sterilization line that sterilizes water without heating;

an undiluted-solution sterilization line that heats and sterilizes a product undiluted solution; and a filling device that is connected to the water sterilization line and the undiluted-solution sterilization line and that fills the water and the product undiluted solution in a container;

wherein the water sterilization line includes a first water tank that stores the water, a water sterilizer that sterilizes the water that is stored in the first water tank, and a second water tank that stores the water that is sterilized by the water sterilizer, and wherein the undiluted-solution sterilization line includes a first undiluted-solution tank that stores the product undiluted solution, a product-undiluted-solution sterilizer that heats and sterilizes the product undiluted solution that is stored in the first undiluted-solution tank, and a second undiluted-solution tank that stores the product undiluted solution that is sterilized by the product-undiluted-solution sterilizer.

27. The content-filling system according to claim 26, wherein the water sterilization line includes a plurality of water sterilizers.

28. The content-filling system according to claim 26, further comprising: a cap-sterilizing device that sterilizes a cap to be mounted on the container in which the water and the product undiluted solution are filled; and a bypass line that connects the water sterilization line and the cap-sterilizing device to each other and that is disposed downstream of the second water tank.

29. The content-filling system according to claim 26, wherein an addition unit that adds a solid into the product undiluted solution is disposed downstream of the second undiluted-solution tank.

30. A content-filling system comprising:

a water sterilization line that sterilizes water without heating;

an undiluted-solution sterilization line that heats and sterilizes a product undiluted solution;

a filling device that is connected to the water sterilization line and the undiluted-solution sterilization line and that fills the water and the product undiluted solution in a container;

a preform-sterilizing device that sterilizes a preform;

a container-molding device that molds the container by using the preform; and a container-sterilizing device that sterilizes the container, wherein the container-molding device molds the container without adjusting temperature of the container by using warm water.

31. A content-filling system comprising:

a water sterilization line that sterilizes water without heating;

an undiluted-solution sterilization line that heats and sterilizes a product undiluted solution; and a filling device that is connected to the water sterilization line and the undiluted-solution sterilization line and that fills the water and the product undiluted solution in a container;

wherein the water sterilization line is divided into a non-sterile zone in a non-sterile atmosphere, a first gray zone and a second gray zone that isolate the non-sterile atmosphere and a sterile atmosphere from each other, and a sterile zone in the sterile atmosphere, the non-sterile zone, the first gray zone, the second gray zone, and the sterile zone are arranged in this order from an upstream position to a downstream position in a direction in which the water is conveyed, a microbe in the water is killed in the first gray zone, and a state in which no microbe is present in the water is maintained in the second gray zone.

* * * * *